United States Patent
Edmunds et al.

(10) Patent No.: US 12,552,766 B2
(45) Date of Patent: Feb. 17, 2026

(54) PESTICIDALLY ACTIVE AZOLE AMIDE COMPOUNDS

(71) Applicant: SYNGENTA CROP PROTECTION AG, Basel (CH)

(72) Inventors: Andrew Edmunds, Stein (CH); Amandine Kolleth Krieger, Stein (CH); Thomas Pitterna, Stein (CH); Sebastian Rendler, Stein (CH); Jürgen Harry Schaetzer, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 1186 days.

(21) Appl. No.: 17/632,391

(22) PCT Filed: Mar. 19, 2020

(86) PCT No.: PCT/EP2020/057547
§ 371 (c)(1),
(2) Date: Feb. 2, 2022

(87) PCT Pub. No.: WO2020/188014
PCT Pub. Date: Sep. 24, 2020

(65) Prior Publication Data
US 2022/0306599 A1    Sep. 29, 2022

(30) Foreign Application Priority Data
Mar. 20, 2019   (EP) .................................. 19163938

(51) Int. Cl.
*C07D 401/04*   (2006.01)
*A01N 43/653*   (2006.01)
*C07D 403/04*   (2006.01)

(52) U.S. Cl.
CPC ......... *C07D 401/04* (2013.01); *A01N 43/653* (2013.01); *C07D 403/04* (2013.01)

(58) Field of Classification Search
CPC ... C07D 401/04; C07D 403/04; A01N 43/653
See application file for complete search history.

(56) References Cited

U.S. PATENT DOCUMENTS

2015/0322037 A1   11/2015   Wang et al.

FOREIGN PATENT DOCUMENTS

| JP | H0291062 A | 3/1990 |
|---|---|---|
| JP | 2022-505376 A | 1/2022 |
| JP | 2022-523430 A | 4/2022 |
| JP | 2022-526795 A | 5/2022 |
| WO | 2017192385 A1 | 11/2017 |
| WO | 2019170626 A1 | 9/2019 |
| WO | 2019197468 A1 | 10/2019 |
| WO | 2019201835 A1 | 10/2019 |
| WO | 2019202077 A1 | 10/2019 |
| WO | 2019206799 A1 | 10/2019 |
| WO | 2020002563 A1 | 1/2020 |
| WO | 2020/079198 A1 | 4/2020 |
| WO | 2020/182577 A1 | 9/2020 |
| WO | 2020/201079 A1 | 10/2020 |

OTHER PUBLICATIONS

Extended European Search Report for EP19161558.2, mailed on Apr. 24, 2019.
Written Opinion of the International Searching Authority and International Search Report for International Application No. PCT/EP2020/055989, mailed on Apr. 17, 2020.
Extended European Search Report for EP19157859.0, mailed on Apr. 15, 2019.
Written Opinion of the International Searching Authority and International Search Report for International Application No. PCT/EP2020/053753, mailed on Apr. 6, 2020.
Extended European Search Report for EP19164611.6, mailed on Sep. 11, 2019.
Written Opinion of the International Searching Authority and International Search Report for International Application No. PCT/EP2020/057546, mailed on Apr. 20, 2020.
Extended European Search Report for EP19164088.7, mailed on May 13, 2019.
Written Opinion of the International Searching Authority and International Search Report for International Application No. PCT/EP2020/057593, mailed on May 25, 2020.
Extended European Search Report for EP19163938.4, mailed on May 13, 2019.
Written Opinion of the International Searching Authority and International Search Report for International Application No. PCT/EP2020/057547, mailed on May 4, 2020.
Extended European Search Report issued in European Patent Application No. EP19164611.6, mailed Sep. 11, 2019.

*Primary Examiner* — Ali Soroush
*Assistant Examiner* — Andriae M Holt
(74) *Attorney, Agent, or Firm* — BakerHostetler; Toni-Junell Herbert

(57) ABSTRACT

Compounds of formula (I) wherein the substituents are as defined in claim 1, and the agrochemically acceptable salts, stereoisomers, enantiomers, tautomers and N-oxides of those compounds, can be used as insecticides.

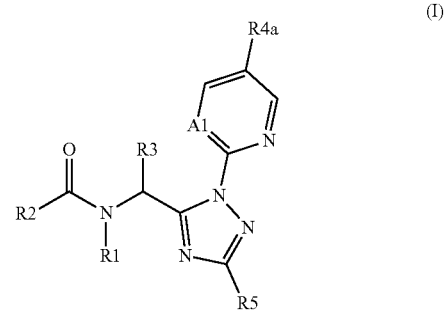

17 Claims, No Drawings

PESTICIDALLY ACTIVE AZOLE AMIDE COMPOUNDS

CROSS-REFERENCE TO RELATED APPLICATIONS

This application is a 371 National Stage application of International Application No. PCT/EP2020/057547 filed Mar. 19, 2020, which claims priority to EP 19163938.4, filed Mar. 20, 2019, the entire contents of these applications are hereby incorporated by reference.

The present invention relates to pesticidally active, in particular insecticidally or acaricidally active azole-amide compounds, to processes for their preparation, to compositions comprising those compounds, and to their use for controlling animal pests, including arthropods and in particular insects or representatives of the order Acarina.

WO2017192385 describes certain heteroaryl-1,2,4-triazole and heteroaryl-tetrazole compounds for use for controlling ectoparasites in animals (such as a mammal and a non-mammal animal).

There have now been found novel pesticidally active azole amide compounds.

The present invention accordingly relates, in a first aspect, to a compound of the formula I

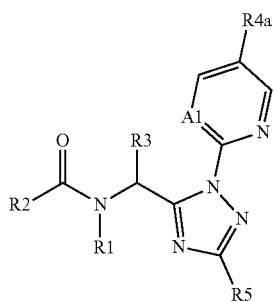

wherein $R_1$ is H, $C_1$-$C_6$alkyl, $C_1$-$C_6$cyanoalkyl, aminocarbonyl$C_1$-$C_6$alkyl, hydroxycarbonyl$C_1$-$C_6$alkyl, $C_1$-$C_6$nitroalkyl, trimethylsilane$C_1$-$C_6$alkyl, $C_1$-$C_6$haloalkyl, $C_2$-$C_6$alkenyl, $C_2$-$C_6$haloalkenyl, $C_2$-$C_6$alkynyl, $C_2$-$C_6$haloalkynyl, $C_3$-$C_4$cycloalkyl$C_1$-$C_2$alkyl-, $C_3$-$C_4$cycloalkyl$C_1$-$C_2$alkyl- wherein the $C_3$-$C_4$cycloalkyl group is substituted with 1 or 2 halogen atoms, oxetan-3-yl-$CH_2$—, benzyl or benzyl substituted with halogen or $C_1$-$C_6$haloalkyl;

$R_2$ is selected from phenyl, pyridine, pyrimidine, pyrazine, pyridazine, and phenyl, pyridine, pyrimidine, pyrazine and pyridazine, each of which is substituted with one to three substituents, provided the substituent(s) are not on either carbon adjacent to the carbon C=X is attached, and each substituent is independently selected from: $C_1$-$C_3$alkyl, $C_1$-$C_3$haloalkyl, $C_1$-$C_3$haloalkylthio, $C_1$-$C_3$alkoxy, $C_1$-$C_3$haloalkoxy, halo, $SF_5$, CN, $CONH_2$, and $C(S)NH_2$;

$R_3$ is $C_1$-$C_3$alkyl or $C_1$-$C_3$haloalkyl;

$A_1$ is $CR_{4b}$ or N;

$R_{4b}$ is hydrogen, or halogen;

$R_{4a}$ is cyano, or $C_1$-$C_3$haloalkoxy;

$R_5$ is halogen, amino, ($C_1$-$C_3$alkyl)amino, di($C_1$-$C_3$alkyl) amino, hydroxy, cyano, $C_3$-$C_4$halocycloalkyl, $C_2$-$C_6$haloalkenyl, $C_1$-$C_4$haloalkylsulfanyl, $C_1$-$C_4$haloalkylsulfinyl, $C_1$-$C_4$haloalkylsulfonyl, $C_1$-$C_4$alkylsulfanyl, $C_1$-$C_4$alkylsulfinyl, $C_1$-$C_4$alkylsulfonyl, ($C_1$-$C_3$alkyl)sulfonylamino, ($C_1$-$C_3$alkyl)sulfonyl($C_1$-$C_3$alkyl)amino, ($C_1$-$C_3$alkyl)NHC (O), ($C_1$-$C_3$alkyl)$_2$NC(O), ($C_3$-$C_6$cycloalkyl)NHC(O), ($C_3$-$C_6$cycloalkyl)($C_1$-$C_3$alkyl)NC(O), ($C_1$-$C_3$alkyl)C (O)($C_1$-$C_3$alkyl)N, ($C_1$-$C_3$alkyl)C(O)NH, diphenylmethanimine, or $C_1$-$C_3$haloalkoxy; or agrochemically acceptable salts, stereoisomers, enantiomers, tautomers and N-oxides of the compounds of formula I.

Compounds of formula I which have at least one basic centre can form, for example, acid addition salts, for example with strong inorganic acids such as mineral acids, for example perchloric acid, sulfuric acid, nitric acid, nitrous acid, a phosphorus acid or a hydrohalic acid, with strong organic carboxylic acids, such as $C_1$-$C_4$alkanecarboxylic acids which are unsubstituted or substituted, for example by halogen, for example acetic acid, such as saturated or unsaturated dicarboxylic acids, for example oxalic acid, malonic acid, succinic acid, maleic acid, fumaric acid or phthalic acid, such as hydroxycarboxylic acids, for example ascorbic acid, lactic acid, malic acid, tartaric acid or citric acid, or such as benzoic acid, or with organic sulfonic acids, such as $C_1$-$C_4$alkane- or arylsulfonic acids which are unsubstituted or substituted, for example by halogen, for example methane- or p-toluenesulfonic acid. Compounds of formula I which have at least one acidic group can form, for example, salts with bases, for example mineral salts such as alkali metal or alkaline earth metal salts, for example sodium, potassium or magnesium salts, or salts with ammonia or an organic amine, such as morpholine, piperidine, pyrrolidine, a mono-, di- or tri-lower-alkylamine, for example ethyl-, diethyl-, triethyl- or dimethylpropylamine, or a mono-, di- or trihydroxy-lower-alkylamine, for example mono-, di- or triethanolamine.

In each case, the compounds of formula I according to the invention are in free form, in oxidized form as a N-oxide or in salt form, e.g. an agronomically usable salt form.

N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

The compounds of formula I according to the invention also include hydrates which may be formed during the salt formation.

The term "$C_1$-$C_n$alkyl" as used herein refers to a saturated straight-chain or branched hydrocarbon radical attached via any of the carbon atoms having 1 to n carbon atoms, for example, any one of the radicals methyl, ethyl, n-propyl, 1-methylbutyl, 2-methylbutyl, 3-methylbutyl, 2,2-dimethylpropyl, 1-ethylpropyl, n-hexyl, n-pentyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl.

The term "$C_1$-$C_n$haloalkyl" as used herein refers to a straight-chain or branched saturated alkyl radical attached via any of the carbon atoms having 1 to n carbon atoms (as mentioned above), where some or all of the hydrogen atoms in these radicals may be replaced by fluorine, chlorine, bromine and/or iodine, i.e., for example, any one of chloromethyl, dichloromethyl, trichloromethyl, fluoromethyl, difluoromethyl, trifluoromethyl, chlorofluoromethyl, dichlorofluoromethyl, chlorodifluoromethyl, 2-fluoroethyl, 2-chloroethyl, 2-bromoethyl, 2-iodoethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, 2-fluoropropyl, 3-fluoropropyl, 2,2-difluoropropyl, 2,3-difluoropropyl, 2-chloropropyl, 3-chloropropyl, 2,3-dichloropropyl, 2-bromopropyl, 3-bromopropyl, 3,3,3-trifluoropropyl, 3,3,3-trichloropropyl, 2,2,3,3,3-pentafluoropropyl, heptafluoropropyl, 1-(fluoromethyl)-2-fluoroethyl, 1-(chloromethyl)-2-chloroethyl, 1-(bromomethyl)-2-bromoethyl, 4-fluorobutyl, 4-chlorobutyl, 4-bromobutyl or nonafluorobutyl. According a term "$C_1$-$C_2$fluoroalkyl" would refer to a $C_1$-$C_2$alkyl radical which carries 1, 2, 3, 4, or 5 fluorine atoms, for example, any one of difluoromethyl, trifluoromethyl, 1-fluoroethyl, 2-fluoroethyl, 2,2-difluoroethyl, 2,2,2-trifluoroethyl, 1,1,2,2-tetrafluoroethyl or pentafluoroethyl.

The term "$C_1$-$C_n$alkoxy" as used herein refers to a straight-chain or branched saturated alkyl radical having 1 to n carbon atoms (as mentioned above) which is attached via an oxygen atom, i.e., for example, any one of the radicals methoxy, ethoxy, n-propoxy, 1-methylethoxy, n-butoxy, 1-methylpropoxy, 2-methylpropoxy or 1,1-dimethylethoxy. The term "halo$C_1$-$C_n$alkoxy" as used herein refers to a $C_1$-$C_n$alkoxy radical where one or more hydrogen atoms on the alkyl radical is replaced by the same or different halogen atom(s)—examples include trifluoromethoxy, 2-fluoroethoxy, 3-fluoropropoxy, 3,3,3-trifluoropropoxy, 4-chlorobutoxy.

The term "$C_1$-$C_n$cyanoalkyl" as used herein refers to a straight chain or branched saturated $C_1$-$C_n$alkyl radical having 1 to n carbon atoms (as mentioned above), where one of the hydrogen atoms in these radicals is be replaced by a cyano group: for example, cyanomethyl, 2-cyanoethyl, 2-cyanopropyl, 3-cyanopropyl, 1-(cyanomethyl)-2-ethyl, 1-(methyl)-2-cyanoethyl, 4-cyanobutyl, and the like.

The term "$C_3$-$C_n$cycloalkyl" as used herein refers to 3-n membered cycloalkyl groups such as cyclopropane, cyclobutane, cyclopentane and cyclohexane.

The term "$C_3$-$C_n$cycloalkyl$C_1$-$C_n$alkyl" as used herein refers to 3 or n membered cycloalkyl group with an alkyl radical, which alkyl radical is connected to the rest of the molecule. In the instance, the $C_3$-$C_n$cycloalkyl$C_1$-$C_n$alkyl-group is substituted, the substituent(s) can be on the cycloalkyl group or alkyl radical.

The term "aminocarbonyl$C_1$-$C_n$alkyl" as used herein refers to an alkyl radical where one of the hydrogen atoms in the radical is replaced by CONH2 group.

The term "hydroxycarbonyl$C_1$-$C_n$alkyl" as used herein refers to an alkyl radical where one of the hydrogen atoms in the radical is replaced by COOH group.

The term "$C_1$-$C_n$nitroalkyl" as used herein refers to an alkyl radical where one of the hydrogen atoms in the radical is replaced by NO2 group.

The term "$C_1$-$C_n$haloalkylthio" as used herein refers to a $C_1$-$C_3$haloalkyl moiety linked through a sulfur atom.

The term "trimethylsilane$C_1$-$C_n$alkyl" as used herein refers to an alkyl radical where one of the hydrogen atoms in the radical is replaced by a —Si(CH$_3$)$_3$ group.

The term "$C_2$-$C_n$alkenyl" as used herein refers to a straight or branched alkenyl chain having from two to n carbon atoms and one or two double bonds, for example, ethenyl, prop-I-enyl, but-2-enyl.

The term "$C_2$-$C_n$haloalkenyl" as used herein refers to a $C_2$-$C_n$alkenyl moiety substituted with one or more halogen atoms which may be the same or different.

The term "$C_2$-$C_n$alkynyl" as used herein refers to a straight or branched alkynyl chain having from two to n carbon atoms and one triple bond, for example, ethynyl, prop-2-ynyl, but-3-ynyl.

The term "$C_2$-$C_n$haloalkynyl" as used herein refers to a $C_2$-$C_n$alkynyl moiety substituted with one or more halogen atoms which may be the same or different.

Halogen is generally fluorine, chlorine, bromine or iodine. This also applies, correspondingly, to halogen in combination with other meanings, such as haloalkyl The pyridine, pyrimidine, pyrazine and pyridazine groups (unsubstituted or substituted) for $R_2$ and $R_4$ are each connected via a carbon atom on the respective ring to the rest of the compound.

As used herein, the term "controlling" refers to reducing the number of pests, eliminating pests and/or preventing further pest damage such that damage to a plant or to a plant derived product is reduced.

The staggered line as used herein, for example, in J-1, M-1 and L-1, represent the point of connection/attachment to the rest of the compound.

As used herein, the term "pest" refers to insects, acarines, nematodes and molluscs that are found in agriculture, horticulture, forestry, the storage of products of vegetable origin (such as fruit, grain and timber); and those pests associated with the damage of man-made structures. The term pest encompasses all stages in the life cycle of the pest.

As used herein, the term "effective amount" refers to the amount of the compound, or a salt thereof, which, upon single or multiple applications provides the desired effect.

An effective amount is readily determined by the skilled person in the art, by the use of known techniques and by observing results obtained under analogous circumstances. In determining the effective amount a number of factors are considered including, but not limited to: the type of plant or derived product to be applied; the pest to be controlled & its lifecycle; the particular compound applied; the type of application; and other relevant circumstances.

As one of ordinary skill in the art will appreciate, compounds of formula I contain a stereogenic centre which is indicated with an asterisk in the structure below:

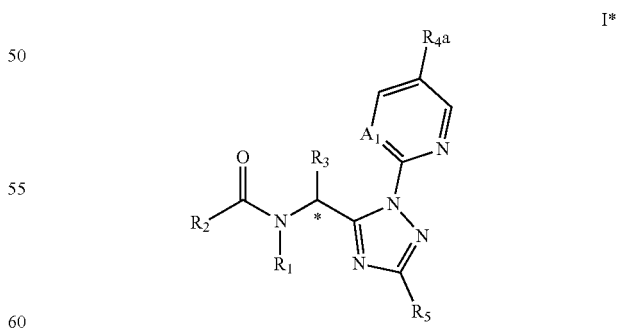

where $R_1$, $R_2$, $R_3$, $R_{4a}$, $R_5$, and $A_1$ are as defined in the first aspect.

The present invention contemplates both racemates and individual enantiomers. Compounds having preferred stereochemistry are set out below.

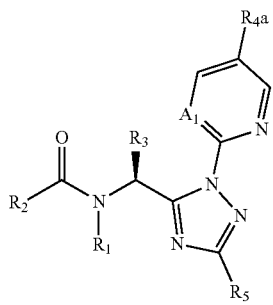

I'a

Particularly preferred compounds of the present invention are compounds of formula I'a: where $R_1$, $R_2$, $R_3$, $R_{4a}$, $R_5$, and $A_1$ are as defined in the first aspect, and stereoisomers, enantiomers, tautomers and N-oxides of the compounds of formula (I'a), and agrochemically acceptable salts thereof.

The term "optionally substituted" as used herein means that the group referenced is either unsubstituted or is substituted by a designated substituent, for example, "$C_3$-$C_4$cycloalkyl is optionally substituted with 1 or 2 halogen atoms" means $C_3$-$C_4$cycloalkyl, $C_3$-$C_4$cycloalkyl substituted with 1 halogen atom and $C_3$-$C_4$cycloalkyl substituted with 2 halogen atoms.

Embodiments according to the invention are provided as set out below.

In an embodiment of each aspect of the invention, $R_1$ is
A. hydrogen, methyl, ethyl, n-propyl, isobutyl, cyclopropylmethyl or HCH≡CCH$_2$—; or
B. hydrogen, methyl, or cyclopropylmethyl; or
C. hydrogen; or
D. methyl; or
E. cyclopropylmethyl.

In an embodiment of each aspect of the invention, $R_2$ is
A. phenyl, pyridine, pyrimidine, pyrazine, pyridazine, or the phenyl, pyridine, pyrimidine, pyrazine and pyridazine, each of which is substituted with one to three substituents, provided the substituent(s) are not on either carbon adjacent to the carbon C═X is attached, and each substituent is independently selected from: $C_1$-$C_3$haloalkyl, $C_1$-$C_3$haloalkylthio, $C_1$-$C_3$alkoxy, $C_1$-$C_3$haloalkoxy, and halogen; or
B. one of M-1 to M-12

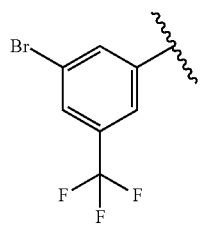
M-1

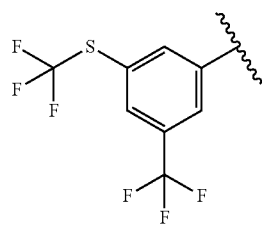
M-2

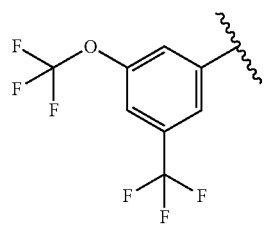
M-3

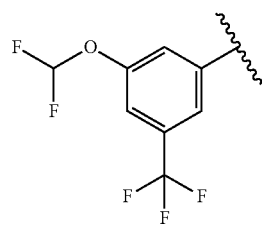
M-4

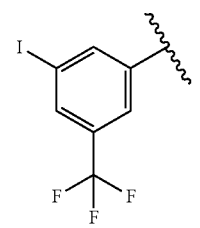
M-5

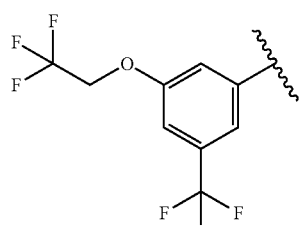
M-6

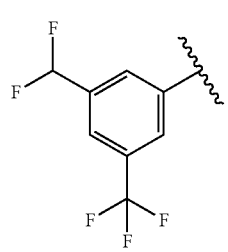
M-7

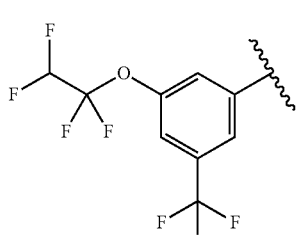
M-8

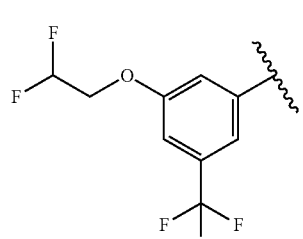
M-9

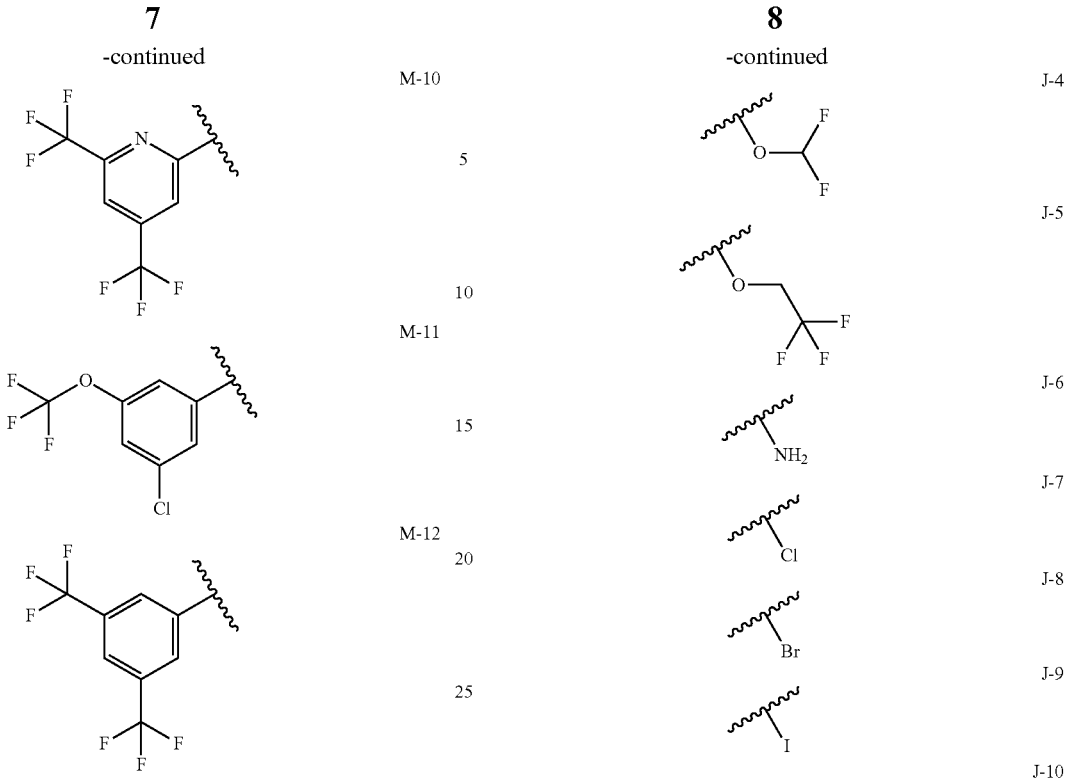

C. one of M-3, M-4, M-5, M-6, M-8, M-9, M-11, or M-12; or
D. one of M-3, M-5, M-6, M-8, M-9, or M-12; or
E. one of M-6, M-9, or M-12.

In an embodiment of each aspect of the invention, $R_3$ is
A. $C_1$-$C_3$alkyl or $C_1$-$C_3$haloalkyl; or
B. methyl.

In an embodiment of each aspect of the invention, $A_1$ is
A. N; or
B. C—$R_{4b}$, where $R_{4b}$ is hydrogen or halogen (such as Cl, F, Br and I); preferably hydrogen.

In an embodiment of each aspect of the invention, $R_{4a}$ is
A. cyano, or $C_1$-$C_3$fluoroalkoxy; or
B. cyano, trifluoromethoxy, difluoromethoxy, 2,2,2-trifluoroethoxy, or 2,2-difluoroethoxy.

In an embodiment of each aspect of the invention, $R_5$ is
A. selected from J-1 to J-11

B. selected from J-2, J-3, J-4, J-5, J-7, J-8, and J-9; or
C. J-2 or J-8.

In a further aspect, $R_5$ includes a 6-membered heteroaryl, such as pyridinyl and pyrimidinyl, for example, 2-pyridinyl and 2-pyrimidinyl.

The present invention, accordingly, makes available a compound of formula I having the substituents $R_1$, $R_2$, $R_3$, $R_{4a}$, $R_5$, and $A_1$ as defined above in all combinations/each permutation. Accordingly, made available, for example, is a compound of formula I with $A_1$ being embodiment A (i.e. $A_1$ is N); $R_1$ being embodiment B (i.e. hydrogen, methyl, cyclopropylmethyl); $R_2$ being an embodiment C (i.e. one of M-3, M-4, M-5, M-6, M-8, M-9, M-11, or M-12); $R_3$ being embodiment B (i.e. methyl); $R_{4a}$ being embodiment B (i.e. cyano, trifluoromethoxy, difluoromethoxy, 2,2,2-trifluoroethoxy, or 2,2-difluoroethoxy); and $R_5$ being embodiment A (i.e selected from J-1 to J-11).

In an embodiment, the compound of formula I can be represented as

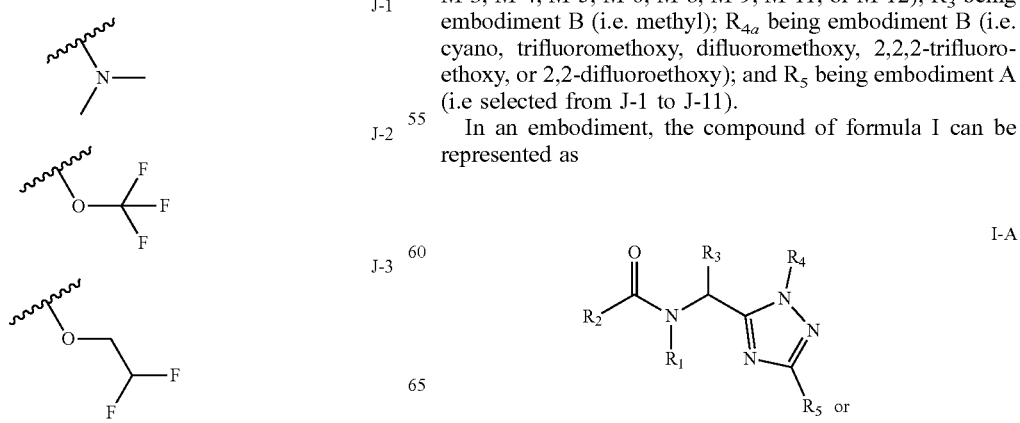

I-A or

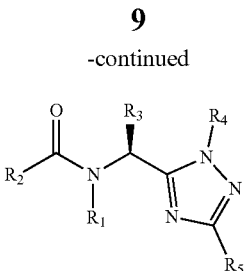

I'-A wherein R1, R$_2$, R$_3$ and R$_5$ are as defined in the first aspect, and R$_4$ is the six-membered cyclic group containing A$_1$ and the substituent R$_{4a}$ as defined in the first aspect.

In an embodiment of each aspect of the invention, the R$_4$ (cyclic group containing A$_1$ and the substituent R$_{4a}$) is A. selected from L-1 to L-9

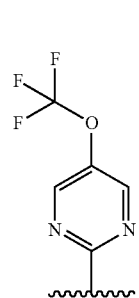

L-1

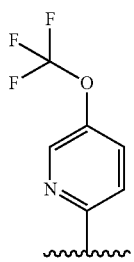

L-2

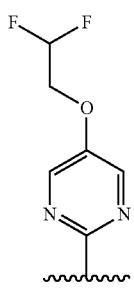

L-3

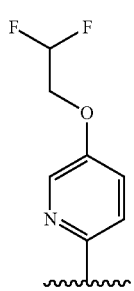

L-4

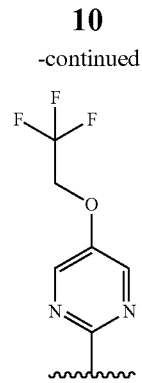

L-5

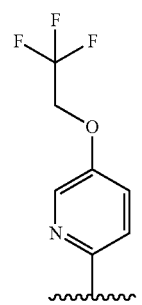

L-6

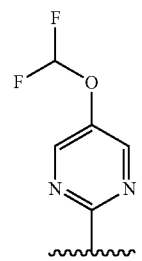

L-7

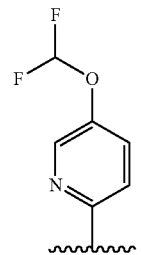

L-8

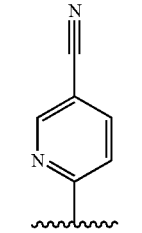

L-9

B. selected from L-1, L-2, L-7, L-8, and L-9; or
C. L-1 or L-9.

In an embodiment of each aspect of the invention, the compound of formula I has as R$_1$ hydrogen, methyl, ethyl, n-propyl, isobutyl, cyclopropylmethyl or HCH≡CCH$_2$—; as R$_2$ one of M-1 to M-12: as R$_3$ methyl; as R$_4$ one of L-1 to L-9; and as R$_5$ one of J-1 to J-11.

In an embodiment of each aspect of the invention, the compound of formula I has as R$_1$ hydrogen, methyl, or cyclopropylmethyl; as R$_2$ one of M-1 to M-12: as R$_3$ methyl; as R$_4$ one of L-1 to L-9; and as R$_5$ one of J-1 to J-11.

In an embodiment of each aspect of the invention, the compound of formula I has as $R_1$ hydrogen; as $R_2$ one of M-1 to M-12: as $R_3$ methyl; as $R_4$ one of L-1 to L-9; and as $R_5$ one of J-1 to J-11.

In an embodiment of each aspect of the invention, the compound of formula I has as $R_1$ hydrogen, methyl, or cyclopropylmethyl; as $R_2$ one of M-3, M-4, M-5, M-6, M-8, M-9, M-11, or M-12; as $R_3$ methyl; as $R_4$ one of L-1 to L-9; and as $R_5$ one of J-1 to J-11.

In an embodiment of each aspect of the invention, the compound of formula I has as $R_1$ hydrogen, methyl, or cyclopropylmethyl; as $R_2$ one of M-3, M-5, M-6, M-8, M-9, or M-12; as $R_3$ methyl; as $R_4$ one of L-1 to L-9; and as $R_5$ one of J-1 to J-11.

In an embodiment of each aspect of the invention, the compound of formula I has as $R_1$ hydrogen, methyl, or cyclopropylmethyl; as $R_2$ one of M-3, M-5, M-6, M-8, M-9, or M-12; as $R_3$ methyl; as $R_4$ one of L-1, L-2, L-7, L-8, and L-9; and as $R_5$ one of J-1 to J-11.

In an embodiment of each aspect of the invention, the compound of formula I has as $R_1$ hydrogen, methyl, or cyclopropylmethyl; as $R_2$ one of M-3, M-5, M-6, M-8, M-9, or M-12; as $R_3$ methyl; as $R_4$ one of L-1, L-2, L-7, L-8, and L-9; and as $R_5$ one J-2, J-3, J-4, J-5, J-7, J-8, and J-9.

In an embodiment of each aspect of the invention, the compound of formula I has as $R_1$ hydrogen, methyl, or cyclopropylmethyl; as $R_2$ one of M-6, M-9, or M-12: as $R_3$ methyl; as $R_4$ one of L-1 or L-9; and as $R_5$ one J-2 or J-8.

In a second aspect, the present invention makes available a composition comprising a compound of formula I as defined in the first aspect, one or more auxiliaries and diluent, and optionally one more other active ingredient.

In a third aspect, the present invention makes available a method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of a compound as defined in the first aspect or a composition as defined in the second aspect.

In a fourth aspect, the present invention makes available a method for the protection of plant propagation material from the attack by insects, acarines, nematodes or molluscs, which comprises treating the propagation material or the site, where the propagation material is planted, with an effective amount of a compound of formula I as defined in the first aspect or a composition as defined in the second aspect.

In a fifth aspect, the present invention makes available a plant propagation material, such as a seed, comprising, or treated with or adhered thereto, a compound of formula I as defined in the first aspect or a composition as defined in the second aspect.

The present invention in a further aspect provides a method of controlling parasites in or on an animal in need thereof comprising administering an effective amount of a compound of the first aspect. The present invention further provides a method of controlling ectoparasites on an animal in need thereof comprising administering an effective amount of a compound of formula I as defined om the first aspect. The present invention further provides a method for preventing and/or treating diseases transmitted by ectoparasites comprising administering an effective amount of a compound of formula I as defined in the first aspect, to an animal in need thereof.

Compounds of formula I can be prepared by those skilled in the art following known methods. More specifically compounds of formulae I, and I'a, and intermediates therefor can be prepared as described below in the schemes and examples. Certain stereogenic centers have been left unspecified for the clarity and are not intended to limit the teaching of the schemes in any way.

Compounds of formula I

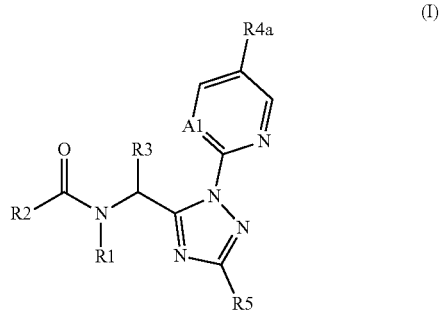

can be prepared by reaction of an amine of formula II

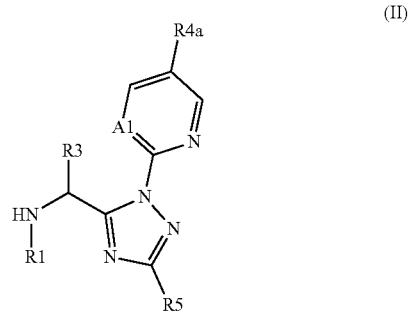

wherein $R_1$, $R_3$, $R_{4a}$, $Q_1$, $Q_2$ and $A_1$ are as described in formula I, with a carboxylic acid derivative of formula (III)

wherein $R_2$ is described as above under formula I. The chemistry is described in more detail in Scheme 1.

Scheme 1

(COCl)$_2$, inert solvent, e.g.
CH$_2$Cl$_2$ rt
or SOCl$_2$, CH$_2$Cl$_2$ rt
or DCC, EDC, THF or
pyridine, rt to 120° C.
or T3P®, pyridine
or HATU, base, DMF

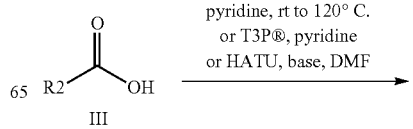

-continued

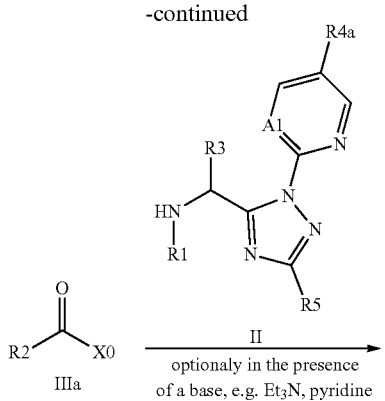

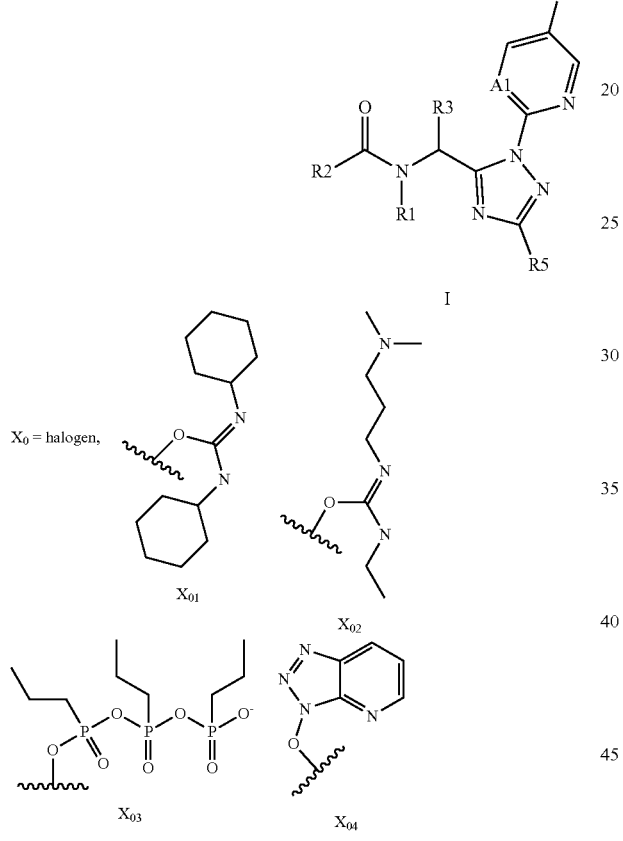

In Scheme 1 compounds of formula III, wherein $R_2$ is described in formula I, are activated to compounds of formula IIIa by methods known to those skilled in the art and described for example in *Tetrahedron*, 61 (46), 10827-10852, 2005. For example, compounds where $X_0$ is halogen are formed by treatment of compounds of formula III with for example, oxalyl chloride or thionyl chloride in the presence of catalytic quantities of DMF in inert solvents such as methylene dichloride or THF at temperatures between 20° C. to 100° C., preferably 25° C. Treatment of IIIa with compounds of formula II wherein $R_1$, $R_3$, $R_5$, $R_{4a}$, and $A_1$ are defined as above for formula I, optionally in the presence of a base, e.g. triethylamine or pyridine leads to compounds of formula I. Alternatively, compounds of formula I can be prepared by treatment of compounds of formula III with dicyclohexyl carbodiimide (DCC) or 1-ethyl-3-(3-dimethylaminopropyl)carbodiimide (EDC) to give the activated species IIIa, wherein $X_0$ is $X_{01}$ and $X_{02}$ respectively, in an inert solvent, e.g. pyridine, or THF optionally in the presence of a base, e.g. triethylamine, at temperatures between 50-180° C. In addition, an acid of the formula III can also be activated by reaction with a coupling reagent such as propanephosphonic acid anhydride (T3P®) or O-(7-Aza-1-benzotriazolyl)-N,N,N',N'-tetramethyluronium-hexafluorophosphat (HATU) to provide compounds of formula IIIa wherein $X_0$ is $X_{03}$ and $X_{04}$ as described for example in *Synthesis* 2013, 45, 1569 and *Journal Prakt. Chemie* 1998, 340, 581. Subsequent reaction with an amine of the formula II provides compounds of formula I.

Processes for the preparation of compounds of formula I are generally known or can be easily prepared by those skilled in the art. A typical example of such a synthesis is shown in Scheme 2

Scheme 2

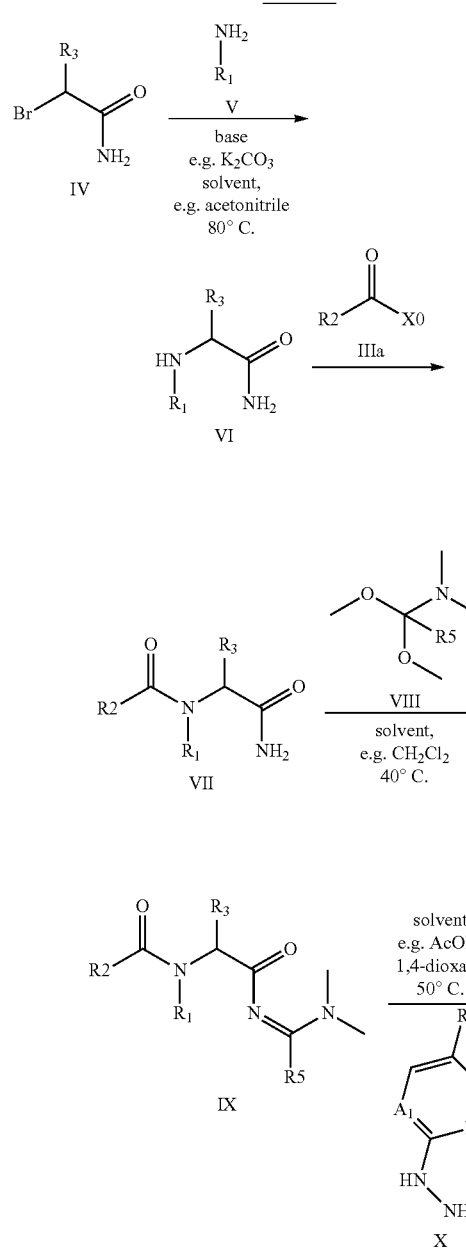

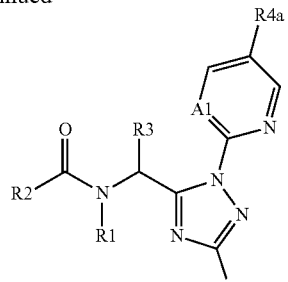

I

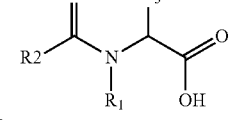

XI

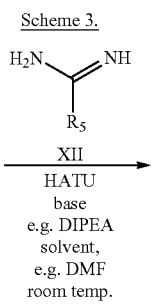

Scheme 3.

HATU
base
e.g. DIPEA
solvent,
e.g. DMF
room temp.

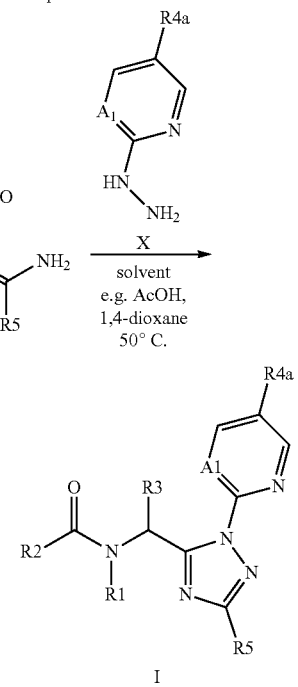

For example, compounds of formula I, wherein $R_1$, $R_2$, $R_3$, $R_{4a}$, $R_5$, and $A_1$ are as defined in formula I, may be prepared by reaction of compounds of formula IX, wherein $R_1$, $R_2$, $R_3$, and $R_5$ is defined for formula I, and compounds of formula X, wherein $R_{4a}$ and $A_1$ are defined in formula I, in suitable solvents that may include, for example, mixture of acetic acid and 1,4-dioxane, usually upon heating at temperatures between room temperature and 120° C., preferably at 40° C. to the boiling point of the reaction mixture, optionally under microwave heating conditions. Such processes have been described previously, for example, in *Tetrahedron* 2017, 73, 750.

Compounds of formula IX, wherein $R_1$, $R_2$, $R_3$, and $R_5$ are as defined as for formula I, may be prepared by reaction between compounds of formula VII, wherein $R_1$, $R_2$, and $R_3$ is defined as above for formula I, and compounds of formula VIII, wherein $R_5$ is defined as above for formula I, in suitable solvents that may include, for example, dichloromethane, usually upon heating at temperatures between room temperature and 150° C., preferably between 40° C. to the boiling point of the reaction mixture. Such processes have been described previously, for example, in *Tetrahedron* 2017, 73, 750, and US2016296501, page 29.

Compounds of formula VII, wherein $R_1$, $R_2$ and $R_3$ are as defined as for formula I, may be prepared by reaction between compounds of formula VI, wherein $R_1$ and $R_3$ are defined as for formula I, and compounds of formula IIIa, wherein $R_2$ and $X_0$ are defined above in scheme 1, in suitable inert solvents that may include, for example, pyridine, DMF, acetonitrile, $CH_2Cl_2$ or THF, optionally in the presence of a base, e.g. triethylamine or pyridine, usually upon heating at temperatures between room temperature and 150° C. (see Scheme 1).

Compounds of formula VI, wherein $R_1$ and $R_3$ are defined as for formula I, may be prepared by reaction between compounds of formula IV, wherein $R_3$ is as defined in formula I, and compounds of formula V, wherein $R_1$ is defined in formula I, in suitable solvents that may include, for example, acetonitrile or dioxane, in the presence of a suitable base, such as sodium, potassium or caesium carbonate (or sodium or potassium hydrogen carbonate), usually upon heating at temperatures between room temperature and 150° C., preferably between 40° C. to the boiling point of the reaction mixture, optionally under microwave heating conditions.

Yet another process for the preparation of compounds of formula Ia, wherein $R_1$, $R_2$, $R_3$, $R_{4a}$, $R_5$, and $A_1$ are as defined above, is outlined in Scheme 3.

Compounds of formula I, wherein $R_1$, $R_2$, $R_3$ and $R_5$ are as defined as for formula I, may be prepared by reaction of compounds of formula XIII, wherein $R_1$, $R_2$, $R_3$ and $R_5$ are as defined in formula I, and compounds of formula X, wherein $R_{4a}$ and $A_1$ are as defined in formula I, in suitable solvents that may include, for example, acetic acid, usually upon heating at temperatures between room temperature and 120° C., preferably between 40° C. to the boiling point of the reaction mixture, optionally under microwave heating conditions. Such processes have been described previously, for example, in *J. Org. Chem.* 2011, 76, 1177.

Compounds of formula XIII, wherein, $R_1$, $R_2$, $R_3$ and $R_5$ are as defined for formula I, may be prepared by reaction between compounds of formula XI, wherein $R_1$, $R_2$, and $R_3$ is defined as for formula I, and compounds of formula XII, wherein, $R_5$ is defined as above, in the presence of a coupling agent, that may include, for example, HATU, in suitable solvents that may include, for example, DMF, usually upon heating at temperatures between room temperature and 150° C., preferably between 20° C. to the boiling point of the reaction mixture, optionally under microwave heating conditions. Such processes have been described previously, for example, in *J. Org. Chem.* 2011, 76, 1177.

Compounds of formula I may also be prepared by the process shown in Scheme 4.

17

Scheme 4.

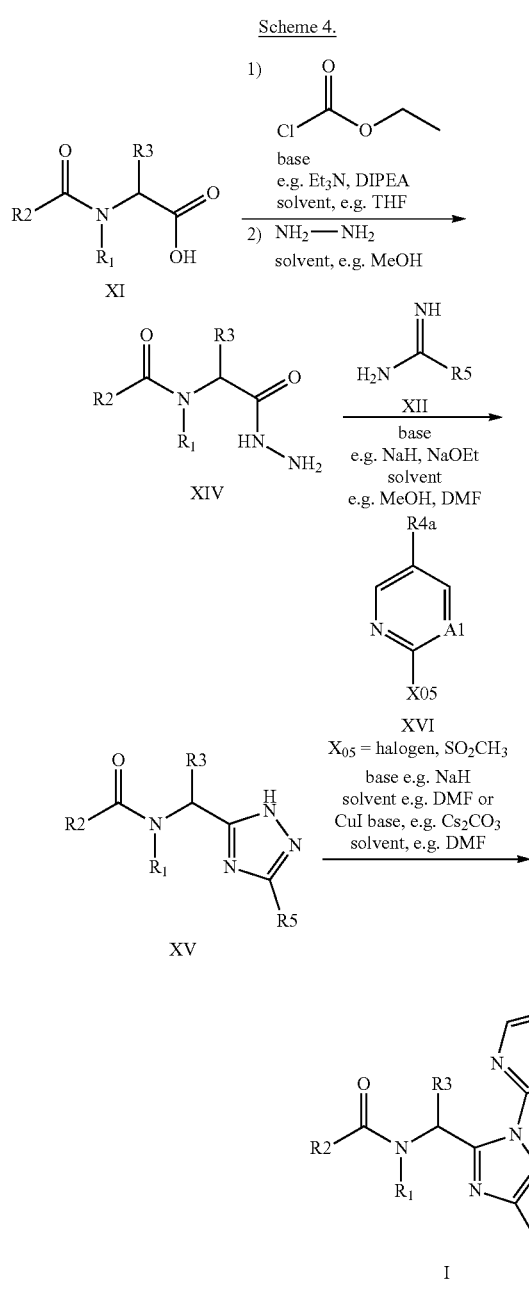

For example, compounds of formula I wherein $R_1$, $R_2$, $R_3$, $R_{4a}$, $R_5$ and $A_1$ are defined as above for formula I, may be prepared by reaction between compounds of formula XV wherein, $R_1$, $R_2$, $R_3$ and $R_5$, are as defined above for formula I, and compounds of formula XVI, wherein $R_{4a}$, $A_1$ are as defined in formula I and wherein $X_{05}$ stands for a leaving group such as, for example, chlorine, bromine, iodine or methyl sulfone, optionally in the presence of a copper catalyst, for example, CuI, in a suitable solvent, such as DMF or NMP, and in the presence of a suitable base, such as sodium hydride, potassium or caesium carbonate usually upon heating at temperatures between room temperature and 200° C., preferably between 20° C. to the boiling point of the reaction mixture, optionally under microwave heating conditions. Such processes have been described previously, for example, in *Chem. Asian J.* 2014, 9, 166.

18

Compounds of formula XV wherein, $R_1$, $R_2$, $R_3$ and $R_5$, are as defined above for formula I, may be prepared by reaction between compounds of formula XIV, wherein $R_1$, $R_2$ and $R_3$, are as defined as above for formula I, and compounds of formula XII, wherein $R_5$ is defined as above for formula I, in the presence of a base, for example sodium hydride or NaOEt in suitable solvents, for example DMF usually upon heating at temperatures between room temperature and 150° C. (analog to WO2017/191115, page 32-33, *Inorganica Chim. Acta* 2010, 363, 2163 or *Angew. Int. Ed.* 2017, 129, 9311).

Compounds of formula XIV wherein, $R_1$, $R_2$ and $R_3$ are as defined above for formula I, may be prepared by reaction of compounds of formula XI, wherein $R_1$, $R_2$ and $R_3$ are as defined above for formula I, by treatment with ethylchloroformate and hydrazine in the presence of a base, for example trimethylamine or DIPEA in suitable solvents, for example methanol or ethanol usually upon heating at temperatures between room temperature and 150° C. Such processes have been described previously, for example, in US2011275801, column 68.

Compounds of formula Ia, wherein $R_1$, $R_2$, $R_3$, $R_{4a}$, and $A_1$ are as defined above and $X_{06}$ is a halogen such as chlorine, bromine or iodine, may be prepared by the process shown in Scheme 5.

Scheme 5.

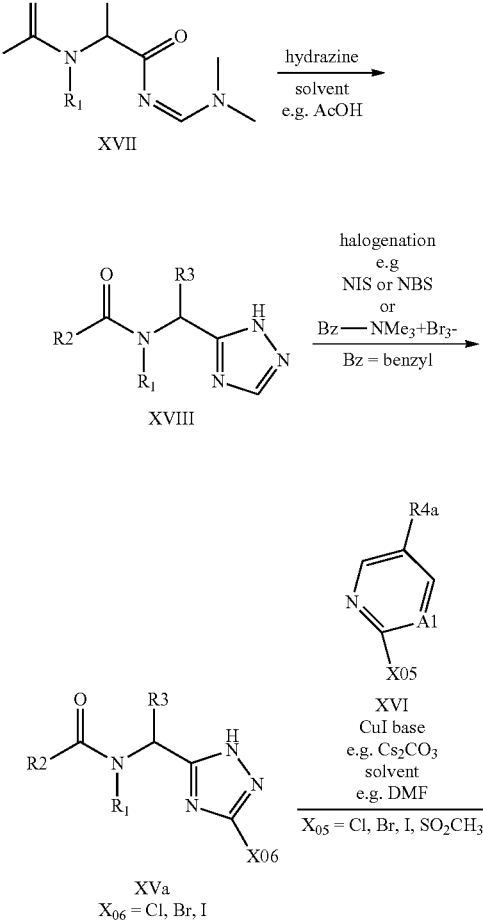

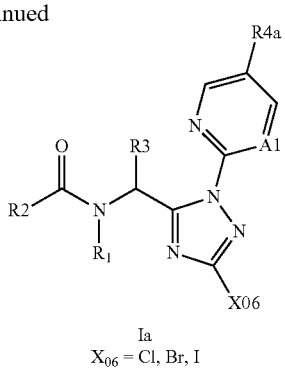

Ia
X06 = Cl, Br, I

Accordingly, compounds of formula Ia, wherein $R_1$, $R_2$, $R_3$, $R_{4a}$, and $A_1$ are defined as above for formula I, and $X_{06}$ represents a halogen such as chlorine, bromine or iodine, may be prepared by reaction of compounds of formula XVa wherein $R_1$, $R_2$, $R_3$ are as defined above for formula I and $X_{06}$ is a halogen such as chlorine, bromine or iodine, and compounds of formula XVI wherein $R_{4a}$ and $A_1$ are defined as above for formula I, and wherein $X_{05}$ represents a leaving group, e.g. chlorine, bromine or iodine or $SO_2CH_3$, optionally in the presence of a copper catalyst, e.g. CuI, preferable in a suitable solvent such as DMF or NMP, and in the presence of a suitable base such as sodium hydride, potassium or caesium carbonate usually upon heating at temperatures between room temperature and 200° C., preferably between 20° C. to the boiling point of the reaction mixture, optionally under microwave heating conditions. Such processes have been described previously, for example, in *Chem. Asian J.* 2014, 9, 166.

Compounds of formula XVa, wherein $R_1$, $R_2$ and $R_3$ are as defined above for formula I and $X_{06}$ is a halogen such as chlorine, bromine or iodine, may be prepared by halogenation of compounds of formula XVIII, wherein $R_1$, $R_2$, and $R_3$, are as defined as above for formula I, with a halogenating agent, such as, for example, benzyltrimethylammonium tribromide, N-iodosuccinimide, in suitable solvents, e.g. $CH_2Cl_2$, in the presence of a suitable base, such as sodium, potassium or lithium hydroxide, usually upon heating at temperatures between room temperature and 150° C., preferably between 20° C. to the boiling point of the reaction mixture, optionally under microwave heating conditions. Such processes have been described previously e.g. in US2014206700, pages 37-38.

Compounds of formula XVIII, wherein $R_1$, $R_2$ and $R_3$ are as defined as above for formula I, may be prepared by reaction of compounds of formula XVII, wherein $R_1$, $R_2$, and $R_3$ are as defined above for formula I, with hydrazine in suitable solvents, for example, acetic acid, mixture of acetic acid and 1,4-dioxane or mixture of acetic acid and toluene, usually upon heating at temperatures between room temperature and 120° C., preferably between 40° C. to the boiling point of the reaction mixture, optionally under microwave heating conditions. Such processes have been described previously, for example, in *J. Heterocyclic Chem.* 2008, 45, 887 and *Bioorg. Med. Chem. Lett.* 2015, 25, 5121.

Compounds of formula Ib wherein $R_1$, $R_2$, $R_3$, $R_{4a}$ and $A_1$ are defined as above for formula I and $R_{5a}$ is diphenylmethanimine, $C_3$-$C_4$halocycloalkyl, $C_2$-$C_6$alkenyl, or $C_2$-$C_6$haloalkenyl may be prepared by the process shown in Scheme 6.

Scheme 6.

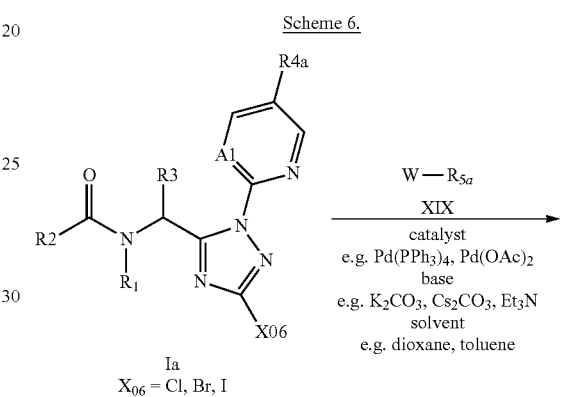

Ia
X06 = Cl, Br, I

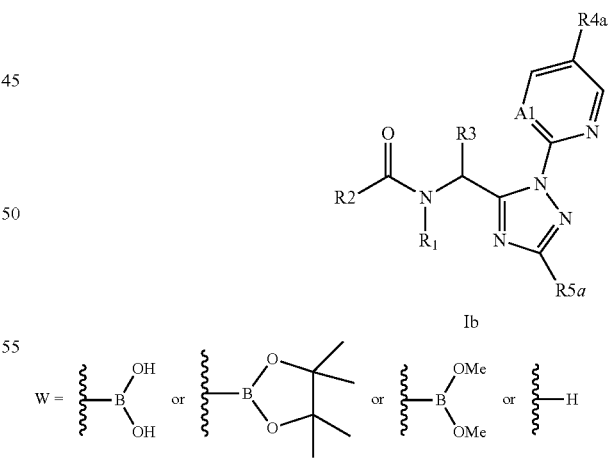

Ib

Accordingly, compounds of formula Ib wherein $R_1$, $R_2$, $R_3$, $R_{4a}$ and $A_1$ are as defined above for formula I and $R_{5a}$ is diphenylmethanimine, $C_3$-$C_4$halocycloalkyl, $C_2$-$C_6$alkenyl, or $C_2$-$C_6$haloalkenyl, may be prepared by reaction of compounds of formula Ia wherein $R_1$, $R_2$, $R_3$, $R_{4a}$, and $A_1$ are defined as above for formula I and $X_{06}$ is an halogen such as chlorine, bromine or iodine, with compounds of formula XIX wherein $R_{5a}$ is described above and W is a boronic acid or a boronate ester or hydrogen as depicted in Scheme 6. These kind of reactions are carried out in the presence of a palladium catalyst, for example, $Pd(PPh_3)_4$, in a suitable solvent, such as dioxane or toluene, in the presence of a suitable base, such as potassium or caesium carbonate usually upon heating at temperatures between room temperature and 200° C., preferably between 20° C. to the boiling point of the reaction mixture, optionally under microwave heating conditions. Such processes have been described previously, for example, analog to *J. Med. Chem.*, 2014, 57, 3687-3706, *Org. Lett.* 2017, 19, 6594 and *Chemical Science* 2016, 7, 6407.

A further method to prepare compounds of formula, respectively Id, is outlined in Scheme 7.

Scheme 7.

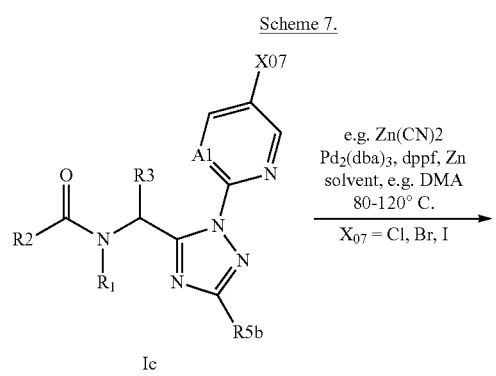

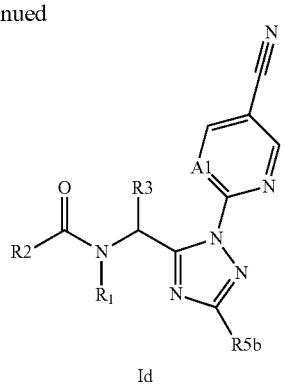

Id (preparation according to Scheme 2, $R_{5b}$ is not halogen)

Thus, compounds of formula Id wherein $R_1$, $R_2$, $R_3$, and $A_1$ are as defined above for formula I and $R_{5b}$ is as defined in formula I but excluding halogen (i.e. amino, ($C_1$-$C_3$alkyl) amino, hydroxy, cyano, $C_3$-$C_4$halocycloalkyl, $C_2$-$C_6$haloalkenyl, $C_1$-$C_4$haloalkylsulfanyl, $C_1$-$C_4$haloalkylsulfinyl, $C_1$-$C_4$haloalkylsulfonyl, $C_1$-$C_4$alkylsulfanyl, $C_1$-$C_4$alkylsulfinyl, $C_1$-$C_4$alkylsulfonyl, ($C_1$-$C_3$alkyl)sulfonylamino, ($C_1$-$C_3$alkyl)sulfonyl($C_1$-$C_3$alkyl)amino, ($C_1$-$C_3$alkyl)NHC(O), ($C_1$-$C_3$alkyl)$_2$NC(O), ($C_3$-$C_6$cycloalkyl)NHC(O), ($C_3$-$C_6$cycloalkyl)($C_1$-$C_3$alkyl)NC(O), ($C_1$-$C_3$alkyl)C(O)($C_1$-$C_3$alkyl)N, ($C_1$-$C_3$alkyl)C(O)NH, diphenylmethanimine, or $C_1$-$C_3$haloalkoxy), may be obtained by reaction of compounds of formula Ic with $Zn(CN)_2$ in the presence of a palladium catalyst, for example, $Pd_2(dba)_3$, in a suitable solvent, such as DMA or DMF usually upon heating at temperatures between 80 to 120° C., preferably at 120° C. to the boiling point of the reaction mixture, optionally under microwave heating conditions. Such processes have been described previously, for example, in *Tetrahedron Lett.* 2000, 41, 3271 and *Chem. Soc. Rev.* 2011, 40, 5049.

Compounds of formula I wherein $R_{4a}$ is $C_1$-$C_3$haloalkoxy can also be prepared as outlined in Scheme 8.

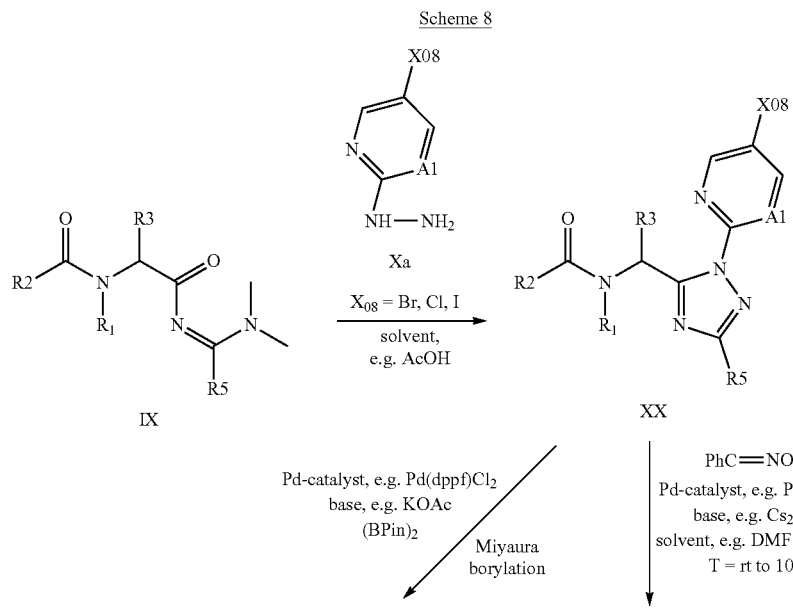

-continued

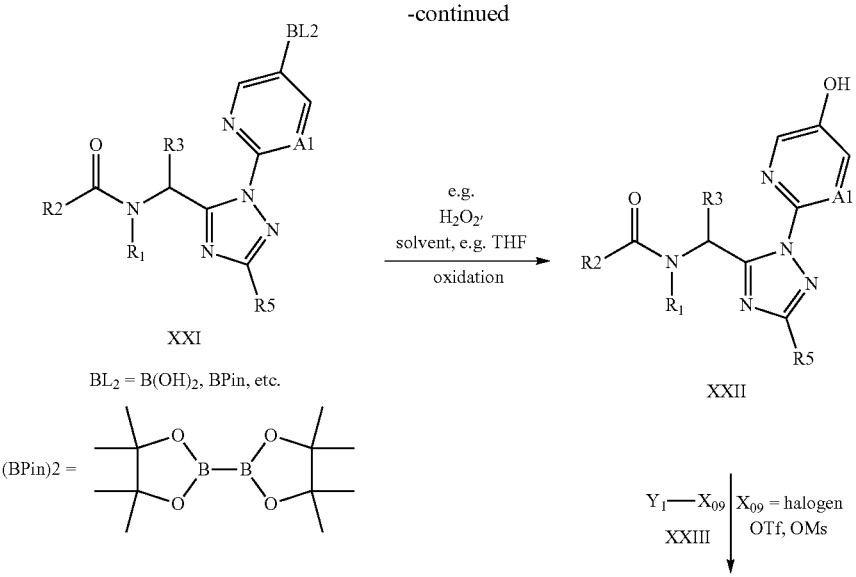

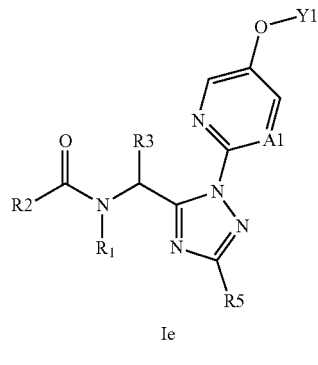

Accordingly, compounds of formula Ie wherein $R_1$, $R_2$, $R_3$, $R_5$ and $A_1$ are as defined in formula I and $Y_1$ is $C_1$-$C_3$haloalkyl, can be prepared from compounds of formula XXII, by treating with alkylating reagents of general formula XXIII wherein $X_{09}$ is preferably a leaving group such as Cl, Br, F, I, $OSO_2CF_3$, or $OSO_2CH_3$ and $Y_1$ is $C_1$-$C_3$haloalkyl, in the presence of a base, such as sodium hydride, $K_2CO_3$, or $Cs_2CO_3$, in an inert solvent such as THF, DMF, or acetonitrile, to give compounds of formula Ie. Such alkylation reactions are well known to those skilled in the art.

Compounds of formula XXII can be obtained by Miyaura borylation of compounds of formula XX, followed by oxidation of the intermediate of formula XXI. The intermediate of formula XXI, wherein $R_1$, $R_2$, $R_3$, $R_5$, and $A_1$ are defined as under formula I and $BL_2$ stands for a boronic acid derivative, preferably 4,4,5,5-tetramethyl-1,3,2-dioxaborolan-2-yl, can be obtained by treatment of compounds of formula XX, wherein $X_{08}$ is a leaving group such as Cl, Br, or I, and $R_1$, $R_2$, $R_3$, $R_5$ and $A_1$ are as defined under formula I, in a palladium catalyzed reaction with bispinacol diborane $(BPin)_2$. This reaction, can be performed in an aprotic solvent, in the presence of a base, preferably a weak base, such as potassium acetate, and $Pd(dppf)C_{12}$ as a common catalyst for this type of reaction. The temperature of the reaction is preferably between 0° C. and the boiling point of the reaction mixture. The obtained intermediate of formula XXI can be converted to compounds of formula XXII by treatment with an oxidizing reagent, preferably hydrogen peroxide or the urea complex thereof. Compounds of formula XX can also be converted to compounds of formula XXII by reaction with (E)-benzaldehyde oxime in an aprotic solvent such as acetonitrile or DMF, in the presence of a base, such as potassium or cesium carbonate, optionally in the presence of a palladium catalyst such as RockPhos-G3-palladacycle ([(2-Di-tert-butylphosphino-3-methoxy-6-methyl-2',4',6'-triisopropyl-1,1'-biphenyl)-2-(2-aminobiphenyl)]palladium(II) methanesulfonate) at temperatures between 25-100° C. Such reactions are known in the literature and have been described for example in *Ang. Chem. Int. Ed.* 56, (16) 4478-4482, 2017. Compounds of formula XXII so obtained are converted to compounds of formula Ie by alkylation methods well known to those skilled in the art and already described above.

Preparation of compounds of formula I wherein $R_{4a}$ is $OCF_3$, i.e. compounds of formula If, wherein wherein $R_1$, $R_2$, $R_3$, $R_5$, and $A_1$ are defined as under formula I can be prepared according to scheme 9

Scheme 9.

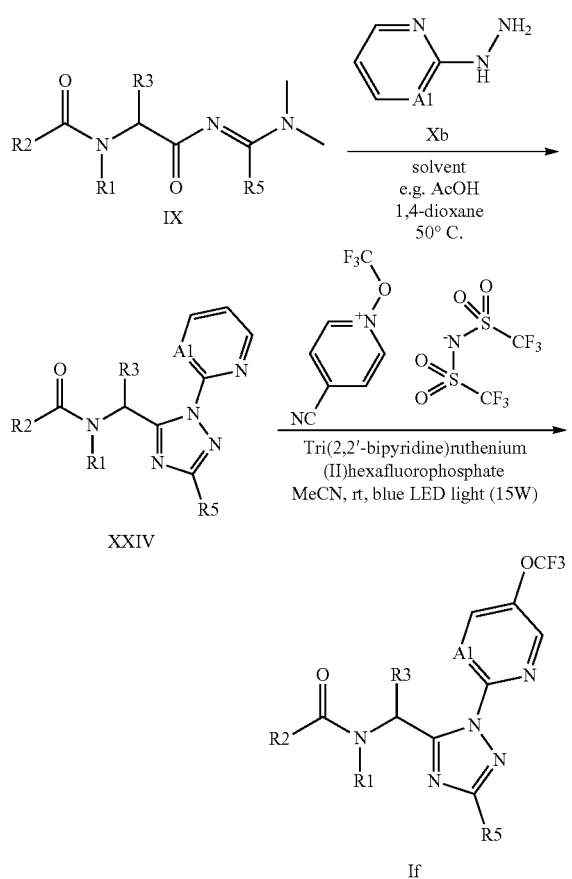

According to Scheme 9, compounds of formula If, wherein $R_1$, $R_2$, $R_3$, $R_5$, and $A_1$ are defined as above, and $R_{4a}$ is trifluoromethoxy, can be prepared by treatment of compounds XXIV, wherein $R_1$, $R_2$, $R_3$, $R_5$ and $A_1$ are defined as above in an inert solvent such as acetonitrile, with a photoredox catalyst, such as Tris(2,2'-bipyridine)ruthenium(II) hexafluorophosphate, under irradiation of blue LED light (15 W) and in the presence of a trifluorofluoromethoxy transfer reagent, such as of 1-(trifluoromethoxy)pyridine-4-carbonitrile; 1,1,1-trifluoro-N(trifluoromethylsulfonyl)methanesulfonamide. Such reactions are performed at 20° C. and have been described in the literature for example in *Ang. Chem.*, 2018, 57 (42), 13784-13789.

Compounds of formula XXIV, wherein $R_1$, $R_2$, $R_3$, $R_5$ and $A_1$ are as defined in formula I, may be prepared by reaction of compounds of formula XIII, wherein $R_1$, $R_2$, $R_5$ and $R_3$ are defined in formula I, and compounds of formula Xb, wherein $A_1$ is defined in formula I, in suitable solvents that may include, for example, mixture of acetic acid and 1,4-dioxane, usually upon heating at temperatures between room temperature and 120° C., preferably at 40° C. to the boiling point of the reaction mixture, optionally under microwave heating conditions. Such processes have been described previously, for example, in *Tetrahedron* 2017, 73, 750.

Similarly, compounds of formula I, wherein $R_5$ is trifuoromethoxy, i.e. compounds of formula Ig, can be prepared by treatment of compounds XXV, wherein, $R_1$, $R_2$, $R_3$, $R_{4a}$ and $A_1$ are defined as above for formula I, in an inert solvent such as acetonitrile, with a photoredox catalyst, such as Tris(2,2'-bipyridine)ruthenium(II) hexafluorophosphate, under irradiation of blue LED light (15 W) and in the presence of a trifluorofluoromethoxy transfer reagent, such as of 1-(trifluoromethoxy)pyridine-4-carbonitrile; 1,1,1-trifluoro-N(trifluoromethylsulfonyl)methanesulfonamide. Such reactions are performed at 20° C. and have been described in the literature as noted above.

Scheme 10.

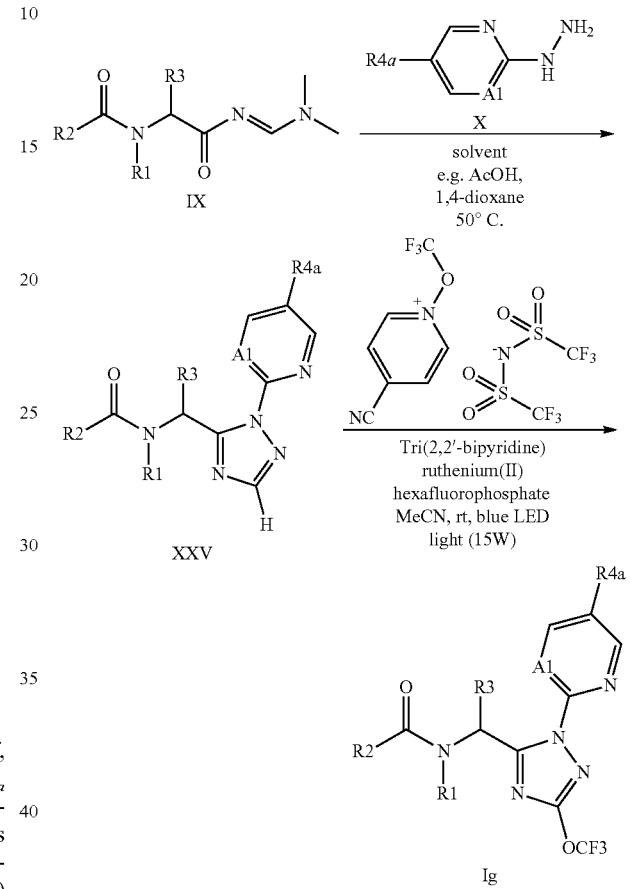

Compounds of formula XXV, wherein $R_1$, $R_2$, $R_3$, $R_{4a}$ and $A_1$ are as defined in formula I, may be prepared by reaction of compounds of formula IX, wherein $R_1$, $R_2$, $R_3$, and $A_1$ are defined in formula I, and compounds of formula X, wherein $A_1$ and $R_{4a}$ are defined in formula I, in suitable solvents that may include, for example, mixture of acetic acid and 1,4-dioxane, usually upon heating at temperatures between room temperature and 120° C., preferably at 40° C. to the boiling point of the reaction mixture, optionally under microwave heating conditions. Such processes have been described previously, for example, in *Tetrahedron* 2017, 73, 750. The chemistry is described in scheme 10 (vide supra)

Compounds of formula I, wherein $R_1$, $R_2$, $R_3$, $R_{4a}$ and $A_1$ are defined as above for formula I and $R_5$ is $OCF_2H$, i.e. compound Ih, can be prepared (scheme 11) from compounds of formula Ij, wherein $R_1$, $R_2$, $R_3$, $R_{4a}$ and $A_1$ are defined as above for formula I, by treatment with a difluorocarbene source e.g. $ClCF_2CO_2Na$ or $CF_2SO_2OCHF_2$ in the presence of a base such as KOH or potassium carbonate and the like, in an inert solvent at temperatures between 20-80° C. Such procedures have been described for example in *J. Fluor. Chem.* 2017, 203, 155, and US2013/0225552, page 128, and *Org. Process Res. Dev.*, 2011, 15, 721.

Compounds of formula Ij, wherein $R_1$, $R_2$, $R_3$, $R_{4a}$ and $A_1$ are defined as above in formula I, can be haloakylated with compounds of formula XXVI, wherein $X_{010}$ is halogen such as Cl, Br, I, and $Y_2$ is $C_1$-$C_3$haloalkyl, in the presence of a base, for example cesium or potassium carbonate, in a solvent such as acetonitrile or DMF at temperatures between 20-80° C. to afford compounds of formula Ii. Such reactions are well known to those skilled in the art and have been reported for example in see e.g. *Med. Chem. Letts.,* 2017, 8(5), p 543-548 and *Bio. Med. Chem. Letts.,* 2017, 27(11), 2420-2423.

Scheme 11.

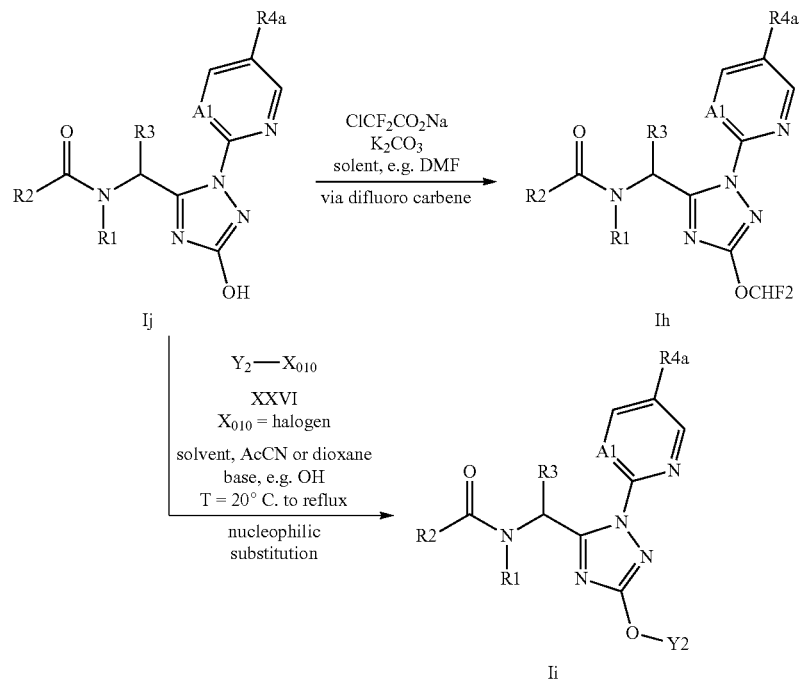

Compounds of formula Ik, wherein $R_1$, $R_2$, $R_3$, $R_{4a}$ and $A_1$ are as described under formula I, and $Y_3$ is $C_1$-$C_4$haloalkyl, can be prepared by reaction with (bpy)CuS$Y_3$, (compound of formula XXVII) wherein $Y_3$ is $C_1$-$C_4$haloalkyl in an inert solvent (such as acetonitrile or DMF) at temperatures between 25° C.-120° C. Such chemistry is known and has been described in the literature (*Angew. Chem. Int. Ed.* 2013, 52, 1548-1552). Compounds of formula Ik, can be further oxidized to compounds of formula Il and Im by methods known to those skilled in the art and analogous to those described in WO 2013/018928, WO 2012/086848 and WO2016/107831 shown in Scheme 12.

Scheme 12.

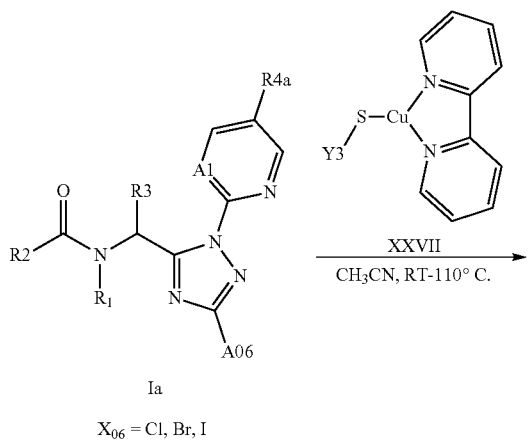

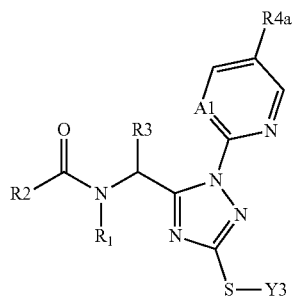

Ik oxidation
e.g. m-CPBA
solvent, e.g. CH₂Cl₂
or
catalyst, e.g. Na₂WO₄·2H₂O,
Oxidant e.g. H₂O₂
solvent e.g. CH₃CN
RT-100° C.
or
RuCl₃·H₂ONaIO₄
Solvent, e.g. H₂O/CCl₄/CH₃CN

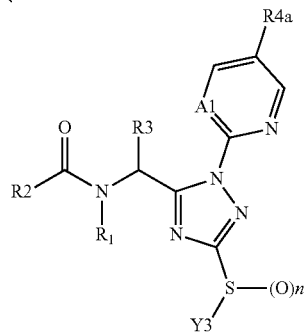

Il, n = 1
Im, n = 2
Y₃ = C₁-C₄ haloalkyl, n = 1 or

Thus, the compound of formula Ik can be oxidized to a compound of formula Il (wherein n=1) by treating for example with m-chloroperbenzoic acid, in an inert solvent such as dichloromethane and chloroform, alcohols such as methanol and ethanol, acetic acid, water, and mixtures thereof. The amount of the oxidant to be used in the reaction is generally 1 to 3 moles, preferably 1 to 1.1 moles, relative to 1 mole of the present compound Ia. The reaction temperature of the reaction is generally within a range of 0° C. to room temperature. The compound represented by the formula Im (where n=2) can be produced by reacting the compound (Ia) in the presence of an oxidant, such as m-chloroperbenzoic acid, in an inert solvent. Examples of the solvent to be used in the reaction include aliphatic halogenated hydrocarbons such as dichloromethane and chloroform; alcohols such as methanol and ethanol; acetic acid; water; and mixtures thereof. Examples of the oxidant to be used in the reaction include m-chloroperbenzoic acid hydrogen peroxide solution. The amount of the oxidant to be used in the reaction is generally 1 to 4 moles, preferably 2.1 moles, relative to 1 mole of the present compound (Ia). The reaction temperature of the reaction is generally within a range of 0° C. to rt. The reaction may be conducted in the presence of a catalyst. Examples of the catalyst to be used in the reaction include sodium tungstate. The SY₃ group wherein Y₃ is C₁-C₄haloalkyl is more difficult to oxidize and so compounds of Im where n=2 generally require higher temperature with oxidants such as m-chloroperbenzoic acid or a hydrogen peroxide solution in the presence of a catalyst, for example sodium tungstate. Those skilled in the art will appreciate that the degree and position of oxidation will depend on such factors as equivalents of oxidant and reaction temperature. Those skilled in the art will also appreciate that even if mixtures of products are formed, these can be separated by crystallization or chromatographic techniques, and the position and degree of oxidation can be determined by spectroscopic methods such as mass spectroscopy, and NMR techniques.

Compounds of formulae In and Io, wherein R₁, R₂, R₃, R₄ₐ, and A₁ are defined as above for formula I and R₅ₑ, in the instance of formula Io, is (C₁-C₃alkyl)amino, (C₁-C₃alkyl)sulfonylamino, (C₁-C₃alkyl)sulfonyl(C₁-C₃alkyl) amino, (C₁-C₃alkyl)C(O)(C₁-C₃alkyl)N or (C₁-C₃alkyl)C(O)NH, may be prepared by synthetic methods well known to those skilled in the art and shown in scheme 13.

Scheme 13.

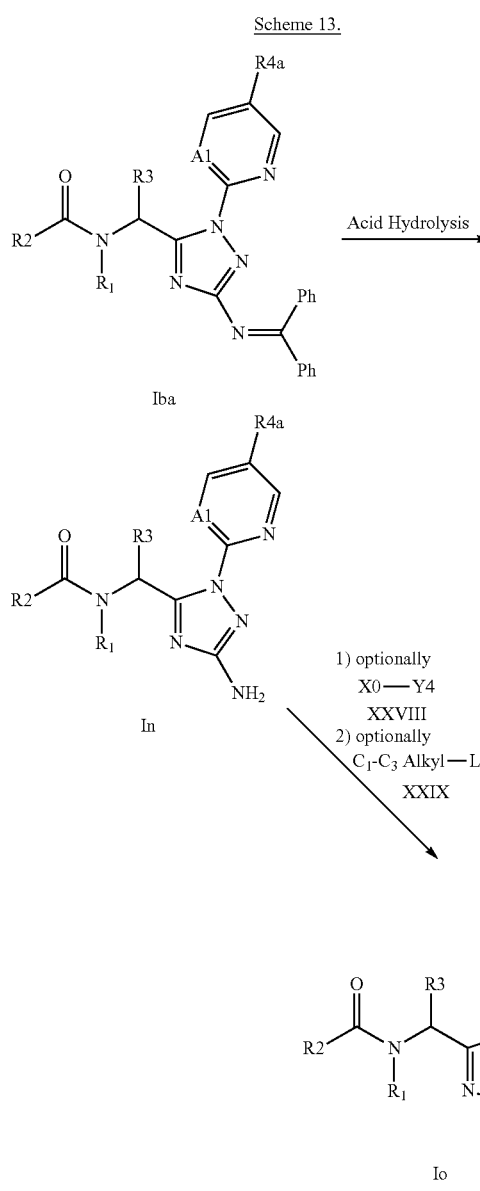

Compounds of formula In, wherein $R_1$, $R_2$, $R_3$, $R_{4a}$, and $A_1$ are defined as above for formula I, can be prepared by transformation of compounds of formula Iba wherein $R_1$, $R_2$, $R_3$, $R_{4a}$, and $A_1$, are defined as above for formula I. This reaction is carried out in a suitable solvent, such as THF, in the presence of an acid, such as hydrogen chloride or citric acid, usually upon heating at temperatures between room temperature and 200° C., preferably between 20° C. to the boiling point of the reaction mixture. Such processes have been described previously, for example, in WO2018/067432 or Eur. J. Med. Chem, 2018, 144, 151-163.

Compounds of formula Io, wherein $A_1$, $R_1$, $R_2$, $R_3$, $R_{4a}$ are defined as above for formula I and $R_{5c}$ is ($C_1$-$C_3$alkyl)amino, ($C_1$-$C_3$alkyl)sulfonylamino, ($C_1$-$C_3$alkyl)sulfonyl($C_1$-$C_3$alkyl)amino, ($C_1$-$C_3$alkyl)C(O)($C_1$-$C_3$alkyl)N or ($C_1$-$C_3$alkyl)C(O)NH, may be prepared by reaction between compound In, wherein $A_1$, $R_1$, $R_2$, $R_3$, $R_{4a}$ are defined as above for formula I, and compound XXVIII wherein $X_0$ is described in scheme 2 and can also be $X_{01}$, $X_{02}$, $X_{03}$ and $X_{04}$ as described in scheme 2 and $Y_4$ is ($C_1$-$C_3$alkyl), ($C_1$-$C_3$alkyl)sulfonyl or ($C_1$-$C_3$alkyl)C(O). The reaction is carried on in a suitable solvent, such as dichloromethane or DMF, in the presence of a suitable base, such as trimethylamine or pyridine usually upon heating at temperatures between room temperature and 200° C., preferably between 20° C. to the boiling point of the reaction mixture. The resulting compounds can be optionally alkylated in a second step by treatment of this later with compound XXIX wherein LG is a leaving group such as chlorine, mesyloxy or tosyloxy in a suitable solvent, such as THF or DMF, in the presence of a suitable base, such as sodium hydride usually upon heating at temperatures between room temperature and 200° C., preferably between 20° C. to the boiling point of the reaction mixture. The first step is optional thus, compound In can directly be used for the reaction with XXIX. Such transformation are easily made by those skilled in the art or care described in WO2010010186 or Eur. J. Med. Chem, 2013, 67, 243-251.

Intermediates described for preparing compounds of formula I are known or can be prepared by methods described vide infra.

Compounds of formula Ij, wherein $R_1$, $R_2$, $R_3$, $R_{4a}$ and $A_1$ are defined as above for formula I, may be prepared by reaction of compound XXX, wherein $A_1$, $R_1$, $R_2$, $R_3$ and $R_{4a}$ are defined as above formula I, with acid, for example HBr, in suitable solvents that may include, for example, acetic acid, usually upon heating at temperatures between room temperature and 200° C. preferably between 20° C. to the boiling point of the reaction mixture (scheme 14) Such processes have been described previously, for example, in WO2017090743.

Scheme 14

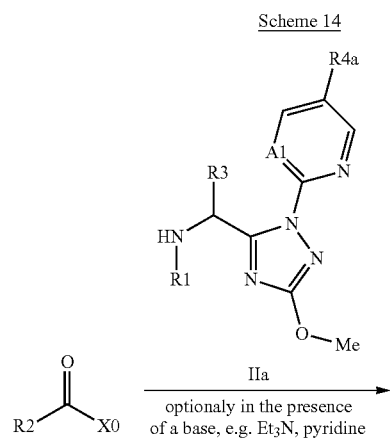

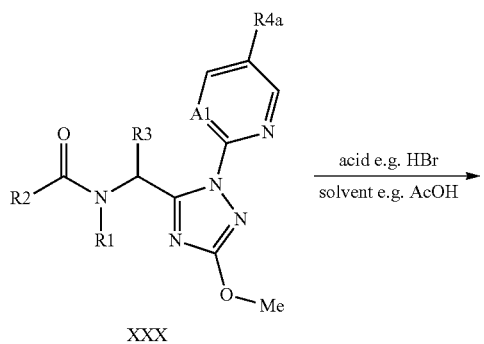

-continued

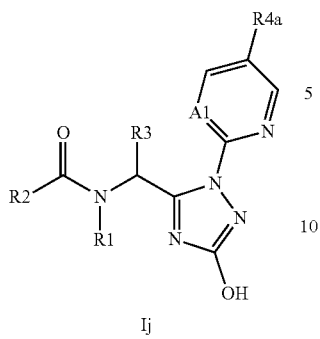

Ij

Processes for synthesizing intermediates of formula II, wherein $R_1$, $R_3$, $R_5$, $R_{4a}$, and $A_1$ are as defined in formula I, are known in part (see WO2017/192385, pages 24-30) or can be easily prepared by those skilled in the art. A typical synthetic route towards such intermediates is outlined in Scheme 15.

Scheme 15.

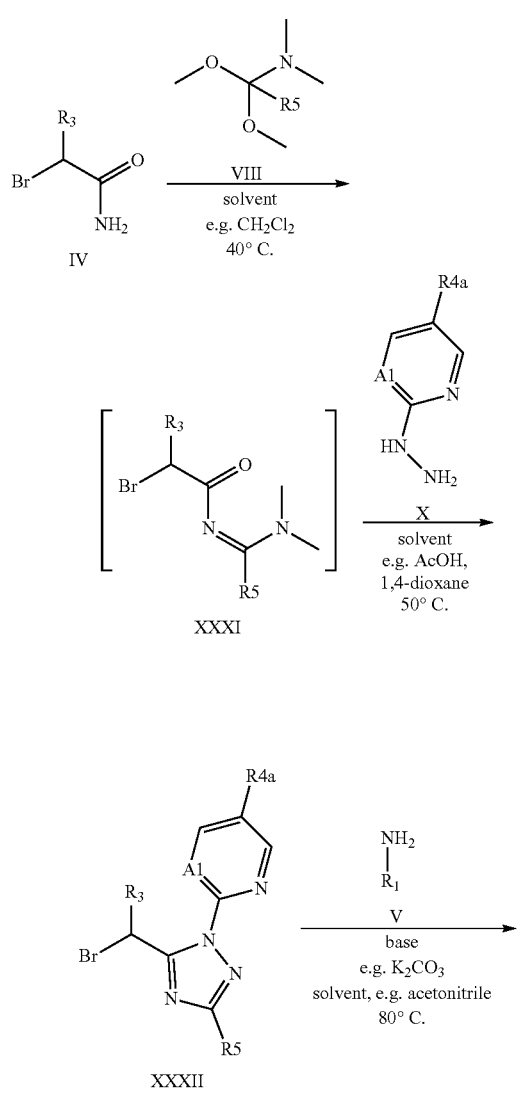

-continued

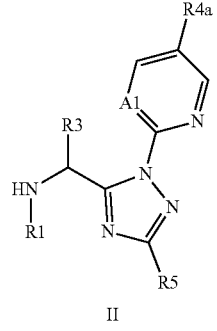

II

For example, compounds of formula II may be prepared by reaction of compounds of formula XXXII, wherein $R_3$, $R_5$, $R_{4a}$, and $A_1$ are as defined in formula I, and compounds of formula V wherein $R_1$ is defined in formula I, in suitable solvents, e. g. acetonitrile or dioxane in the presence of a suitable base such as sodium, potassium or caesium carbonate (or sodium or potassium hydrogen carbonate), usually upon heating at temperatures between room temperature and 150° C., preferably between 40° C. to refluxing temperatures, optionally under microwave heating conditions.

Compounds of formula XXXII, wherein $R_3$, $R_{4a}$, $R_5$, and $A_1$ are as defined in formula I, may be prepared by reaction of compounds of formula XXXI, wherein $R_3$ and $R_5$ is as defined in formula I, and compounds of formula X, wherein $R_{4a}$ and $A_1$ are as defined in formula I, in suitable solvents, for example, a mixture of acetic acid and 1,4-dioxane, usually upon heating at temperatures between room temperature and 120° C., preferably between 40° C. to the boiling point of the reaction mixture, optionally under microwave heating conditions. Such processes have been described previously, for example, in *Tetrahedron* 2017, 73, 750.

Compounds of formula XXXI, wherein $R_3$ and $R_5$ is defined as above in formula I, may be prepared by reaction of compounds of formula IV, wherein $R_3$ is as defined in formula I, and compounds of formula VIII, wherein $R_5$ is defined as above in formula I, in suitable solvents, for example, dichloromethane, usually upon heating at temperatures between room temperature and 150° C., preferably between 40° C. to the boiling point of the reaction mixture. Such processes have been described previously, for example, in *Tetrahedron* 2017, 73, 750.

Compounds of formula IIb, wherein $R_1$, $R_{4a}$ and $A_1$ are as defined in formula I and $X_{06}$ is chlorine, bromine or iodine, can be prepared as described in scheme 16.

Scheme 16

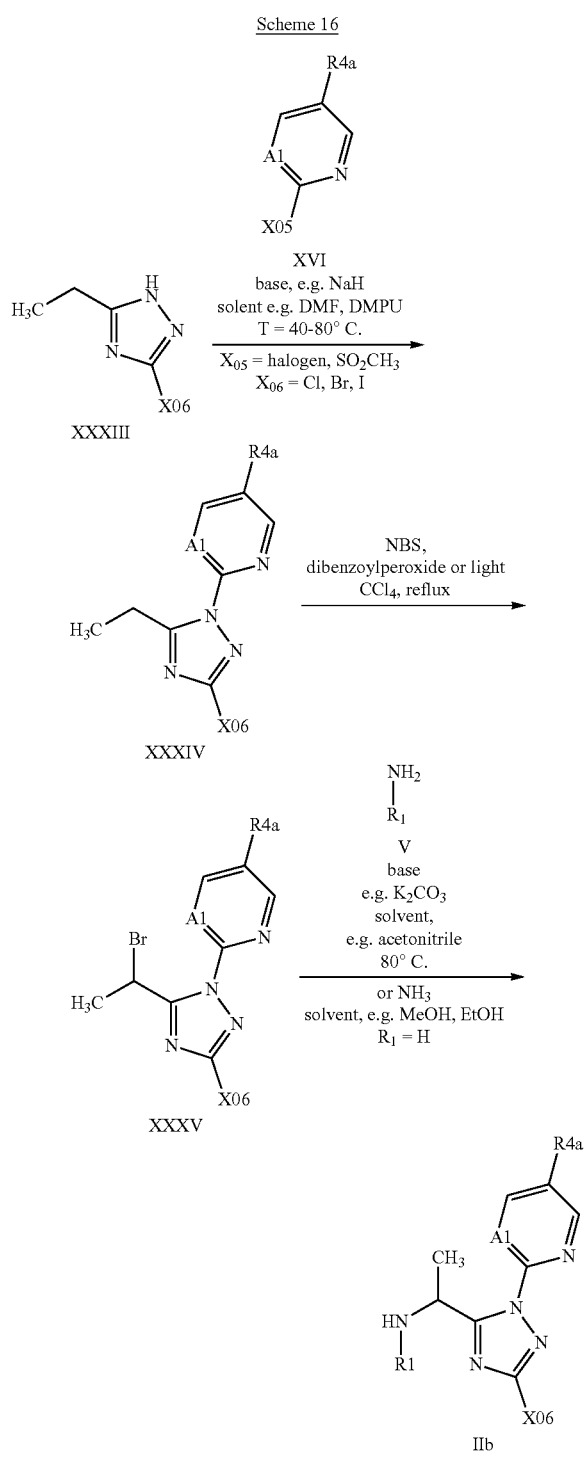

Scheme 17

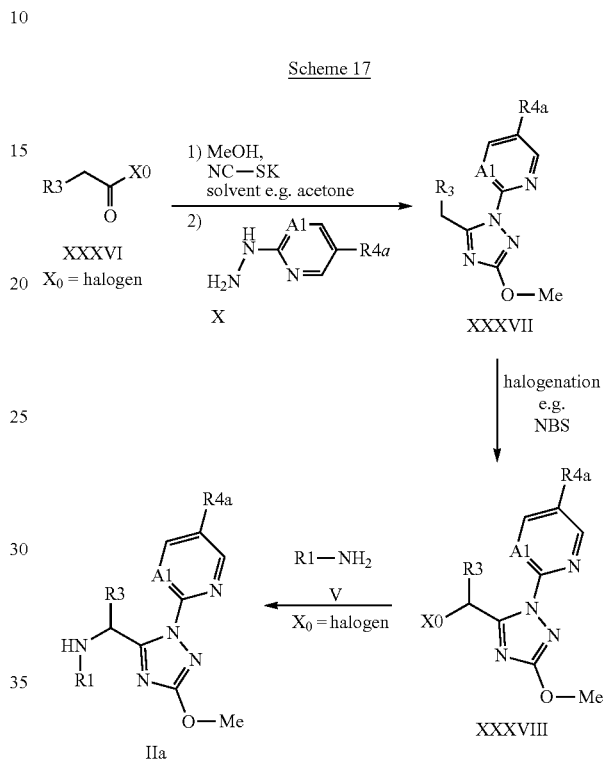

formula XXXV wherein $R_{4a}$, $X_{06}$, and $A_1$ are defined as above for formula I. Finally, reaction of compounds of formula XXXV with ammonia (see e. g. WO2017/192385, page 30) or amines (analog to WO2008/017932, page 53) of formula V wherein $R_1$ is defined as above, optionally under microwave heating conditions, gives compounds of formula IIb.

Preparation of intermediates of formula IIa is outlined in Scheme 17.

Thus, compounds of formula XXXVII, wherein $R_3$, $R_{4a}$, and $A_1$ are defined as above for formula I, may be prepared in two steps by reaction between compounds of formula XXXVI, wherein $R_3$ is defined as above for formula I and $X_0$ is a halogen such as for example bromine, chlorine or iodine, and potassium thiocyanate and methanol in a suitable solvent such as acetone usually upon heating at temperatures between room temperature and 200° C., preferably between 20° C. to the boiling point of the reaction mixture. The resulting intermediate is then engaged in a second step with compounds of formula X wherein $R_{4a}$ and $A_1$ are defined as above for formula I, in suitable solvents such as for example ethanol, usually upon heating at temperatures between room temperature and 200° C., preferably between 20° C. to the boiling point of the reaction mixture to give compounds of formula XXXVII. Treatment of compounds of formula XXXVII with a halogenating agent such as, for example, N-bromo-succinimide in suitable solvents that may include, for example, $CH_2Cl_2$, in the presence of a suitable activator, such as benzoyle peroxide, usually upon heating at temperatures between room temperature and 200° C., preferably between 20° C. to the boiling point of the reaction mixture, optionally under white light lamp (230V) gives compounds of formula XXXVIII. Such processes have been described previously, such processes have been described previously, for example, in DE1962429. Reaction of compounds of formula XXXVIII with compounds of formula V, wherein $R_1$ is defined in formula I, in suitable solvents that may Accordingly, compounds of formula XXXIII wherein $X_{06}$ is chlorine, bromine or iodine, are treated with compounds of formula XVI wherein $R_{4a}$ and $A_1$ are defined as above for formula I and $X_{05}$ is a leaving group, e.g. halogen or methyl sulfone, in the presence of a base, preferable NaH in an aprotic solvent, e.g. DMF or DMPU to afford compounds of general formula XXXIV (according to Chem. Ber. 1967, 100, 2250). Subsequent benzylic bromination of compounds of formula XXXIV under known conditions (analog to U.S. Pat. No. 4,295,876, page 14-15) delivers compound of include, for example, acetonitrile or dioxane, in the presence of a suitable base, such as sodium, potassium or cesium carbonate (or sodium or potassium hydrogene carbonate), at temperatures between room temperature and 200° C., preferably between room temperature and 40° C., optionally under microwave heating conditions leads to compounds of formula IIa.

Hydrazines of formula X, wherein $R_{4a}$ and $A_1$ are as defined above for formula I, are either commercially available or can be prepared according to well-known methods, or as shown in Scheme 18.

pounds of formula Xb wherein Y1 and $A_1$ are as previously described. Similar reactions have previously been described for example in *J. Med. Chem.*, 2018, 61(1), 207-223, and *Bio. Med. Chem. Letts.*, 2017, 27(21), 4858-4866. Compounds of formula XVIc wherein $R_{4a}$ is $OCHF_2$ can be prepared from compounds of formula XVIa by treatment with a difluorocarbene source e.g. $ClCF_2CO_2Na$ or $CF_2SO_2OCHF_2$ in the presence of a base such as KOH, potassium carbonate and the like, in an inert solvent at temperatures between 20-80° C. Such procedures have been described for example in *J. Fluor. Chem.* 2017, 203, 155,

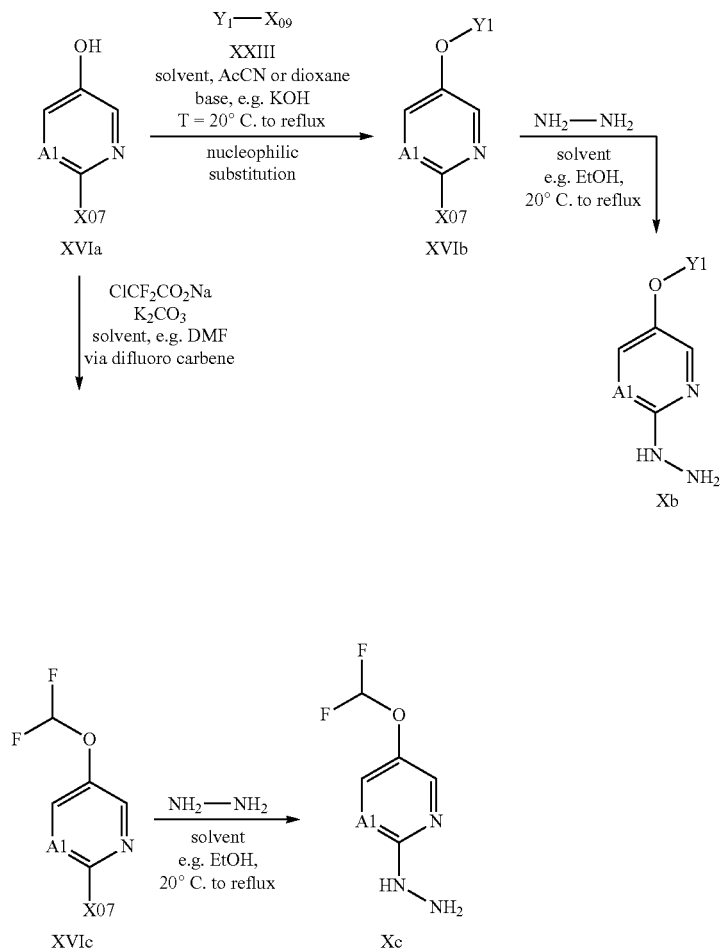

Thus compounds of formula XVIa, wherein $A_1$ is N or CH, and $X_{07}$ is a leaving group such as Cl, Br, F, I, or methyl sulphone can be alkylated with a base, for example cesium or potassium carbonate, in a solvent such as acetonitrile or DMF at temperatures between 20-80° C. with a compound of formula XXIII, wherein $Y_1$ is $C_1$-$C_3$haloalkyl and $X_{09}$ is a leaving group such as Cl, Br, F, I, $OSO_2CF_3$, or $OSO_2CH_3$, to give compounds of formula XVIb wherein $A_1$ and $X_{07}$ are as previously defined and $Y_1$ is $C_1$-$C_3$haloalkyl. Such reactions are well known to those skilled in the art and have been reported for example in see e.g. *Med. Chem. Letts.*, 2017, 8(5), p 543-548 and *Bio. Med. Chem. Letts.*, 2017, 27(11), 2420-2423. Compounds of formula XVIb can be treated with hydrazine in a suitable solvent for example, ethanol, aqueous dioxane at temperatures 20-80° C. to give comand US2013/0225552, page 128, and *Org. Process Res. Dev.*, 2011, 15, 721. Compounds of formula XVIb, wherein $A_1$ is defined as above for formula I and $X_{07}$ stands for a halogen or methyl sulfone are reacted with hydrazine as previously discussed to give compounds of formula Xc. Hydrazines of formula Xd, wherein $A_1$ is defined as above for formula I, can be prepared in a quite similar way as already described in Scheme 18. Thus, as shown in scheme 19, compounds of formula XVId, wherein $A_1$ are defined as above for formula I and $X_{09}$ stands for a halogen or methyl sulfone, are reacted with hydrazine in a suitable solvent, preferable in ethanol or isopropanol, at temperature between 20° C. to refluxing conditions to give compounds of formula Xd (see e.g. *Tet. Lett.* 2016, 57, 1056).

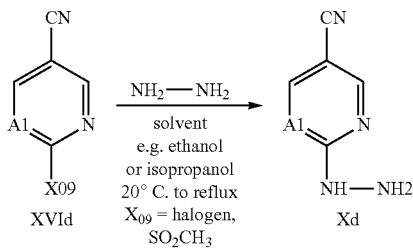

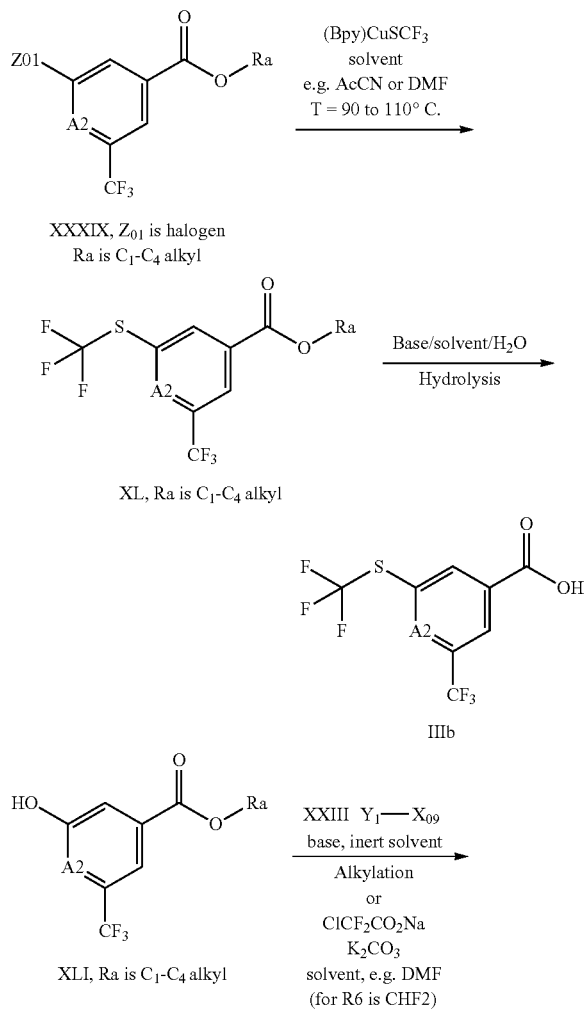

Compounds of formula III are known, for example 3-(difluoromethyl)-5-(trifluoromethyl)benzoic acid CAS: [2248290-21-1], 3-bromo-5-(trifluoromethyl)benzoic acid CAS: [328-67-6], 3-iodo-5-(trifluoromethyl)benzoic acid, CAS: [28186-62-1] commercially available, or can be prepared by those skilled in the art. For example see also WO 2013/171712, WO 2012/117000, WO2017/192385. Some compounds of formula III are novel and have been especially prepared to enable preparation of compounds of formula I. Synthesis of such compounds is shown in Scheme 20:

As shown in Scheme 20, compounds of formula XXXIX, wherein $Z_{01}$ is halogen, preferably bromine or iodine, $A_2$ is nitrogen or CH, and $R_4$ is $C_1$-$C_4$alkyl, can be treated with a bipyridine copper reagent (bpy)CuSCF$_3$, wherein bpy is bipyridyl, in an inert solvent such as acetonitrile or DMF, at temperatures between room temperature and 120° C., optionally under microwave heating, to give compounds of formula XL, wherein $A_2$ and Ra are as previously defined. Such chemistry is known and has been described in the literature, for example, in Angew. Chem. Int. Ed. 2013, 52, 1548-1552. A preferred reagent for this transformation is (bpy)CuSCF$_3$ (CAS [1413732-47-4]). Compounds of formula XL are converted to compounds of formula IIIb by ester hydrolysis, for example reaction with a base e.g. Lithium, potassium, or sodium hydroxide, in water optionally in the presence of a water miscible solvent such a THF, acetone, dioxane and the like. Such reactions are well known to those skilled in the art.

Compounds of formula XLII, wherein is $A_2$ is nitrogen or CH, $R_6$ is $C_1$-$C_3$haloalkyl, and Ra is $C_1$-$C_4$alkyl, can be prepared by reaction of a compound of formula XLI with a compound of formula XXIII, wherein $X_{09}$ is Cl, Br, F, I, OSO$_2$CF$_3$, or OSO$_2$CH$_3$, and $Y_1$ is $C_1$-$C_3$haloalkyl, in the presence of a base, such as sodium hydride, K$_2$CO$_3$, or Cs$_2$CO$_3$, in an inert solvent such as THF, DMF, or acetonitrile. Compounds of formula XLII wherein $R_6$ is CHF$_2$ are prepared by treatment with in situ generated difluorocarbene analogous to the procedures described previously. Hydrolysis of compounds of formula XLII to give compounds of formula IIIc as described vide supra.

Depending on the procedure or the reaction conditions, the reactants can be reacted in the presence of a base. Examples of suitable bases are alkali metal or alkaline earth metal hydroxides, alkali metal or alkaline earth metal hydrides, alkali metal or alkaline earth metal amides, alkali metal or alkaline earth metal alkoxides, alkali metal or alkaline earth metal acetates, alkali metal or alkaline earth metal carbonates, alkali metal or alkaline earth metal dialkylamides or alkali metal or alkaline earth metal alkylsilylamides, alkylamines, alkylenediamines, free or N-alkylated saturated or unsaturated cycloalkylamines, basic heterocycles, ammonium hydroxides and carbocyclic amines. Examples which may be mentioned are sodium hydroxide, sodium hydride, sodium amide, sodium methoxide, sodium acetate, sodium carbonate, potassium tert-butoxide, potassium hydroxide, potassium carbonate, potassium hydride, lithium diisopropylamide, potassium bis(trimethylsilyl)amide, calcium hydride, triethylamine, diisopropylethylamine, triethylenediamine, cyclohexylamine, N-cyclohexyl-N,N-dimethylamine, N,N-diethylaniline, pyridine, 4-(N,N-dimethylamino)pyridine, quinuclidine, N-methylmorpholine, benzyltrimethylammonium hydroxide and 1,8-diazabicyclo[5.4.0]undec-7-ene (DBU).

The reactants can be reacted with each other as such, i.e. without adding a solvent or diluent. In most cases, however, it is advantageous to add an inert solvent or diluent or a mixture of these. If the reaction is carried out in the presence of a base, bases which are employed in excess, such as triethylamine, pyridine, N-methylmorpholine or N,N-diethylaniline, may also act as solvents or diluents.

The reactions are advantageously carried out in a temperature range from approximately −80° C. to approximately +140° C., preferably from approximately −30° C. to approximately +100° C., in many cases in the range between ambient temperature and approximately +80° C.

Depending on the choice of the reaction conditions and starting materials which are suitable in each case, it is possible, for example, in one reaction step only to replace one substituent by another substituent according to the invention, or a plurality of substituents can be replaced by other substituents according to the invention in the same reaction step.

Salts of compounds of formula I can be prepared in a manner known per se. Thus, for example, acid addition salts of compounds of formula I are obtained by treatment with a suitable acid or a suitable ion exchanger reagent and salts with bases are obtained by treatment with a suitable base or with a suitable ion exchanger reagent.

Salts of compounds of formula I can be converted in the customary manner into the free compounds I, acid addition salts, for example, by treatment with a suitable basic compound or with a suitable ion exchanger reagent and salts with bases, for example, by treatment with a suitable acid or with a suitable ion exchanger reagent.

Salts of compounds of formula I can be converted in a manner known per se into other salts of compounds of formula I, acid addition salts, for example, into other acid addition salts, for example by treatment of a salt of inorganic acid such as hydrochloride with a suitable metal salt such as a sodium, barium or silver salt, of an acid, for example with silver acetate, in a suitable solvent in which an inorganic salt which forms, for example silver chloride, is insoluble and thus precipitates from the reaction mixture.

Depending on the procedure or the reaction conditions, the compounds of formula I, which have salt-forming properties can be obtained in free form or in the form of salts.

The compounds of formula I and, where appropriate, the tautomers thereof, in each case in free form or in salt form, can be present in the form of one of the isomers which are possible or as a mixture of these, for example in the form of pure isomers, such as antipodes and/or diastereomers, or as isomer mixtures, such as enantiomer mixtures, for example racemates, diastereomer mixtures or racemate mixtures, depending on the number, absolute and relative configuration of asymmetric carbon atoms which occur in the molecule and/or depending on the configuration of non-aromatic double bonds which occur in the molecule; the invention relates to the pure isomers and also to all isomer mixtures which are possible and is to be understood in each case in this sense hereinabove and hereinbelow, even when stereochemical details are not mentioned specifically in each case.

Diastereomer mixtures or racemate mixtures of compounds of formula I, in free form or in salt form, which can be obtained depending on which starting materials and procedures have been chosen can be separated in a known manner into the pure diasteromers or racemates on the basis of the physicochemical differences of the components, for example by fractional crystallization, distillation and/or chromatography.

Enantiomer mixtures, such as racemates, which can be obtained in a similar manner can be resolved into the optical antipodes by known methods, for example by recrystallization from an optically active solvent, by chromatography on chiral adsorbents, for example high-performance liquid chromatography (HPLC) on acetyl cellulose, with the aid of suitable microorganisms, by cleavage with specific, immobilized enzymes, via the formation of inclusion compounds, for example using chiral crown ethers, where only one enantiomer is complexed, or by conversion into diastereomeric salts, for example by reacting a basic end-product racemate with an optically active acid, such as a carboxylic acid, for example camphor, tartaric or malic acid, or sulfonic acid, for example camphorsulfonic acid, and separating the diastereomer mixture which can be obtained in this manner, for example by fractional crystallization based on their differing solubilities, to give the diastereomers, from which the desired enantiomer can be set free by the action of suitable agents, for example basic agents.

Pure diastereomers or enantiomers can be obtained according to the invention not only by separating suitable isomer mixtures, but also by generally known methods of diastereoselective or enantioselective synthesis, for example by carrying out the process according to the invention with starting materials of a suitable stereochemistry.

N-oxides can be prepared by reacting a compound of the formula I with a suitable oxidizing agent, for example the $H_2O_2$/urea adduct in the presence of an acid anhydride, e.g. trifluoroacetic anhydride.

Such oxidations are known from the literature, for example from *J. Med. Chem.*, 32 (12), 2561-73, 1989 or WO 2000/15615.

It is advantageous to isolate or synthesize in each case the biologically more effective isomer, for example enantiomer or diastereomer, or isomer mixture, for example enantiomer mixture or diastereomer mixture, if the individual components have a different biological activity.

The compounds of formula I and, where appropriate, the tautomers thereof, in each case in free form or in salt form, can, if appropriate, also be obtained in the form of hydrates and/or include other solvents, for example those which may have been used for the crystallization of compounds which are present in solid form.

The compounds of formula I according to the following Tables A-1 to A-297 can be prepared according to the methods described above. The examples which follow are intended to illustrate the invention and show preferred compounds of formula I, in the form of a compound of formula Ip.

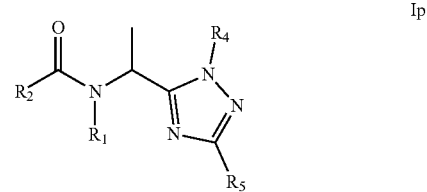

Table A-1 provides 12 compounds A-1.001 to A-1.012 of formula Ip wherein $R_1$ is H, $R_5$ is Cl, $R_4$ is (5-cyano-2-pyridyl) and $R_2$ is as defined in table Z. For example, A-1.002 is

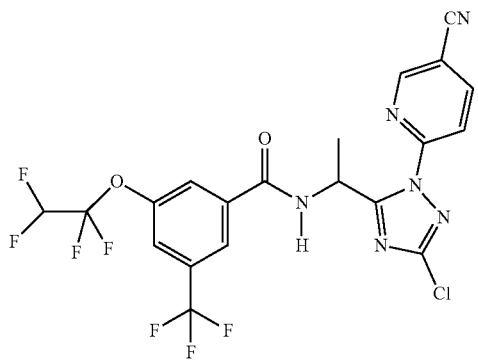 [SMILES: CC(NC(=O)c1cc(OC(F)(F)C(F)F)cc(C(F)(F)F)c1)c1nc(Cl)nn1-c1ccc(C#N)cn1]

TABLE Z

| Index | Substituent definitions of $R_2$ |
|---|---|
| 1 | 3-(difluoromethyl)-5-(trifluoromethyl)phenyl |
| 2 | 3-(1,1,2-trifluoroethoxy)-5-(trifluoromethyl)phenyl |
| 3 | 3-bromo-5-(trifluoromethyl)phenyl |
| 4 | 3-(trifluoromethylthio)-5-(trifluoromethyl)phenyl |
| 5 | 3-(trifluoromethoxy)-5-(trifluoromethyl)phenyl |
| 6 | 3-(difluoromethoxy)-5-(trifluoromethyl)phenyl |
| 7 | 3-iodo-5-(trifluoromethyl)phenyl |
| 8 | 3-(2,2,2-trifluoroethoxy)-5-(trifluoromethyl)phenyl |
| 9 | 3-(2,2-difluoroethoxy)-5-(trifluoromethyl)phenyl |
| 10 | 2,6-bis(trifluoromethyl)pyridin-4-yl (with 4-CF3) |
| 11 | 3-chloro-5-(trifluoromethoxy)phenyl |

TABLE Z-continued

Substituent definitions of $R_2$

| Index | $R_2$ |
|---|---|
| 12 | 3,5-bis(trifluoromethyl)phenyl |

Table A-2 provides 12 compounds A-2.001 to A-2.012 of formula Ip wherein $R_1$ is H, $R_5$ is Cl, $R_4$ is [5-(trifluoromethoxy)pyrimidin-2-yl] and $R_2$ is as defined in table Z.

Table A-3 provides 12 compounds A-3.001 to A-3.012 of formula Ip wherein $R_1$ is H, $R_5$ is Cl, $R_4$ is [5-(trifluoromethoxy)-2-pyridyl] and $R_2$ are as defined in table Z.

Table A-4 provides 12 compounds A-4.001 to A-4.012 of formula Ip wherein $R_1$ is H, $R_5$ is Cl, $R_4$ is [5-(2,2-difluoroethoxy)pyrimidin-2-yl] and $R_2$ is as defined in table Z.

Table A-5 provides 12 compounds A-5.001 to A-5.012 of formula Ip wherein $R_1$ is H, $R_5$ is Cl, $R_4$ is [5-(2,2-difluoroethoxy)-2-pyridyl] and $R_2$ is as defined in table Z.

Table A-6 provides 12 compounds A-6.001 to A-6.012 of formula Ip wherein $R_1$ is H, $R_5$ is Cl, $R_4$ is [5-(2,2,2-trifluoroethoxy)pyrimidin-2-yl] and $R_2$ is as defined in table Z.

Table A-7 provides 12 compounds A-7.001 to A-7.012 of formula Ip wherein $R_1$ is H, $R_5$ is Cl, $R_4$ is [5-(2,2,2-trifluoroethoxy)-2-pyridyl] and $R_2$ is as defined in table Z.

Table A-8 provides 12 compounds A-8.001 to A-8.012 of formula Ip wherein $R_1$ is H, $R_5$ is Cl, $R_4$ is [5-(difluoromethoxy)-2-pyridyl] and $R_2$ is as defined in table Z.

Table A-9 provides 12 compounds A-9.001 to A-9.012 of formula Ip wherein $R_1$ is H, $R_5$ is Cl, $R_4$ is [5-(difluoromethoxy)pyrimidin-2-yl] and $R_2$ is as defined in table Z.

Table A-10 provides 12 compounds A-10.001 to A-10.012 of formula Ip wherein $R_1$ is H, $R_5$ is Br, $R_4$ is (5-cyano-2-pyridyl) and $R_2$ is as defined in table Z.

Table A-11 provides 12 compounds A-11.001 to A-11.012 of formula Ip wherein $R_1$ is H, $R_5$ is Br, $R_4$ is [5-(trifluoromethoxy)pyrimidin-2-yl] and $R_2$ is as defined in table Z.

Table A-12 provides 12 compounds A-12.001 to A-12.012 of formula Ip wherein $R_1$ is H, $R_5$ is Br, $R_4$ is [5-(trifluoromethoxy)-2-pyridyl] and $R_2$ is as defined in table Z.

Table A-13 provides 12 compounds A-13.001 to A-13.012 of formula Ip wherein $R_1$ is H, $R_5$ is Br, $R_4$ is [5-(2,2-difluoroethoxy)pyrimidin-2-yl] and $R_2$ is as defined in table Z.

Table A-14 provides 12 compounds A-14.001 to A-14.012 of formula Ip wherein $R_1$ is H, $R_5$ is Br, $R_4$ is [5-(2,2-difluoroethoxy)-2-pyridyl] and $R_2$ is as defined in table Z.

Table A-15 provides 12 compounds A-15.001 to A-15.012 of formula Ip wherein $R_1$ is H, $R_5$ is Br, $R_4$ is [5-(2,2,2-trifluoroethoxy)pyrimidin-2-yl] and $R_2$ is as defined in table Z.

Table A-16 provides 12 compounds A-16.001 to A-16.012 of formula Ip wherein $R_1$ is H, $R_5$ is Br, $R_4$ is [5-(2,2,2-trifluoroethoxy)-2-pyridyl] and $R_2$ is as defined in table Z.

Table A-17 provides 12 compounds A-17.001 to A-17.012 of formula Ip wherein $R_1$ is H, $R_5$ is Br, $R_4$ is [5-(difluoromethoxy)-2-pyridyl] and $R_2$ is as defined in table Z.

Table A-18 provides 12 compounds A-18.001 to A-18.012 of formula Ip wherein $R_1$ is H, $R_5$ is Br, $R_4$ is [5-(difluoromethoxy)pyrimidin-2-yl] and $R_2$ is as defined in table Z.

Table A-19 provides 12 compounds A-19.001 to A-19.012 of formula Ip wherein $R_1$ is H, $R_5$ is I, $R_4$ is (5-cyano-2-pyridyl) and $R_2$ is as defined in table Z.

Table A-20 provides 12 compounds A-20.001 to A-20.012 of formula Ip wherein $R_1$ is H, $R_5$ is I, $R_4$ is [5-(trifluoromethoxy)pyrimidin-2-yl] and $R_2$ is as defined in table Z.

Table A-21 provides 12 compounds A-21.001 to A-21.012 of formula Ip wherein $R_1$ is H, $R_5$ is I, $R_4$ is [5-(trifluoromethoxy)-2-pyridyl] and $R_2$ is as defined in table Z.

Table A-22 provides 12 compounds A-22.001 to A-22.012 of formula Ip wherein $R_1$ is H, $R_5$ is I, $R_4$ is [5-(2,2-difluoroethoxy)pyrimidin-2-yl] and $R_2$ is as defined in table Z.

Table A-23 provides 12 compounds A-23.001 to A-23.012 of formula Ip wherein $R_1$ is H, $R_5$ is I, $R_4$ is [5-(2,2-difluoroethoxy)-2-pyridyl] and $R_2$ is as defined in table Z.

Table A-24 provides 12 compounds A-24.001 to A-24.012 of formula Ip wherein $R_1$ is H, $R_5$ is I, $R_4$ is [5-(2,2,2-trifluoroethoxy)-2-pyridyl] and $R_2$ is as defined in table Z.

Table A-25 provides 12 compounds A-25.001 to A-25.012 of formula Ip wherein $R_1$ is H, $R_5$ is I, $R_4$ is [5-(2,2,2-trifluoroethoxy)pyrimidin-2-yl] and $R_2$ is as defined in table Z.

Table A-26 provides 12 compounds A-26.001 to A-26.012 of formula Ip wherein $R_1$ is H, $R_5$ is I, $R_4$ is [5-(difluoromethoxy)-2-pyridyl] and $R_2$ is as defined in table Z.

Table A-27 provides 12 compounds A-27.001 to A-27.012 of formula Ip wherein $R_1$ is H, $R_5$ is I, $R_4$ is [5-(difluoromethoxy)pyrimidin-2-yl] and $R_2$ is as defined in table Z.

Table A-28 provides 12 compounds A-28.001 to A-28.012 of formula Ip wherein $R_1$ is H, $R_5$ is $NH_2$, $R_4$ is (5-cyano-2-pyridyl) and $R_2$ is as defined in table Z.

Table A-29 provides 12 compounds A-29.001 to A-29.012 of formula Ip wherein $R_1$ is H, $R_5$ is $NH_2$, $R_4$ is [5-(trifluoromethoxy)pyrimidin-2-yl] and $R_2$ is as defined in table Z.

Table A-30 provides 12 compounds A-30.001 to A-30.012 of formula Ip wherein $R_1$ is H, $R_5$ is $NH_2$, $R_4$ is [5-(trifluoromethoxy)-2-pyridyl] and $R_2$ is as defined in table Z.

Table A-31 provides 12 compounds A-31.001 to A-31.012 of formula Ip wherein $R_1$ is H, $R_5$ is $NH_2$, $R_4$ is [5-(2,2-difluoroethoxy)pyrimidin-2-yl] and $R_2$ is as defined in table Z.

Table A-32 provides 12 compounds A-32.001 to A-32.012 of formula Ip wherein $R_1$ is H, $R_5$ is $NH_2$, $R_4$ is [5-(2,2-difluoroethoxy)-2-pyridyl] and $R_2$ is as defined in table Z.

Table A-33 provides 12 compounds A-33.001 to A-33.012 of formula Ip wherein $R_1$ is H, $R_5$ is $NH_2$, $R_4$ is [5-(2,2,2-trifluoroethoxy)pyrimidin-2-yl] and $R_2$ is as defined in table Z.

Table A-34 provides 12 compounds A-34.001 to A-34.012 of formula Ip wherein $R_1$ is H, $R_5$ is $NH_2$, $R_4$ is [5-(2,2,2-trifluoroethoxy)-2-pyridyl] and $R_2$ is as defined in table Z.

Table A-35 provides 12 compounds A-35.001 to A-35.012 of formula Ip wherein $R_1$ is H, $R_5$ is $NH_2$, $R_4$ is [5-(difluoromethoxy)-2-pyridyl] and $R_2$ is as defined in table Z.

Table A-36 provides 12 compounds A-36.001 to A-36.012 of formula Ip wherein $R_1$ is H, $R_5$ is $NH_2$, $R_4$ is [5-(difluoromethoxy)pyrimidin-2-yl] and $R_2$ is as defined in table Z.

Table A-37 provides 12 compounds A-37.001 to A-37.012 of formula Ip wherein $R_1$ is H, $R_5$ is $NHCH_3$, $R_4$ is (5-cyano-2-pyridyl) and $R_2$ is as defined in table Z.

Table A-38 provides 12 compounds A-38.001 to A-38.012 of formula Ip wherein $R_1$ is H, $R_5$ is $NHCH_3$, $R_4$ is [5-(trifluoromethoxy)pyrimidin-2-yl] and $R_2$ is as defined in table Z.

Table A-39 provides 12 compounds A-39.001 to A-39.012 of formula Ip wherein $R_1$ is H, $R_5$ is $NHCH_3$, $R_4$ is [5-(trifluoromethoxy)-2-pyridyl] and $R_2$ is as defined in table Z.

Table A-40 provides 12 compounds A-40.001 to A-40.012 of formula Ip wherein $R_1$ is H, $R_5$ is $NHCH_3$, $R_4$ is [5-(2,2-difluoroethoxy)pyrimidin-2-yl] and $R_2$ is as defined in table Z.

Table A-41 provides 12 compounds A-41.001 to A-41.012 of formula Ip wherein $R_1$ is H, $R_5$ is $NHCH_3$, $R_4$ is [5-(2,2-difluoroethoxy)-2-pyridyl] and $R_2$ is as defined in table Z.

Table A-42 provides 12 compounds A-42.001 to A-42.012 of formula Ip wherein $R_1$ is H, $R_5$ is $NHCH_3$, $R_4$ is [5-(2,2,2-trifluoroethoxy)pyrimidin-2-yl] and $R_2$ is as defined in table Z.

Table A-43 provides 12 compounds A-43.001 to A-43.012 of formula Ip wherein $R_1$ is H, $R_5$ is $NHCH_3$, $R_4$ is [5-(2,2,2-trifluoroethoxy)-2-pyridyl] and $R_2$ is as defined in table Z.

Table A-44 provides 12 compounds A-44.001 to A-44.012 of formula Ip wherein $R_1$ is H, $R_5$ is $NHCH_3$, $R_4$ is [5-(difluoromethoxy)-2-pyridyl] and $R_2$ is as defined in table Z.

Table A-45 provides 12 compounds A-45.001 to A-45.012 of formula Ip wherein $R_1$ is H, $R_5$ is $NHCH_3$, $R_4$ is [5-(difluoromethoxy)pyrimidin-2-yl] and $R_2$ is as defined in table Z.

Table A-46 provides 12 compounds A-46.001 to A-46.012 of formula Ip wherein $R_1$ is H, $R_5$ is $N(CH_3)_2$, $R_4$ is (5-cyano-2-pyridyl) and $R_2$ is as defined in table Z.

Table A-47 provides 12 compounds A-47.001 to A-47.012 of formula Ip wherein $R_1$ is H, $R_5$ is $N(CH_3)_2$, $R_4$ is [5-(trifluoromethoxy)pyrimidin-2-yl] and $R_2$ is as defined in table Z.

Table A-48 provides 12 compounds A-48.001 to A-48.012 of formula Ip wherein $R_1$ is H, $R_5$ is $N(CH_3)_2$, $R_4$ is [5-(trifluoromethoxy)-2-pyridyl] and $R_2$ is as defined in table Z.

Table A-49 provides 12 compounds A-49.001 to A-49.012 of formula Ip wherein $R_1$ is H, $R_5$ is $N(CH_3)_2$, $R_4$ is [5-(2,2-difluoroethoxy)pyrimidin-2-yl] and $R_2$ is as defined in table Z.

Table A-50 provides 12 compounds A-50.001 to A-50.012 of formula Ip wherein $R_1$ is H, $R_5$ is $N(CH_3)_2$, $R_4$ is [5-(2,2-difluoroethoxy)-2-pyridyl] and $R_2$ is as defined in table Z.

Table A-51 provides 12 compounds A-51.001 to A-51.012 of formula Ip wherein $R_1$ is H, $R_5$ is $N(CH_3)_2$, $R_4$ is [5-(2,2,2-trifluoroethoxy)pyrimidin-2-yl] and $R_2$ is as defined in table Z.

Table A-52 provides 12 compounds A-52.001 to A-52.012 of formula Ip wherein $R_1$ is H, $R_5$ is $N(CH_3)_2$, $R_4$ is [5-(2,2,2-trifluoroethoxy)-2-pyridyl] and $R_2$ is as defined in table Z.

Table A-53 provides 12 compounds A-53.001 to A-53.012 of formula Ip wherein $R_1$ is H, $R_5$ is $N(CH_3)_2$, $R_4$ is [5-(difluoromethoxy)-2-pyridyl] and $R_2$ is as defined in table Z.

Table A-54 provides 12 compounds A-54.001 to A-54.012 of formula Ip wherein $R_1$ is H, $R_5$ is $N(CH_3)_2$, $R_4$ is [5-(difluoromethoxy)pyrimidin-2-yl] and $R_2$ is as defined in table Z.

Table A-55 provides 12 compounds A-55.001 to A-55.012 of formula Ip wherein $R_1$ is H, $R_5$ is $NHCOCH_3$, $R_4$ is (5-cyano-2-pyridyl) and $R_2$ is as defined in table Z.

Table A-56 provides 12 compounds A-56.001 to A-56.012 of formula Ip wherein $R_1$ is H, $R_5$ is $NHCOCH_3$, $R_4$ is [5-(trifluoromethoxy)pyrimidin-2-yl] and $R_2$ is as defined in table Z.

Table A-57 provides 12 compounds A-57.001 to A-57.012 of formula Ip wherein $R_1$ is H, $R_5$ is $NHCOCH_3$, $R_4$ is [5-(trifluoromethoxy)-2-pyridyl] and $R_2$ is as defined in table Z.

Table A-58 provides 12 compounds A-58.001 to A-58.012 of formula Ip wherein $R_1$ is H, $R_5$ is $NHCOCH_3$, $R_4$ is [5-(2,2-difluoroethoxy)pyrimidin-2-yl] and $R_2$ is as defined in table Z.

Table A-59 provides 12 compounds A-59.001 to A-59.012 of formula Ip wherein $R_1$ is H, $R_5$ is $NHCOCH_3$, $R_4$ is [5-(2,2-difluoroethoxy)-2-pyridyl] and $R_2$ is as defined in table Z.

Table A-60 provides 12 compounds A-60.001 to A-60.012 of formula Ip wherein $R_1$ is H, $R_5$ is $NHCOCH_3$, $R_4$ is [5-(2,2,2-trifluoroethoxy)pyrimidin-2-yl] and $R_2$ is as defined in table Z.

Table A-61 provides 12 compounds A-61.001 to A-61.012 of formula Ip wherein $R_1$ is H, $R_5$ is $NHCOCH_3$, $R_4$ is [5-(2,2,2-trifluoroethoxy)-2-pyridyl] and $R_2$ is as defined in table Z.

Table A-62 provides 12 compounds A-62.001 to A-62.012 of formula Ip wherein $R_1$ is H, $R_5$ is $NHCOCH_3$, $R_4$ is [5-(difluoromethoxy)-2-pyridyl] and $R_2$ is as defined in table Z.

Table A-63 provides 12 compounds A-63.001 to A-63.012 of formula Ip wherein $R_1$ is H, $R_5$ is $NHCOCH_3$, $R_4$ is [5-(difluoromethoxy)pyrimidin-2-yl] and $R_2$ is as defined in table Z.

Table A-64 provides 12 compounds A-64.001 to A-64.012 of formula Ip wherein $R_1$ is H, $R_5$ is $OCF_3$, $R_4$ is (5-cyano-2-pyridyl) and $R_2$ is as defined in table Z.

Table A-65 provides 12 compounds A-65.001 to A-65.012 of formula Ip wherein $R_1$ is H, $R_5$ is $OCF_3$, $R_4$ is [5-(trifluoromethoxy)pyrimidin-2-yl] and $R_2$ is as defined in table Z.

Table A-66 provides 12 compounds A-66.001 to A-66.012 of formula Ip wherein $R_1$ is H, $R_5$ is $OCF_3$, $R_4$ is [5-(trifluoromethoxy)-2-pyridyl] and $R_2$ is as defined in table Z.

Table A-67 provides 12 compounds A-67.001 to A-67.012 of formula Ip wherein $R_1$ is H, $R_5$ is $OCF_3$, $R_4$ is [5-(2,2-difluoroethoxy)pyrimidin-2-yl] and $R_2$ is as defined in table Z.

Table A-68 provides 12 compounds A-68.001 to A-68.012 of formula Ip wherein $R_1$ is H, $R_5$ is $OCF_3$, $R_4$ is [5-(2,2-difluoroethoxy)-2-pyridyl] and $R_2$ is as defined in table Z.

Table A-69 provides 12 compounds A-69.001 to A-69.012 of formula Ip wherein $R_1$ is H, $R_5$ is $OCF_3$, $R_4$ is [5-(2,2,2-trifluoroethoxy)pyrimidin-2-yl] and $R_2$ is as defined in table Z.

Table A-70 provides 12 compounds A-70.001 to A-70.012 of formula Ip wherein $R_1$ is H, $R_5$ is $OCF_3$, $R_4$ is [5-(2,2,2-trifluoroethoxy)-2-pyridyl] and $R_2$ is as defined in table Z.

Table A-71 provides 12 compounds A-71.001 to A-71.012 of formula Ip wherein $R_1$ is H, $R_5$ is $OCF_3$, $R_4$ is [5-(difluoromethoxy)-2-pyridyl] and $R_2$ is as defined in table Z.

Table A-72 provides 12 compounds A-72.001 to A-72.012 of formula Ip wherein $R_1$ is H, $R_5$ is $OCF_3$, $R_4$ is [5-(difluoromethoxy)pyrimidin-2-yl] and $R_2$ is as defined in table Z.

Table A-73 provides 12 compounds A-73.001 to A-73.012 of formula Ip wherein $R_1$ is H, $R_5$ is $OCHF_2$, $R_4$ is (5-cyano-2-pyridyl) and $R_2$ is as defined in table Z.

Table A-74 provides 12 compounds A-74.001 to A-74.012 of formula Ip wherein $R_1$ is H, $R_5$ is $OCHF_2$, $R_4$ is [5-(trifluoromethoxy)pyrimidin-2-yl] and $R_2$ is as defined in table Z.

Table A-75 provides 12 compounds A-75.001 to A-75.012 of formula Ip wherein $R_1$ is H, $R_5$ is $OCHF_2$, $R_4$ is [5-(trifluoromethoxy)-2-pyridyl] and $R_2$ is as defined in table Z.

Table A-76 provides 12 compounds A-76.001 to A-76.012 of formula Ip wherein $R_1$ is H, $R_5$ is $OCHF_2$, $R_4$ is [5-(2,2-difluoroethoxy)pyrimidin-2-yl] and $R_2$ is as defined in table Z.

Table A-77 provides 12 compounds A-77.001 to A-77.012 of formula Ip wherein $R_1$ is H, $R_5$ is $OCHF_2$, $R_4$ is [5-(2,2-difluoroethoxy)-2-pyridyl] and $R_2$ is as defined in table Z.

Table A-78 provides 12 compounds A-78.001 to A-78.012 of formula Ip wherein $R_1$ is H, $R_5$ is $OCHF_2$, $R_4$ is [5-(2,2,2-trifluoroethoxy)pyrimidin-2-yl] and $R_2$ is as defined in table Z.

Table A-79 provides 12 compounds A-79.001 to A-79.012 of formula Ip wherein $R_1$ is H, $R_5$ is $OCHF_2$, $R_4$ is [5-(2,2,2-trifluoroethoxy)-2-pyridyl] and $R_2$ is as defined in table Z.

Table A-80 provides 12 compounds A-80.001 to A-80.012 of formula Ip wherein $R_1$ is H, $R_5$ is $OCHF_2$, $R_4$ is [5-(difluoromethoxy)-2-pyridyl] and $R_2$ is as defined in table Z.

Table A-81 provides 12 compounds A-81.001 to A-81.012 of formula Ip wherein $R_1$ is H, $R_5$ is $OCHF_2$, $R_4$ is [5-(difluoromethoxy)pyrimidin-2-yl] and $R_2$ is as defined in table Z.

Table A-82 provides 12 compounds A-82.001 to A-82.012 of formula Ip wherein $R_1$ is H, $R_5$ is $OCH_2CF_3$, $R_4$ is (5-cyano-2-pyridyl) and $R_2$ is as defined in table Z.

Table A-83 provides 12 compounds A-83.001 to A-83.012 of formula Ip wherein $R_1$ is H, $R_5$ is $OCH_2CF_3$, $R_4$ is [5-(trifluoromethoxy)pyrimidin-2-yl] and $R_2$ is as defined in table Z.

Table A-84 provides 12 compounds A-84.001 to A-84.012 of formula Ip wherein $R_1$ is H, $R_5$ is $OCH_2CF_3$, $R_4$ is [5-(trifluoromethoxy)-2-pyridyl] and $R_2$ is as defined in table Z.

Table A-85 provides 12 compounds A-85.001 to A-85.012 of formula Ip wherein $R_1$ is H, $R_5$ is $OCH_2CF_3$, $R_4$ is [5-(2,2-difluoroethoxy)pyrimidin-2-yl] and $R_2$ is as defined in table Z.

Table A-86 provides 12 compounds A-86.001 to A-86.012 of formula Ip wherein $R_1$ is H, $R_5$ is $OCH_2CF_3$, $R_4$ is [5-(2,2-difluoroethoxy)-2-pyridyl] and $R_2$ is as defined in table Z.

Table A-87 provides 12 compounds A-87.001 to A-87.012 of formula Ip wherein $R_1$ is H, $R_5$ is $OCH_2CF_3$, $R_4$ is [5-(2,2,2-trifluoroethoxy)pyrimidin-2-yl] and $R_2$ is as defined in table Z.

Table A-88 provides 12 compounds A-88.001 to A-88.012 of formula Ip wherein $R_1$ is H, $R_5$ is $OCH_2CF_3$, $R_4$ is [5-(2,2,2-trifluoroethoxy)-2-pyridyl] and $R_2$ is as defined in table Z.

Table A-89 provides 12 compounds A-89.001 to A-89.012 of formula Ip wherein $R_1$ is H, $R_5$ is $OCH_2CF_3$, $R_4$ is [5-(difluoromethoxy)-2-pyridyl] and $R_2$ is as defined in table Z.

Table A-90 provides 12 compounds A-90.001 to A-90.012 of formula Ip wherein $R_1$ is H, $R_5$ is $OCH_2CF_3$, $R_4$ is [5-(difluoromethoxy)pyrimidin-2-yl] and $R_2$ is as defined in table Z.

Table A-91 provides 12 compounds A-91.001 to A-91.012 of formula Ip wherein $R_1$ is H, $R_5$ is $OCH_2CHF_2$, $R_4$ is (5-cyano-2-pyridyl) and $R_2$ is as defined in table Z.

Table A-92 provides 12 compounds A-92.001 to A-92.012 of formula Ip wherein $R_1$ is H, $R_5$ is $OCH_2CHF_2$, $R_4$ is [5-(trifluoromethoxy)pyrimidin-2-yl] and $R_2$ is as defined in table Z.

Table A-93 provides 12 compounds A-93.001 to A-93.012 of formula Ip wherein $R_1$ is H, $R_5$ is $OCH_2CHF_2$, $R_4$ is [5-(trifluoromethoxy)-2-pyridyl] and $R_2$ is as defined in table Z.

Table A-94 provides 12 compounds A-94.001 to A-94.012 of formula Ip wherein $R_1$ is H, $R_5$ is $OCH_2CHF_2$, $R_4$ is [5-(2,2-difluoroethoxy)pyrimidin-2-yl] and $R_2$ is as defined in table Z.

Table A-95 provides 12 compounds A-95.001 to A-95.012 of formula Ip wherein $R_1$ is H, $R_5$ is $OCH_2CHF_2$, $R_4$ is [5-(2,2-difluoroethoxy)-2-pyridyl] and $R_2$ is as defined in table Z.

Table A-96 provides 12 compounds A-96.001 to A-96.012 of formula Ip wherein $R_1$ is H, $R_5$ is $OCH_2CHF_2$, $R_4$ is [5-(2,2,2-trifluoroethoxy)pyrimidin-2-yl] and $R_2$ is as defined in table Z.

Table A-97 provides 12 compounds A-97.001 to A-97.012 of formula Ip wherein $R_1$ is H, $R_5$ is $OCH_2CHF_2$, $R_4$ is [5-(2,2,2-trifluoroethoxy)-2-pyridyl] and $R_2$ is as defined in table Z.

Table A-98 provides 12 compounds A-98.001 to A-98.012 of formula Ip wherein $R_1$ is H, $R_5$ is $OCH_2CHF_2$, $R_4$ is [5-(difluoromethoxy)-2-pyridyl] and $R_2$ is as defined in table Z.

Table A-99 provides 12 compounds A-99.001 to A-99.012 of formula Ip wherein $R_1$ is H, $R_5$ is $OCH_2CHF_2$, $R_4$ is [5-(difluoromethoxy)pyrimidin-2-yl] and $R_2$ is as defined in table Z.

Table A-100 provides 12 compounds A-100.001 to A-100.012 of formula Ip wherein $R_1$ is $CH_3$, $R_5$ is Cl, $R_4$ is (5-cyano-2-pyridyl) and $R_2$ is as defined in table Z.

Table A-101 provides 12 compounds A-101.001 to A-101.012 of formula Ip wherein $R_1$ is $CH_3$, $R_5$ is Cl, $R_4$ is [5-(trifluoromethoxy)pyrimidin-2-yl] and $R_2$ is as defined in table Z.

Table A-102 provides 12 compounds A-102.001 to A-102.012 of formula Ip wherein $R_1$ is $CH_3$, $R_5$ is Cl, $R_4$ is [5-(trifluoromethoxy)-2-pyridyl] and $R_2$ is as defined in table Z.

Table A-103 provides 12 compounds A-103.001 to A-103.012 of formula Ip wherein $R_1$ is $CH_3$, $R_5$ is Cl, $R_4$ is [5-(2,2-difluoroethoxy)pyrimidin-2-yl] and $R_2$ is as defined in table Z.

Table A-104 provides 12 compounds A-104.001 to A-104.012 of formula Ip wherein $R_1$ is $CH_3$, $R_5$ is Cl, $R_4$ is [5-(2,2-difluoroethoxy)-2-pyridyl] and $R_2$ is as defined in table Z.

Table A-105 provides 12 compounds A-105.001 to A-105.012 of formula Ip wherein $R_1$ is $CH_3$, $R_5$ is Cl, $R_4$ is [5-(2,2,2-trifluoroethoxy)pyrimidin-2-yl] and $R_2$ is as defined in table Z.

Table A-106 provides 12 compounds A-106.001 to A-106.012 of formula Ip wherein $R_1$ is $CH_3$, $R_5$ is Cl, $R_4$ is [5-(2,2,2-trifluoroethoxy)-2-pyridyl] and $R_2$ is as defined in table Z.

Table A-107 provides 12 compounds A-107.001 to A-107.012 of formula Ip wherein $R_1$ is $CH_3$, $R_5$ is Cl, $R_4$ is [5-(difluoromethoxy)-2-pyridyl] and $R_2$ is as defined in table Z.

Table A-108 provides 12 compounds A-108.001 to A-108.012 of formula Ip wherein $R_1$ is $CH_3$, $R_5$ is Cl, $R_4$ is [5-(difluoromethoxy)pyrimidin-2-yl] and $R_2$ is as defined in table Z.

Table A-109 provides 12 compounds A-109.001 to A-109.012 of formula Ip wherein $R_1$ is $CH_3$, $R_5$ is Br, $R_4$ is (5-cyano-2-pyridyl) and $R_2$ is as defined in table Z.

Table A-110 provides 12 compounds A-110.001 to A-110.012 of formula Ip wherein $R_1$ is $CH_3$, $R_5$ is Br, $R_4$ is [5-(trifluoromethoxy)pyrimidin-2-yl] and $R_2$ is as defined in table Z.

Table A-111 provides 12 compounds A-111.001 to A-111.012 of formula Ip wherein $R_1$ is $CH_3$, $R_5$ is Br, $R_4$ is [5-(trifluoromethoxy)-2-pyridyl] and $R_2$ is as defined in table Z.

Table A-112 provides 12 compounds A-112.001 to A-112.012 of formula Ip wherein $R_1$ is $CH_3$, $R_5$ is Br, $R_4$ is [5-(2,2-difluoroethoxy)pyrimidin-2-yl] and $R_2$ is as defined in table Z.

Table A-113 provides 12 compounds A-113.001 to A-113.012 of formula Ip wherein $R_1$ is $CH_3$, $R_5$ is Br, $R_4$ is [5-(2,2-difluoroethoxy)-2-pyridyl] and $R_2$ is as defined in table Z.

Table A-114 provides 12 compounds A-114.001 to A-114.012 of formula Ip wherein $R_1$ is $CH_3$, $R_5$ is Br, $R_4$ is [5-(2,2,2-trifluoroethoxy)pyrimidin-2-yl] and $R_2$ is as defined in table Z.

Table A-115 provides 12 compounds A-115.001 to A-115.012 of formula Ip wherein $R_1$ is $CH_3$, $R_5$ is Br, $R_4$ is [5-(2,2,2-trifluoroethoxy)-2-pyridyl] and $R_2$ is as defined in table Z.

Table A-116 provides 12 compounds A-116.001 to A-116.012 of formula Ip wherein $R_1$ is $CH_3$, $R_5$ is Br, $R_4$ is [5-(difluoromethoxy)-2-pyridyl] and $R_2$ is as defined in table Z.

Table A-117 provides 12 compounds A-117.001 to A-117.012 of formula Ip wherein $R_1$ is $CH_3$, $R_5$ is Br, $R_4$ is [5-(difluoromethoxy)pyrimidin-2-yl] and $R_2$ is as defined in table Z.

Table A-118 provides 12 compounds A-118.001 to A-118.012 of formula Ip wherein $R_1$ is $CH_3$, $R_5$ is I, $R_4$ is (5-cyano-2-pyridyl) and $R_2$ is as defined in table Z.

Table A-119 provides 12 compounds A-119.001 to A-119.012 of formula Ip wherein $R_1$ is $CH_3$, $R_5$ is I, $R_4$ is [5-(trifluoromethoxy)pyrimidin-2-yl] and $R_2$ is as defined in table Z.

Table A-120 provides 12 compounds A-120.001 to A-120.012 of formula Ip wherein $R_1$ is $CH_3$, $R_5$ is I, $R_4$ is [5-(trifluoromethoxy)-2-pyridyl] and $R_2$ is as defined in table Z.

Table A-121 provides 12 compounds A-121.001 to A-121.012 of formula Ip wherein $R_1$ is $CH_3$, $R_5$ is I, $R_4$ is [5-(2,2-difluoroethoxy)pyrimidin-2-yl] and $R_2$ is as defined in table Z.

Table A-122 provides 12 compounds A-122.001 to A-122.012 of formula Ip wherein $R_1$ is $CH_3$, $R_5$ is I, $R_4$ is [5-(2,2-difluoroethoxy)-2-pyridyl] and $R_2$ is as defined in table Z.

Table A-123 provides 12 compounds A-123.001 to A-123.012 of formula Ip wherein $R_1$ is $CH_3$, $R_5$ is I, $R_4$ is [5-(2,2,2-trifluoroethoxy)pyrimidin-2-yl] and $R_2$ is as defined in table Z.

Table A-124 provides 12 compounds A-124.001 to A-124.012 of formula Ip wherein $R_1$ is $CH_3$, $R_5$ is I, $R_4$ is [5-(2,2,2-trifluoroethoxy)-2-pyridyl] and $R_2$ is as defined in table Z.

Table A-125 provides 12 compounds A-125.001 to A-125.012 of formula Ip wherein $R_1$ is $CH_3$, $R_5$ is I, $R_4$ is [5-(difluoromethoxy)-2-pyridyl] and $R_2$ is as defined in table Z.

Table A-126 provides 12 compounds A-126.001 to A-126.012 of formula Ip wherein $R_1$ is $CH_3$, $R_5$ is I, $R_4$ is [5-(difluoromethoxy)pyrimidin-2-yl] and $R_2$ is as defined in table Z.

Table A-127 provides 12 compounds A-127.001 to A-127.012 of formula Ip wherein $R_1$ is $CH_3$, $R_5$ is $NH_2$, $R_4$ is (5-cyano-2-pyridyl) and $R_2$ is as defined in table Z.

Table A-128 provides 12 compounds A-128.001 to A-128.012 of formula Ip wherein $R_1$ is $CH_3$, $R_5$ is $NH_2$, $R_4$ is [5-(trifluoromethoxy)pyrimidin-2-yl] and $R_2$ is as defined in table Z.

Table A-129 provides 12 compounds A-129.001 to A-129.012 of formula Ip wherein $R_1$ is $CH_3$, $R_5$ is $NH_2$, $R_4$ is [5-(trifluoromethoxy)-2-pyridyl] and $R_2$ is as defined in table Z.

Table A-130 provides 12 compounds A-130.001 to A-130.012 of formula Ip wherein $R_1$ is $CH_3$, $R_5$ is $NH_2$, $R_4$ is [5-(2,2-difluoroethoxy)pyrimidin-2-yl] and $R_2$ is as defined in table Z.

Table A-131 provides 12 compounds A-131.001 to A-131.012 of formula Ip wherein $R_1$ is $CH_3$, $R_5$ is $NH_2$, $R_4$ is [5-(2,2-difluoroethoxy)-2-pyridyl] and $R_2$ is as defined in table Z.

Table A-132 provides 12 compounds A-132.001 to A-132.012 of formula Ip wherein $R_1$ is $CH_3$, $R_5$ is $NH_2$, $R_4$ is [5-(2,2,2-trifluoroethoxy)pyrimidin-2-yl] and $R_2$ is as defined in table Z.

Table A-133 provides 12 compounds A-133.001 to A-133.012 of formula Ip wherein $R_1$ is $CH_3$, $R_5$ is $NH_2$, $R_4$ is [5-(2,2,2-trifluoroethoxy)-2-pyridyl] and $R_2$ is as defined in table Z.

Table A-134 provides 12 compounds A-134.001 to A-134.012 of formula Ip wherein $R_1$ is $CH_3$, $R_5$ is $NH_2$, $R_4$ is [5-(difluoromethoxy)-2-pyridyl] and $R_2$ is as defined in table Z.

Table A-135 provides 12 compounds A-135.001 to A-135.012 of formula Ip wherein $R_1$ is $CH_3$, $R_5$ is $NH_2$, $R_4$ is [5-(difluoromethoxy)pyrimidin-2-yl] and $R_2$ is as defined in table Z.

Table A-136 provides 12 compounds A-136.001 to A-136.012 of formula Ip wherein $R_1$ is $CH_3$, $R_5$ is $NHCH_3$, $R_4$ is (5-cyano-2-pyridyl) and $R_2$ is as defined in table Z.

Table A-137 provides 12 compounds A-137.001 to A-137.012 of formula Ip wherein $R_1$ is $CH_3$, $R_5$ is $NHCH_3$, $R_4$ is [5-(trifluoromethoxy)pyrimidin-2-yl] and $R_2$ is as defined in table Z.

Table A-138 provides 12 compounds A-138.001 to A-138.012 of formula Ip wherein $R_1$ is $CH_3$, $R_5$ is $NHCH_3$, $R_4$ is [5-(trifluoromethoxy)-2-pyridyl] and $R_2$ is as defined in table Z.

Table A-139 provides 12 compounds A-139.001 to A-139.012 of formula Ip wherein $R_1$ is $CH_3$, $R_5$ is $NHCH_3$, $R_4$ is [5-(2,2-difluoroethoxy)pyrimidin-2-yl] and $R_2$ is as defined in table Z.

Table A-140 provides 12 compounds A-140.001 to A-140.012 of formula Ip wherein $R_1$ is $CH_3$, $R_5$ is $NHCH_3$, $R_4$ is [5-(2,2-difluoroethoxy)-2-pyridyl] and $R_2$ is as defined in table Z.

Table A-141 provides 12 compounds A-141.001 to A-141.012 of formula Ip wherein $R_1$ is $CH_3$, $R_5$ is $NHCH_3$, $R_4$ is [5-(2,2,2-trifluoroethoxy)pyrimidin-2-yl] and $R_2$ is as defined in table Z.

Table A-142 provides 12 compounds A-142.001 to A-142.012 of formula Ip wherein $R_1$ is $CH_3$, $R_5$ is $NHCH_3$, $R_4$ is [5-(2,2,2-trifluoroethoxy)-2-pyridyl] and $R_2$ is as defined in table Z.

Table A-143 provides 12 compounds A-143.001 to A-143.012 of formula Ip wherein $R_1$ is $CH_3$, $R_5$ is $NHCH_3$, $R_4$ is [5-(difluoromethoxy)-2-pyridyl] and $R_2$ is as defined in table Z.

Table A-144 provides 12 compounds A-144.001 to A-144.012 of formula Ip wherein $R_1$ is $CH_3$, $R_5$ is $NHCH_3$, $R_4$ is [5-(difluoromethoxy)pyrimidin-2-yl] and $R_2$ is as defined in table Z.

Table A-145 provides 12 compounds A-145.001 to A-145.012 of formula Ip wherein $R_1$ is $CH_3$, $R_5$ is $N(CH_3)_2$, $R_4$ is (5-cyano-2-pyridyl) and $R_2$ is as defined in table Z.

Table A-146 provides 12 compounds A-146.001 to A-146.012 of formula Ip wherein $R_1$ is $CH_3$, $R_5$ is $N(CH_3)_2$, $R_4$ is [5-(trifluoromethoxy)pyrimidin-2-yl] and $R_2$ is as defined in table Z.

Table A-147 provides 12 compounds A-147.001 to A-147.012 of formula Ip wherein $R_1$ is $CH_3$, $R_5$ is $N(CH_3)_2$, $R_4$ is [5-(trifluoromethoxy)-2-pyridyl] and $R_2$ is as defined in table Z.

Table A-148 provides 12 compounds A-148.001 to A-148.012 of formula Ip wherein $R_1$ is $CH_3$, $R_5$ is $N(CH_3)_2$, $R_4$ is [5-(2,2-difluoroethoxy)pyrimidin-2-yl] and $R_2$ is as defined in table Z.

Table A-149 provides 12 compounds A-149.001 to A-149.012 of formula Ip wherein $R_1$ is $CH_3$, $R_5$ is $N(CH_3)_2$, $R_4$ is [5-(2,2-difluoroethoxy)-2-pyridyl] and $R_2$ is as defined in table Z.

Table A-150 provides 12 compounds A-150.001 to A-150.012 of formula Ip wherein $R_1$ is $CH_3$, $R_5$ is $N(CH_3)_2$, $R_4$ is [5-(2,2,2-trifluoroethoxy)pyrimidin-2-yl] and $R_2$ is as defined in table Z.

Table A-151 provides 12 compounds A-151.001 to A-151.012 of formula Ip wherein $R_1$ is $CH_3$, $R_5$ is $N(CH_3)_2$, $R_4$ is [5-(2,2,2-trifluoroethoxy)-2-pyridyl] and $R_2$ is as defined in table Z.

Table A-152 provides 12 compounds A-152.001 to A-152.012 of formula Ip wherein $R_1$ is $CH_3$, $R_5$ is $N(CH_3)_2$, $R_4$ is [5-(difluoromethoxy)-2-pyridyl] and $R_2$ is as defined in table Z.

Table A-153 provides 12 compounds A-153.001 to A-153.012 of formula Ip wherein $R_1$ is $CH_3$, $R_5$ is $N(CH_3)_2$, $R_4$ is [5-(difluoromethoxy)pyrimidin-2-yl] and $R_2$ is as defined in table Z.

Table A-154 provides 12 compounds A-154.001 to A-154.012 of formula Ip wherein $R_1$ is $CH_3$, $R_5$ is $NHCOCH_3$, $R_4$ is (5-cyano-2-pyridyl) and $R_2$ is as defined in table Z.

Table A-155 provides 12 compounds A-155.001 to A-155.012 of formula Ip wherein $R_1$ is $CH_3$, $R_5$ is $NHCOCH_3$, $R_4$ is [5-(trifluoromethoxy)pyrimidin-2-yl] and $R_2$ is as defined in table Z.

Table A-156 provides 12 compounds A-156.001 to A-156.012 of formula Ip wherein $R_1$ is $CH_3$, $R_5$ is $NHCOCH_3$, $R_4$ is [5-(trifluoromethoxy)-2-pyridyl] and $R_2$ is as defined in table Z.

Table A-157 provides 12 compounds A-157.001 to A-157.012 of formula Ip wherein $R_1$ is $CH_3$, $R_5$ is $NHCOCH_3$, $R_4$ is [5-(2,2-difluoroethoxy)pyrimidin-2-yl] and $R_2$ is as defined in table Z.

Table A-158 provides 12 compounds A-158.001 to A-158.012 of formula Ip wherein $R_1$ is $CH_3$, $R_5$ is $NHCOCH_3$, $R_4$ is [5-(2,2-difluoroethoxy)-2-pyridyl] and $R_2$ is as defined in table Z.

Table A-159 provides 12 compounds A-159.001 to A-159.012 of formula Ip wherein $R_1$ is $CH_3$, $R_5$ is $NHCOCH_3$, $R_4$ is [5-(2,2,2-trifluoroethoxy)pyrimidin-2-yl] and $R_2$ is as defined in table Z.

Table A-160 provides 12 compounds A-160.001 to A-160.012 of formula Ip wherein $R_1$ is $CH_3$, $R_5$ is $NHCOCH_3$, $R_4$ is [5-(2,2,2-trifluoroethoxy)-2-pyridyl] and $R_2$ is as defined in table Z.

Table A-161 provides 12 compounds A-161.001 to A-161.012 of formula Ip wherein $R_1$ is $CH_3$, $R_5$ is $NHCOCH_3$, $R_4$ is [5-(difluoromethoxy)-2-pyridyl] and $R_2$ is as defined in table Z.

Table A-162 provides 12 compounds A-162.001 to A-162.012 of formula Ip wherein $R_1$ is $CH_3$, $R_5$ is $NHCOCH_3$, $R_4$ is [5-(difluoromethoxy)pyrimidin-2-yl] and $R_2$ is as defined in table Z.

Table A-163 provides 12 compounds A-163.001 to A-163.012 of formula Ip wherein $R_1$ is $CH_3$, $R_5$ is $OCF_3$, $R_4$ is (5-cyano-2-pyridyl) and $R_2$ is as defined in table Z.

Table A-164 provides 12 compounds A-164.001 to A-164.012 of formula Ip wherein $R_1$ is $CH_3$, $R_5$ is $OCF_3$, $R_4$ is [5-(trifluoromethoxy)pyrimidin-2-yl] and $R_2$ is as defined in table Z.

Table A-165 provides 12 compounds A-165.001 to A-165.012 of formula Ip wherein $R_1$ is $CH_3$, $R_5$ is $OCF_3$, $R_4$ is [5-(trifluoromethoxy)-2-pyridyl] and $R_2$ is as defined in table Z.

Table A-166 provides 12 compounds A-166.001 to A-166.012 of formula Ip wherein $R_1$ is $CH_3$, $R_5$ is $OCF_3$, $R_4$ is [5-(2,2-difluoroethoxy)pyrimidin-2-yl] and $R_2$ is as defined in table Z.

Table A-167 provides 12 compounds A-167.001 to A-167.012 of formula Ip wherein $R_1$ is $CH_3$, $R_5$ is $OCF_3$, $R_4$ is [5-(2,2-difluoroethoxy)-2-pyridyl] and $R_2$ is as defined in table Z.

Table A-168 provides 12 compounds A-168.001 to A-168.012 of formula Ip wherein $R_1$ is $CH_3$, $R_5$ is $OCF_3$, $R_4$ is [5-(2,2,2-trifluoroethoxy)pyrimidin-2-yl] and $R_2$ is as defined in table Z.

Table A-169 provides 12 compounds A-169.001 to A-169.012 of formula Ip wherein $R_1$ is $CH_3$, $R_5$ is $OCF_3$, $R_4$ is [5-(2,2,2-trifluoroethoxy)-2-pyridyl] and $R_2$ is as defined in table Z.

Table A-170 provides 12 compounds A-170.001 to A-170.012 of formula Ip wherein $R_1$ is $CH_3$, $R_5$ is $OCF_3$, $R_4$ is [5-(difluoromethoxy)-2-pyridyl] and $R_2$ is as defined in table Z.

Table A-171 provides 12 compounds A-171.001 to A-171.012 of formula Ip wherein $R_1$ is $CH_3$, $R_5$ is $OCF_3$, $R_4$ is [5-(difluoromethoxy)pyrimidin-2-yl] and $R_2$ is as defined in table Z.

Table A-172 provides 12 compounds A-172.001 to A-172.012 of formula Ip wherein $R_1$ is $CH_3$, $R_5$ is $OCHF_2$, $R_4$ is (5-cyano-2-pyridyl) and $R_2$ is as defined in table Z.

Table A-173 provides 12 compounds A-173.001 to A-173.012 of formula Ip wherein $R_1$ is $CH_3$, $R_5$ is $OCHF_2$, $R_4$ is [5-(trifluoromethoxy)pyrimidin-2-yl] and $R_2$ is as defined in table Z.

Table A-174 provides 12 compounds A-174.001 to A-174.012 of formula Ip wherein $R_1$ is $CH_3$, $R_5$ is $OCHF_2$, $R_4$ is [5-(trifluoromethoxy)-2-pyridyl] and $R_2$ is as defined in table Z.

Table A-175 provides 12 compounds A-175.001 to A-175.012 of formula Ip wherein $R_1$ is $CH_3$, $R_5$ is $OCHF_2$, $R_4$ is [5-(2,2-difluoroethoxy)pyrimidin-2-yl] and $R_2$ is as defined in table Z.

Table A-176 provides 12 compounds A-176.001 to A-176.012 of formula Ip wherein $R_1$ is $CH_3$, $R_5$ is $OCHF_2$, $R_4$ is [5-(2,2-difluoroethoxy)-2-pyridyl] and $R_2$ is as defined in table Z.

Table A-177 provides 12 compounds A-177.001 to A-177.012 of formula Ip wherein $R_1$ is $CH_3$, $R_5$ is $OCHF_2$, $R_4$ is [5-(2,2,2-trifluoroethoxy)pyrimidin-2-yl] and $R_2$ is as defined in table Z.

Table A-178 provides 12 compounds A-178.001 to A-178.012 of formula Ip wherein $R_1$ is $CH_3$, $R_5$ is $OCHF_2$, $R_4$ is [5-(2,2,2-trifluoroethoxy)-2-pyridyl] and $R_2$ is as defined in table Z.

Table A-179 provides 12 compounds A-179.001 to A-179.012 of formula Ip wherein $R_1$ is $CH_3$, $R_5$ is $OCHF_2$, $R_4$ is [5-(difluoromethoxy)-2-pyridyl] and $R_2$ is as defined in table Z.

Table A-180 provides 12 compounds A-180.001 to A-180.012 of formula Ip wherein $R_1$ is $CH_3$, $R_5$ is $OCHF_2$, $R_4$ is [5-(difluoromethoxy)pyrimidin-2-yl] and $R_2$ is as defined in table Z.

Table A-181 provides 12 compounds A-181.001 to A-181.012 of formula Ip wherein $R_1$ is $CH_3$, $R_5$ is $OCH_2CF_3$, $R_4$ is (5-cyano-2-pyridyl) and $R_2$ is as defined in table Z.

Table A-182 provides 12 compounds A-182.001 to A-182.012 of formula Ip wherein $R_1$ is $CH_3$, $R_5$ is $OCH_2CF_3$, $R_4$ is [5-(trifluoromethoxy)pyrimidin-2-yl] and $R_2$ is as defined in table Z.

Table A-183 provides 12 compounds A-183.001 to A-183.012 of formula Ip wherein $R_1$ is $CH_3$, $R_5$ is $OCH_2CF_3$, $R_4$ is [5-(trifluoromethoxy)-2-pyridyl] and $R_2$ is as defined in table Z.

Table A-184 provides 12 compounds A-184.001 to A-184.012 of formula Ip wherein $R_1$ is $CH_3$, $R_5$ is $OCH_2CF_3$, $R_4$ is [5-(2,2-difluoroethoxy)pyrimidin-2-yl] and $R_2$ is as defined in table Z.

Table A-185 provides 12 compounds A-185.001 to A-185.012 of formula Ip wherein $R_1$ is $CH_3$, $R_5$ is $OCH_2CF_3$, $R_4$ is [5-(2,2-difluoroethoxy)-2-pyridyl] and $R_2$ is as defined in table Z.

Table A-186 provides 12 compounds A-186.001 to A-186.012 of formula Ip wherein $R_1$ is $CH_3$, $R_5$ is $OCH_2CF_3$, $R_4$ is [5-(2,2,2-trifluoroethoxy)pyrimidin-2-yl] and $R_2$ is as defined in table Z.

Table A-187 provides 12 compounds A-187.001 to A-187.012 of formula Ip wherein $R_1$ is $CH_3$, $R_5$ is $OCH_2CF_3$, $R_4$ is [5-(2,2,2-trifluoroethoxy)-2-pyridyl] and $R_2$ is as defined in table Z.

Table A-188 provides 12 compounds A-188.001 to A-188.012 of formula Ip wherein $R_1$ is $CH_3$, $R_5$ is $OCH_2CF_3$, $R_4$ is [5-(difluoromethoxy)-2-pyridyl] and $R_2$ is as defined in table Z.

Table A-189 provides 12 compounds A-189.001 to A-189.012 of formula Ip wherein $R_1$ is $CH_3$, $R_5$ is $OCH_2CF_3$, $R_4$ is [5-(difluoromethoxy)pyrimidin-2-yl] and $R_2$ is as defined in table Z.

Table A-190 provides 12 compounds A-190.001 to A-190.012 of formula Ip wherein $R_1$ is $CH_3$, $R_5$ is $OCH_2CHF_2$, $R_4$ is (5-cyano-2-pyridyl) and $R_2$ is as defined in table Z.

Table A-191 provides 12 compounds A-191.001 to A-191.012 of formula Ip wherein $R_1$ is $CH_3$, $R_5$ is $OCH_2CHF_2$, $R_4$ is [5-(trifluoromethoxy)pyrimidin-2-yl] and $R_2$ is as defined in table Z.

Table A-192 provides 12 compounds A-192.001 to A-192.012 of formula Ip wherein $R_1$ is $CH_3$, $R_5$ is $OCH_2CHF_2$, $R_4$ is [5-(trifluoromethoxy)-2-pyridyl] and $R_2$ is as defined in table Z.

Table A-193 provides 12 compounds A-193.001 to A-193.012 of formula Ip wherein $R_1$ is $CH_3$, $R_5$ is $OCH_2CHF_2$, $R_4$ is [5-(2,2-difluoroethoxy)pyrimidin-2-yl] and $R_2$ is as defined in table Z.

Table A-194 provides 12 compounds A-194.001 to A-194.012 of formula Ip wherein $R_1$ is $CH_3$, $R_5$ is $OCH_2CHF_2$, $R_4$ is [5-(2,2-difluoroethoxy)-2-pyridyl] and $R_2$ is as defined in table Z.

Table A-195 provides 12 compounds A-195.001 to A-195.012 of formula Ip wherein $R_1$ is $CH_3$, $R_5$ is $OCH_2CHF_2$, $R_4$ is [5-(2,2,2-trifluoroethoxy)pyrimidin-2-yl] and $R_2$ is as defined in table Z.

Table A-196 provides 12 compounds A-196.001 to A-196.012 of formula Ip wherein $R_1$ is $CH_3$, $R_5$ is $OCH_2CHF_2$, $R_4$ is [5-(2,2,2-trifluoroethoxy)-2-pyridyl] and $R_2$ is as defined in table Z.

Table A-197 provides 12 compounds A-197.001 to A-197.012 of formula Ip wherein $R_1$ is $CH_3$, $R_5$ is $OCH_2CHF_2$, $R_4$ is [5-(difluoromethoxy)-2-pyridyl] and $R_2$ is as defined in table Z.

Table A-198 provides 12 compounds A-198.001 to A-198.012 of formula Ip wherein $R_1$ is $CH_3$, $R_5$ is $OCH_2CHF_2$, $R_4$ is [5-(difluoromethoxy)pyrimidin-2-yl] and $R_2$ is as defined in table Z.

Table A-199 provides 12 compounds A-199.001 to A-199.012 of formula Ip wherein $R_1$ is $CH_2Cyp$, $R_5$ is Cl, $R_4$ is (5-cyano-2-pyridyl) and $R_2$ is as defined in table Z.

Table A-200 provides 12 compounds A-200.001 to A-200.012 of formula Ip wherein $R_1$ is $CH_2Cyp$, $R_5$ is Cl, $R_4$ is [5-(trifluoromethoxy)pyrimidin-2-yl] and $R_2$ is as defined in table Z.

Table A-201 provides 12 compounds A-201.001 to A-201.012 of formula Ip wherein $R_1$ is $CH_2Cyp$, $R_5$ is Cl, $R_4$ is [5-(trifluoromethoxy)-2-pyridyl] and $R_2$ is as defined in table Z.

Table A-202 provides 12 compounds A-202.001 to A-202.012 of formula Ip wherein $R_1$ is $CH_2Cyp$, $R_5$ is Cl, $R_4$ is [5-(2,2-difluoroethoxy)pyrimidin-2-yl] and $R_2$ is as defined in table Z.

Table A-203 provides 12 compounds A-203.001 to A-203.012 of formula Ip wherein $R_1$ is $CH_2Cyp$, $R_5$ is Cl, $R_4$ is [5-(2,2-difluoroethoxy)-2-pyridyl] and $R_2$ is as defined in table Z.

Table A-204 provides 12 compounds A-204.001 to A-204.012 of formula Ip wherein $R_1$ is $CH_2Cyp$, $R_5$ is Cl, $R_4$ is [5-(2,2,2-trifluoroethoxy)pyrimidin-2-yl] and $R_2$ is as defined in table Z.

Table A-205 provides 12 compounds A-205.001 to A-205.012 of formula Ip wherein $R_1$ is $CH_2Cyp$, $R_5$ is Cl, $R_4$ is [5-(2,2,2-trifluoroethoxy)-2-pyridyl] and $R_2$ is as defined in table Z.

Table A-206 provides 12 compounds A-206.001 to A-206.012 of formula Ip wherein $R_1$ is $CH_2Cyp$, $R_5$ is Cl, $R_4$ is [5-(difluoromethoxy)-2-pyridyl] and $R_2$ is as defined in table Z.

Table A-207 provides 12 compounds A-207.001 to A-207.012 of formula Ip wherein $R_1$ is $CH_2Cyp$, $R_5$ is Cl, $R_4$ is [5-(difluoromethoxy)pyrimidin-2-yl] and $R_2$ is as defined in table Z.

Table A-208 provides 12 compounds A-208.001 to A-208.012 of formula Ip wherein $R_1$ is $CH_2Cyp$, $R_5$ is Br, $R_4$ is (5-cyano-2-pyridyl) and $R_2$ is as defined in table Z.

Table A-209 provides 12 compounds A-209.001 to A-209.012 of formula Ip wherein $R_1$ is $CH_2Cyp$, $R_5$ is Br, $R_4$ is [5-(trifluoromethoxy)pyrimidin-2-yl] and $R_2$ is as defined in table Z.

Table A-210 provides 12 compounds A-210.001 to A-210.012 of formula Ip wherein $R_1$ is $CH_2Cyp$, $R_5$ is Br, $R_4$ is [5-(trifluoromethoxy)-2-pyridyl] and $R_2$ is as defined in table Z.

Table A-211 provides 12 compounds A-211.001 to A-211.012 of formula Ip wherein $R_1$ is $CH_2Cyp$, $R_5$ is Br, $R_4$ is [5-(2,2-difluoroethoxy)pyrimidin-2-yl] and $R_2$ is as defined in table Z.

Table A-212 provides 12 compounds A-212.001 to A-212.012 of formula Ip wherein $R_1$ is $CH_2Cyp$, $R_5$ is Br, $R_4$ is [5-(2,2-difluoroethoxy)-2-pyridyl] and $R_2$ is as defined in table Z.

Table A-213 provides 12 compounds A-213.001 to A-213.012 of formula Ip wherein $R_1$ is $CH_2Cyp$, $R_5$ is Br, $R_4$ is [5-(2,2,2-trifluoroethoxy)pyrimidin-2-yl] and $R_2$ is as defined in table Z.

Table A-214 provides 12 compounds A-214.001 to A-214.012 of formula Ip wherein $R_1$ is $CH_2Cyp$, $R_5$ is Br, $R_4$ is [5-(2,2,2-trifluoroethoxy)-2-pyridyl] and $R_2$ is as defined in table Z.

Table A-215 provides 12 compounds A-215.001 to A-215.012 of formula Ip wherein $R_1$ is $CH_2Cyp$, $R_5$ is Br, $R_4$ is [5-(difluoromethoxy)-2-pyridyl] and $R_2$ is as defined in table Z.

Table A-216 provides 12 compounds A-216.001 to A-216.012 of formula Ip wherein $R_1$ is $CH_2Cyp$, $R_5$ is Br, $R_4$ is [5-(difluoromethoxy)pyrimidin-2-yl] and $R_2$ is as defined in table Z.

Table A-217 provides 12 compounds A-217.001 to A-217.012 of formula Ip wherein $R_1$ is $CH_2Cyp$, $R_5$ is I, $R_4$ is (5-cyano-2-pyridyl) and $R_2$ is as defined in table Z.

Table A-218 provides 12 compounds A-218.001 to A-218.012 of formula Ip wherein $R_1$ is $CH_2Cyp$, $R_5$ is I, $R_4$ is [5-(trifluoromethoxy)pyrimidin-2-yl] and $R_2$ is as defined in table Z.

Table A-219 provides 12 compounds A-219.001 to A-219.012 of formula Ip wherein $R_1$ is $CH_2Cyp$, $R_5$ is I, $R_4$ is [5-(trifluoromethoxy)-2-pyridyl] and $R_2$ is as defined in table Z.

Table A-220 provides 12 compounds A-220.001 to A-220.012 of formula Ip wherein $R_1$ is $CH_2Cyp$, $R_5$ is I, $R_4$ is [5-(2,2-difluoroethoxy)pyrimidin-2-yl] and $R_2$ is as defined in table Z.

Table A-221 provides 12 compounds A-221.001 to A-221.012 of formula Ip wherein $R_1$ is $CH_2Cyp$, $R_5$ is I, $R_4$ is [5-(2,2-difluoroethoxy)-2-pyridyl] and $R_2$ is as defined in table Z.

Table A-222 provides 12 compounds A-222.001 to A-222.012 of formula Ip wherein $R_1$ is $CH_2Cyp$, $R_5$ is I, $R_4$ is [5-(2,2,2-trifluoroethoxy)pyrimidin-2-yl] and $R_2$ is as defined in table Z.

Table A-223 provides 12 compounds A-223.001 to A-223.012 of formula Ip wherein $R_1$ is $CH_2Cyp$, $R_5$ is I, $R_4$ is [5-(2,2,2-trifluoroethoxy)-2-pyridyl] and $R_2$ is as defined in table Z.

Table A-224 provides 12 compounds A-224.001 to A-224.012 of formula Ip wherein $R_1$ is $CH_2Cyp$, $R_5$ is I, $R_4$ is [5-(difluoromethoxy)-2-pyridyl] and $R_2$ is as defined in table Z.

Table A-225 provides 12 compounds A-225.001 to A-225.012 of formula Ip wherein $R_1$ is $CH_2Cyp$, $R_5$ is I, $R_4$ is [5-(difluoromethoxy)pyrimidin-2-yl] and $R_2$ is as defined in table Z.

Table A-226 provides 12 compounds A-226.001 to A-226.012 of formula Ip wherein $R_1$ is $CH_2Cyp$, $R_5$ is $NH_2$, $R_4$ is (5-cyano-2-pyridyl) and $R_2$ is as defined in table Z.

Table A-227 provides 12 compounds A-227.001 to A-227.012 of formula Ip wherein $R_1$ is $CH_2Cyp$, $R_5$ is $NH_2$, $R_4$ is [5-(trifluoromethoxy)pyrimidin-2-yl] and $R_2$ is as defined in table Z.

Table A-228 provides 12 compounds A-228.001 to A-228.012 of formula Ip wherein $R_1$ is $CH_2Cyp$, $R_5$ is $NH_2$, $R_4$ is [5-(trifluoromethoxy)-2-pyridyl] and $R_2$ is as defined in table Z.

Table A-229 provides 12 compounds A-229.001 to A-229.012 of formula Ip wherein $R_1$ is $CH_2Cyp$, $R_5$ is $NH_2$, $R_4$ is [5-(2,2-difluoroethoxy)pyrimidin-2-yl] and $R_2$ is as defined in table Z.

Table A-230 provides 12 compounds A-230.001 to A-230.012 of formula Ip wherein $R_1$ is $CH_2Cyp$, $R_5$ is $NH_2$, $R_4$ is [5-(2,2-difluoroethoxy)-2-pyridyl] and $R_2$ is as defined in table Z.

Table A-231 provides 12 compounds A-231.001 to A-231.012 of formula Ip wherein $R_1$ is $CH_2Cyp$, $R_5$ is $NH_2$, $R_4$ is [5-(2,2,2-trifluoroethoxy)pyrimidin-2-yl] and $R_2$ is as defined in table Z.

Table A-232 provides 12 compounds A-232.001 to A-232.012 of formula Ip wherein $R_1$ is $CH_2Cyp$, $R_5$ is $NH_2$, $R_4$ is [5-(2,2,2-trifluoroethoxy)-2-pyridyl] and $R_2$ is as defined in table Z.

Table A-233 provides 12 compounds A-233.001 to A-233.012 of formula Ip wherein $R_1$ is $CH_2Cyp$, $R_5$ is $NH_2$, $R_4$ is [5-(difluoromethoxy)-2-pyridyl] and $R_2$ is as defined in table Z.

Table A-234 provides 12 compounds A-234.001 to A-234.012 of formula Ip wherein $R_1$ is $CH_2Cyp$, $R_5$ is $NH_2$, $R_4$ is [5-(difluoromethoxy)pyrimidin-2-yl] and $R_2$ is as defined in table Z.

Table A-235 provides 12 compounds A-235.001 to A-235.012 of formula Ip wherein $R_1$ is $CH_2Cyp$, $R_5$ is $NHCH_3$, $R_4$ is (5-cyano-2-pyridyl) and $R_2$ is as defined in table Z.

Table A-236 provides 12 compounds A-236.001 to A-236.012 of formula Ip wherein $R_1$ is $CH_2Cyp$, $R_5$ is $NHCH_3$, $R_4$ is [5-(trifluoromethoxy)pyrimidin-2-yl] and $R_2$ is as defined in table Z.

Table A-237 provides 12 compounds A-237.001 to A-237.012 of formula Ip wherein $R_1$ is $CH_2Cyp$, $R_5$ is $NHCH_3$, $R_4$ is [5-(trifluoromethoxy)-2-pyridyl] and $R_2$ is as defined in table Z.

Table A-238 provides 12 compounds A-238.001 to A-238.012 of formula Ip wherein $R_1$ is $CH_2Cyp$, $R_5$ is $NHCH_3$, $R_4$ is [5-(2,2-difluoroethoxy)pyrimidin-2-yl] and $R_2$ is as defined in table Z.

Table A-239 provides 12 compounds A-239.001 to A-239.012 of formula Ip wherein $R_1$ is $CH_2Cyp$, $R_5$ is $NHCH_3$, $R_4$ is [5-(2,2-difluoroethoxy)-2-pyridyl] and $R_2$ is as defined in table Z.

Table A-240 provides 12 compounds A-240.001 to A-240.012 of formula Ip wherein $R_1$ is $CH_2Cyp$, $R_5$ is $NHCH_3$, $R_4$ is [5-(2,2,2-trifluoroethoxy)pyrimidin-2-yl] and $R_2$ is as defined in table Z.

Table A-241 provides 12 compounds A-241.001 to A-241.012 of formula Ip wherein $R_1$ is $CH_2Cyp$, $R_5$ is $NHCH_3$, $R_4$ is [5-(2,2,2-trifluoroethoxy)-2-pyridyl] and $R_2$ is as defined in table Z.

Table A-242 provides 12 compounds A-242.001 to A-242.012 of formula Ip wherein $R_1$ is $CH_2Cyp$, $R_5$ is $NHCH_3$, $R_4$ is [5-(difluoromethoxy)-2-pyridyl] and $R_2$ is as defined in table Z.

Table A-243 provides 12 compounds A-243.001 to A-243.012 of formula Ip wherein $R_1$ is $CH_2Cyp$, $R_5$ is $NHCH_3$, $R_4$ is [5-(difluoromethoxy)pyrimidin-2-yl] and $R_2$ is as defined in table Z.

Table A-244 provides 12 compounds A-244.001 to A-244.012 of formula Ip wherein $R_1$ is $CH_2Cyp$, $R_5$ is $N(CH_3)_2$, $R_4$ is (5-cyano-2-pyridyl) and $R_2$ is as defined in table Z.

Table A-245 provides 12 compounds A-245.001 to A-245.012 of formula Ip wherein $R_1$ is $CH_2Cyp$, $R_5$ is $N(CH_3)_2$, $R_4$ is [5-(trifluoromethoxy)pyrimidin-2-yl] and $R_2$ is as defined in table Z.

Table A-246 provides 12 compounds A-246.001 to A-246.012 of formula Ip wherein $R_1$ is $CH_2Cyp$, $R_5$ is $N(CH_3)_2$, $R_4$ is [5-(trifluoromethoxy)-2-pyridyl] and $R_2$ is as defined in table Z.

Table A-247 provides 12 compounds A-247.001 to A-247.012 of formula Ip wherein $R_1$ is $CH_2Cyp$, $R_5$ is $N(CH_3)_2$, $R_4$ is [5-(2,2-difluoroethoxy)pyrimidin-2-yl] and $R_2$ is as defined in table Z.

Table A-248 provides 12 compounds A-248.001 to A-248.012 of formula Ip wherein $R_1$ is $CH_2Cyp$, $R_5$ is $N(CH_3)_2$, $R_4$ is [5-(2,2-difluoroethoxy)-2-pyridyl] and $R_2$ is as defined in table Z.

Table A-249 provides 12 compounds A-249.001 to A-249.012 of formula Ip wherein $R_1$ is $CH_2Cyp$, $R_5$ is $N(CH_3)_2$, $R_4$ is [5-(2,2,2-trifluoroethoxy)pyrimidin-2-yl] and $R_2$ is as defined in table Z.

Table A-250 provides 12 compounds A-250.001 to A-250.012 of formula Ip wherein $R_1$ is $CH_2Cyp$, $R_5$ is $N(CH_3)_2$, $R_4$ is [5-(2,2,2-trifluoroethoxy)-2-pyridyl] and $R_2$ is as defined in table Z.

Table A-251 provides 12 compounds A-251.001 to A-251.012 of formula Ip wherein $R_1$ is $CH_2Cyp$, $R_5$ is $N(CH_3)_2$, $R_4$ is [5-(difluoromethoxy)-2-pyridyl] and $R_2$ is as defined in table Z.

Table A-252 provides 12 compounds A-252.001 to A-252.012 of formula Ip wherein $R_1$ is $CH_2Cyp$, $R_5$ is $N(CH_3)_2$, $R_4$ is [5-(difluoromethoxy)pyrimidin-2-yl] and $R_2$ is as defined in table Z.

Table A-253 provides 12 compounds A-253.001 to A-253.012 of formula Ip wherein $R_1$ is $CH_2Cyp$, $R_5$ is $NHCOCH_3$, $R_4$ is (5-cyano-2-pyridyl) and $R_2$ is as defined in table Z.

Table A-254 provides 12 compounds A-254.001 to A-254.012 of formula Ip wherein $R_1$ is $CH_2Cyp$, $R_5$ is $NHCOCH_3$, $R_4$ is [5-(trifluoromethoxy)pyrimidin-2-yl] and $R_2$ is as defined in table Z.

Table A-255 provides 12 compounds A-255.001 to A-255.012 of formula Ip wherein $R_1$ is $CH_2Cyp$, $R_5$ is $NHCOCH_3$, $R_4$ is [5-(trifluoromethoxy)-2-pyridyl] and $R_2$ is as defined in table Z.

Table A-256 provides 12 compounds A-256.001 to A-256.012 of formula Ip wherein $R_1$ is $CH_2Cyp$, $R_5$ is $NHCOCH_3$, $R_4$ is [5-(2,2-difluoroethoxy)pyrimidin-2-yl] and $R_2$ is as defined in table Z.

Table A-257 provides 12 compounds A-257.001 to A-257.012 of formula Ip wherein $R_1$ is $CH_2Cyp$, $R_5$ is $NHCOCH_3$, $R_4$ is [5-(2,2-difluoroethoxy)-2-pyridyl] and $R_2$ is as defined in table Z.

Table A-258 provides 12 compounds A-258.001 to A-258.012 of formula Ip wherein $R_1$ is $CH_2Cyp$, $R_5$ is $NHCOCH_3$, $R_4$ is [5-(2,2,2-trifluoroethoxy)pyrimidin-2-yl] and $R_2$ is as defined in table Z.

Table A-259 provides 12 compounds A-259.001 to A-259.012 of formula Ip wherein $R_1$ is $CH_2Cyp$, $R_5$ is $NHCOCH_3$, $R_4$ is [5-(2,2,2-trifluoroethoxy)-2-pyridyl] and $R_2$ is as defined in table Z.

Table A-260 provides 12 compounds A-260.001 to A-260.012 of formula Ip wherein $R_1$ is $CH_2Cyp$, $R_5$ is $NHCOCH_3$, $R_4$ is [5-(difluoromethoxy)-2-pyridyl] and $R_2$ is as defined in table Z.

Table A-261 provides 12 compounds A-261.001 to A-261.012 of formula Ip wherein $R_1$ is $CH_2Cyp$, $R_5$ is $NHCOCH_3$, $R_4$ is [5-(difluoromethoxy)pyrimidin-2-yl] and $R_2$ is as defined in table Z.

Table A-262 provides 12 compounds A-262.001 to A-262.012 of formula Ip wherein $R_1$ is $CH_2Cyp$, $R_5$ is $OCF_3$, $R_4$ is (5-cyano-2-pyridyl) and $R_2$ is as defined in table Z.

Table A-263 provides 12 compounds A-263.001 to A-263.012 of formula Ip wherein $R_1$ is $CH_2Cyp$, $R_5$ is $OCF_3$, $R_4$ is [5-(trifluoromethoxy)pyrimidin-2-yl] and $R_2$ is as defined in table Z.

Table A-264 provides 12 compounds A-264.001 to A-264.012 of formula Ip wherein $R_1$ is $CH_2Cyp$, $R_5$ is $OCF_3$, $R_4$ is [5-(trifluoromethoxy)-2-pyridyl] and $R_2$ is as defined in table Z.

Table A-265 provides 12 compounds A-265.001 to A-265.012 of formula Ip wherein $R_1$ is $CH_2Cyp$, $R_5$ is $OCF_3$, $R_4$ is [5-(2,2-difluoroethoxy)pyrimidin-2-yl] and $R_2$ is as defined in table Z.

Table A-266 provides 12 compounds A-266.001 to A-266.012 of formula Ip wherein $R_1$ is $CH_2Cyp$, $R_5$ is $OCF_3$, $R_4$ is [5-(2,2-difluoroethoxy)-2-pyridyl] and $R_2$ is as defined in table Z.

Table A-267 provides 12 compounds A-267.001 to A-267.012 of formula Ip wherein $R_1$ is $CH_2Cyp$, $R_5$ is $OCF_3$, $R_4$ is [5-(2,2,2-trifluoroethoxy)pyrimidin-2-yl] and $R_2$ is as defined in table Z.

Table A-268 provides 12 compounds A-268.001 to A-268.012 of formula Ip wherein $R_1$ is $CH_2Cyp$, $R_5$ is $OCF_3$, $R_4$ is [5-(2,2,2-trifluoroethoxy)-2-pyridyl] and $R_2$ is as defined in table Z.

Table A-269 provides 12 compounds A-269.001 to A-269.012 of formula Ip wherein $R_1$ is $CH_2Cyp$, $R_5$ is $OCF_3$, $R_4$ is [5-(difluoromethoxy)-2-pyridyl] and $R_2$ is as defined in table Z.

Table A-270 provides 12 compounds A-270.001 to A-270.012 of formula Ip wherein $R_1$ is $CH_2Cyp$, $R_5$ is $OCF_3$, $R_4$ is [5-(difluoromethoxy)pyrimidin-2-yl] and $R_2$ is as defined in table Z.

Table A-271 provides 12 compounds A-271.001 to A-271.012 of formula Ip wherein $R_1$ is $CH_2Cyp$, $R_5$ is $OCHF_2$, $R_4$ is (5-cyano-2-pyridyl) and $R_2$ is as defined in table Z.

Table A-272 provides 12 compounds A-272.001 to A-272.012 of formula Ip wherein $R_1$ is $CH_2Cyp$, $R_5$ is $OCHF_2$, $R_4$ is [5-(trifluoromethoxy)pyrimidin-2-yl] and $R_2$ is as defined in table Z.

Table A-273 provides 12 compounds A-273.001 to A-273.012 of formula Ip wherein $R_1$ is $CH_2Cyp$, $R_5$ is $OCHF_2$, $R_4$ is [5-(trifluoromethoxy)-2-pyridyl] and $R_2$ is as defined in table Z.

Table A-274 provides 12 compounds A-274.001 to A-274.012 of formula Ip wherein $R_1$ is $CH_2Cyp$, $R_5$ is $OCHF_2$, $R_4$ is [5-(2,2-difluoroethoxy)pyrimidin-2-yl] and $R_2$ is as defined in table Z.

Table A-275 provides 12 compounds A-275.001 to A-275.012 of formula Ip wherein $R_1$ is $CH_2Cyp$, $R_5$ is $OCHF_2$, $R_4$ is [5-(2,2-difluoroethoxy)-2-pyridyl] and $R_2$ is as defined in table Z.

Table A-276 provides 12 compounds A-276.001 to A-276.012 of formula Ip wherein $R_1$ is $CH_2Cyp$, $R_5$ is $OCHF_2$, $R_4$ is [5-(2,2,2-trifluoroethoxy)pyrimidin-2-yl] and $R_2$ is as defined in table Z.

Table A-277 provides 12 compounds A-277.001 to A-277.012 of formula Ip wherein $R_1$ is $CH_2Cyp$, $R_5$ is $OCHF_2$, $R_4$ is [5-(2,2,2-trifluoroethoxy)-2-pyridyl] and $R_2$ is as defined in table Z.

Table A-278 provides 12 compounds A-278.001 to A-278.012 of formula Ip wherein $R_1$ is $CH_2Cyp$, $R_5$ is $OCHF_2$, $R_4$ is [5-(difluoromethoxy)-2-pyridyl] and $R_2$ is as defined in table Z.

Table A-279 provides 12 compounds A-279.001 to A-279.012 of formula Ip wherein $R_1$ is $CH_2Cyp$, $R_5$ is $OCHF_2$, $R_4$ is [5-(difluoromethoxy)pyrimidin-2-yl] and $R_2$ is as defined in table Z.

Table A-280 provides 12 compounds A-280.001 to A-280.012 of formula Ip wherein $R_1$ is $CH_2Cyp$, $R_5$ is $OCH_2CF_3$, $R_4$ is (5-cyano-2-pyridyl) and $R_2$ is as defined in table Z.

Table A-281 provides 12 compounds A-281.001 to A-281.012 of formula Ip wherein $R_1$ is $CH_2Cyp$, $R_5$ is $OCH_2CF_3$, $R_4$ is [5-(trifluoromethoxy)pyrimidin-2-yl] and $R_2$ is as defined in table Z.

Table A-282 provides 12 compounds A-282.001 to A-282.012 of formula Ip wherein $R_1$ is $CH_2Cyp$, $R_5$ is $OCH_2CF_3$, $R_4$ is [5-(trifluoromethoxy)-2-pyridyl] and $R_2$ is as defined in table Z.

Table A-283 provides 12 compounds A-283.001 to A-283.012 of formula Ip wherein $R_1$ is $CH_2Cyp$, $R_5$ is $OCH_2CF_3$, $R_4$ is [5-(2,2-difluoroethoxy)pyrimidin-2-yl] and $R_2$ is as defined in table Z.

Table A-284 provides 12 compounds A-284.001 to A-284.012 of formula Ip wherein $R_1$ is $CH_2Cyp$, $R_5$ is $OCH_2CF_3$, $R_4$ is [5-(2,2-difluoroethoxy)-2-pyridyl] and $R_2$ is as defined in table Z.

Table A-285 provides 12 compounds A-285.001 to A-285.012 of formula Ip wherein $R_1$ is $CH_2Cyp$, $R_5$ is $OCH_2CF_3$, $R_4$ is [5-(2,2,2-trifluoroethoxy)pyrimidin-2-yl] and $R_2$ is as defined in table Z.

Table A-286 provides 12 compounds A-286.001 to A-286.012 of formula Ip wherein $R_1$ is $CH_2Cyp$, $R_5$ is $OCH_2CF_3$, $R_4$ is [5-(2,2,2-trifluoroethoxy)-2-pyridyl] and $R_2$ is as defined in table Z.

Table A-287 provides 12 compounds A-287.001 to A-287.012 of formula Ip wherein $R_1$ is $CH_2Cyp$, $R_5$ is $OCH_2CF_3$, $R_4$ is [5-(difluoromethoxy)-2-pyridyl] and $R_2$ is as defined in table Z.

Table A-288 provides 12 compounds A-288.001 to A-288.012 of formula Ip wherein $R_1$ is $CH_2Cyp$, $R_5$ is $OCH_2CF_3$, $R_4$ is [5-(difluoromethoxy)pyrimidin-2-yl] and $R_2$ is as defined in table Z.

Table A-289 provides 12 compounds A-289.001 to A-289.012 of formula Ip wherein $R_1$ is $CH_2Cyp$, $R_5$ is $OCH_2CHF_2$, $R_4$ is (5-cyano-2-pyridyl) and $R_2$ is as defined in table Z.

Table A-290 provides 12 compounds A-290.001 to A-290.012 of formula Ip wherein $R_1$ is $CH_2Cyp$, $R_5$ is $OCH_2CHF_2$, $R_4$ is [5-(trifluoromethoxy)pyrimidin-2-yl] and $R_2$ is as defined in table Z.

Table A-291 provides 12 compounds A-291.001 to A-291.012 of formula Ip wherein $R_1$ is $CH_2Cyp$, $R_5$ is $OCH_2CHF_2$, $R_4$ is [5-(trifluoromethoxy)-2-pyridyl] and $R_2$ is as defined in table Z.

Table A-292 provides 12 compounds A-292.001 to A-292.012 of formula Ip wherein $R_1$ is $CH_2Cyp$, $R_5$ is $OCH_2CHF_2$, $R_4$ is [5-(2,2-difluoroethoxy)pyrimidin-2-yl] and $R_2$ is as defined in table Z.

Table A-293 provides 12 compounds A-293.001 to A-293.012 of formula Ip wherein $R_1$ is $CH_2Cyp$, $R_5$ is $OCH_2CHF_2$, $R_4$ is [5-(2,2-difluoroethoxy)-2-pyridyl] and $R_2$ is as defined in table Z.

Table A-294 provides 12 compounds A-294.001 to A-294.012 of formula Ip wherein $R_1$ is $CH_2Cyp$, $R_5$ is $OCH_2CHF_2$, $R_4$ is [5-(2,2,2-trifluoroethoxy)pyrimidin-2-yl] and $R_2$ is as defined in table Z.

Table A-295 provides 12 compounds A-295.001 to A-295.012 of formula Ip wherein $R_1$ is $CH_2Cyp$, $R_5$ is $OCH_2CHF_2$, $R_4$ is [5-(2,2,2-trifluoroethoxy)-2-pyridyl] and $R_2$ is as defined in table Z.

Table A-296 provides 12 compounds A-296.001 to A-296.012 of formula Ip wherein $R_1$ is $CH_2Cyp$, $R_5$ is $OCH_2CHF_2$, $R_4$ is [5-(difluoromethoxy)-2-pyridyl] and $R_2$ is as defined in table Z.

Table A-297 provides 12 compounds A-297.001 to A-297.012 of formula Ip wherein $R_1$ is $CH_2Cyp$, $R_5$ is $OCH_2CHF_2$, $R_4$ is [5-(difluoromethoxy)pyrimidin-2-yl] and $R_2$ is as defined in table Z.

Also made available are certain intermediate compounds of the amine of formula IIa

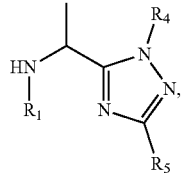

IIa wherein $R_1$, $R_4$ (corresponding to the to the ring containing $A_2$, and $R_{4a}$ as defined in formula I) and $R_5$ are as defined for formula I, some of which are novel. Preferred embodiments for $R_1$, $R_4$ and $R_5$ for formula I are correspondingly preferred embodiments for $R_1$, $R_4$ and $R_5$ for formula IIa. Specific examples of compounds of formula IIa are where $R_1$, $R_4$ and $R_5$ are defined in Tables A-1 to A-297.

Also made available are certain intermediate compounds of the amine of formula IIIaa

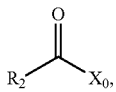

IIIaa wherein $R_2$ is defined for formula I, some of which are novel. Preferred embodiments for $R_2$ for formula I are correspondingly preferred embodiments for $R_2$ for formula IIIa. Specific examples of compounds of formula IIIaa are wherein (A) $X_0$ is halogen and $R_2$ is as defined in table Z; (B) $X_0$ is $X_{01}$ and $R_2$ is as defined in table Z; (C) $X_0$ is $X_{02}$ and $R_2$ is as defined in table Z; (D) $X_0$ is $X_{03}$ and $R_2$ is as defined in table Z; and (E) $X_0$ is $X_{04}$ and $R_2$ is as defined in table Z; wherein.

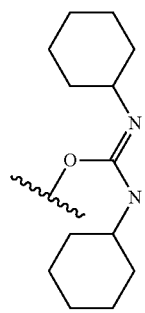

$X_{01}$

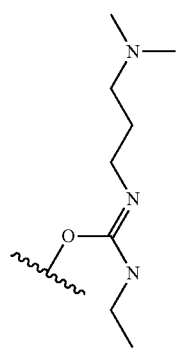

$X_{02}$

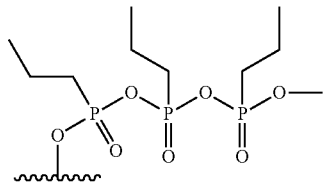

$X_{03}$

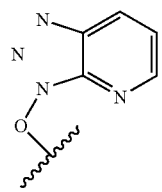

$X_{04}$

Further, compounds of formula III are made available

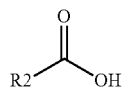

III wherein $R_2$ is as defined in formula I; preferred embodiments for $R_2$ for formula I are correspondingly preferred embodiments for $R_2$ for formula III. Specific examples of compounds of formula III are where $R_2$ is as defined in Table Z;

compounds of formula VII are made available

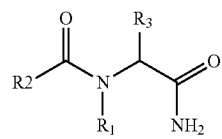

VII wherein $R_2$, $R_1$ and $R_3$ are as defined in formula I; preferred embodiments for $R_2$, $R_1$ and $R_3$ for formula I are correspondingly preferred embodiments for $R_2$, $R_1$ and $R_3$ for formula VII. Specific examples of compounds of formula VII are where (i) $R_3$ is methyl, $R_2$ is one the substituents defined in Table Z, and $R_1$ is hydrogen; (ii) $R_3$ is methyl, $R_2$ is one the substituents defined in Table Z, and $R_1$ is methyl, and (iii) $R_3$ is methyl, $R_2$ is one the substituents defined in Table Z, and $R_1$ is —CH$_2$Cyp;

compounds of formula IX are made available

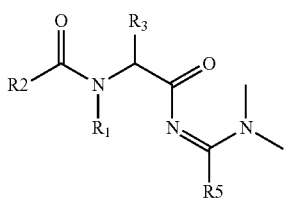

IX wherein $R_2$, $R_1$, $R_3$ and $R_5$ are as defined in formula I; preferred embodiments for $R_2$, $R_1$, $R_3$ and $R_5$ for formula I are correspondingly preferred embodiments for $R_2$, $R_1$ and $R_3$ for formula IX. Specific examples of compounds of formula IX are where $R_3$ is methyl, and $R_1$, $R_2$ and $R_5$ are as defined for any one compound in Tables A-1 to A-297;

compounds of formula XI are made available

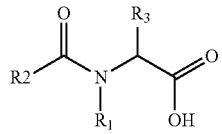

XI wherein $R_2$, $R_1$ and $R_3$ are as defined in formula I; preferred embodiments for $R_2$, $R_1$ and $R_3$ for formula I are correspondingly preferred embodiments for $R_2$, $R_1$ and $R_3$ for formula XI. Specific examples of compounds of formula XI are where $R_3$ is methyl, and $R_1$ and $R_2$ are as defined for any one compound in Tables A-1 to A-297;

compounds of formula XIII are made available

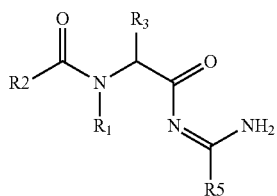

XIII wherein $R_2$, $R_1$, $R_3$ and $R_5$ are as defined in formula I; preferred embodiments for $R_2$, $R_1$, $R_3$ and $R_5$ for formula I are correspondingly preferred embodiments for $R_2$, $R_1$, $R_3$ and $R_5$ for formula XIII. Specific examples of compounds of formula XIII are where $R_3$ is methyl, and $R_1$, $R_2$ and $R_5$ are as defined for any one compound in Tables A-1 to A-297.

The compounds of formula I according to the invention are preventively and/or curatively valuable active ingredients in the field of pest control, even at low rates of application, which have a very favorable biocidal spectrum and are well tolerated by warm-blooded species, fish and plants. The active ingredients according to the invention act against all or individual developmental stages of normally sensitive, but also resistant, animal pests, such as insects or representatives of the order Acarina. The insecticidal or acaricidal activity of the active ingredients according to the invention can manifest itself directly, i. e. in destruction of the pests, which takes place either immediately or only after some time has elapsed, for example during ecdysis, or indirectly, for example in a reduced oviposition and/or hatching rate.

Examples of the above mentioned animal pests are:

from the order Acarina, for example,

*Acalitus* spp, *Aculus* spp, *Acaricalus* spp, *Aceria* spp, *Acarus siro*, *Amblyomma* spp., *Argas* spp., *Boophilus* spp., *Brevipalpus* spp., *Bryobia* spp, *Calipitrimerus* spp., *Chorioptes* spp., *Dermanyssus gallinae*, *Dermatophagoides* spp, *Eotetranychus* spp, *Eriophyes* spp., *Hemitarsonemus* spp, *Hyalomma* spp., *Ixodes* spp., *Olygonychus* spp, *Ornithodoros* spp., *Polyphagotarsone latus*, *Panonychus* spp., *Phyllocoptruta oleivora*, *Phytonemus* spp, *Polyphagotarsonemus* spp, *Psoroptes* spp., *Rhipicephalus* spp., *Rhizoglyphus* spp., *Sarcoptes* spp., *Steneotarsonemus* spp, *Tarsonemus* spp. and *Tetranychus* spp.;

from the order Anoplura, for example,

*Haematopinus* spp., *Linognathus* spp., *Pediculus* spp., *Pemphigus* spp. and *Phylloxera* spp.;

from the order Coleoptera, for example,

*Agriotes* spp., *Amphimallon majale*, *Anomala orientalis*, *Anthonomus* spp., *Aphodius* spp, *Astylus atromaculatus*, *Ataenius* spp, *Atomaria linearis*, *Chaetocnema tibialis*, *Cerotoma* spp, *Conoderus* spp, *Cosmopolites* spp., *Cotinis nitida*, *Curculio* spp., *Cyclocephala* spp, *Dermestes* spp., *Diabrotica* spp., *Diloboderus abderus*, *Epilachna* spp., *Eremnus* spp., *Heteronychus arator*, *Hypothenemus hampei*, *Lagria vilosa*, *Leptinotarsa decemLineata*, *Lissorhoptrus* spp., *Liogenys* spp, *Maecolaspis* spp, *Maladera castanea*, *Megascelis* spp, *Melighetes aeneus*, *Melolontha* spp., *Myochrous armatus*, *Orycaephilus* spp., *Otiorhynchus* spp., *Phyllophaga* spp, *Phlyctinus* spp., *Popillia* spp., *Psylliodes* spp., *Rhyssomatus aubtilis*, *Rhizopertha* spp., *Scarabeidae*, *Sitophilus* spp., *Sitotroga* spp., *Somaticus* spp, *Sphenophorus* spp, *Sternechus subsignatus*, *Tenebrio* spp., *Tribolium* spp. and *Trogoderma* spp.;

from the order Diptera, for example,

*Aedes* spp., *Anopheles* spp, *Antherigona soccata*, *Bactrocea oleae*, *Bibio hortulanus*, *Bradysia* spp, *Calliphora erythrocephala*, *Ceratitis* spp., *Chrysomyia* spp., *Culex* spp., *Cuterebra* spp., *Dacus* spp., *Delia* spp, *Drosophila melanogaster*, *Fannia* spp., *Gastrophilus* spp., *Geomyza tripunctata*, *Glossina* spp., *Hypoderma* spp., *Hyppobosca* spp., *Liriomyza* spp., *Lucilia* spp., *Melanagromyza* spp., *Musca* spp., *Oestrus* spp., *Orseolia* spp., *Oscinella frit*, *Pegomyia hyoscyami*, *Phorbia* spp., *Rhagoletis* spp, *Rivelia quadrifasciata*, *Scatella* spp, *Sciara* spp., *Stomoxys* spp., *Tabanus* spp., *Tannia* spp. and *Tipula* spp.;

from the order Hemiptera, for example,

*Acanthocoris scabrator*, *Acrosternum* spp, *Adelphocoris lineolatus*, *Amblypelta nitida*, *Bathycoelia thalassina*, *Blissus* spp, *Cimex* spp., *Clavigralla tomentosicollis*, *Creontiades* spp, *Distantiella theobroma*, *Dichelops furcatus*, *Dysdercus* spp., *Edessa* spp, *Euchistus* spp., *Eurydema pulchrum*, *Eurygaster* spp., *Halyomorpha halys*, *Horcias nobilellus*, *Leptocorisa* spp., *Lygus* spp, *Margarodes* spp, *Murgantia histrionic*, *Neomegalotomus* spp, *Nesidiocoris tenuis*, *Nezara* spp., *Nysius simulans*, *Oebalus insularis*, *Piesma* spp., *Piezodorus* spp, *Rhodnius* spp., *Sahlbergella singularis*, *Scaptocoris castanea*, *Scotinophara* spp., *Thyanta* spp, *Triatoma* spp., *Vatiga illudens*; *Acyrthosium pisum*, *Adalges* spp, *Agalliana ensigera*, *Agonoscena targionii*, *Aleurodicus* spp, *Aleurocanthus* spp, *Aleurolobus barodensis*, *Aleurothrixus floccosus*, *Aleyrodes brassicae*, *Amarasca biguttula*, *Amritodus atkinsoni*, *Aonidiella* spp., *Aphididae*, *Aphis* spp., *Aspidiotus* spp., *Aulacorthum solani*, *Bactericera cockerelli*, *Bemisia* spp, *Brachycaudus* spp, *Brevicoryne brassicae*, *Cacopsylla* spp, *Cavariella aegopodii* Scop., *Ceroplaster* spp., *Chrysomphalus aonidium*, *Chrysomphalus dictyospermi*, *Cicadella* spp, *Cofana spectra*, *Cryptomyzus* spp, *Cicadulina* spp, *Coccus hesperidum*, *Dalbulus maidis*, *Dialeurodes* spp, *Diaphorina citri*, *Diuraphis noxia*, *Dysaphis* spp, *Empoasca* spp., *Eriosoma larigerum*, *Erythroneura* spp., *Gascardia* spp., *Glycaspis brimblecombei*, *Hyadaphis pseudobrassicae*, *Hyalopterus* spp, *Hypero-*

*myzus pallidus, Idioscopus clypealis, Jacobiasca lybica, Laodelphax* spp., *Lecanium corni, Lepidosaphes* spp., *Lopaphis erysimi, Lyogenys maidis, Macrosiphum* spp., *Mahanarva* spp, *Metcalfa pruinosa, Metopolophium dirhodum, Myndus crudus, Myzus* spp., *Neotoxoptera* sp, *Nephotettix* spp., *Nilaparvata* spp., *Nippolachnus piri Mats, Odonaspis ruthae, Oregma lanigera Zehnter, Parabemisia myricae, Paratrioza cockerelli, Parlatoria* spp., *Pemphigus* spp., *Peregrinus maidis, Perkinsiella* spp, *Phorodon humuli, Phylloxera* spp, *Planococcus* spp., *Pseudaulacaspis* spp., *Pseudococcus* spp., *Pseudatomoscelis seriatus, Psylla* spp., *Pulvinaria aethiopica, Quadraspidiotus* spp., *Quesada gigas, Recilia dorsalis, Rhopalosiphum* spp., *Saissetia* spp., *Scaphoideus* spp., *Schizaphis* spp., *Sitobion* spp., *Sogatella furcifera, Spissistilus festinus, Tarophagus Proserpina, Toxoptera* spp, *Trialeurodes* spp, *Tridiscus sporoboli, Trionymus* spp, *Trioza erytreae, Unaspis citri, Zygina flammigera, Zyginidia scutellaris,* from the order Hymenoptera, for example,

*Acromyrmex, Arge* spp, *Atta* spp., *Cephus* spp., *Diprion* spp., *Diprionidae, Gilpinia polytoma, Hoplo-campa* spp., *Lasius* spp., *Monomorium pharaonis, Neodiprion* spp., *Pogonomyrmex* spp, *Slenopsis invicta, Solenopsis* spp. and *Vespa* spp.;

from the order Isoptera, for example,

*Coptotermes* spp, *Corniternes cumulans, Incisitermes* spp, *Macrotermes* spp, *Mastotermes* spp, *Microtermes* spp, *Reticulitermes* spp.; *Solenopsis* geminate from the order Lepidoptera, for example,

*Acleris* spp., *Adoxophyes* spp., *Aegeria* spp., *Agrotis* spp., *Alabama argillaceae, Amylois* spp., *Anticarsia gemmatalis, Archips* spp., *Argyresthia* spp, *Argyrotaenia* spp., *Autographa* spp., *Bucculatrix thurberiella, Busseola fusca, Cadra cautella, Carposina nipponensis, Chilo* spp., *Choristoneura* spp., *Chrysoteuchia topiaria, Clysia ambiguella, Cnaphalocrocis* spp., *Cnephasia* spp., *Cochylis* spp., *Coleophora* spp., *Colias lesbia, Cosmophila flava, Crambus* spp, *Crocidolomia binotalis, Cryptophlebia leucotreta, Cydalima perspectalis, Cydia* spp., *Diaphania perspectalis, Diatraea* spp., *Diparopsis castanea, Earias* spp., *Eldana saccharina, Ephestia* spp., *Epinotia* spp, *Estigmene acrea, Etiella zinckinella, Eucosma* spp., *Eupoecilia ambiguella, Euproctis* spp., *Euxoa* spp., *Feltia jaculiferia, Grapholita* spp., *Hedya nubiferana, Heliothis* spp., *Hellula undalis, Herpetogramma* spp, *Hyphantria cunea, Keiferia lycopersicella, Lasmopalpus lignosellus, Leucoptera scitella, Lithocollethis* spp., *Lobesia botrana, Loxostege bifidalis, Lymantria* spp., *Lyonetia* spp., *Malacosoma* spp., *Mamestra brassicae, Manduca sexta, Mythimna* spp, *Noctua* spp, *Operophtera* spp., *Orniodes indica, Ostrinia nubilalis, Pammene* spp., *Pandemis* spp., *Panolis flammea, Papaipema nebris, Pectinophora gossypi-ela, Perileucoptera coffeella, Pseudaletia unipuncta, Phthorimaea operculella, Pieris rapae, Pieris* spp., *Plutella xylostella, Prays* spp., *Pseudoplusia* spp, *Rachiplusia nu, Richia albicosta, Scirpophaga* spp., *Sesamia* spp., *Sparganothis* spp., *Spodoptera* spp., *Sylepta derogate, Synanthedon* spp., *Thaumetopoea* spp., *Tortrix* spp., *Trichoplusia ni, Tuta absoluta,* and *Yponomeuta* spp.;

from the order Mallophaga, for example,

*Damalinea* spp. and *Trichodectes* spp.;

from the order Orthoptera, for example,

*Blatta* spp., *Blattella* spp., *Gryllotalpa* spp., *Leucophaea maderae, Locusta* spp., *Neocurtilla hexadactyla, Periplaneta* spp., *Scapteriscus* spp, and *Schistocerca* spp.;

from the order Psocoptera, for example,

*Liposcelis* spp.;

from the order Siphonaptera, for example,

*Ceratophyllus* spp., *Ctenocephalides* spp. and *Xenopsylla cheopis;* from the order Thysanoptera, for example,

*Calliothrips phaseoli, Frankliniella* spp., *Heliothrips* spp, *Hercinothrips* spp., *Parthenothrips* spp, *Scirtothrips aurantii, Sericothrips variabilis, Taeniothrips* spp., *Thrips* spp;

from the order Thysanura, for example, *Lepisma saccharina.*

The active ingredients according to the invention can be used for controlling, i. e. containing or destroying, pests of the abovementioned type which occur in particular on plants, especially on useful plants and ornamentals in agriculture, in horticulture and in forests, or on organs, such as fruits, flowers, foliage, stalks, tubers or roots, of such plants, and in some cases even plant organs which are formed at a later point in time remain protected against these pests.

Suitable target crops are, in particular, cereals, such as wheat, barley, rye, oats, rice, maize or sorghum; beet, such as sugar or fodder beet; fruit, for example pomaceous fruit, stone fruit or soft fruit, such as apples, pears, plums, peaches, almonds, cherries or berries, for example strawberries, raspberries or blackberries; leguminous crops, such as beans, lentils, peas or soya; oil crops, such as oilseed rape, mustard, poppies, olives, sunflowers, coconut, castor, cocoa or ground nuts; cucurbits, such as pumpkins, cucumbers or melons; fibre plants, such as cotton, flax, hemp or jute; citrus fruit, such as oranges, lemons, grapefruit or tangerines; vegetables, such as spinach, lettuce, asparagus, cabbages, carrots, onions, tomatoes, potatoes or bell peppers; Lauraceae, such as avocado, Cinnamonium or camphor; and also tobacco, nuts, coffee, eggplants, sugarcane, tea, pepper, grapevines, hops, the plantain family and latex plants.

The compositions and/or methods of the present invention may be also used on any ornamental and/or vegetable crops, including flowers, shrubs, broad-leaved trees and evergreens.

For example the invention may be used on any of the following ornamental species: *Ageratum* spp., *Alonsoa* spp., *Anemone* spp., *Anisodontea capsenisis, Anthemis* spp., *Antirrhinum* spp., *Aster* spp., *Begonia* spp. (e.g. *B. elatior, B. sempertlorens, B. tubéreux*), *Bougainvillea* spp., *Brachycome* spp., *Brassica* spp. (ornamental), *Calceolaria* spp., *Capsicum annuum, Catharanthus roseus, Canna* spp., *Centaurea* spp., *Chrysanthemum* spp., *Cineraria* spp. (*C. maritime*), *Coreopsis* spp., *Crassula coccinea, Cuphea ignea, Dahlia* spp., *Delphinium* spp., *Dicentra spectabilis, Dorotheantus* spp., *Eustoma grandiflorum, Forsythia* spp., *Fuchsia* spp., *Geranium gnaphalium, Gerbera* spp., *Gomphrena globosa, Heliotropium* spp., *Helianthus* spp., *Hibiscus* spp., *Hortensia* spp., *Hydrangea* spp., *Hypoestes phyllostachya, Impatiens* spp. (*I. Walleriana*), (*resines* spp.), *Kalanchoe* spp., *Lantana camara, Lavatera trimestris, Leonotis leonurus, Lilium* spp., *Mesembryanthemum* spp., *Mimulus* spp., *Monarda* spp., *Nemesia* spp., *Tagetes* spp., *Dianthus* spp. (carnation), *Canna* spp., *Oxalis* spp., *Bellis* spp., *Pelargonium* spp. (*P. peltatum, P. Zonale*), *Viola* spp. (pansy), *Petunia* spp., *Phlox* spp., *Plecthranthus* spp., *Poinsettia* spp., *Parthenocissus* spp. (*P. quinquefolia, P. tricuspidata*), *Primula* spp., *Ranunculus* spp., *Rhododendron* spp., *Rosa* spp. (rose), *Rudbeckia* spp., *Saintpaulia* spp., *Salvia* spp.,

*Scaevola aemola, Schizanthus wisetonensis, Sedum* spp., *Solanum* spp., *Surfinia* spp., *Tagetes* spp., *Nicotinia* spp., *Verbena* spp., *Zinnia* spp. and *other bedding plants*.

For example the invention may be used on any of the following vegetable species: *Allium* spp. (*A. sativum, A. cepa, A. oschaninii, A. Porrum, A. ascalonicum, A. fistulosum*), *Anthriscus cerefolium, Apium graveolus, Asparagus officinalis, Beta vulgarus, Brassica* spp. (*B. Oleracea, B. Pekinensis, B. rapa*), *Capsicum annuum, Cicer arietinum, Cichorium endivia, Cichorum* spp. (*C. intybus, C. endivia*), *Citrillus lanatus, Cucumis* spp. (*C. sativus, C. melo*), *Cucurbita* spp. (*C. pepo, C. maxima*), *Cyanara* spp. (*C. scolymus, C. cardunculus*), *Daucus carota, Foeniculum vulgare, Hypericum* spp., *Lactuca sativa, Lycopersicon* spp. (*L. esculentum, L. lycopersicum*), *Mentha* spp., *Ocimum basilicum, Petroselinum crispum, Phaseolus* spp. (*P. vulgaris, P. coccineus*), *Pisum sativum, Raphanus sativus, Rheum rhaponticum, Rosemarinus* spp., *Salvia* spp., *Scorzonera hispanica, Solanum melongena, Spinacea oleracea, Valerianella* spp. (*V. locusta, V. eriocarpa*) and *Vicia fabs.*

Preferred ornamental species include *African violet, Begonia, Dahlia, Gerbera, Hydrangea, Verbena, Rosa, Kalanchoe, Poinsettia, Aster, Centaurea, Coreopsis, Delphinium, Monarda, Phlox, Rudbeckia, Sedum, Petunia, Viola, Impatiens, Geranium, Chrysanthemum, Ranunculus, Fuchsia, Salvia, Hortensia*, rosemary, sage, St. Johnswort, mint, sweet pepper, tomato and cucumber.

The active ingredients according to the invention are especially suitable for controlling *Aphis craccivora, Diabrotica balteata, Heliothis virescens, Myzus persicae, Plutella xylostella* and *Spodoptera littoralis* in cotton, vegetable, maize, rice and soya crops. The active ingredients according to the invention are further especially suitable for controlling *Mamestra* (preferably in vegetables), *Cydia pomonella* (preferably in apples), *Empoasca* (preferably in vegetables, vineyards), *Leptinotarsa* (preferably in potatos) and *Chilo supressalis* (preferably in rice).

The active ingredients according to the invention are especially suitable for controlling *Aphis craccivora, Diabrotica balteata, Heliothis virescens, Myzus persicae, Plutella xylostella* and *Spodoptera littoralis* in cotton, vegetable, maize, rice and soya crops. The active ingredients according to the invention are further especially suitable for controlling *Mamestra* (preferably in vegetables), *Cydia pomonella* (preferably in apples), *Empoasca* (preferably in vegetables, vineyards), *Leptinotarsa* (preferably in potatos) and *Chilo supressalis* (preferably in rice).

In a further aspect, the invention may also relate to a method of controlling damage to plant and parts thereof by plant parasitic nematodes (Endoparasitic-, Semiendoparasitic- and Ectoparasitic nematodes), especially plant parasitic nematodes such as root knot nematodes, *Meloidogyne hapla, Meloidogyne incognita, Meloidogyne javanica, Meloidogyne arenaria* and other *Meloidogyne* species; cyst-forming nematodes, *Globodera rostochiensis* and other *Globodera* species; *Heterodera avenae, Heterodera glycines, Heterodera schachtii, Heterodera trifolii*, and other *Heterodera* species; Seed gall nematodes, *Anguina* species; Stem and foliar nematodes, *Aphelenchoides* species; Sting nematodes, *Belonolaimus longicaudatus* and other *Belonolaimus* species; Pine nematodes, *Bursaphelenchus xylophilus* and other *Bursaphelenchus* species; Ring nematodes, *Criconema* species, *Criconemella* species, *Criconemoides* species, *Mesocriconema* species; Stem and bulb nematodes, *Ditylenchus destructor, Ditylenchus dipsaci* and other *Ditylenchus* species; Awl nematodes, *Dolichodorus* species; Spiral nematodes, *Heliocotylenchus multicinctus* and other *Helicotylenchus* species; Sheath and sheathoid nematodes, *Hemicycliophora* species and *Hemicriconemoides* species; *Hirshmanniella* species; Lance nematodes, *Hoploaimus* species; false rootknot nematodes, *Nacobbus* species; Needle nematodes, *Longidorus elongatus* and other *Longidorus* species; Pin nematodes, *Pratylenchus* species; Lesion nematodes, *Pratylenchus neglectus, Pratylenchus penetrans, Pratylenchus curvitatus, Pratylenchus goodeyi* and other *Pratylenchus* species; Burrowing nematodes, *Radopholus similis* and other *Radopholus* species; Reniform nematodes, *Rotylenchus robustus, Rotylenchus reniformis* and other *Rotylenchus* species; *Scutellonema* species; Stubby root nematodes, *Trichodorus primitivus* and other *Trichodorus* species, *Paratrichodorus* species; Stunt nematodes, *Tylenchorhynchus claytoni, Tylenchorhynchus dubius* and other *Tylenchorhynchus* species; Citrus nematodes, *Tylenchulus* species; Dagger nematodes, *Xiphinema* species; and other plant parasitic nematode species, such as *Subanguina* spp., *Hypsoperine* spp., *Macroposthonia* spp., *Melinius* spp., *Punctodera* spp., and *Quinisulcius* spp.

The compounds of the invention may also have activity against the molluscs. Examples of which include, for example, Ampullariidae; Anion (*A. ater, A. circumscriptus, A. hortensis, A. rufus*); Bradybaenidae (*Bradybaena fruticum*); Cepaea (*C. hortensis, C. Nemoralis*); ochlodina; *Deroceras* (*D. agrestis, D. empiricorum, D. laeve, D. reticulatum*); *Discus* (*D. rotundatus*); Euomphalia; Galba (*G. trunculata*); Helicelia (*H. itala, H. obvia*); Helicidae *Helicigona arbustorum*); Helicodiscus; Helix (*H. aperta*); *Limax* (*L. cinereoniger, L. flavus, L. marginatus, L. maximus, L. tenellus*); Lymnaea; Milax (*M. gagates, M. marginatus, M. sowerbyi*); Opeas; Pomacea (*P. canaticulata*); Vallonia and Zanitoides.

The term "crops" is to be understood as including also crop plants which have been so transformed by the use of recombinant DNA techniques that they are capable of synthesising one or more selectively acting toxins, such as are known, for example, from toxin-producing bacteria, especially those of the genus Bacillus.

Toxins that can be expressed by such transgenic plants include, for example, insecticidal proteins, for example insecticidal proteins from *Bacillus cereus* or *Bacillus popilliae*; or insecticidal proteins from *Bacillus thuringiensis*, such as δ-endotoxins, e.g. Cry1Ab, Cry1Ac, Cry1F, Cry1Fa2, Cry2Ab, Cry3A, Cry3Bb1 or Cry9C, or vegetative insecticidal proteins (Vip), e.g. Vip1, Vip2, Vip3 or Vip3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as Streptomycetes toxins, plant lectins, such as pea lectins, barley lectins or snowdrop lectins; agglutinins; proteinase inhibitors, such as trypsin inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by δ-endotoxins, for example Cry1Ab, Cry1Ac, Cry1F, Cry1Fa2, Cry2Ab, Cry3A, Cry3Bb1 or Cry9C, or vegetative insecticidal proteins (Vip), for example Vip1, Vip2, Vip3 or Vip3A, expressly also hybrid toxins, truncated toxins and modified toxins. Hybrid toxins are produced recombinantly by a new combination of different domains of those proteins (see, for example, WO 02/15701). Truncated toxins, for example a truncated Cry1Ab, are known. In the case of modified toxins, one or more amino acids of the naturally occurring toxin are replaced. In such amino acid replacements, preferably non-naturally present protease recognition sequences are inserted into the toxin, such as, for example, in the case of Cry3A055, a cathepsin-G-recognition sequence is inserted into a Cry3A toxin (see WO 03/018810).

Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. Cry1-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (*Coleoptera*), two-winged insects (*Diptera*) and moths (*Lepidoptera*).

Transgenic plants containing one or more genes that code for an insecticidal resistance and express one or more toxins are known and some of them are commercially available. Examples of such plants are: YieldGard® (maize variety that expresses a Cry1Ab toxin); YieldGard Rootworm® (maize variety that expresses a Cry3Bb1 toxin); YieldGard Plus® (maize variety that expresses a Cry1Ab and a Cry3Bb1 toxin); Starlink® (maize variety that expresses a Cry9C toxin); Herculex I® (maize variety that expresses a Cry1Fa2 toxin and the enzyme phosphinothricine N-acetyltransferase (PAT) to achieve tolerance to the herbicide glufosinate ammonium); NuCOTN 33B® (cotton variety that expresses a Cry1Ac toxin); Bollgard I® (cotton variety that expresses a Cry1Ac toxin); Bollgard II® (cotton variety that expresses a Cry1Ac and a Cry2Ab toxin); VipCot® (cotton variety that expresses a Vip3A and a Cry1Ab toxin); NewLeaf® (potato variety that expresses a Cry3A toxin); NatureGard®, Agrisure® GT Advantage (GA21 glyphosate-tolerant trait), Agrisure® CB Advantage (Bt11 corn borer (CB) trait) and Protecta®.

Further examples of such transgenic crops are:
1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a truncated Cry1Ab toxin. Bt11 maize also transgenically expresses the enzyme PAT to achieve tolerance to the herbicide glufosinate ammonium.
2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a Cry1Ab toxin. Bt176 maize also transgenically expresses the enzyme PAT to achieve tolerance to the herbicide glufosinate ammonium.
3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified Cry3A toxin. This toxin is Cry3A055 modified by insertion of a cathepsin-G-protease recognition sequence. The preparation of such transgenic maize plants is described in WO 03/018810.
4. MON 863 Maize from Monsanto Europe S.A. 270-272 Avenue de Tervuren, B-1150 Brussels, Belgium, registration number C/DE/02/9. MON 863 expresses a Cry3Bb1 toxin and has resistance to certain *Coleoptera* insects.
5. IPC 531 Cotton from Monsanto Europe S.A. 270-272 Avenue de Tervuren, B-1150 Brussels, Belgium, registration number C/ES/96/02.
6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain *Lepidoptera* insects and of the PAT protein for achieving tolerance to the herbicide glufosinate ammonium.
7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603×MON 810 Maize transgenically expresses the protein CP4 EPSPS, obtained from *Agrobacterium* sp. strain CP4, which imparts tolerance to the herbicide Roundup® (contains glyphosate), and also a Cry1Ab toxin obtained from *Bacillus thuringiensis* subsp. kurstaki which brings about tolerance to certain *Lepidoptera*, include the European corn borer.

Transgenic crops of insect-resistant plants are also described in BATS (Zentrum für Biosicherheit und Nachhaltigkeit, Zentrum BATS, Clarastrasse 13, 4058 Basel, Switzerland) Report 2003, (http://bats.ch).

The term "crops" is to be understood as including also crop plants which have been so transformed by the use of recombinant DNA techniques that they are capable of synthesising antipathogenic substances having a selective action, such as, for example, the so-called "pathogenesis-related proteins" (PRPs, see e.g. EP-A-0 392 225). Examples of such antipathogenic substances and transgenic plants capable of synthesising such antipathogenic substances are known, for example, from EP-A-0 392 225, WO 95/33818 and EP-A-0 353 191. The methods of producing such transgenic plants are generally known to the person skilled in the art and are described, for example, in the publications mentioned above.

Crops may also be modified for enhanced resistance to fungal (for example *Fusarium*, Anthracnose, or *Phytophthora*), bacterial (for example *Pseudomonas*) or viral (for example potato leafroll virus, tomato spotted wilt virus, cucumber mosaic virus) pathogens.

Crops also include those that have enhanced resistance to nematodes, such as the soybean cyst nematode.

Crops that are tolerance to abiotic stress include those that have enhanced tolerance to drought, high salt, high temperature, chill, frost, or light radiation, for example through expression of NF—YB or other proteins known in the art.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 95/33818) or protein or polypeptide factors involved in plant pathogen defence (so-called "plant disease resistance genes", as described in WO 03/000906).

Further areas of use of the compositions according to the invention are the protection of stored goods and store rooms and the protection of raw materials, such as wood, textiles, floor coverings or buildings, and also in the hygiene sector, especially the protection of humans, domestic animals and productive livestock against pests of the mentioned type.

The present invention provides a compound of the first aspect for use in therapy. The present invention provides a compound of the first aspect, for use in controlling parasites in or on an animal. The present invention further provides a compound of the first aspect, for use in controlling ectoparasites on an animal. The present invention further provides a compound of the first aspect, for use in preventing and/or treating diseases transmitted by ectoparasites.

The present invention provides the use of a compound of the first aspect, for the manufacture of a medicament for controlling parasites in or on an animal. The present invention further provides the use of a compound of the first aspect, for the manufacture of a medicament for controlling ectoparasites on an animal. The present invention further provides the use of a compound of the first aspect, for the manufacture of a medicament for preventing and/or treating diseases transmitted by ectoparasites.

The present invention provides the use of a compound of the first aspect, in controlling parasites in or on an animal. The present invention further provides the use of a compound of the first aspect, in controlling ectoparasites on an animal.

The term "controlling" when used in context of parasites in or on an animal refers to reducing the number of pests or parasites, eliminating pests or parasites and/or preventing further pest or parasite infestation.

The term "treating" when used used in context of parasites in or on an animal refers to restraining, slowing, stopping or reversing the progression or severity of an existing symptom or disease. The term "preventing" when used used in context of parasites in or on an animal refers to the avoidance of a symptom or disease developing in the animal.

The term "animal" when used used in context of parasites in or on an animal may refer to a mammal and a non-mammal, such as a bird or fish. In the case of a mammal, it may be a human or non-human mammal. Non-human mammals include, but are not limited to, livestock animals and companion animals. Livestock animals include, but are not limited to, cattle, camellids, pigs, sheep, goats and horses. Companion animals include, but are not limited to, dogs, cats and rabbits.

A "parasite" is a pest which lives in or on the host animal and benefits by deriving nutrients at the host animal's expense. An "endoparasite" is a parasite which lives in the host animal. An "ectoparasite" is a parasite which lives on the host animal. Ectoparasites include, but are not limited to, acari, insects and crustaceans (e.g. sea lice). The Acari (or Acarina) sub-class comprises ticks and mites. Ticks include, but are not limited to, members of the following genera: *Rhipicaphalus*, for example, *Rhipicaphalus (Boophilus) microplus* and *Rhipicephalus sanguineus*; *Amblyomma*; *Dermacentor*, *Haemaphysalis*; *Hyalomma*; *Ixodes*; *Rhipicentor*; *Margaropus*; *Argas*; *Otobius*; and *Ornithodoros*. Mites include, but are not limited to, members of the following genera: *Chorioptes*, for example *Chorioptes bovis*; *Psoroptes*, for example *Psoroptes ovis*; *Cheyletiella*; *Dermanyssus*; for example *Dermanyssus gaffinae*; *Ortnithonyssus*; *Demodex*, for example *Demodex canis*; *Sarcoptes*, for example *Sarcoptes scabiei*; and *Psorergates*. Insects include, but are not limited to, members of the orders: *Siphonaptera, Diptera, Phthiraptera, Lepidoptera, Coleoptera* and Homoptera. Members of the *Siphonaptera* order include, but are not limited to, *Ctenocephalides felis* and *Ctenocephatides canis*. Members of the *Diptera* order include, but are not limited to, *Musca* spp.; bot fly, for example *Gasterophilus intestinalis* and *Oestrus ovis*; biting flies; horse flies, for example *Haematopota* spp. and *Tabunus* spp.; *haematobia*, for example *haematobia irritans*; *Stomoxys; Lucilia*; midges; and mosquitoes. Members of the Phthiraptera class include, but are not limited to, blood sucking lice and chewing lice, for example *Bovicola Ovis* and *Bovicola Bovis*.

The term "effective amount" when used used in context of parasites in or on an animal refers to the amount or dose of the compound of the invention, or a salt thereof, which, upon single or multiple dose administration to the animal, provides the desired effect in or on the animal. The effective amount can be readily determined by the attending diagnostician, as one skilled in the art, by the use of known techniques and by observing results obtained under analogous circumstances. In determining the effective amount a number of factors are considered by the attending diagnostician, including, but not limited to: the species of mammal; its size, age, and general health; the parasite to be controlled and the degree of infestation; the specific disease or disorder involved; the degree of or involvement or the severity of the disease or disorder; the response of the individual; the particular compound administered; the mode of administration; the bioavailability characteristics of the preparation administered; the dose regimen selected; the use of concomitant medication; and other relevant circumstances.

The compounds of the invention may be administered to the animal by any route which has the desired effect including, but not limited to topically, orally, parenterally and subcutaneously. Topical administration is preferred. Formulations suitable for topical administration include, for example, solutions, emulsions and suspensions and may take the form of a pour-on, spot-on, spray-on, spray race or dip. In the alternative, the compounds of the invention may be administered by means of an ear tag or collar.

Salt forms of the compounds of the invention include both pharmaceutically acceptable salts and veterinary acceptable salts, which can be different to agrochemically acceptable salts. Pharmaceutically and veterinary acceptable salts and common methodology for preparing them are well known in the art. See, for example, Gould, P. L., "Salt selection for basic drugs", International Journal of Pharmaceutics, 33: 201-217 (1986); Bastin, R. J., et al. "Salt Selection and Optimization Procedures for Pharmaceutical New Chemical Entities", Organic Process Research and Development, 4: 427-435 (2000); and Berge, S. M., et al., "Pharmaceutical Salts", Journal of Pharmaceutical Sciences, 66: 1-19, (1977). One skilled in the art of synthesis will appreciate that the compounds of the invention are readily converted to and may be isolated as a salt, such as a hydrochloride salt, using techniques and conditions well known to one of ordinary skill in the art. In addition, one skilled in the art of synthesis will appreciate that the compounds of the invention are readily converted to and may be isolated as the corresponding free base from the corresponding salt.

The present invention also provides a method for controlling pests (such as mosquitoes and other disease vectors; see also http://www.whoint/malaria/vector_control/irs/en/). In one embodiment, the method for controlling pests comprises applying the compositions of the invention to the target pests, to their locus or to a surface or substrate by brushing, rolling, spraying, spreading or dipping. By way of example, an IRS (indoor residual spraying) application of a surface such as a wall, ceiling or floor surface is contemplated by the method of the invention. In another embodiment, it is contemplated to apply such compositions to a substrate such as non-woven or a fabric material in the form of (or which can be used in the manufacture of) netting, clothing, bedding, curtains and tents.

In one embodiment, the method for controlling such pests comprises applying a pesticidally effective amount of the compositions of the invention to the target pests, to their locus, or to a surface or substrate so as to provide effective residual pesticidal activity on the surface or substrate. Such application may be made by brushing, rolling, spraying, spreading or dipping the pesticidal composition of the invention. By way of example, an IRS application of a surface such as a wall, ceiling or floor surface is contemplated by the method of the invention so as to provide effective residual pesticidal activity on the surface. In another embodiment, it is contemplated to apply such compositions for residual control of pests on a substrate such as a fabric material in the form of (or which can be used in the manufacture of) netting, clothing, bedding, curtains and tents.

Substrates including non-woven, fabrics or netting to be treated may be made of natural fibres such as cotton, raffia, jute, flax, sisal, hessian, or wool, or synthetic fibres such as polyamide, polyester, polypropylene, polyacrylonitrile or the like. The polyesters are particularly suitable. The methods of textile treatment are known, e.g. WO 2008/151984, WO 2003/034823, U.S. Pat. No. 5,631,072, WO 2005/64072, WO2006/128870, EP 1724392, WO 2005113886 or WO 2007/090739.

Further areas of use of the compositions according to the invention are the field of tree injection/trunk treatment for all ornamental trees as well all sort of fruit and nut trees.

In the field of tree injection/trunk treatment, the compounds according to the present invention are especially suitable against wood-boring insects from the order Lepidoptera as mentioned above and from the order Coleoptera, especially against woodborers listed in the following tables A and B:

TABLE A

Examples of exotic woodborers of economic importance.

| Family | Species | Host or Crop Infested |
|---|---|---|
| Buprestidae | Agrilus planipennis | Ash |
| Cerambycidae | Anoplura glabripennis | Hardwoods |
| Scolytidae | Xylosandrus crassiusculus | Hardwoods |
| | X. mutilatus | Hardwoods |
| | Tomicus piniperda | Conifers |

TABLE B

Examples of native woodborers of economic importance.

| Family | Species | Host or Crop Infested |
|---|---|---|
| Buprestidae | Agrilus anxius | Birch |
| | Agrilus politus | Willow, Maple |
| | Agrilus sayi | Bayberry, Sweetfern |
| | Agrilus vittaticolllis | Apple, Pear, Cranberry, Serviceberry, Hawthorn |
| | Chrysobothris femorata | Apple, Apricot, Beech, Boxelder, Cherry, Chestnut, Currant, Elm, Hawthorn, Hackberry, Hickory, Horsechestnut, Linden, Maple, Mountain-ash, Oak, Pecan, Pear, Peach, Persimmon, Plum, Poplar, Quince, Redbud, Serviceberry, Sycamore, Walnut, Willow |
| | Texania campestris | Basswood, Beech, Maple, Oak, Sycamore, Willow, Yellow-poplar |
| Cerambycidae | Goes pulverulentus | Beech, Elm, Nuttall, Willow, Black oak, Cherrybark oak, Water oak, Sycamore |
| | Goes tigrinus | Oak |
| | Neoclytus acuminatus | Ash, Hickory, Oak, Walnut, Birch, Beech, Maple, Eastern hophornbeam, Dogwood, Persimmon, Redbud, Holly, Hackberry, Black locust, Honeylocust, Yellow-poplar, Chestnut, Osage-orange, Sassafras, Lilac, Mountain-mahogany, Pear, Cherry, Plum, Peach, Apple, Elm, Basswood, Sweetgum |
| | Neoptychodes trilineatus | Fig, Alder, Mulberry, Willow, Netleaf hackberry |
| | Oberea ocellata | Sumac, Apple, Peach, Plum, Pear, Currant, Blackberry |

TABLE B-continued

Examples of native woodborers of economic importance.

| Family | Species | Host or Crop Infested |
|---|---|---|
| | Oberea tripunctata | Dogwood, Viburnum, Elm, Sourwood, Blueberry, Rhododendron, Azalea, Laurel, Poplar, Willow, Mulberry |
| | Oncideres cingulata | Hickory, Pecan, Persimmon, Elm, Sourwood, Basswood, Honeylocust, Dogwood, Eucalyptus, Oak, Hackberry, Maple, Fruit trees |
| | Saperda calcarata | Poplar |
| | Strophiona nitens | Chestnut, Oak, Hickory, Walnut, Beech, Maple |
| Scolytidae | Corthylus columbianus | Maple, Oak, Yellow-poplar, Beech, Boxelder, Sycamore, Birch, Basswood, Chestnut, Elm |
| | Dendroctonus frontalis | Pine |
| | Dryocoetes betulae | Birch, Sweetgum, Wild cherry, Beech, Pear |
| | Monarthrum fasciatum | Oak, Maple, Birch, Chestnut, Sweetgum, Blackgum, Poplar, Hickory, Mimosa, Apple, Peach, Pine |
| | Phloeotribus liminaris | Peach, Cherry, Plum, Black cherry, Elm, Mulberry, Mountain-ash |
| | Pseudopityophthorus pruinosus | Oak, American beech, Black cherry, Chickasaw plum, Chestnut, Maple, Hickory, Hornbeam, Hophornbeam |
| Sesiidae | Paranthrene simulans | Oak, American chestnut |
| | Sannina uroceriformis | Persimmon |
| | Synanthedon exitiosa | Peach, Plum, Nectarine, Cherry, Apricot, Almond, Black cherry |
| | Synanthedon pictipes | Peach, Plum, Cherry, Beach, Black Cherry |
| | Synanthedon rubrofascia | Tupelo |
| | Synanthedon scitula | Dogwood, Pecan, Hickory, Oak, Chestnut, Beech, Birch, Black cherry, Elm, Mountain-ash, Viburnum, Willow, Apple, Loquat, Ninebark, Bayberry |
| | Vitacea polistiformis | Grape |

The present invention may be also used to control any insect pests that may be present in turfgrass, including for example beetles, caterpillars, fire ants, ground pearls, millipedes, sow bugs, mites, mole crickets, scales, mealybugs, ticks, spittlebugs, southern chinch bugs and white grubs. The present invention may be used to control insect pests at various stages of their life cycle, including eggs, larvae, nymphs and adults.

In particular, the present invention may be used to control insect pests that feed on the roots of turfgrass including white grubs (such as *Cyclocephala* spp. (e.g. masked chafer, *C. lurida*), *Rhizotrogus* spp. (e.g. European chafer, *R. majalis*), *Cotinus* spp. (e.g. Green June beetle, *C. nitida*), *Popillia* spp. (e.g. Japanese beetle, *P. japonica*), *Phyllophaga* spp. (e.g. May/June beetle), *Ataenius* spp. (e.g. Black turfgrass ataenius, *A. spretulus*), *Maladera* spp. (e.g. Asiatic garden beetle, *M. castanea*) and *Tomarus* spp.), ground pearls (*Margarodes* spp.), mole crickets (tawny, southern, and short-winged; *Scapteriscus* spp., *Giyllotalpa africana*) and leatherjackets (European crane fly, *Tipula* spp.).

The present invention may also be used to control insect pests of turfgrass that are thatch dwelling, including armyworms (such as fall armyworm *Spodoptera frugiperda*, and common armyworm *Pseudaletia unipuncta*), cutworms, billbugs (*Sphenophorus* spp., such as *S. venatus verstitus* and *S. parvulus*), and sod webworms (such as *Crambus* spp. and the tropical sod webworm, *Herpetogramma phaeopteralis*).

The present invention may also be used to control insect pests of turfgrass that live above the ground and feed on the turfgrass leaves, including chinch bugs (such as southern chinch bugs, *Blissus insularis*), Bermudagrass mite (*Eriophyes cynodoniensis*), rhodesgrass mealybug (*Antonina graminis*), two-lined spittlebug (*Propsapia bicincta*), leafhoppers, cutworms (Noctuidae family), and greenbugs.

The present invention may also be used to control other pests of turfgrass such as red imported fire ants (*Solenopsis invicta*) that create ant mounds in turf.

In the hygiene sector, the compositions according to the invention are active against ectoparasites such as hard ticks, soft ticks, mange mites, harvest mites, flies (biting and licking), parasitic fly larvae, lice, hair lice, bird lice and fleas.

Examples of Such Parasites are:
Of the order Anoplurida: *Haematopinus* spp., *Linognathus* spp., *Pediculus* spp. and *Phtirus* spp., *Solenopotes* spp.
Of the order Mallophagida: *Trimenopon* spp., *Menopon* spp., *Trinoton* spp., *Bovicola* spp., *Werneckiella* spp., *Lepikentron* spp., *Damalina* spp., *Trichodectes* spp. and *Felicola* spp.
Of the order Diptera and the suborders Nematocerina and Brachycerina, for example *Aedes* spp., *Anopheles* spp., *Culex* spp., *Simulium* spp., *Eusimulium* spp., *Phlebotomus* spp., *Lutzomyia* spp., *Culicoides* spp., *Chrysops* spp., *Hybomitra* spp., *Atylotus* spp., *Tabanus* spp., *Haematopota* spp., *Philipomyia* spp., *Braula* spp.,

*Musca* spp., *Hydrotaea* spp., *Stomoxys* spp., *Haematobia* spp., *Morellia* spp., *Fannia* spp., *Glossina* spp., *Calliphora* spp., *Lucilia* spp., *Chrysomyia* spp., *Wohlfahrtia* spp., *Sarcophaga* spp., *Oestrus* spp., *Hypoderma* spp., *Gasterophilus* spp., *Hippobosca* spp., *Lipoptena* spp. and *Melophagus* spp.

Of the order Siphonapterida, for example *Pulex* spp., *Ctenocephalides* spp., *Xenopsylla* spp., *Ceratophyllus* spp.

Of the order Heteropterida, for example *Cimex* spp., *Triatoma* spp., *Rhodnius* spp., *Panstrongylus* spp.

Of the order Blattarida, for example *Blatta orientalis*, *Periplaneta americana*, Blattelagermanica and *Supella* spp.

Of the subclass Acaria (Acarida) and the orders Meta- and Meso-*stigmata*, for example *Argas* spp., *Ornithodorus* spp., *Otobius* spp., *Ixodes* spp., *Amblyomma* spp., *Boophilus* spp., *Dermacentor* spp., *Haemophysalis* spp., *Hyalomma* spp., *Rhipicephalus* spp., *Dermanyssus* spp., *Raillietia* spp., *Pneumonyssus* spp., *Sternostoma* spp. and *Varroa* spp.

Of the orders Actinedida (Prostigmata) and Acaridida (Astigmata), for example *Acarapis* spp., *Cheyletiella* spp., *Ornithocheyletia* spp., *Myobia* spp., *Psorergatesspp.*, *Demodex* spp., *Trombicula* spp., *Listrophorus* spp., *Acarus* spp., *Tyrophagus* spp., *Caloglyphus* spp., *Hypodectes* spp., *Pterolichus* spp., *Psoroptes* spp., *Chorioptes* spp., *Otodectes* spp., *Sarcoptes* spp., *Notoedres* spp., *Knemidocoptes* spp., *Cytodites* spp. and *Laminosioptes* spp.

The compositions according to the invention are also suitable for protecting against insect infestation in the case of materials such as wood, textiles, plastics, adhesives, glues, paints, paper and card, leather, floor coverings and buildings.

The compositions according to the invention can be used, for example, against the following pests: beetles such as *Hylotrupes bajulus, Chlorophorus pilosis, Anobium punctatum, Xestobium rufovillosum, Ptilinuspecticornis, Dendrobium pertinex, Ernobius mollis, Priobium carpini, Lyctus brunneus, Lyctus africanus, Lyctus planicollis, Lyctus linearis, Lyctus pubescens, Trogoxylon aequale, Minthesrugicollis, Xyleborus* spec., *Tryptodendron* spec., *Apate monachus, Bostrychus capucins, Heterobostrychus brunneus, Sinoxylon* spec. and *Dinoderus minutus*, and also hymenopterans such as *Sirex juvencus, Urocerus gigas, Urocerus gigas taignus* and *Urocerus augur*, and termites such as *Kalotermes flavicollis, Cryptotermes brevis, Heterotermes indicola, Reticulitermes flavipes, Reticulitermes santonensis, Reticulitermes lucifugus, Mastotermes darwiniensis, Zootermopsis nevadensis* and *Coptotermes formosanus*, and bristletails such as *Lepisma saccharina*. The compounds of formulae I, and I'a, or salts thereof, are especially suitable for controlling one or more pests selected from the family: Noctuidae, Plutellidae, Chrysomelidae, Thripidae, Pentatomidae, Tortricidae, Delphacidae, Aphididae, Noctuidae, Crambidae, Meloidogynidae, and Heteroderidae. In a preferred embodiment of each aspect, a compound TX (where the abbreviation "TX" means "one compound selected from the compounds defined in the Tables A-1 to A-297 and Table P") controls one or more of pests selected from the family: Noctuidae, Plutellidae, Chrysomelidae, Thripidae, Pentatomidae, Tortricidae, Delphacidae, Aphididae, Noctuidae, Crambidae, Meloidogynidae, and Heteroderidae.

The compounds of formulae I, and I'a, or salts thereof, are especially suitable for controlling one or more of pests selected from the genus: *Spodoptera* spp, *Plutella* spp, *Frankliniella* spp, *Thrips* spp, *Euschistus* spp, *Cydia* spp, *Nilaparvata* spp, *Myzus* spp, *Aphis* spp, *Diabrotica* spp, *Rhopalosiphum* spp, *Pseudoplusia* spp and *Chilo* spp. In a preferred embodiment of each aspect, a compound TX (where the abbreviation "TX" means "one compound selected from the compounds defined in the Tables A-1 to A-297 and Table P") controls one or more of pests selected from the genus: *Spodoptera* spp, *Plutella* spp, *Frankliniella* spp, *Thrips* spp, *Euschistus* spp, *Cydia* spp, *Nilaparvata* spp, *Myzus* spp, *Aphis* spp, *Diabrotica* spp, *Rhopalosiphum* spp, *Pseudoplusia* spp and *Chilo* spp.

The compounds of formulae I, and I'a, or salts thereof, are especially suitable for controlling one or more of *Spodoptera littoralis, Plutella xylostella, Frankliniella occidentalis, Thrips tabaci, Euschistus heros, Cydia pomonella, Nilaparvata lugens, Myzus persicae, Chrysodeixis includens, Aphis craccivora, Diabrotica balteata, Rhopalosiphum padi*, and *Chilo suppressalis*.

In a preferred embodiment of each aspect, a compound TX (where the abbreviation "TX" means "one compound selected from the compounds defined in the Tables A-1 to A-297 and Table P") controls one or more of *Spodoptera littoralis, Plutella xylostella, Frankliniella occidentalis, Thrips tabaci, Euschistus heros, Cydia pomonella, Nilaparvata lugens, Myzus persicae, Chrysodeixis includens, Aphis craccivora, Diabrotica balteata, Rhopalosiphum Padia*, and *Chilo Suppressalis*, such as *Spodoptera littoralis*+TX, *Plutella xylostella*+TX; *Frankliniella occidentalis*+TX, *Thrips tabaci*+TX, *Euschistus heros*+TX, *Cydia pomonella*+TX, *Nilaparvata lugens*+TX, *Myzus persicae*+TX, *Chrysodeixis includens*+TX, *Aphis craccivora*+TX, *Diabrotica balteata*+TX, *Rhopalosiphum Padi*+TX, and *Chilo suppressalis*+TX.

In an embodiment, of each aspect, one compound selected from the compounds defined in the Tables A-1 to A-297 and Table P is suitable for controlling *Spodoptera littoralis, Plutella xylostella, Frankliniella occidentalis, Thrips tabaci, Euschistus heros, Cydia pomonella, Nilaparvata lugens, Myzus persicae, Chrysodeixis includens, Aphis craccivora, Diabrotica balteata, Rhopalosiphum Padia*, and *Chilo Suppressalis* in cotton, vegetable, maize, cereal, rice and soya crops.

In an embodiment, one compound from selected from the compounds defined in the Tables A-1 to A-297 and Table P is suitable for controlling *Mamestra* (preferably in vegetables), *Cydia pomonella* (preferably in apples), *Empoasca* (preferably in vegetables, vineyards), *Leptinotarsa* (preferably in potatos) and *Chilo supressalis* (preferably in rice).

Compounds according to the invention may possess any number of benefits including, inter alia, advantageous levels of biological activity for protecting plants against insects or superior properties for use as agrochemical active ingredients (for example, greater biological activity, an advantageous spectrum of activity, an increased safety profile (against non-target organisms above and below ground (such as fish, birds and bees), improved physico-chemical properties, or increased biodegradability). In particular, it has been surprisingly found that certain compounds of formula I may show an advantageous safety profile with respect to non-target arthropods, in particular pollinators such as honey bees, solitary bees, and bumble bees. Most particularly, *Apis mellifera*.

The compounds according to the invention can be used as pesticidal agents in unmodified form, but they are generally formulated into compositions in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspoemulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, 10$^{th}$ Edition, Southern Illinois University, 2010.

The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %):

Emulsifiable Concentrates:
    active ingredient: 1 to 95%, preferably 60 to 90%
    surface-active agent: 1 to 30%, preferably 5 to 20%
    liquid carrier: 1 to 80%, preferably 1 to 35%

Dusts:
    active ingredient: 0.1 to 10%, preferably 0.1 to 5%
    solid carrier: 99.9 to 90%, preferably 99.9 to 99%

Suspension Concentrates:
    active ingredient: 5 to 75%, preferably 10 to 50%
    water: 94 to 24%, preferably 88 to 30%
    surface-active agent: 1 to 40%, preferably 2 to 30%

Wettable Powders:
    active ingredient: 0.5 to 90%, preferably 1 to 80%
    surface-active agent: 0.5 to 20%, preferably 1 to 15%
    solid carrier: 5 to 95%, preferably 15 to 90%

Granules:
    active ingredient: 0.1 to 30%, preferably 0.1 to 15%
    solid carrier: 99.5 to 70)/0, preferably 97 to 85%

The following Examples further illustrate, but do not limit, the invention.

| Wettable powders | a) | b) | c) |
|---|---|---|---|
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20% |

The combination is thoroughly mixed with the adjuvants and the mixture is thoroughly ground in a suitable mill, affording powders that can be used directly for seed treatment.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
|---|---|
| Active ingredients | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
|---|---|
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

Suspension Concentrate

| | |
|---|---|
| active ingredients | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Flowable Concentrate for Seed Treatment

| | |
|---|---|
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

Formulation types include an emulsion concentrate (EC), a suspension concentrate (SC), a suspoemulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP), a soluble granule (SG) or any technically feasible formulation in combination with agriculturally acceptable adjuvants.

PREPARATORY EXAMPLES

LCMS Methods:
Method 1: Spectra were recorded on a Mass Spectrometer from Waters (SQD, SQDII Single quadrupole mass spectrometer) equipped with an electrospray source (Polarity: positive and negative ions, Capillary: 3.00 kV, Cone range: 30 V, Extractor: 2.00 V, Source Temperature: 150° C., Desolvation Temperature: 350° C., Cone Gas Flow: 50 l/h, Desolvation Gas Flow: 650 l/h, Mass range: 100 to 900 Da) and an Acquity UPLC from Waters: Binary pump, heated column compartment, diode-array detector and ELSD detector. Column: Waters UPLC HSS T3, 1.8 µm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH, gradient: 10-100% B in 1.2 min; Flow (ml/min) 0.85.

Method 2: Spectra were recorded on a Mass Spectrometer from Waters (SQD, SQDII Single quadrupole mass spectrometer) equipped with an electrospray source (Polarity: positive and negative ions), Capillary: 3.00 kV, Cone range: 30V, Extractor: 2.00 V, Source Temperature: 150° C., Desolvation Temperature: 350° C., Cone Gas Flow: 50 l/h, Desolvation Gas Flow: 650 l/h, Mass range: 100 to 900 Da) and an Acquity UPLC from Waters: Binary pump, heated column compartment, diode-array detector and ELSD detector. Column: Waters UPLC HSS T3, 1.8 µm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH, gradient: 10-100% B in 2.7 min; Flow (ml/min) 0.85.

Method 3:
Mass Spectrometer: Waters SQ Detector 2 Mass Spectrometer
HPLC: UPLC 'H' class with Quaternary Gradient
Optimized Mass Parameter:—
Ionisation method: Electrospray (ESI)
Polarity: Positive and Negative Polarity Switch
Scan Type: Full Scan
Capillary (kV): 3.00
Cone Voltage (V): 41.00
Source Temperature (° C.): 150
Desolvation Gas Flow (L/Hr): 1000
Desolvation Temperature (° C.): 500
Gas Flow® Cone (L/Hr): 50
Mass range: 110 to 800 Da
Optimized Chromatographic Parameter:—
Gradient Conditions:
Solvent A: Water with 0.1% formic acid:Acetonitrile:: 95:5 v/v
Solvent B: Acetonitrile with 0.05% formic acid
Time (minutes) A (%) B (%) Flow rate (ml/min)
0 90 10 0.6
0.2 50 50 0.6
0.7 0 100 0.6
1.3 0 100 0.6
1.4 90 10 0.6
1.6 90 10 0.6
PDA Wavelength range: 200 to 400 nm
Column: Acquity UPLC HSS T3 C18
Column length: 30 mm
Internal diameter of column: 2.1 mm
Particle Size: 1.8µ
Column oven temperature: 40° C.

Example 1: Preparation of N-[1-[5-bromo-2-(5-cyano-2-pyridyl)-1,2,4-triazol-3-yl]ethyl]-3,5-bis(trifluoromethyl)benzamide (Compound P11)

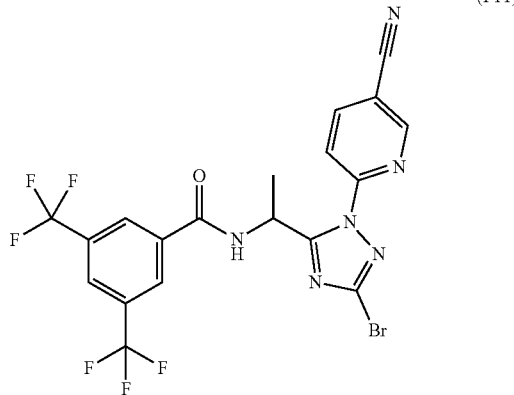

(P11)

Step 1: Preparation of 6-(3-bromo-5-ethyl-1,2,4-triazol-1-yl)pyridine-3-carbonitrile (Intermediate 11)

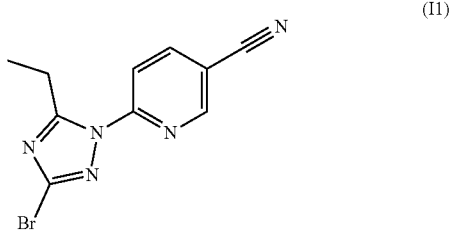 [SMILES: CCc1nc(Br)nn1-c1ccc(C#N)cn1]

(I1)

Under argon, sodium hydride was placed into a vial, and dry dimethylformamide (20 mL) was added. A solution of 3-bromo-5-ethyl-1H-1,2,4-triazole (CAS: 15777-58-9, 1.00 g, 5.68 mmol) in dry dimethylformamide (6.0 mL) was added in portions at room temperature. The reaction mixture was stirred for 30 min at room temperature before adding 6-bromopyridine-3-carbonitrile (CAS: 139585-70-9, 1.25 g, 6.82 mmol), and the resulting mixture was stirred at room temperature for 1 hour. The reaction mixture was diluted with ethyl acetate and the organic layer was washed with water (5×20 mL), once with brine, dried over magnesium sulfate, filtered and evaporated under reduced pressure. The crude was purified by chromatography over silica gel to afford 6-(3-bromo-5-ethyl-1,2,4-triazol-1-yl)pyridine-3-carbonitrile.

$^1$H NMR (400 MHz, Chloroform-d) δ ppm: 1.43 (t, J=7.34 Hz, 3H) 3.37 (q, J=7.58 Hz, 2H) 8.07-8.12 (m, 1H) 8.12-8.19 (m, 1H) 8.76-8.83 (m, 1H).

LC-MS (method 1): retention time 0.93 min, m/z 280 [M+H$^+$].

Step 2: Preparation of 6-[3-bromo-5-(1-bromoethyl)-1,2,4-triazol-1-yl]pyridine-3-carbonitrile (Intermediate 12)

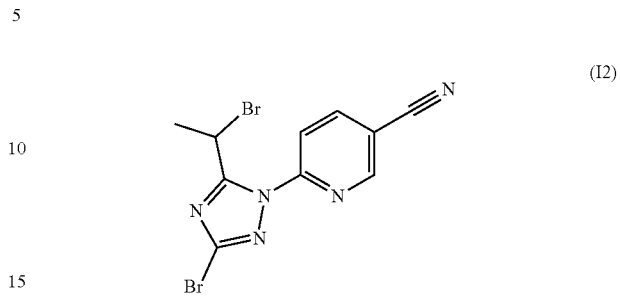

(I2)

A mixture of 6-(3-bromo-5-ethyl-1,2,4-triazol-1-yl)pyridine-3-carbonitrile (0.98 g, 3.52 mmol), N-bromosuccinimide (1.94 g, 10.6 mmol, 3.01 equiv.) and benzoyl peroxide (0.014 g, 0.056 mmol, 0.016 equiv.) in acetonitrile (12 mL) was heated to reflux in a sealed vial for 14 hours. N-bromosuccinimide (0.323 g, 1.76 mmol, 0.50 equiv.) and benzoyl peroxide (0.029 g, 0.112 mmol, 0.032 equiv.) were added again, the vial was purged with argon, closed and heated to 80° C. for 2 hours more. The reaction mixture was concentrated under reduced pressure and then purified by chromatography over silica gel to afford 6-[3-bromo-5-(1-bromoethyl)-1,2,4-triazol-1-yl]pyridine-3-carbonitrile.

$^1$H NMR (400 MHz, Chloroform-d) δ ppm: 2.22 (d, J=6.97 Hz, 3H) 6.37 (q, J=6.97 Hz, 1H) 8.08-8.14 (m, 1H) 8.16-8.23 (m, 1H) 8.84 (d, J=1.47 Hz, 1H).

LC-MS (method 1): retention time 1.02 min, m/z 356-358-360 [M+H$^+$].

Step 3: Preparation of 6-[5-(1-aminoethyl)-3-bromo-1,2,4-triazol-1-yl]pyridine-3-carbonitrile Hydrobromide (Intermediate 13)

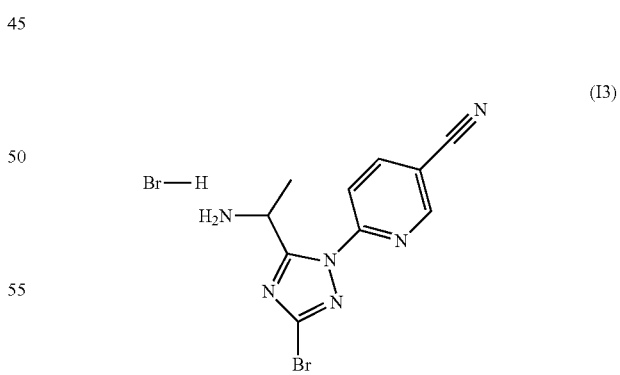

(I3)

A mixture of 6-[3-bromo-5-(1-bromoethyl)-1,2,4-triazol-1-yl]pyridine-3-carbonitrile (0.57 g, 1.596 mmol) in an ammonia solution (7 M in methanol, 29 mL) was stirred at room temperature for 15 hours. The reaction mixture was evaporated and used as crude in the next step.

LC-MS (method 1): retention time 0.66 min, m/z 293 [M+H$^+$] (without hydrobromide).

Step 4: Preparation of N-[1-[5-bromo-2-(5-cyano-2-pyridyl)-1,2,4-triazol-3-yl]ethyl]-3,5-bis(trifluoromethyl) benzamide (Compound P11)

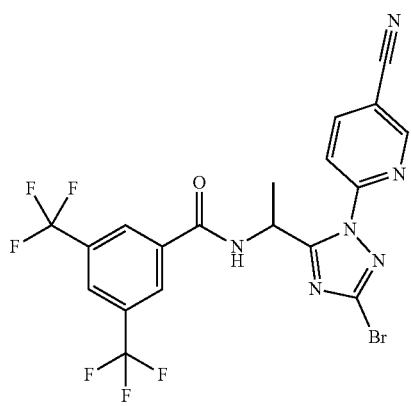
(P11)

To a solution of 6-[5-(1-aminoethyl)-3-bromo-1,2,4-triazol-1-yl]pyridine-3-carbonitrile hydrobromide (170 mg, 0.456 mmol, 1.30 equiv.) in dichloromethane (5.00 mL) cooled at 0° C., was added triethylamine (0.244 mL, 1.75 mmol, 5.00 equiv.), followed by 3,5-bis(trifluoromethyl) benzoyl chloride (0.065 mL, 0.351 mmol, 1.00 equiv.). The reaction mixture was stirred for 2 hours at room temperature, then concentrated. The crude material was dissolved in ethyl acetate, the organic phase was washed three times with water, dried over sodium sulfate, filtered and concentrated over isolute under reduced pressure to be purified by flash chromatography over silica gel (ethyl acetate in cyclohexane), yielding N-[1-[5-bromo-2-(5-cyano-2-pyridyl)-1,2,4-triazol-3-yl]ethyl]-3,5-bis(trifluoromethyl) benzamide.

¹H NMR (400 MHz, Chloroform-d) δ ppm: 1.78 (d, J=6.60 Hz, 3H) 6.48 (m, 1H) 8.05 (s, 1H) 8.15 (m, 1H) 8.22 (m, 1H) 8.27 (m, 2H) 8.89 (m, 1H).

LC-MS (method 1): retention time 1.14 min, m/z 535 [M+H]⁺.

Example 2: Preparation of N-[1-[5-bromo-2-(5-cyano-2-pyridyl)-1,2,4-triazol-3-yl]ethyl]-3-(trifluoromethyl)-5-(trifluoromethylsulfanyl)benzamide (Compound P5)

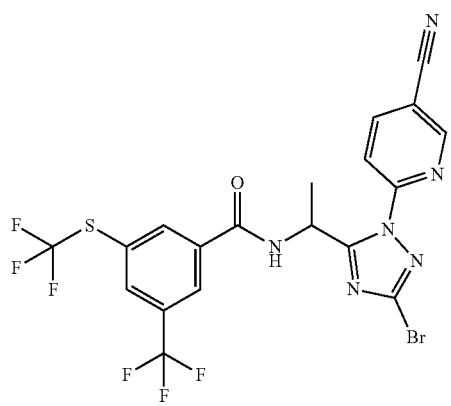
(P5)

6-[5-(1-aminoethyl)-3-bromo-1,2,4-triazol-1-yl]pyridine-3-carbonitrile hydrobromide (0.15 g, 0.401 mmol) was dissolved in Acetonitrile (4 mL), N-ethyl-N-isopropyl-propan-2-amine (0.210 mL, 1.2031 mmol) was added. After 10 min stirring at room temperature, 3-(trifluoromethyl)-5-(trifluoromethylsulfanyl)benzoic acid (0.128 g, 0.441 mmol) was added followed by HATU (0.204 g, 0.521 mmol). Then the resulting mixture was stirred for 16 hours at room temperature. The reaction mixture was evaporated under reduced pressure and the residue obtained was purified by chromatography over silica gel to afford N-[1-[5-bromo-2-(5-cyano-2-pyridyl)-1,2,4-triazol-3-yl]ethyl]-3-(trifluoromethyl)-5-(trifluoromethylsulfanyl)benzamide.

1H NMR (400 MHz, Chloroform) δ ppm 1.77 (d, J=6.60 Hz, 3H) 6.41-6.52 (m, 1H) 7.28 (s, 1H) 8.06-8.09 (m, 1H) 8.12-8.16 (m, 1H) 8.17-8.20 (m, 1H) 8.20-8.25 (m, 1H) 8.26-8.28 (m, 1H) 8.86-8.91 (m, 1H)

LC-MS (method 1): retention time 1.18 min, m/z 567 [M+H]⁺.

Example 3: Preparation of N-[1-[5-bromo-2-(5-cyano-2-pyridyl)-1,2,4-triazol-3-yl]ethyl]-3-(2,2-difluoroethoxy)-5-(trifluoromethyl)benzamide (Compound P33)

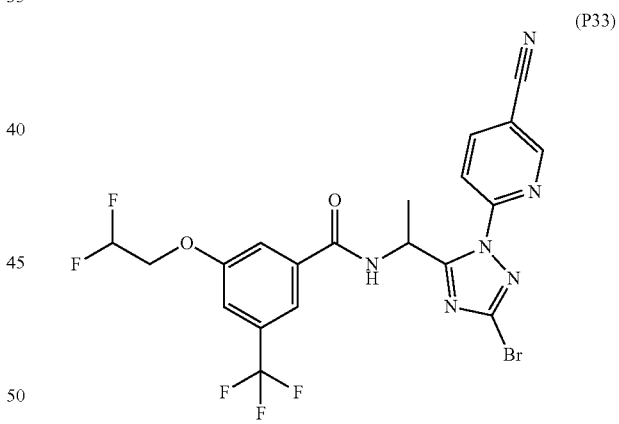
(P33)

The desired product was prepared using the condition described for Example 2 to afford N-[1-[5-bromo-2-(5-cyano-2-pyridyl)-1,2,4-triazol-3-yl]ethyl]-3-(2,2-difluoroethoxy)-5-(trifluoromethyl)benzamide.

1H NMR (400 MHz, Chloroform) δ ppm 1.76 (d, J=6.60 Hz, 3H) 4.28 (td, J=12.84, 4.03 Hz, 2H) 5.95-6.30 (m, 1H) 6.44 (dd, J=8.07, 6.97 Hz, 1H) 7.26 (br d, J=8.44 Hz, 1H) 7.33 (s, 1H) 7.55 (s, 1H) 7.67 (s, 1H) 8.10-8.16 (m, 1H) 8.19-8.25 (m, 1H) 8.88 (dd, J=2.20, 0.73 Hz, 1H)

LC-MS (method 1): retention time 1.09 min, m/z 545 [M+H]⁺.

Example 4: Preparation of N-[1-[5-bromo-2-(5-cyano-2-pyridyl)-1,2,4-triazol-3-yl]ethyl]-3-(difluoromethoxy)-5-(trifluoromethyl)benzamide (Compound P10)

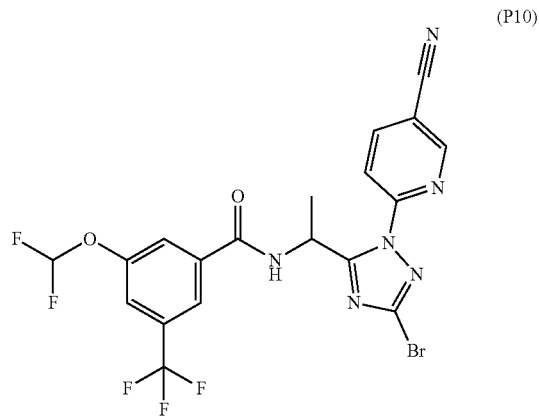 [SMILES: CC(NC(=O)c1cc(OC(F)F)cc(C(F)(F)F)c1)c1nc(Br)nn1-c1ccc(C#N)cn1]

The desired product was prepared using the condition described for Example 2 to afford N-[1-[5-bromo-2-(5-cyano-2-pyridyl)-1,2,4-triazol-3-yl]ethyl]-3-(difluoromethoxy)-5-(trifluoromethyl)benzamide. 1H NMR (400 MHz, Chloroform) δ ppm 1.76 (d, J=6.60 Hz, 3H) 6.40-6.50 (m, 1H) 6.44-6.82 (m, 1H) 7.26 (br d, J=8.07 Hz, 1H) 7.56 (s, 1H) 7.77 (s, 1H) 7.90 (s, 1H) 8.10-8.18 (m, 1H) 8.19-8.28 (m, 1H) 8.83-8.92 (m, 1H)

LC-MS (method 1): retention time 1.09 min, m/z 533 [M+H]$^+$.

Example 5: Preparation of N-[1-[5-bromo-2-(5-cyano-2-pyridyl)-1,2,4-triazol-3-yl]ethyl]-3-(trifluoromethoxy)-5-(trifluoromethyl)benzamide (Compound P9)

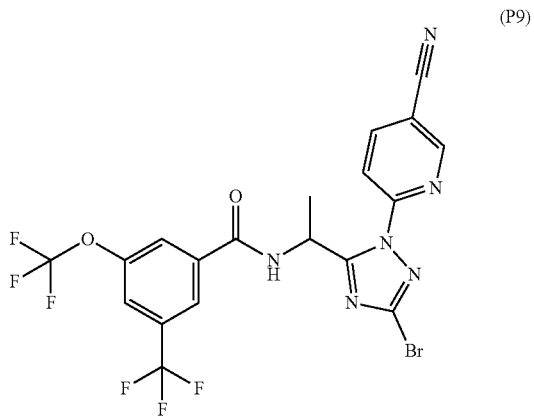 [SMILES: CC(NC(=O)c1cc(OC(F)(F)F)cc(C(F)(F)F)c1)c1nc(Br)nn1-c1ccc(C#N)cn1]

The desired product was prepared using the condition described for Example 2 to afford N-[1-[5-bromo-2-(5-cyano-2-pyridyl)-1,2,4-triazol-3-yl]ethyl]-3-(trifluoromethoxy)-5-(trifluoromethyl)benzamide. 1H NMR (400 MHz, Chloroform) δ ppm 1.77 (d, J=6.60 Hz, 3H) 6.46 (br d, J=1.10 Hz, 1H) 7.27 (br s, 1H) 7.64 (s, 1H) 7.87 (s, 1H) 7.99 (s, 1H) 8.11-8.17 (m, 1H) 8.19-8.25 (m, 1H) 8.86-8.91 (m, 1H)

LC-MS (method 1): retention time 1.16 min, m/z 549 [M+H]$^+$. Table P: Examples of compounds of formula I

| Entry | IUPAC name | STRUCTURE | RT (min) | [M + H] (measured) | Method | MP ° C. |
|---|---|---|---|---|---|---|
| P1 | 3-bromo-N-[1-[5-bromo-2-[5-(difluoromethoxy)pyrimidin-2-yl]-1,2,4-triazol-3-yl]ethyl]-5-(trifluoromethyl)benzamide | | 1.10 | 587 | 3 | 191-193 |

| Entry | IUPAC name | STRUCTURE | RT (min) | [M + H] (measured) | Method | MP ° C. |
|---|---|---|---|---|---|---|
| P2 | N-[1-[5-bromo-2-[5-(difluoromethoxy)pyrimidin-2-yl]-1,2,4-triazol-3-yl]ethyl]-3,5-bis(trifluoromethyl)benzamide | | 1.15 | 577 | 3 | 171-173 |
| P3 | N-[1-[5-bromo-2-[5-(difluoromethoxy)pyrimidin-2-yl]-1,2,4-triazol-3-yl]ethyl]-3-(difluoromethoxy)-5-(trifluoromethyl)benzamide | | 1.10 | 574 | 3 | 150-152 |
| P4 | N-[1-[5-bromo-2-[5-(difluoromethoxy)pyrimidin-2-yl]-1,2,4-triazol-3-yl]ethyl]-3-(2,2,2-trifluoroethoxy)-5-(trifluoromethyl)benzamide | | 1.10 | 607 | 3 | 153-155 |

| Entry | IUPAC name | STRUCTURE | RT (min) | [M + H] (measured) | Method | MP °C. |
|---|---|---|---|---|---|---|
| P5 | N-[1-[5-bromo-2-(5-cyano-2-pyridyl)-1,2,4-triazol-3-yl]ethyl]-3-(trifluoromethyl)-5-(trifluoromethylsulfanyl)benzamide | | 1.19 | 567 | 1 | 175-176 |
| P6 | N-[1-[5-bromo-2-[5-(difluoromethoxy)-2-pyridyl]-1,2,4-triazol-3-yl]ethyl]-3,5-bis(trifluoromethyl)benzamide | | 1.21 | 574 | 3 | 153-155 |
| P7 | N-[1-[5-bromo-2-[5-(difluoromethoxy)-2-pyridyl]-1,2,4-triazol-3-yl]ethyl]-3-(difluoromethoxy)-5-(trifluoromethyl)benzamide | | 1.60 | 572 | 3 | 68-70 |

-continued

| Entry | IUPAC name | STRUCTURE | RT (min) | [M + H] (measured) | Method | MP ° C. |
|---|---|---|---|---|---|---|
| P8 | N-[1-[5-bromo-2-(5-cyano-2-pyridyl)-1,2,4-triazol-3-yl]ethyl]-3-(difluoromethyl)-5-(trifluoromethyl)benzamide | | | | | 204-206 |
| P9 | N-[1-[5-bromo-2-(5-cyano-2-pyridyl)-1,2,4-triazol-3-yl]ethyl]-3-(trifluoromethoxy)-5-(trifluoromethyl)benzamide | | 1.16 | 549 | 1 | 178-179 |
| P10 | N-[1-[5-bromo-2-(5-cyano-2-pyridyl)-1,2,4-triazol-3-yl]ethyl]-3-(difluoromethoxy)-5-(trifluoromethyl)benzamide | | 1.10 | 533 | 1 | 123-124 |
| P11 | N-[1-[5-bromo-2-(5-cyano-2-pyridyl)-1,2,4-triazol-3-yl]ethyl]-3,5-bis(trifluoromethyl)benzamide | | 1.14 | 535 | 1 | 110-111 |

-continued

| Entry | IUPAC name | STRUCTURE | RT (min) | [M + H] (measured) | Method | MP ° C. |
|---|---|---|---|---|---|---|
| P12 | N-[1-[5-bromo-2-(5-cyano-2-pyridyl)-1,2,4-triazol-3-yl]ethyl]-N-methyl-3,5-bis(trifluoromethyl)benzamide | | 1.15 | 549 | 1 | |
| P13 | 3-bromo-N-[1-[5-bromo-2-[5-(difluoromethoxy)-2-pyridyl]-1,2,4-triazol-3-yl]ethyl]-5-(trifluoromethyl)benzamide | | | | | 146-148 |
| P14 | N-[1-[5-bromo-2-[5-(difluoromethoxy)-2-pyridyl]-1,2,4-triazol-3-yl]ethyl]-3-(2,2,2-trifluoroethoxy)-5-(trifluoromethyl)benzamide | | 1.63 | 404 | ? | 72-74 |

-continued

| Entry | IUPAC name | STRUCTURE | RT (min) | [M + H] (measured) | Method | MP ° C. |
|---|---|---|---|---|---|---|
| P15 | N-[1-[5-bromo-2-[5-(2,2-difluoroethoxy)-2-pyridyl]-1,2,4-triazol-3-yl]ethyl]-3,5-bis(trifluoromethyl)benzamide | | | | | 181-183 |
| P16 | N-[1-[5-bromo-2-[5-(2,2-difluoroethoxy)-2-pyridyl]-1,2,4-triazol-3-yl]ethyl]-3-(difluoromethoxy)-5-(trifluoromethyl)benzamide | | | | | 136-138 |
| P17 | N-[1-[5-bromo-2-[5-(2,2,2-trifluoroethoxy)-2-pyridyl]-1,2,4-triazol-3-yl]ethyl]-3,5-bis(trifluoromethyl)benzamide | | 1.65 | 608 | ? | 133-135 |

-continued

| Entry | IUPAC name | STRUCTURE | RT (min) | [M + H] (measured) | Method | MP ° C. |
|---|---|---|---|---|---|---|
| P18 | 3-bromo-N-[1-[5-bromo-2-[5-(2,2-difluoroethoxy)pyrimidin-2-yl]-1,2,4-triazol-3-yl]ethyl]-5-(trifluoromethyl)benzamide | 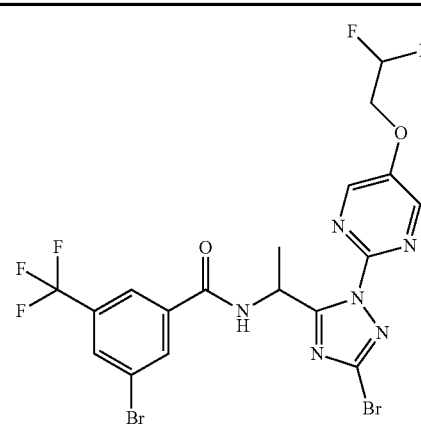 | 1.12 | 601 | 3 | 104-106 |
| P19 | N-[1-[5-bromo-2-[5-(2,2-difluoroethoxy)pyrimidin-2-yl]-1,2,4-triazol-3-yl]ethyl]-3-(2,2,2-trifluoroethoxy)-5-(trifluoromethyl)benzamide | 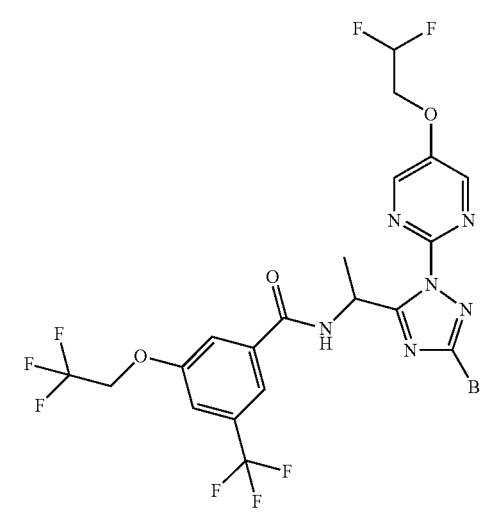 | 1.12 | 69 | 3 | 88-90 |
| P20 | N-[1-[5-bromo-2-[5-(2,2,2-trifluoroethoxy)pyrimidin-2-yl]-1,2,4-triazol-3-yl]ethyl]-3-(2,2-difluoroethoxy)-5-(trifluoromethyl)benzamide | 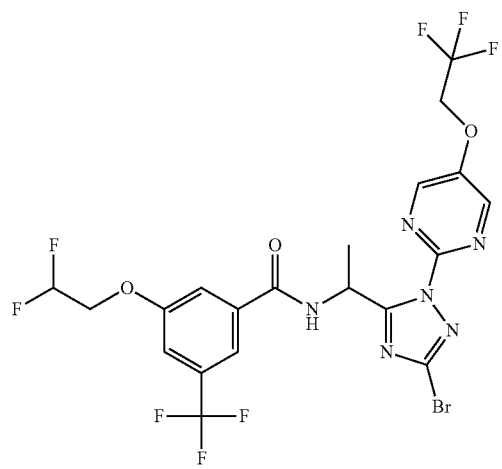 [SMILES: CC(NC(=O)c1cc(OCC(F)F)cc(C(F)(F)F)c1)c1nc(Br)nn1-c1ncc(OCC(F)(F)F)cn1] | 1.10 | 620 | 3 | 91-93 |

-continued

| Entry | IUPAC name | STRUCTURE | RT (min) | [M + H] (measured) | Method | MP ° C. |
|---|---|---|---|---|---|---|
| P21 | N-[1-[5-bromo-2-(5-cyano-2-pyridyl)-1,2,4-triazol-3-yl]ethyl]-3-(2,2,2-trifluoroethoxy)-5-(trifluoromethyl)benzamide | | 1.16 | 563 | 3 | 188-190 |
| P22 | N-[1-[5-bromo-2-[5-(2,2-difluoroethoxy)pyrimidin-2-yl]-1,2,4-triazol-3-yl]ethyl]-3-(trifluoromethoxy)-5-(trifluoromethyl)benzamide | | 1.12 | 607 | 1 | 142-153 |
| P23 | N-[1-[5-bromo-2-[5-(2,2-difluoroethoxy)pyrimidin-2-yl]-1,2,4-triazol-3-yl]ethyl]-3-(difluoromethoxy)-5-(trifluoromethyl)benzamide | | 1.07 | 589 | 1 | |
| P24 | N-[1-[5-bromo-2-[5-(2,2-difluoroethoxy)pyrimidin-2-yl]-1,2,4-triazol-3-yl]ethyl]-3-(trifluoromethyl)-5-(trifluoromethylsulfanyl)benzamide | | 1.16 | 623 | 1 | 140-150 |

-continued

| Entry | IUPAC name | STRUCTURE | RT (min) | [M + H] (measured) | Method | MP °C. |
|---|---|---|---|---|---|---|
| P25 | N-[1-[5-bromo-2-[5-(2,2-difluoroethoxy)pyrimidin-2-yl]-1,2,4-triazol-3-yl]ethyl]-3,5-bis(trifluoromethyl)benzamide | | 1.11 | 589 | 1 | |
| P26 | N-[1-[5-bromo-2-[5-(difluoromethoxy)-2-pyridyl]-1,2,4-triazol-3-yl]ethyl]-3-chloro-5-(trifluoromethyl)benzamide | | | | | 90-92 |
| P27 | N-[1-[5-bromo-2-[5-(2,2-difluoroethoxy)pyrimidin-2-yl]-1,2,4-triazol-3-yl]ethyl]-3-chloro-5-(trifluoromethyl)benzamide | | 1.11 | 557 | 3 | 100-102 |
| P28 | N-[1-[5-bromo-2-[5-(difluoromethoxy)pyrimidin-2-yl]-1,2,4-triazol-3-yl]ethyl]-3-(difluoromethyl)-5-(trifluoromethyl)benzamide | | 1.53 | 557 | ? | 181-183 |

-continued

| Entry | IUPAC name | STRUCTURE | RT (min) | [M + H] (measured) | Method | MP ° C. |
|---|---|---|---|---|---|---|
| P29 | N-[1-[5-bromo-2-[5-(difluoromethoxy)pyrimidin-2-yl]-1,2,4-triazol-3-yl]ethyl]-3-chloro-5-(trifluoromethyl)benzamide | | 1.57 | 541 | ? | 179-181 |
| P30 | 3-bromo-N-[1-[5-bromo-2-(5-cyano-2-pyridyl)-1,2,4-triazol-3-yl]ethyl]-5-(trifluoromethyl)benzamide | | | | | 178-180 |
| P31 | N-[1-[5-bromo-2-(5-cyano-2-pyridyl)-1,2,4-triazol-3-yl]ethyl]-3-chloro-5-(trifluoromethyl)benzamide | | | | | 94-96 |
| P32 | N-[1-[2-(5-cyano-2-pyridyl)-5-pyrimidin-2-yl-1,2,4-triazol-3-yl]ethyl]-3,5-bis(trifluoromethyl)benzamide | | 1.02 | 533 | 1 | 272-274 |

| Entry | IUPAC name | STRUCTURE | RT (min) | [M + H] (measured) | Method | MP ° C. |
|---|---|---|---|---|---|---|
| P33 | N-[1-[5-bromo-2-(5-cyano-2-pyridyl)-1,2,4-triazol-3-yl]ethyl]-3-(2,2-difluoroethoxy)-5-(trifluoromethyl)benzamide | | 1.09 | 545 | 1 | 166-167 |
| P34 | N-[1-[5-bromo-2-[5-(difluoromethoxy)-2-pyridyl]-1,2,4-triazol-3-yl]ethyl]-3-(2,2-difluoroethoxy)-5-(trifluoromethyl)benzamide | | 1.59 | 587 | ? | 76-78 |
| P35 | 3-bromo-N-[1-[5-bromo-2-[5-(2,2-difluoroethoxy)-2-pyridyl]-1,2,4-triazol-3-yl]ethyl]-5-(trifluoromethyl)benzamide | | | | | 175-177 |

| Entry | IUPAC name | STRUCTURE | RT (min) | [M + H] (measured) | Method | MP ° C. |
|---|---|---|---|---|---|---|
| P36 | N-[1-[5-bromo-2-[5-(2,2-difluoroethoxy)-2-pyridyl]-1,2,4-triazol-3-yl]ethyl]-3-(2,2-difluoroethoxy)-5-(trifluoromethyl)benzamide | | | | | 143-145 |
| P37 | N-[1-[5-bromo-2-[5-(2,2,2-trifluoroethoxy)-2-pyridyl]-1,2,4-triazol-3-yl]ethyl]-3-chloro-5-(trifluoromethyl)benzamide | | | | | 114-116 |
| P38 | N-[1-[5-bromo-2-[5-(2,2,2-trifluoroethoxy)-2-pyridyl]-1,2,4-triazol-3-yl]ethyl]-3-(difluoromethoxy)-[5-(trifluoromethyl)benzamide | | | | | 111-113 |

-continued

| Entry | IUPAC name | STRUCTURE | RT (min) | [M + H] (measured) | Method | MP ° C. |
|---|---|---|---|---|---|---|
| P39 | N-[1-[5-bromo-2-[5-(2,2,2-trifluoroethoxy)-2-pyridyl]-1,2,4-triazol-3-yl]ethyl]-3-(2,2,2-trifluoroethoxy)-5-(trifluoromethyl)benzamide | 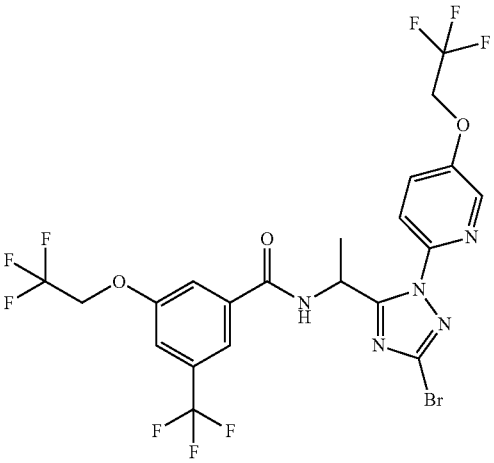 [SMILES: CC(NC(=O)c1cc(OCC(F)(F)F)cc(C(F)(F)F)c1)c1nc(Br)nn1-c1ccc(OCC(F)(F)F)cn1] | | | | 70-72 |
| P40 | N-[1-[5-bromo-2-[5-(2,2-difluoroethoxy)pyrimidin-2-yl]-1,2,4-triazol-3-yl]ethyl]-3-(difluoromethyl)-5-(trifluoromethyl)benzamide | 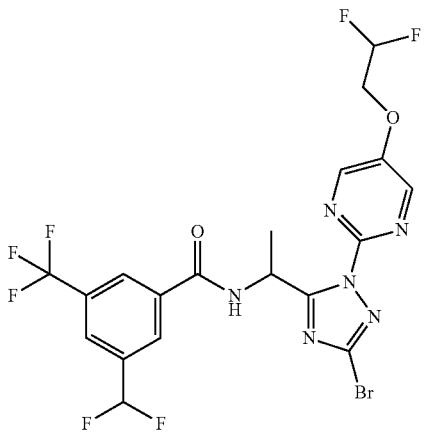 [SMILES: CC(NC(=O)c1cc(C(F)F)cc(C(F)(F)F)c1)c1nc(Br)nn1-c1ncc(OCC(F)F)cn1] | 1.07 | 572 | 3 | 99-101 |
| P41 | 3-bromo-N-[1-[5-bromo-2-[5-(2,2,2-trifluoroethoxy)pyrimidin-2-yl]-1,2,4-triazol-3-yl]ethyl]-5-(trifluoromethyl)benzamide | 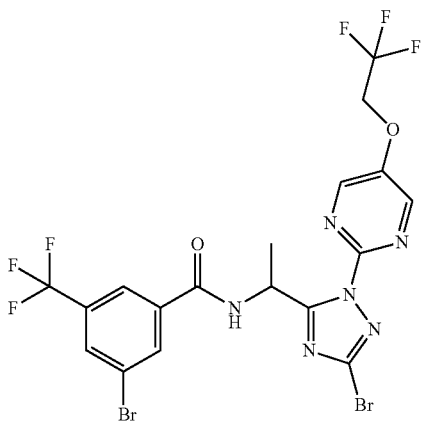 [SMILES: CC(NC(=O)c1cc(Br)cc(C(F)(F)F)c1)c1nc(Br)nn1-c1ncc(OCC(F)(F)F)cn1] | 1.14 | 619 | 3 | 103-105 |

-continued

| Entry | IUPAC name | STRUCTURE | RT (min) | [M + H] (measured) | Method | MP ° C. |
|---|---|---|---|---|---|---|
| P42 | N-[1-[5-bromo-2-[5-(2,2,2-trifluoroethoxy)pyrimidin-2-yl]-1,2,4-triazol-3-yl]ethyl]-3-(difluoromethyl)-5-(trifluoromethyl)benzamide | | 1.10 | 590 | 3 | 96-98 |
| P43 | N-[1-[5-bromo-2-[5-(2,2,2-trifluoroethoxy)pyrimidin-2-yl]-1,2,4-triazol-3-yl]ethyl]-3-chloro-5-(trifluoromethyl)benzamide | | 1.14 | 575 | 3 | 99-101 |
| P44 | N-[1-[5-bromo-2-[5-(2,2,2-trifluoroethoxy)pyrimidin-2-yl]-1,2,4-triazol-3-yl]ethyl]-3,5-bis(trifluoromethyl)benzamide | | 1.15 | 608 | 3 | 100-102 |

-continued

| Entry | IUPAC name | STRUCTURE | RT (min) | [M + H] (measured) | Method | MP ° C. |
|---|---|---|---|---|---|---|
| P45 | N-[1-[5-bromo-2-[5-(2,2,2-trifluoroethoxy)pyrimidin-2-yl]-1,2,4-triazol-3-yl]ethyl]-(3-(difluoromethoxy)-5-(trifluoromethyl)benzamide |  | 1.13 | 606 | 3 | 161-163 |
| P46 | N-[1-[5-bromo-2-[5-(2,2,2-trifluoroethoxy)pyrimidin-2-yl]-1,2,4-triazol-3-yl]ethyl]-3-(2,2,2-trifluoroethoxy)-5-(trifluoromethyl)benzamide |  | 1.16 | 638 | 3 | 94-96 |
| P47 | N-[1-[5-bromo-2-[5-(2,2-difluoroethoxy)pyrimidin-2-yl]-1,2,4-triazol-3-yl]ethyl]-3-(2,2-difluoroethoxy)-5-(trifluoromethyl)benzamide |  | 1.06 | 603 | 1 |  |

-continued

| Entry | IUPAC name | STRUCTURE | RT (min) | [M + H] (measured) | Method | MP ° C. |
|---|---|---|---|---|---|---|
| P48 | N-[1-[5-cyano-2-(5-cyano-2-pyridyl)-1,2,4-triazol-3-yl]ethyl]-3,5-bis(trifluoromethyl)benzamide | | 1.87 | 480 | 2 | |
| P49 | N-[1-[5-bromo-2-[5-(2,2-difluoroethoxy)-2-pyridyl]-1,2,4-triazol-3-yl]ethyl]-3-chloro-5-(trifluoromethyl)benzamide | | | | | 160-162 |
| P50 | 3-bromo-N-[1-[5-bromo-2-[5-(2,2,2-trifluoroethoxy)-2-pyridyl]-1,2,4-triazol-3-yl]ethyl]-5-(trifluoromethyl)benzamide | | 1.65 | 618 | ? | 129-131 |

-continued

| Entry | IUPAC name | STRUCTURE | RT (min) | [M + H] (measured) | Method | MP ° C. |
|---|---|---|---|---|---|---|
| P51 | N-[1-[5-bromo-2-[5-(difluoromethoxy)-2-pyridyl]-1,2,4-triazol-3-yl]ethyl]-3-(difluoromethyl)-5-(trifluoromethyl)benzamide | | 1.59 | 557 | ? | 68-70 |
| P52 | N-[1-[5-bromo-2-[5-(2,2-difluoroethoxy)-2-pyridyl]-1,2,4-triazol-3-yl]ethyl]-3-(difluoromethyl)-5-(trifluoromethyl)benzamide | | | | | 167-169 |
| P53 | N-[1-[5-bromo-2-[5-(2,2-difluoroethoxy)-2-pyridyl]-1,2,4-triazol-3-yl]ethyl]-3-(2,2,2-trifluoroethoxy)-5-(trifluoromethyl)benzamide | | | | | 155-157 |

| Entry | IUPAC name | STRUCTURE | RT (min) | [M + H] (measured) | Method | MP °C. |
|---|---|---|---|---|---|---|
| P54 | N-[1-[5-bromo-2-[5-(2,2,2-trifluoroethoxy)-2-pyridyl]-1,2,4-triazol-3-yl]ethyl]-3-(difluoromethyl)-5-(trifluoromethyl)benzamide | | | | | 116-118 |
| P55 | N-[1-[5-bromo-2-[5-(2,2,2-trifluoroethoxy)-2-pyridyl]-1,2,4-triazol-3-yl]ethyl]-3-(2,2-difluoroethoxy)-5-(trifluoromethyl)benzamide | | | | | 78-80 |
| P56 | N-[1-[2-(5-cyano-2-pyridyl)-5-[(E)-N-methoxy-C-methyl-carbonimidoyl]-1,2,4-triazol-3-yl]ethyl]-3,5-bis(trifluoromethyl)benzamide | | 1.16 | 526 | 1 | 259-260 |

-continued

| Entry | IUPAC name | STRUCTURE | RT (min) | [M + H] (measured) | Method | MP °C. |
|---|---|---|---|---|---|---|
| P57 | N-[1-[5-acetyl-2-(5-cyano-2-pyridyl)-1,2,4-triazol-3-yl]ethyl]-3,5-bis(trifluoromethyl)benzamide | | 1.08 | 497 | 1 | 177-178 |

TABLE I

Table of Intermediates

| Index | IUPAC name | STRUCTURE | RT (min) | [M + H] (measured) | Method | MP °C. | NMR |
|---|---|---|---|---|---|---|---|
| I1 | 6-(3-bromo-5-ethyl-1,2,4-triazol-1-yl)pyridine-3-carbonitrile | | 0.93 | 280 | 1 | — | 1) |
| I2 | 6-[3-bromo-5-(1-bromoethyl)-1,2,4-triazol-1-yl]pyridine-3-carbonitrile | | 1.02 | 356-358-360 | 1 | — | 2) |

TABLE I-continued

Table of Intermediates

| Index | IUPAC name | STRUCTURE | RT (min) | [M + H] (measured) | Method | MP ° C. | NMR |
|---|---|---|---|---|---|---|---|
| I3 | 6-[5-(1-aminoethyl)-3-bromo-1,2,4-triazol-1-yl]pyridine-3-carbonitrile; hydrobromide | | 0.66 | 293 | 1 | — | |

1) 1H NMR (400 MHz, Chloroform-d) δ ppm: 1.43 (t, J = 7.34 Hz, 3 H) 3.37 (q, J = 7.58 Hz, 2 H) 8.07-8.12 (m, 1 H) 8.12-8.19 (m, 1 H) 8.76-8.83 (m, 1 H).
2) 1H NMR (400 MHz, Chloroform-d) δ ppm: 2.22 (d, J = 6.97 Hz, 3 H) 6.37 (q, J = 6.97 Hz, 1 H) 8.08-8.14 (m, 1 H) 8.16-8.23 (m, 1 H) 8.84 (d, J = 1.47 Hz, 1 H).

The activity of the compositions according to the invention can be broadened considerably, and adapted to prevailing circumstances, by adding other insecticidally, acaricidally and/or fungicidally active ingredients. The mixtures of the compounds of formula I with other insecticidally, acaricidally and/or fungicidally active ingredients may also have further surprising advantages which can also be described, in a wider sense, as synergistic activity. For example, better tolerance by plants, reduced phytotoxicity, insects can be controlled in their different development stages or better behaviour during their production, for example during grinding or mixing, during their storage or during their use.

Suitable additions to active ingredients here are, for example, representatives of the following classes of active ingredients: organophosphorus compounds, nitrophenol derivatives, thioureas, juvenile hormones, formamidines, benzophenone derivatives, ureas, pyrrole derivatives, carbamates, pyrethroids, chlorinated hydrocarbons, acylureas, pyridylmethyleneamino derivatives, macrolides, neonicotinoids and Bacillus thuringiensis preparations.

The following mixtures of the compounds of formula I with active ingredients are preferred (where the abbreviation "TX" means "one compound selected from the compounds defined in the Tables A-1 to A-297 and Table P"):
an adjuvant selected from the group of substances consisting of petroleum oils (alternative name) (628)+TX,
an insect control active substance selected from Abamectin+TX, Acequinocyl+TX, Acetamiprid+TX, Acetoprole+TX, Acrinathrin+TX, Acynonapyr+TX, Afidopyropen+TX, Afoxalaner+TX, Alanycarb+TX, Allethrin+TX, Alpha-Cypermethrin+TX, Alphamethrin+TX, Amidoflumet+TX, Aminocarb+TX, Azocyclotin+TX, Bensultap+TX, Benzoximate+TX, Benzpyrimoxan+TX, Betacyfluthrin+TX, Beta-cypermethrin+TX, Bifenazate+TX, Bifenthrin+TX, Binapacryl+TX, Bioallethrin+TX, Bioallethrin S)-cyclopentylisomer+TX, Bioresmethrin+TX, Bistrifluron+TX, Broflanilide+TX, Brofluthrinate+TX, Bromophos-ethyl+TX, Buprofezine+TX, Butocarboxim+TX, Cadusafos+TX, Carbaryl+TX, Carbosulfan+TX, Cartap+TX, CAS number: 1472050-04-6+TX, CAS number: 1632218-00-8+TX, CAS number: 1808115-49-2+TX, CAS number: 2032403-97-5+TX, CAS number: 2044701-44-0+TX, CAS number: 2128706-05-6+TX, CAS number: 2249718-27-0+TX, Chlorantraniliprole+TX, Chlordane+TX, Chlorfenapyr+TX, Chloroprallethrin+TX, Chromafenozide+TX, Clenpirin+TX, Cloethocarb+TX, Clothianidin+TX, 2-chlorophenyl N-methylcarbamate (CPMC)+TX, Cyanofenphos+TX, Cyantraniliprole+TX, Cyclaniliprole+TX, Cyclobutrifluram+TX, Cycloprothrin+TX, Cycloxaprid+TX, Cycloxaprid+TX, Cyenopyrafen+TX, Cyetpyrafen (or Etpyrafen)+TX, Cyflumetofen+TX, Cyfluthrin+TX, Cyhalodiamide+TX, Cyhalothrin+TX, Cypermethrin+TX, Cyphenothrin+TX, Cyromazine+TX, Deltamethrin+TX, Diafenthiuron+TX, Dialifos+TX, Dibrom+TX, Dicloromezotiaz+TX, Diflovidazine+TX, Diflubenzuron+TX, dimpropyridaz+TX, Dinactin+TX, Dinocap+TX, Dinotefuran+TX, Dioxabenzofos+TX, Emamectin+TX, Empenthrin+TX, Epsilon-momfluorothrin+TX, Epsilon-metofluthrin+TX, Esfenvalerate+TX, Ethion+TX, Ethiprole+TX, Etofenprox+TX, Etoxazole+TX, Famphur+TX, Fenazaquin+TX, Fenfluthrin+TX, Fenitrothion+TX, Fenobucarb+TX, Fenothiocarb+TX, Fenoxycarb+TX, Fenpropathrin+TX, Fenpyroxymate+TX, Fensulfothion+TX, Fenthion+TX, Fentinacetate+TX, Fenvalerate+TX, Fipronil+TX, Flometoquin+TX, Flonicamid+TX, Fluacrypyrim+TX, Fluazaindolizine+TX, Fluazuron+TX, Flubendiamide+TX, Flubenzimine+TX, Flucitrinate+TX, Flucycloxuron+TX, Flucythrinate+TX, Fluensulfone+TX, Flufenerim+TX, Flufenprox+TX, Flufiprole+TX, Fluhexafon+TX, Flumethrin+TX, Fluopyram+TX, Flupentiofenox+TX, Flupyradifurone+TX, Flupyrimin+TX, Fluralaner+TX, Fluvalinate+TX, Fluxametamide+TX, Fosthiazate+TX, Gamma-Cyhalothrin+TX, Gossyplure™+TX, Guadipyr+TX, Halofenozide+TX, Halofenozide+TX, Halofenprox+TX, Heptafluthrin+TX, Hexythiazox+TX, Hydramethylnon+TX, Imicyafos+TX, Imidacloprid+TX, Imiprothrin+TX, Indoxacarb+TX, Iodomethane+TX, Iprodione+TX, Isocycloseram+TX, Isothioate+TX, Ivermectin+TX, Kappa-bifenthrin+TX, Kappa-tefluthrin+TX, Lambda-Cyhalothrin+TX, Lepimectin+TX, Lufenuron+TX, Metaflumizone+TX, Metaldehyde+TX, Metam+TX, Methomyl+TX, Methoxyfenozide+TX, Metofluthrin+TX, Metolcarb+TX, Mexacarbate+TX, Milbemectin+TX, Momfluorothrin+TX, Niclosamide+TX, Nitenpyram+TX, Nithiazine+TX, Omethoate+TX, Oxamyl+TX, Oxazosufyl+TX, Parathion-ethyl+TX, Permethrin+TX, Phenothrin+TX, Phosphocarb+TX, Piperonylbutoxide+TX, Pirimicarb+TX, Pirimiphos-ethyl+TX, Polyhedrosis virus+TX, Prallethrin+TX, Profenofos+TX, Profenofos+TX, Profluthrin+TX, Propargite+TX, Propetamphos+TX, Propoxur+TX, Prothiophos+TX, Protrifenbute+TX, Pyflubumide+TX, Pymetrozine+TX, Pyraclofos+TX, Pyrafluprole+TX, Pyridaben+TX, Pyridalyl+TX, Pyrifluquinazon+TX, Pyrimidifen+TX, Pyrimostrobin+TX, Pyriprole+TX, Pyriproxyfen+TX, Resmethrin+TX, Sarolaner+TX, Selamectin+TX, Silafluofen+TX, Spinetoram+TX, Spinosad+TX, Spirodiclofen+TX, Spiromesifen+TX, Spiropidion+TX, Spirotetramat+TX, Sulfoxaflor+TX, Tebufenozide+TX, Tebufenpyrad+TX, Tebupirimiphos+TX, Tefluthrin+TX, Temephos+TX, Tetrachloraniliprole+TX, Tetradiphon+TX, Tetramethrin+TX, Tetramethylfluthrin+TX, Tetranactin+TX, Tetraniliprole+TX, Thetacypermethrin+TX, Thiacloprid+TX, Thiamethoxam+TX, Thiocyclam+TX, Thiodicarb+TX, Thiofanox+TX, Thiometon+TX, Thiosultap+TX, Tioxazafen+TX, Tolfenpyrad+TX, Toxaphene+TX, Tralomethrin+TX, Transfluthrin+TX, Triazamate+TX, Triazophos+TX, Trichlorfon+TX, Trichloronate+TX, Trichlorphon+TX, Triflumezopyrim+TX, Tyclopyrazoflor+TX, Zeta-Cypermethrin+TX, Extract of seaweed and fermentation product derived from melasse+TX, Extract of seaweed and fermentation product derived from melasse comprising urea+TX, amino acids+TX, potassium and molybdenum and EDTA-chelated manganese+TX, Extract of seaweed and fermented plant products+TX, Extract of seaweed and fermented plant products comprising phytohormones+TX, vitamins+TX, EDTA-chelated copper+TX, zinc+TX, and iron+TX, Azadirachtin+TX, *Bacillus aizawai*+TX, *Bacillus chitinosporus* AQ746 (NRRL Accession No B-21 618)+TX, *Bacillus firmus*+TX, *Bacillus kurstaki*+TX, *Bacillus mycoides* AQ726 (NRRL Accession No. B-21664)+TX, *Bacillus pumilus* (NRRL Accession No B-30087)+TX, *Bacillus pumilus* AQ717 (NRRL Accession No. B-21662)+TX, *Bacillus* sp. AQ178 (ATCC Accession No. 53522)+TX, *Bacillus* sp. AQ175 (ATCC Accession No. 55608)+TX, *Bacillus* sp. AQ177 (ATCC Accession No. 55609)+TX, *Bacillus subtilis* unspecified+TX, *Bacillus subtilis* AQ153 (ATCC Accession No. 55614)+TX, *Bacillus subtilis* AQ30002 (NRRL Accession No. B-50421)+TX, *Bacillus subtilis* AQ30004 (NRRL Accession No. B-50455)+TX, *Bacillus subtilis* AQ713 (NRRL Accession No. B-21661)+TX, *Bacillus subtilis* AQ743 (NRRL Accession No. B-21665)+TX, *Bacillus thuringiensis* AQ52 (NRRL Accession No. B-21619)+TX, *Bacillus thuringiensis* BD #32 (NRRL Accession No B-21530)+TX, *Bacillus thuringiensis* subspec. kurstaki BMP 123+TX, *Beauveria bassiana*+TX, D-limonene+TX, Granulovirus+TX, Harpin+TX, *Helicoverpa armigera* Nucleopolyhedrovirus+TX, *Helicoverpa zea* Nucleopolyhedrovirus+TX, *Heliothis virescens* Nucleopolyhedrovirus+TX, *Heliothis punctigera* Nucleopolyhedrovirus+TX, *Metarhizium* spp.+TX, *Muscodor albus* 620 (NRRL Accession No. 30547)+TX, *Muscodor roseus* A3-5 (NRRL Accession No. 30548)+TX, Neem tree based products+TX, *Paecilomyces fumosoroseus*+TX, *Paecilomyces lilacinus*+TX, *Pasteuria nishizawae*+TX, *Pasteuria penetrans*+TX, *Pasteuria ramosa*+TX, *Pasteuria thornei*+TX, *Pasteuria usgae*+TX, P-cymene+TX, *Plutella xylostella* Granulosis virus+TX, *Plutella xylostella* Nucleopolyhedrovirus+TX, Polyhedrosis virus+TX, pyrethrum+TX, QRD 420 (a terpenoid blend)+TX, QRD 452 (a terpenoid blend)+TX, QRD 460 (a terpenoid blend)+TX, Quillaja *saponaria*+TX, *Rhodococcus globerulus* AQ719 (NRRL Accession No B-21663)+TX, *Spodoptera frugiperda* Nucleopolyhedrovirus+TX, *Streptomyces galbus* (NRRL Accession No. 30232)+TX, *Streptomyces* sp. (NRRL Accession No. B-30145)+TX, Terpenoid blend+TX, and *Verticillium* spp., an algicide selected from the group of substances consisting of bethoxazin [CCN]+TX, copper dioctanoate (IUPAC name) (170)+TX, copper sulfate (172)+TX, cybutryne [CCN]+TX, dichlone (1052)+TX, dichlorophen (232)+TX, endothal (295)+TX, fentin (347)+TX, hydrated lime [CCN]+TX, nabam (566)+TX, quinoclamine (714)+TX, quinonamid (1379)+TX, simazine (730)+TX, triphenyltin acetate (IUPAC name) (347) and triphenyltin hydroxide (IUPAC name) (347)+TX, an anthelmintic selected from the group of substances consisting of abamectin (1)+TX, crufomate (1011)+TX, Cyclobutrifluram+TX, doramectin (alternative name) [CCN]+TX, emamectin (291)+TX, emamectin benzoate (291)+TX, eprinomectin (alternative name) [CCN]+TX, ivermectin (alternative name) [CCN]+TX, milbemycin oxime (alternative name) [CCN]+TX, moxidectin (alternative name) [CCN]+TX, piperazine [CCN]+TX, selamectin (alternative name) [CCN]+TX, spinosad (737) and thiophanate (1435)+TX, an avicide selected from the group of substances consisting of chloralose (127)+TX, endrin (1122)+TX, fenthion (346)+TX, pyridin-4-amine (IUPAC name) (23) and strychnine (745)+TX, a bactericide selected from the group of substances consisting of 1-hydroxy-1H-pyridine-2-thione (IUPAC name) (1222)+TX, 4-(quinoxalin-2-ylamino)benzenesulfonamide (IUPAC name) (748)+TX, 8-hydroxyquinoline sulfate (446)+TX, bronopol (97)+TX, copper dioctanoate (IUPAC name) (170)+TX, copper hydroxide (IUPAC name) (169)+TX, cresol [CCN]+TX, dichlorophen (232)+TX, dipyrithione (1105)+TX, dodicin (1112)+TX, fenaminosulf (1144)+TX, formaldehyde (404)+TX, hydrargaphen (alternative name) [CCN]+TX, kasugamycin (483)+TX, kasugamycin hydrochloride hydrate (483)+TX, nickel bis(dimethyldithiocarbamate) (IUPAC name) (1308)+TX, nitrapyrin (580)+TX, octhilinone (590)+TX, oxolinic acid (606)+TX, oxytetracycline (611)+TX, potassium hydroxyquinoline sulfate (446)+TX, probenazole (658)+TX, streptomycin (744)+TX, streptomycin sesquisulfate (744)+TX, tecloftalam (766)+TX, and thiomersal (alternative name) [CCN]+TX, a biological agent selected from the group of substances consisting of *Adoxophyes orana* GV (alternative name) (12)+TX, *Agrobacterium radiobacter* (alternative name) (13)+TX, *Amblyseius* spp. (alternative name) (19)+TX, *Anagrapha falcifera* NPV (alternative name) (28)+TX, *Anagrus atomus* (alternative name) (29)+TX, *Aphelinus abdominalis* (alternative name) (33)+TX, *Aphidius colemani* (alternative name) (34)+TX, *Aphidoletes aphidimyza* (alternative name) (35)+TX, *Autographa californica* NPV (alternative name) (38)+

TX, *Bacillus firmus* (alternative name) (48)+TX, *Bacillus sphaericus* Neide (scientific name) (49)+TX, *Bacillus thuringiensis* Berliner (scientific name) (51)+TX, *Bacillus thuringiensis* subsp. *aizawai* (scientific name) (51)+TX, *Bacillus thuringiensis* subsp. *israelensis* (scientific name) (51)+TX, *Bacillus thuringiensis* subsp. *japonensis* (scientific name) (51)+TX, *Bacillus thuringiensis* subsp. kurstaki (scientific name) (51)+TX, *Bacillus thuringiensis* subsp. *tenebrionis* (scientific name) (51)+TX, *Beauveria bassiana* (alternative name) (53)+TX, *Beauveria brongniartii* (alternative name) (54)+TX, *Chrysoperla carnea* (alternative name) (151)+TX, *Cryptolaemus montrouzieri* (alternative name) (178)+TX, *Cydia pomonella* GV (alternative name) (191)+TX, *Dacnusa sibirica* (alternative name) (212)+TX, *Diglyphus isaea* (alternative name) (254)+TX, *Encarsia formosa* (scientific name) (293)+TX, *Eretmocerus eremicus* (alternative name) (300)+TX, *Helicoverpa zea* NPV (alternative name) (431)+TX, *Heterorhabditis bacteriophora* and *H. megidis* (alternative name) (433)+TX, *Hippodamia convergens* (alternative name) (442)+TX, *Leptomastix dactylopfi* (alternative name) (488)+TX, *Macrolophus caliginosus* (alternative name) (491)+TX, *Mamestra brassicae* NPV (alternative name) (494)+TX, *Metaphycus helvolus* (alternative name) (522)+TX, *Metarhizium anisopliae* var. *acridum* (scientific name) (523)+TX, *Metarhizium anisopliae* var. *anisopliae* (scientific name) (523)+TX, *Neodiprion sertifer* NPV and *N. lecontei* NPV (alternative name) (575)+TX, *Orius* spp. (alternative name) (596)+TX, *Paecilomyces fumosoroseus* (alternative name) (613)+TX, *Phytoseiulus persimilis* (alternative name) (644)+TX, *Spodoptera exigua* multicapsid nuclear polyhedrosis virus (scientific name) (741)+TX, *Steinernema bibionis* (alternative name) (742)+TX, *Steinernema carpocapsae* (alternative name) (742)+TX, *Steinernema feltiae* (alternative name) (742)+TX, *Steinernema glaseri* (alternative name) (742)+TX, *Steinernema riobrave* (alternative name) (742)+TX, *Steinernema riobravis* (alternative name) (742)+TX, *Steinernema scapterisci* (alternative name) (742)+TX, *Steinernema* spp. (alternative name) (742)+TX, *Trichogramma* spp. (alternative name) (826)+TX, *Typhlodromus occidentalis* (alternative name) (844) and *Verticillium lecanfi* (alternative name) (848)+TX, a soil sterilant selected from the group of substances consisting of iodomethane (IUPAC name) (542) and methyl bromide (537)+TX, a chemosterilant selected from the group of substances consisting of apholate [CCN]+TX, bisazir (alternative name) [CCN]+TX, busulfan (alternative name) [CCN]+TX, diflubenzuron (250)+TX, dimatif (alternative name) [CCN]+TX, hemel [CCN]+TX, hempa [CCN]+TX, metepa [CCN]+TX, methiotepa [CCN]+TX, methyl apholate [CCN]+TX, morzid [CCN]+TX, penfluron (alternative name) [CCN]+TX, tepa [CCN]+TX, thiohempa (alternative name) [CCN]+TX, thiotepa (alternative name) [CCN]+TX, tretamine (alternative name) [CCN] and uredepa (alternative name) [CCN]+TX, an insect pheromone selected from the group of substances consisting of (E)-dec-5-en-1-yl acetate with (E)-dec-5-en-1-ol (IUPAC name) (222)+TX, (E)-tridec-4-en-1-yl acetate (IUPAC name) (829)+TX, (E)-6-methylhept-2-en-4-ol (IUPAC name) (541)+TX, (E,Z)-tetradeca-4,10-dien-1-yl acetate (IUPAC name) (779)+TX, (Z)-dodec-7-en-1-yl acetate (IUPAC name) (285)+TX, (Z)-hexadec-11-enal (IUPAC name) (436)+TX, (Z)-hexadec-11-en-1-yl acetate (IUPAC name) (437)+TX, (Z)-hexadec-13-en-11-yn-1-yl acetate (IUPAC name) (438)+TX, (Z)-icos-13-en-10-one (IUPAC name) (448)+TX, (Z)-tetradec-7-en-1-al (IUPAC name) (782)+TX, (Z)-tetradec-9-en-1-ol (IUPAC name) (783)+TX, (Z)-tetradec-9-en-1-yl acetate (IUPAC name) (784)+TX, (7E,9Z)-dodeca-7,9-dien-1-yl acetate (IUPAC name) (283)+TX, (9Z,11E)-tetradeca-9,11-dien-1-yl acetate (IUPAC name) (780)+TX, (9Z, 12E)-tetradeca-9,12-dien-1-yl acetate (IUPAC name) (781)+TX, 14-methyloctadec-1-ene (IUPAC name) (545)+TX, 4-methylnonan-5-ol with 4-methylnonan-5-one (IUPAC name) (544)+TX, alpha-multistriatin (alternative name) [CCN]+TX, brevicomin (alternative name) [CCN]+TX, codlelure (alternative name) [CCN]+TX, codlemone (alternative name) (167)+TX, cuelure (alternative name) (179)+TX, disparlure (277)+TX, dodec-8-en-1-yl acetate (IUPAC name) (286)+TX, dodec-9-en-1-yl acetate (IUPAC name) (287)+TX, dodeca-8+TX, 10-dien-1-yl acetate (IUPAC name) (284)+TX, dominicalure (alternative name) [CCN]+TX, ethyl 4-methyloctanoate (IUPAC name) (317)+TX, eugenol (alternative name) [CCN]+TX, frontalin (alternative name) [CCN]+TX, gossyplure (alternative name) (420)+TX, grandlure (421)+TX, grandlure I (alternative name) (421)+TX, grandlure II (alternative name) (421)+TX, grandlure III (alternative name) (421)+TX, grandlure IV (alternative name) (421)+TX, hexalure [CCN]+TX, ipsdienol (alternative name) [CCN]+TX, ipsenol (alternative name) [CCN]+TX, japonilure (alternative name) (481)+TX, lineatin (alternative name) [CCN]+TX, litlure (alternative name) [CCN]+TX, looplure (alternative name) [CCN]+TX, medlure [CCN]+TX, megatomoic acid (alternative name) [CCN]+TX, methyl eugenol (alternative name) (540)+TX, muscalure (563)+TX, octadeca-2,13-dien-1-yl acetate (IUPAC name) (588)+TX, octadeca-3,13-dien-1-yl acetate (IUPAC name) (589)+TX, orfralure (alternative name) [CCN]+TX, oryctalure (alternative name) (317)+TX, ostramone (alternative name) [CCN]+TX, siglure [CCN]+TX, sordidin (alternative name) (736)+TX, sulcatol (alternative name) [CCN]+TX, tetradec-11-en-1-yl acetate (IUPAC name) (785)+TX, trimedlure (839)+TX, trimedlure A (alternative name) (839)+TX, trimedlure $B_1$ (alternative name) (839)+TX, trimedlure B2 (alternative name) (839)+TX, trimedlure C (alternative name) (839) and trunc-call (alternative name) [CCN]+TX, an insect repellent selected from the group of substances consisting of 2-(octylthio)ethanol (IUPAC name) (591)+TX, butopyronoxyl (933)+TX, butoxy(polypropylene glycol) (936)+TX, dibutyl adipate (IUPAC name) (1046)+TX, dibutyl phthalate (1047)+TX, dibutyl succinate (IUPAC name) (1048)+TX, diethyltoluamide [CCN]+TX, dimethyl carbate [CCN]+TX, dimethyl phthalate [CCN]+TX, ethyl hexanediol (1137)+TX, hexamide [CCN]+TX, methoquin-butyl (1276)+TX, methylneodecanamide [CCN]+TX, oxamate [CCN] and picaridin [CCN]+TX, a molluscicide selected from the group of substances consisting of bis(tributyltin) oxide (IUPAC name) (913)+TX, bromoacetamide [CCN]+TX, calcium arsenate [CCN]+TX, cloethocarb (999)+TX, copper acetoarsenite [CCN]+TX, copper sulfate (172)+TX, fentin (347)+TX, ferric phosphate (IUPAC name) (352)+TX, metaldehyde (518)+TX, methiocarb (530)+

TX, niclosamide (576)+TX, niclosamide-olamine (576)+TX, pentachlorophenol (623)+TX, sodium pentachlorophenoxide (623)+TX, tazimcarb (1412)+TX, thiodicarb (799)+TX, tributyltin oxide (913)+TX, trifenmorph (1454)+TX, trimethacarb (840)+TX, triphenyltin acetate (IUPAC name) (347) and triphenyltin hydroxide (IUPAC name) (347)+TX, pyriprole [394730-71-3]+TX, a nematicide selected from the group of substances consisting of AKD-3088 (compound code)+TX, 1,2-dibromo-3-chloropropane (IUPAC/Chemical Abstracts name) (1045)+TX, 1,2-dichloropropane (IUPAC/Chemical Abstracts name) (1062)+TX, 1,2-dichloropropane with 1,3-dichloropropene (IUPAC name) (1063)+TX, 1,3-dichloropropene (233)+TX, 3,4-dichlorotetrahydrothiophene 1,1-dioxide (IUPAC/Chemical Abstracts name) (1065)+TX, 3-(4-chlorophenyl)-5-methylrhodanine (IUPAC name) (980)+TX, 5-methyl-6-thioxo-1,3,5-thiadiazinan-3-ylacetic acid (IUPAC name) (1286)+TX, 6-isopentenylaminopurine (alternative name) (210)+TX, abamectin (1)+TX, acetoprole [CCN]+TX, alanycarb (15)+TX, aldicarb (16)+TX, aldoxycarb (863)+TX, AZ 60541 (compound code)+TX, benclothiaz [CCN]+TX, benomyl (62)+TX, butylpyridaben (alternative name)+TX, cadusafos (109)+TX, carbofuran (118)+TX, carbon disulfide (945)+TX, carbosulfan (119)+TX, chloropicrin (141)+TX, chlorpyrifos (145)+TX, cloethocarb (999)+TX, Cyclobutrifluram+TX, cytokinins (alternative name) (210)+TX, dazomet (216)+TX, DBCP (1045)+TX, DCIP (218)+TX, diamidafos (1044)+TX, dichlofenthion (1051)+TX, dicliphos (alternative name)+TX, dimethoate (262)+TX, doramectin (alternative name) [CCN]+TX, emamectin (291)+TX, emamectin benzoate (291)+TX, eprinomectin (alternative name) [CCN]+TX, ethoprophos (312)+TX, ethylene dibromide (316)+TX, fenamiphos (326)+TX, fenpyrad (alternative name)+TX, fensulfothion (1158)+TX, fosthiazate (408)+TX, fosthietan (1196)+TX, furfural (alternative name) [CCN]+TX, GY-81 (development code) (423)+TX, heterophos [CCN]+TX, iodomethane (IUPAC name) (542)+TX, isamidofos (1230)+TX, isazofos (1231)+TX, ivermectin (alternative name) [CCN]+TX, kinetin (alternative name) (210)+TX, mecarphon (1258)+TX, metam (519)+TX, metam-potassium (alternative name) (519)+TX, metam-sodium (519)+TX, methyl bromide (537)+TX, methyl isothiocyanate (543)+TX, milbemycin oxime (alternative name) [CCN]+TX, moxidectin (alternative name) [CCN]+TX, *Myrothecium verrucaria* composition (alternative name) (565)+TX, NC-184 (compound code)+TX, oxamyl (602)+TX, phorate (636)+TX, phosphamidon (639)+TX, phosphocarb [CCN]+TX, sebufos (alternative name)+TX, selamectin (alternative name) [CCN]+TX, spinosad (737)+TX, terbam (alternative name)+TX, terbufos (773)+TX, tetrachlorothiophene (IUPAC/Chemical Abstracts name) (1422)+TX, thiafenox (alternative name)+TX, thionazin (1434)+TX, triazophos (820)+TX, triazuron (alternative name)+TX, xylenols [CCN]+TX, YI-5302 (compound code) and zeatin (alternative name) (210)+TX, fluensulfone [318290-98-1]+TX, fluopyram+TX, a nitrification inhibitor selected from the group of substances consisting of potassium ethylxanthate [CCN] and nitrapyrin (580)+TX, a plant activator selected from the group of substances consisting of acibenzolar (6)+TX, acibenzolar-S-methyl (6)+TX, probenazole (658) and *Reynoutria sachalinensis* extract (alternative name) (720)+TX, a rodenticide selected from the group of substances consisting of 2-isovalerylindan-1,3-dione (IUPAC name) (1246)+TX, 4-(quinoxalin-2-ylamino)benzenesulfonamide (IUPAC name) (748)+TX, alpha-chlorohydrin [CCN]+TX, aluminium phosphide (640)+TX, antu (880)+TX, arsenous oxide (882)+TX, barium carbonate (891)+TX, bisthiosemi (912)+TX, brodifacoum (89)+TX, bromadiolone (91)+TX, bromethalin (92)+TX, calcium cyanide (444)+TX, chloralose (127)+TX, chlorophacinone (140)+TX, cholecalciferol (alternative name) (850)+TX, coumachlor (1004)+TX, coumafuryl (1005)+TX, coumatetralyl (175)+TX, crimidine (1009)+TX, difenacoum (246)+TX, difethialone (249)+TX, diphacinone (273)+TX, ergocalciferol (301)+TX, flocoumafen (357)+TX, fluoroacetamide (379)+TX, flupropadine (1183)+TX, flupropadine hydrochloride (1183)+TX, gamma-HCH (430)+TX, HCH (430)+TX, hydrogen cyanide (444)+TX, iodomethane (IUPAC name) (542)+TX, lindane (430)+TX, magnesium phosphide (IUPAC name) (640)+TX, methyl bromide (537)+TX, norbormide (1318)+TX, phosacetim (1336)+TX, phosphine (IUPAC name) (640)+TX, phosphorus [CCN]+TX, pindone (1341)+TX, potassium arsenite [CCN]+TX, pyrinuron (1371)+TX, scilliroside (1390)+TX, sodium arsenite [CCN]+TX, sodium cyanide (444)+TX, sodium fluoroacetate (735)+TX, strychnine (745)+TX, thallium sulfate [CCN]+TX, warfarin (851) and zinc phosphide (640)+TX, a synergist selected from the group of substances consisting of 2-(2-butoxyethoxy)ethyl piperonylate (IUPAC name) (934)+TX, 5-(1,3-benzodioxol-5-yl)-3-hexylcyclohex-2-enone (IUPAC name) (903)+TX, farnesol with nerolidol (alternative name) (324)+TX, MB-599 (development code) (498)+TX, MGK 264 (development code) (296)+TX, piperonyl butoxide (649)+TX, piprotal (1343)+TX, propyl isomer (1358)+TX, S421 (development code) (724)+TX, sesamex (1393)+TX, sesamolin (1394) and sulfoxide (1406)+TX, an animal repellent selected from the group of substances consisting of anthraquinone (32)+TX, chloralose (127)+TX, copper naphthenate [CCN]+TX, copper oxychloride (171)+TX, diazinon (227)+TX, dicyclopentadiene (chemical name) (1069)+TX, guazatine (422)+TX, guazatine acetates (422)+TX, methiocarb (530)+TX, pyridin-4-amine (IUPAC name) (23)+TX, thiram (804)+TX, trimethacarb (840)+TX, zinc naphthenate [CCN] and ziram (856)+TX, a virucide selected from the group of substances consisting of imanin (alternative name) [CCN] and ribavirin (alternative name) [CCN]+TX, a wound protectant selected from the group of substances consisting of mercuric oxide (512)+TX, octhilinone (590) and thiophanate-methyl (802)+TX, a biologically active substance selected from 1,1-bis(4-chloro-phenyl)-2-ethoxyethanol+TX, 2,4-dichlorophenyl benzenesulfonate+TX, 2-fluoro-N-methyl-N-1-naphthylacetamide+TX, 4-chlorophenyl phenyl sulfone+TX, acetoprole+TX, aldoxycarb+TX, amidithion+TX, amidothioate+TX, amiton+TX, amiton hydrogen oxalate+TX, amitraz+TX, aramite+TX, arsenous oxide+TX, azobenzene+TX, azothoate+TX, benomyl+TX, benoxa-fos+TX, benzyl benzoate+TX, bixafen+TX, brofenvalerate+TX, bromo-cyclen+TX, bromophos+TX, bromopropylate+TX, buprofezin+

TX, butocarboxim+TX, butoxycarboxim+TX, butylpyridaben+TX, calcium polysulfide+TX, camphechlor+TX, carbanolate+TX, carbophenothion+TX, cymiazole+TX, chino-methionat+TX, chlorbenside+TX, chlordimeform+TX, chlordimeform hydrochloride+TX, chlorfenethol+TX, chlorfenson+TX, chlorfensulfide+TX, chlorobenzilate+TX, chloromebuform+TX, chloromethiuron+TX, chloropropylate+TX, chlorthiophos+TX, cinerin I+TX, cinerin II+TX, cinerins+TX, closantel+TX, coumaphos+TX, crotamiton+TX, crotoxyphos+TX, cufraneb+TX, cyanthoate+TX, DCPM+TX, DDT+TX, demephion+TX, demephion-O+TX, demephion-S+TX, demeton-methyl+TX, demeton-O+TX, demeton-O-methyl+TX, demeton-S+TX, demeton-S-methyl+TX, demeton-S-methylsulfon+TX, dichlofluanid+TX, dichlorvos+TX, dicliphos+TX, dienochlor+TX, dimefox+TX, dinex+TX, dinex-diclexine+TX, dinocap-4+TX, dinocap-6+TX, dinocton+TX, dino-penton+TX, dinosulfon+TX, dinoterbon+TX, dioxathion+TX, diphenyl sulfone+TX, disulfiram+TX, DNOC+TX, dofenapyn+TX, dorामectin+TX, endothion+TX, eprinomectin+TX, ethoate-methyl+TX, etrimfos+TX, fenazaflor+TX, fenbutatin oxide+TX, fenothiocarb+TX, fenpyrad+TX, fen-pyroximate+TX, fenpyrazamine+TX, fenson+TX, fentrifanil+TX, flubenzimine+TX, flucycloxuron+TX, fluenetil+TX, fluorbenside+TX, FMC 1137+TX, formetanate+TX, formetanate hydrochloride+TX, formparanate+TX, gamma-HCH+TX, glyodin+TX, halfenprox+TX, hexadecyl cyclopropanecarboxylate+TX, isocarbophos+TX, jasmolin I+TX, jasmolin II+TX, jodfenphos+TX, lindane+TX, malonoben+TX, mecarbam+TX, mephosfolan+TX, mesulfen+TX, methacrifos+TX, methyl bromide+TX, metolcarb+TX, mexacarbate+TX, milbemycin oxime+TX, mipafox+TX, monocrotophos+TX, morphothion+TX, moxidectin+TX, naled+TX, 4-chloro-2-(2-chloro-2-methylpropyl)-5-[(6-iodo-3-pyridyl)methoxy]pyridazin-3-one+TX, nifluridide+TX, nikkomycins+TX, nitrilacarb+TX, nitrilacarb 1:1 zinc chloride complex+TX, omethoate+TX, oxydeprofos+TX, oxydisulfoton+TX, pp'-DDT+TX, parathion+TX, permethrin+TX, phenkapton+TX, phosalone+TX, phosfolan+TX, phosphamidon+TX, polychloroterpenes+TX, polynactins+TX, proclonol+TX, promacyl+TX, propoxur+TX, prothidathion+TX, prothoate+TX, pyrethrin I+TX, pyrethrin II+TX, pyrethrins+TX, pyridaphenthion+TX, pyrimitate+TX, quinalphos+TX, quintiofos+TX, R-1492+TX, phosglycin+TX, rotenone+TX, schradan+TX, sebufos+TX, selamectin+TX, sophamide+TX, SSI-121+TX, sulfiram+TX, sulfluramid+TX, sulfotep+TX, sulfur+TX, diflovidazin+TX, tau-fluvalinate+TX, TEPP+TX, terbam+TX, tetradifon+TX, tetrasul+TX, thiafenox+TX, thiocarboxime+TX, thiofanox+TX, thiometon+TX, thioquinox+TX, thuringiensin+TX, triamiphos+TX, triarathene+TX, triazophos+TX, triazuron+TX, trifenofos+TX, trinactin+TX, vamidothion+TX, vaniliprole+TX, bethoxazin+TX, copper dioctanoate+TX, copper sulfate+TX, cybutryne+TX, dichlone+TX, dichlorophen+TX, endothal+TX, fentin+TX, hydrated lime+TX, nabam+TX, quinoclamine+TX, quinonamid+TX, simazine+TX, triphenyltin acetate+TX, triphenyltin hydroxide+TX, crufomate+TX, piperazine+TX, thiophanate+TX, chloralose+TX, fenthion+TX, pyridin-4-amine+TX, strychnine+TX, 1-hydroxy-1H-pyridine-2-thione+TX, 4-(quinoxalin-2-ylamino)benzenesulfonamide+TX, 8-hydroxyquinoline sulfate+TX, bronopol+TX, copper hydroxide+TX, cresol+TX, dipyrithione+TX, dodicin+TX, fenaminosulf+TX, formaldehyde+TX, hydrargaphen+TX, kasugamycin+TX, kasugamycin hydrochloride hydrate+TX, nickel bis (dimethyldithiocarbamate)+TX, nitrapyrin+TX, octhilinone+TX, oxolinic acid+TX, oxytetracycline+TX, potassium hydroxyquinoline sulfate+TX, probenazole+TX, streptomycin+TX, streptomycin sesquisulfate+TX, tecloftalam+TX, thiomersal+TX, *Adoxophyes orana* GV+TX, *Agrobacterium radiobacter*+TX, *Amblyseius* spp.+TX, *Anagrapha falcifera* NPV+TX, *Anagrus atomus*+TX, *Aphelinus abdominalis*+TX, *Aphidius colemani*+TX, *Aphidoletes aphidimyza*+TX, *Autographa californica* NPV+TX, *Bacillus sphaericus* Neide+TX, *Beauveria brongniartii*+TX, *Chrysoperla carnea*+TX, *Cryptolaemus montrouzieri*+TX, *Cydia pomonella* GV+TX, *Dacnusa sibirica*+TX, *Diglyphus isaea*+TX, *Encarsia formosa*+TX, *Eretmocerus eremicus*+TX, *Heterorhabditis bacteriophora* and *H. megidis*+TX, *Hippodamia convergens*+TX, *Leptomastix dactylopii*+TX, *Macrolophus caliginosus*+TX, *Mamestra brassicae* NPV+TX, *Metaphycus helvolus*+TX, *Metarhizium anisopliae* var. *acridum*+TX, *Metarhizium anisopliae* var. *anisopliae*+TX, *Neodiprion sertifer* NPV and *N. lecontei* NPV+TX, *Orius* spp.+TX, *Paecilomyces fumosoroseus*+TX, *Phytoseiulus persimilis*+TX, *Steinernema bibionis*+TX, *Steinernema carpocapsae*+TX, *Steinernema feltiae*+TX, *Steinernema glaseri*+TX, *Steinernema riobrave*+TX, *Steinernema riobravis*+TX, *Steinernema scapterisci*+TX, *Steinernema* spp.+TX, *Trichogramma* spp.+TX, *Typhlodromus occidentalis*+TX, *Verticillium lecanii*+TX, apholate+TX, bisazir+TX, busulfan+TX, dimatif+TX, hemel+TX, hempa+TX, metepa+TX, methiotepa+TX, methyl apholate+TX, morzid+TX, penfluron+TX, tepa+TX, thiohempa+TX, thiotepa+TX, tretamine+TX, uredepa+TX, (E)-dec-5-en-1-yl acetate with (E)-dec-5-en-1-ol+TX, (E)-tridec-4-en-1-yl acetate+TX, (E)-6-methylhept-2-en-4-ol+TX, (E,Z)-tetradeca-4,10-dien-1-yl acetate+TX, (Z)-dodec-7-en-1-yl acetate+TX, (Z)-hexadec-11-enal+TX, (Z)-hexadec-11-en-1-yl acetate+TX, (Z)-hexadec-13-en-11-yn-1-yl acetate+TX, (Z)-icos-13-en-10-one+TX, (Z)-tetradec-7-en-1-al+TX, (Z)-tetradec-9-en-1-ol+TX, (Z)-tetradec-9-en-1-yl acetate+TX, (7E,9Z)-dodeca-7,9-dien-1-yl acetate+TX, (9Z,11E)-tetradeca-9,11-dien-1-yl acetate+TX, (9Z,12E)-tetradeca-9,12-dien-1-yl acetate+TX, 14-methyloctadec-1-ene+TX, 4-methylnonan-5-ol with 4-methylnonan-5-one+TX, alpha-multistriatin+TX, brevicomin+TX, codlelure+TX, codlemone+TX, cuelure+TX, disparlure+TX, dodec-8-en-1-yl acetate+TX, dodec-9-en-1-yl acetate+TX, dodeca-8+TX, 10-dien-1-yl acetate+TX, dominicalure+TX, ethyl 4-methyloctanoate+TX, eugenol+TX, frontalin+TX, grandlure+TX, grandlure I+TX, grandlure II+TX, grandlure III+TX, grandlure IV+TX, hexalure+TX, ipsdienol+TX, ipsenol+TX, japonilure+TX, lineatin+TX, litlure+TX, looplure+TX, medlure+TX, megatomoic acid+TX, methyl eugenol+TX, muscalure+TX, octadeca-2,13-dien-1-yl acetate+TX, octadeca-3,13-dien-1-yl acetate+TX, orfralure+TX, oryctalure+TX, ostramone+TX, siglure+TX, sordidin+TX, sulcatol+TX, tetradec-11-en-1-yl acetate+TX, trimedlure+TX, trimedlure A+TX, trimedlure $B_1$+TX, trimedlure $B_2$+TX, trimedlure C+TX, trunc-call+TX, 2-(octylthio)-ethanol+TX, butopyronoxyl+TX, butoxy(polypropylene glycol)+TX, dibutyl adipate+TX, dibutyl phthalate+TX, dibutyl succinate+TX, diethyltoluamide+TX, dimethyl carbate+TX, dimethyl phthalate+TX, ethyl hexanediol+TX, hexamide+TX, methoquinbutyl+TX, methylneodecanamide+TX, oxamate+TX, picaridin+TX, 1-dichloro-1-nitroethane+TX, 1,1-dichloro-2,2-bis(4-ethylphenyl)-ethane+TX, 1,2-dichloropropane with 1,3-dichloropropene+TX, 1-bromo-2-chloroethane+TX, 2,2,2-trichloro-1-(3,4-dichlorophenyl)ethyl acetate+TX, 2,2-dichlorovinyl 2-ethylsulfinylethyl methyl phosphate+TX, 2-(1,3-dithiolan-2-yl)phenyl dimethylcarbamate+TX, 2-(2-butoxyethoxy)ethyl thiocyanate+TX, 2-(4,5-dimethyl-1,3-dioxolan-2-yl)phenyl methylcarbamate+TX, 2-(4-chloro-3,5-xylyloxy)ethanol+TX, 2-chlorovinyl diethyl phosphate+TX, 2-imidazolidone+TX, 2-isovalerylindan-1,3-dione+TX, 2-methyl(prop-2-ynyl) aminophenyl methylcarbamate+TX, 2-thiocyanatoethyl laurate+TX, 3-bromo-1-chloroprop-1-ene+TX, 3-methyl-1-phenylpyrazol-5-yl dimethyl-carbamate+TX, 4-methyl(prop-2-ynyl)amino-3,5-xylyl methylcarbamate+TX, 5,5-dimethyl-3-oxocyclohex-1-enyl dimethylcarbamate+TX, acethion+TX, acrylonitrile+TX, aldrin+TX, allosamidin+TX, allyxycarb+TX, alpha-ecdysone+TX, aluminium phosphide+TX, aminocarb+TX, anabasine+TX, athidathion+TX, azamethiphos+TX, *Bacillus thuringiensis* delta endotoxins+TX, barium hexafluorosilicate+TX, barium polysulfide+TX, barthrin+TX, Bayer 22/190+TX, Bayer 22408+TX, beta-cyfluthrin+TX, beta-cypermethrin+TX, bioethanomethrin+TX, biopermethrin+TX, bis(2-chloroethyl) ether+TX, borax+TX, bromfenvinfos+TX, bromo-DDT+TX, bufencarb+TX, butacarb+TX, butathiofos+TX, butonate+TX, calcium arsenate+TX, calcium cyanide+TX, carbon disulfide+TX, carbon tetrachloride+TX, cartap hydrochloride+TX, cevadine+TX, chlorbicyclen+TX, chlordane+TX, chlordecone+TX, chloroform+TX, chloropicrin+TX, chlorphoxim+TX, chlorprazophos+TX, cis-resmethrin+TX, cismethrin+TX, clocythrin+TX, copper acetoarsenite+TX, copper arsenate+TX, copper oleate+TX, coumithoate+TX, cryolite+TX, CS 708+TX, cyanofenphos+TX, cyanophos+TX, cyclethrin+TX, cythioate+TX, d-tetramethrin+TX, DAEP+TX, dazomet+TX, decarbofuran+TX, diamidafos+TX, dicapthon+TX, dichlofenthion+TX, dicresyl+TX, dicyclanil+TX, dieldrin+TX, diethyl 5-methylpyrazol-3-yl phosphate+TX, dilor+TX, dimefluthrin+TX, dimetan+TX, dimethrin+TX, dimethylvinphos+TX, dimetilan+TX, dinoprop+TX, dinosam+TX, dinoseb+TX, diofenolan+TX, dioxabenzofos+TX, dithicrofos+TX, DSP+TX, ecdysterone+TX, El 1642+TX, EMPC+TX, EPBP+TX, etaphos+TX, ethiofencarb+TX, ethyl formate+TX, ethylene dibromide+TX, ethylene dichloride+TX, ethylene oxide+TX, EXD+TX, fenchlorphos+TX, fenethacarb+TX, fenitrothion+TX, fenoxacrim+TX, fenpirithrin+TX, fensulfothion+TX, fenthion-ethyl+TX, flucofuron+TX, fosmethilan+TX, fospirate+TX, fosthietan+TX, furathiocarb+TX, furethrin+TX, guazatine+TX, guazatine acetates+TX, sodium tetrathiocarbonate+TX, halfenprox+TX, HCH+TX, HEOD+TX, heptachlor+TX, heterophos+TX, HHDN+TX, hydrogen cyanide+TX, hyquincarb+TX, IPSP+TX, isazofos+TX, isobenzan+TX, isodrin+TX, isofenphos+TX, isolane+TX, isoprothiolane+TX, isoxathion+TX, juvenile hormone I+TX, juvenile hormone II+TX, juvenile hormone III+TX, kelevan+TX, kinoprene+TX, lead arsenate+TX, leptophos+TX, lirimfos+TX, lythidathion+TX, m-cumenyl methylcarbamate+TX, magnesium phosphide+TX, mazidox+TX, mecarphon+TX, menazon+TX, mercurous chloride+TX, mesulfenfos+TX, metam+TX, metam-potassium+TX, metam-sodium+TX, methanesulfonyl fluoride+TX, methocrotophos+TX, methoprene+TX, methothrin+TX, methoxychlor+TX, methyl isothiocyanate+TX, methylchloroform+TX, methylene chloride+TX, metoxadiazone+TX, mirex+TX, naftalofos+TX, naphthalene+TX, NC-170+TX, nicotine+TX, nicotine sulfate+TX, nithiazine+TX, nornicotine+TX, O-5-dichloro-4-iodophenyl O-ethyl ethylphosphonothioate+TX, O,O-diethyl O-4-methyl-2-oxo-2H-chromen-7-yl phosphorothioate+TX, O,O-diethyl O-6-methyl-2-propylpyrimidin-4-ylphosphorothioate+TX, O,O,O',O'-tetrapropyl dithiopyrophosphate+TX, oleic acid+TX, para-dichlorobenzene+TX, parathion-methyl+TX, pentachlorophenol+TX, pentachlorophenyl laurate+TX, PH 60-38+TX, phenkapton+TX, phosnichlor+TX, phosphine+TX, phoxim-methyl+TX, pirimetaphos+TX, polychlorodicyclopentadiene isomers+TX, potassium arsenite+TX, potassium thiocyanate+TX, precocene I+TX, precocene II+TX, precocene III+TX, primidophos+TX, profluthrin+TX, promecarb+TX, prothiofos+TX, pyrazophos+TX, pyresmethrin+TX, quassia+TX, quinalphos-methyl+TX, quinothion+TX, rafoxanide+TX, resmethrin+TX, rotenone+TX, kadethrin+TX, ryania+TX, ryanodine+TX, sabadilla)+TX, schradan+TX, sebufos+TX, SI-0009+TX, thiapronil+TX, sodium arsenite+TX, sodium cyanide+TX, sodium fluoride+TX, sodium hexafluorosilicate+TX, sodium pentachlorophenoxide+TX, sodium selenate+TX, sodium thiocyanate+TX, sulcofuron+TX, sulcofuron-sodium+TX, sulfuryl fluoride+TX, sulprofos+TX, tar oils+TX, tazimcarb+TX, TDE+TX, tebupirimfos+TX, temephos+TX, terallethrin+TX, tetrachloroethane+TX, thicrofos+TX, thiocyclam+TX, thiocyclam hydrogen oxalate+TX, thionazin+TX, thiosultap+TX, thiosultap-sodium+TX, tralomethrin+TX, transpermethrin+TX, triazamate+TX, trichlormetaphos-3+TX, trichloronat+TX, trimethacarb+TX, tolprocarb+TX, triclopyricarb+TX, triprene+TX, veratridine+TX, veratrine+TX, XMC+TX, zetamethrin+TX, zinc phosphide+TX, zolaprofos+TX, and meperfluthrin+TX, tetramethylfluthrin+TX, bis(tributyltin) oxide+TX, bromoacetamide+TX, ferric phosphate+TX, niclosamide-olamine+TX, tributyltin oxide+TX, pyrimorph+TX, trifenmorph+TX, 1,2-dibromo-3-chloropropane+TX, 1,3-dichloropropene+TX, 3,4-dichlorotetrahydrothiophene 1,1-dioxide+TX, 3-(4-chlorophenyl)-5-methylrhodanine+TX, 5-methyl-6-thioxo-1,3,5-thiadiazinan-3-ylacetic acid+TX, 6-isopentenylaminopurine+TX, 2-fluoro-N-(3-methoxyphenyl)-9H-purin-6-amine+TX, benclothiaz+TX, cytokinins+TX, DCIP+TX, furfural+TX, isamidofos+TX, kinetin+TX, *Myrothecium verrucaria* composition+TX, tetrachlorothiophene+TX, xylenols+TX, zeatin+TX, potassium ethylxanthate+TX, acibenzolar+TX, acibenzolar-S-methyl+TX, *Reynoutria sachalinensis* extract+TX, alpha-chlorohydrin+TX, antu+TX, barium carbonate+TX, bisthiosemi+TX, brodifacoum+TX, bromadiolone+TX, bromethalin+TX, chlorophacinone+TX, cholecalciferol+TX, coumachlor+TX, coumafuryl+TX, coumatetralyl+TX, crimidine+TX, difenacoum+TX, difethialone+TX, diphacinone+TX, ergocalciferol+TX, flocoumafen+TX, fluoroacetamide+TX, flupropadine+TX, flupropadine hydrochloride+TX, norbormide+TX, phosacetim+TX, phosphorus+TX, pindone+TX, pyrinuron+TX, scilliroside+TX, -sodium fluoroacetate+TX, thallium sulfate+TX, warfarin+TX, -2-(2-butoxyethoxy)ethyl piperonylate+TX, 5-(1,3-benzodioxol-5-yl)-3-hexylcyclohex-2-enone+TX, farnesol with nerolidol+TX, verbutin+TX, MGK 264+TX, piperonyl butoxide+TX, piprotal+TX, propyl isomer+TX, S421+TX, sesamex+TX, sesasmolin+TX, sulfoxide+TX, anthraquinone+TX, copper naphthenate+TX, copper oxychloride+TX, dicyclopentadiene+TX, thiram+TX, zinc naphthenate+TX, ziram+TX, imanin+TX, ribavirin+TX, mercuric oxide+TX, thiophanate-methyl+TX, azaconazole+TX, bitertanol+TX, bromuconazole+TX, cyproconazole+TX, difenoconazole+TX, diniconazole-+TX, epoxiconazole+TX, fenbuconazole+TX, fluquinconazole+TX, flusilazole+TX, flutriafol+TX, furametpyr+TX, hexaconazole+TX, imazalil-+TX, imiben-conazole+TX, ipconazole+TX, metconazole+TX, myclobutanil+TX, paclobutrazole+TX, pefurazoate+TX, penconazole+TX, prothioconazole+TX, pyrifenox+TX, prochloraz+TX, propiconazole+TX, pyrisoxazole+TX, -simeconazole+TX, tebucon-azole+TX, tetraconazole+TX, triadimefon+TX, triadimenol+TX, triflumizole+TX, triticonazole+TX, ancymidol+TX, fenarimol+TX, nuarimol+TX, bupirimate+TX, dimethirimol+TX, ethirimol+TX, dodemorph+TX, fenpropidine+TX, fenpropimorph+TX, spiroxamine+TX, tridemorph+TX, cyprodinil+TX, mepanipyrim+TX, pyrimethanil+TX, fenpiclonil+TX, fludioxonil+TX, benalaxyl+TX, furalaxyl+TX, -metalaxyl-+TX, Rmetalaxyl+TX, ofurace+TX, oxadixyl+TX, carbendazim+TX, debacarb+TX, fuberidazole-+TX, thiabendazole+TX, chlozolinate+TX, dichlozoline+TX, myclozoline-+TX, procymidone+TX, vinclozoline+TX, boscalid+TX, carboxin+TX, fenfuram+TX, flutolanil+TX, mepronil+TX, oxycarboxin+TX, penthiopyrad+TX, thifluzamide+TX, dodine+TX, iminoctadine+TX, azoxystrobin+TX, dimoxystrobin+TX, enestroburin+TX, fenaminstrobin+TX, flufenoxystrobin+TX, fluoxastrobin+TX, kresoxim-methyl+TX, metominostrobin+TX, trifloxystrobin+TX, orysastrobin+TX, picoxystrobin+TX, pyraclostrobin+TX, pyrametostrobin+TX, pyraoxystrobin+TX, ferbam+TX, mancozeb+TX, maneb+TX, metiram+TX, propineb+TX, zineb+TX, captafol+TX, captan+TX, fluoroimide+TX, folpet+TX, tolylfluanid+TX, bordeaux mixture+TX, copper oxide+TX, mancopper+TX, oxine-copper+TX, nitrothal-isopropyl+TX, edifenphos+TX, iprobenphos+TX, phosdiphen+TX, tolclofos-methyl+TX, anilazine+TX, benthiavalicarb+TX, blasticidin-S+TX, chloroneb-+TX, chloro-thalonil+TX, cyflufenamid+TX, cymoxanil+TX, cyclobutrifluram+TX, diclocymet+TX, diclomezine-+TX, dicloran+TX, diethofencarb+TX, dimethomorph-+TX, flumorph+TX, dithianon+TX, ethaboxam+TX, etridiazole+TX, famoxadone+TX, fenamidone+TX, fenoxanil+TX, ferimzone+TX, fluazinam+TX, fluopicolide+TX, flusulfamide+TX, fluxapyroxad+TX, -fenhexamid+TX, fosetyl-aluminium-+TX, hymexazol+TX, iprovalicarb+TX, cyazofamid+TX, methasulfocarb+TX, metrafenone+TX, pencycuron+TX, phthalide+TX, polyoxins+TX, propamocarb+TX, pyribencarb+TX, proquinazid+TX, pyroquilon+TX, pyriofenone+TX, quinoxyfen+TX, quintozene+TX, tiadinil+TX, triazoxide+TX, tricyclazole+TX, triforine+TX, validamycin+TX, valifenalate+TX, zoxamide+TX, mandipropamid+TX, flubeneteram+TX, isopyrazam+TX, sedaxane+TX, benzovindiflupyr+TX, pydiflumetofen+TX, 3-difluoromethyl-1-methyl-1H-pyrazole-4-carboxylic acid (3',4',5'-trifluoro-biphenyl-2-yl)-amide+TX, isoflucypram+TX, isotianil+TX, dipymetitrone+TX, 6-ethyl-5,7-dioxo-pyrrolo[4,5][1,4]dithiino[1,2-c]isothiazole-3-carbonitrile+TX, 2-(difluoromethyl)-N-[3-ethyl-1,1-dimethyl-indan-4-yl]pyridine-3-carboxamide+TX, 4-(2,6-difluorophenyl)-6-methyl-5-phenyl-pyridazine-3-carbonitrile+TX, (R)-3-(difluoromethyl)-1-methyl-N-[1,1,3-trimethylindan-4-yl]pyrazole-4-carboxamide+TX, 4-(2-bromo-4-fluoro-phenyl)-N-(2-chloro-6-fluoro-phenyl)-2,5-dimethyl-pyrazol-3-amine+TX, 4-(2-bromo-4-fluorophenyl)-N-(2-chloro-6-fluorophenyl)-1,3-dimethyl-1H-pyrazol-5-amine+TX, fluindapyr+TX, coumethoxystrobin (jiaxiangjunzhi)+TX, Ivbenmixianan+TX, dichlobentiazox+TX, mandestrobin+TX, 3-(4,4-difluoro-3,4-dihydro-3,3-dimethylisoquinolin-1-yl)quinolone+TX, 2-[2-fluoro-6-[(8-fluoro-2-methyl-3-quinolyl)oxy]phenyl]propan-2-ol+TX, oxathiapiprolin+TX, tert-butyl N-[6-[[[(1-methyltetrazol-5-yl)-phenyl-methylene]amino]oxymethyl]-2-pyridyl]carbamate+TX, pyraziflumid+TX, inpyrfluxam+TX, trolprocarb+TX, mefentrifluconazole+TX, ipfentrifluconazole+TX, 2-(difluoromethyl)-N-[(3R)-3-ethyl-1,1-dimethyl-indan-4-yl]pyridine-3-carboxamide+TX, N'-(2,5-dimethyl-4-phenoxyphenyl)-N-ethyl-N-methyl-formamidine+TX, N'-[4-(4,5-dichlorothiazol-2-yl)oxy-2,5-dimethyl-phenyl]-N-ethyl-N-methyl-formamidine+TX, [2-[3-[2-[1-[2-[3,5-bis(difluoromethyl)pyrazol-1-yl]acetyl]-4-piperidyl]thiazol-4-yl]-4,5-dihydroisoxazol-5-yl]-3-chloro-phenyl]methanesulfonate+TX, but-3-ynyl N-[6-[[[(Z)-[(1-methyltetrazol-5-yl)-phenyl-methylene]amino]oxymethyl]-2-pyridyl]carbamate+TX, methyl N-[[5-[4-(2,4-dimethylphenyl)triazol-2-yl]-2-methyl-phenyl]methyl]carbamate+TX, 3-chloro-6-methyl-5-phenyl-4-(2,4,6-trifluorophenyl)pyridazine+TX, pyridachlometyl+TX, 3-(difluoromethyl)-1-methyl-N-[1,1,3-trimethylindan-4-yl]pyrazole-4-carboxamide+TX, 1-[2-[[1-(4-chlorophenyl)pyrazol-3-yl]oxymethyl]-3-methyl-phenyl]-4-methyl-tetrazol-5-one+TX, 1-methyl-4-[3-methyl-2-[[2-methyl-4-(3,4,5-trimethylpyrazol-1-yl)phenoxy]methyl]phenyl]tetrazol-5-one+TX, aminopyrifen+TX, ametoctradin+TX, amisulbrom+TX, penflufen+TX, (Z,2E)-5-[1-(4-chlorophenyl)pyrazol-3-yl]oxy-2-methoxyimino-N,3-dimethyl-pent-3-enamide+TX, florylpicoxamid+TX, fenpicoxamid+TX, tebufloquin+TX, ipflufenoquin+TX, quinofumelin+TX, isofetamid+TX, N-[2-[2,4-dichloro-phenoxy]phenyl]-3-(difluoromethyl)-1-methyl-pyrazole-4-carboxamide+TX, N-[2-[2-chloro-4-(trifluoromethyl)phenoxy]phenyl]-3-(difluoromethyl)-1-methyl-pyrazole-4-carboxamide+TX, benzothiostrobin+TX, phenamacril+TX, 5-amino-1,3,4-thiadiazole-2-thiol zinc salt (2:1)+TX, fluopyram+TX, flutianil+TX, fluopimomide+TX, pyrapropoyne+TX, picarbutrazox+TX, 2-(difluoromethyl)-N-(3-ethyl-1,1-dimethyl-indan-4-yl)pyridine-3-carboxamide+TX, 2-(difluoromethyl)-N-((3R)-1,1,3-trimethylindan-4-yl)pyridine-3-carboxamide+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, metyltetraprole+TX, 2-(difluoromethyl)-N-((3R)-1,1,3-trimethylindan-4-yl) pyridine-3-carboxamide+TX, α-(1,1-dimethylethyl)-α-[4'-(trifluoromethoxy)[1,1'-biphenyl]-4-yl]-5-pyrimidinemethanol+TX, fluoxapiprolin+TX, enoxastrobin+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, 4-[[6-[2-(2,4-difluorophenyl)-1,1-difluoro-2-hydroxy-3-(5-sulfanyl-1,2,4-triazol-1-yl)propyl]-3-pyridyl]oxy] benzonitrile+TX, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile+TX, trinexapac+TX, coumoxystrobin+TX, zhongshengmycin+TX, thiodiazole copper+TX, zinc thiazole+TX, amectotractin+TX, iprodione+TX; N'-[5-bromo-2-methyl-6-[(1S)-1-methyl-2-propoxy-ethoxy]-3-pyridyl]-N-ethyl-N-methyl-formamidine+TX, N'-[5-bromo-2-methyl-6-[(1R)-1-methyl-2-propoxy-ethoxy]-3-pyridyl]-N-ethyl-N-methyl-formamidine+TX, N'-[5-bromo-2-methyl-6-(1-methyl-2-propoxy-ethoxy)-3-pyridyl]-N-ethyl-N-methyl-formamidine+TX, N'-[5-chloro-2-methyl-6-(1-methyl-2-propoxy-ethoxy)-3-pyridyl]-N-ethyl-N-methyl-formamidine+TX, N'-[5-bromo-2-methyl-6-(1-methyl-2-propoxy-ethoxy)-3-pyridyl]-N-isopropyl-N-methyl-formamidine+TX (these compounds may be prepared from the methods described in WO2015/155075); N'-[5-bromo-2-methyl-6-(2-propoxypropoxy)-3-pyridyl]-N-ethyl-N-methyl-formamidine+TX (this compound may be prepared from the methods described in IPCOM000249876D); N-isopropyl-N'-[5-methoxy-2-methyl-4-(2,2,2-trifluoro-1-hydroxy-1-phenyl-ethyl)phenyl]-N-methyl-formamidine+TX, N'-[4-(1-cyclopropyl-2,2,2-trifluoro-1-hydroxy-ethyl)-5-methoxy-2-methyl-phenyl]-N-isopropyl-N-methyl-formamidine+TX (these compounds may be prepared from the methods described in WO2018/228896); N-ethyl-N'-[5-methoxy-2-methyl-4-[2-trifluoromethyl)oxetan-2-yl]phenyl]-N-methyl-formamidine+TX, N-ethyl-N'-[5-methoxy-2-methyl-4-[2-trifuoromethyl)tetrahydrofuran-2-yl]phenyl]-N-methyl-formamidine+TX (these compounds may be prepared from the methods described in WO2019/110427); N-[(1R)-1-benzyl-3-chloro-1-methyl-but-3-enyl]-8-fluoro-quinoline-3-carboxamide+TX, N-[(1S)-1-benzyl-3,3,3-trifluoro-1-methyl-propyl]-8-fluoro-quinoline-3-carboxamide+TX, N-[(1S)-1-benzyl-1,3-dimethyl-butyl]-7,8-difluoro-quinoline-3-carboxamide+TX, 8-fluoro-N-[1-[(3-fluorophenyl)methyl]-1,3-dimethyl-butyl]quinoline-3-carboxamide+TX, N-(1-benzyl-1,3-dimethyl-butyl)-8-fluoro-quinoline-3-carboxamide+TX, N-[(1R)-1-benzyl-1,3-dimethyl-butyl]-8-fluoro-quinoline-3-carboxamide+TX, N-[(1S)-1-benzyl-1,3-dimethyl-butyl]-8-fluoro-quinoline-3-carboxamide+TX, N-(1-benzyl-3-chloro-1-methyl-but-3-enyl)-8-fluoro-quinoline-3-carboxamide+TX (these compounds may be prepared from the methods described in WO2017/153380); 1-(6,7-dimethylpyrazolo[1,5-a]pyridin-3-yl)-4,4,5-trifluoro-3,3-dimethyl-isoquinoline+TX, 1-(6,7-dimethylpyrazolo[1,5-a]pyridin-3-yl)-4,4,6-trifluoro-3,3-dimethyl-isoquinoline+TX, 4,4-difluoro-3,3-dimethyl-1-(6-methylpyrazolo[1,5-a]pyridin-3-yl)isoquinoline+TX, 4,4-difluoro-3,3-dimethyl-1-(7-methylpyrazolo[1,5-a]pyridin-3-yl)isoquinoline+TX, 1-(6-chloro-7-methyl-pyrazolo[1,5-a]pyridin-3-yl)-4,4-difluoro-3,3-dimethyl-isoquinoline+TX (these compounds may be prepared from the methods described in WO2017/025510); 1-(4,5-dimethylbenzimidazol-1-yl)-4,4,5-trifluoro-3,3-dimethyl-isoquinoline+TX, 1-(4,5-dimethylbenzimidazol-1-yl)-4,4-difluoro-3,3-dimethyl-isoquinoline+TX, 6-chloro-4,4-difluoro-3,3-dimethyl-1-(4-methylbenzimidazol-1-yl)isoquinoline+TX, 4,4-difluoro-1-(5-fluoro-4-methyl-benzimidazol-1-yl)-3,3-dimethyl-isoquinoline+TX, 3-(4,4-difluoro-3,3-dimethyl-1-isoquinolyl)-7,8-dihydro-6H-cyclopenta[e]benzimidazole+TX (these compounds may be prepared from the methods described in WO2016/156085); N-methoxy-N-[[4-[5-(trifluoromethyl)-1,2,4-oxadiazol-3-yl]phenyl]methyl]cyclopropanecarboxamide+TX, N,2-dimethoxy-N-[[4-[5-(trifluoromethyl)-1,2,4-oxadiazol-3-yl]phenyl]methyl]propanamide+TX, N-ethyl-2-methyl-N-[[4-[5-(trifluoromethyl)-1,2,4-oxadiazol-3-yl]phenyl]methyl]propanamide+TX, 1-methoxy-3-methyl-1-[[4-[5-(trifluoromethyl)-1,2,4-oxadiazol-3-yl]phenyl]methyl]urea+TX, 1,3-dimethoxy-1-[[4-[5-(trifluoromethyl)-1,2,4-oxadiazol-3-yl]phenyl]methyl]urea+TX, 3-ethyl-1-methoxy-1-[[4-[5-(trifluoromethyl)-1,2,4-oxadiazol-3-yl]phenyl]methyl]urea+TX, N-[[4-[5-(trifluoromethyl)-1,2,4-oxadiazol-3-yl]phenyl]methyl]propanamide+TX, 4,4-dimethyl-2-[[4-[5-(trifluoromethyl)-1,2,4-oxadiazol-3-yl]phenyl]methyl]isoxazolidin-3-one+TX, 5,5-dimethyl-2-[[4-[5-(trifluoromethyl)-1,2,4-oxadiazol-3-yl]phenyl]methyl]isoxazolidin-3-one+TX, ethyl 1-[[4-[5-(trifluoromethyl)-1,2,4-oxadiazol-3-yl]phenyl]methyl]pyrazole-4-carboxylate+TX, N,N-dimethyl-1-[[4-[5-(trifluoromethyl)-1,2,4-oxadiazol-3-yl]phenyl]methyl]-1,2,4-triazol-3-amine+TX. The compounds in this paragraph may be prepared from the methods described in WO 2017/055473, WO 2017/055469, WO 2017/093348 and WO 2017/118689; 2-[6-(4-chlorophenoxy)-2-(trifluoromethyl)-3-pyridyl]-1-(1,2,4-triazol-1-yl)propan-2-ol+TX (this compound may be prepared from the methods described in WO 2017/029179); 2-[6-(4-bromophenoxy)-2-(trifluoromethyl)-3-pyridyl]-1-(1,2,4-triazol-1-yl)propan-2-ol+TX (this compound may be prepared from the methods described in WO 2017/029179); 3-[2-(1-chlorocyclopropyl)-3-(2-fluorophenyl)-2-hydroxy-propyl]imidazole-4-carbonitrile+TX (this compound may be prepared from the methods described in WO 2016/156290); 3-[2-(1-chlorocyclopropyl)-3-(3-chloro-2-fluoro-phenyl)-2-hydroxy-propyl]imidazole-4-carbonitrile+TX (this compound may be prepared from the methods described in WO 2016/156290); (4-phenoxyphenyl)methyl 2-amino-6-methyl-pyridine-3-carboxylate+TX (this compound may be prepared from the methods described in WO 2014/006945); 2,6-Dimethyl-1H,5H-[1,4]dithiino[2,3-c:5,6-c']dipyrrole-1,3,5,7(2H,6H)-tetrone+TX (this compound may be prepared from the methods described in WO 2011/138281); N-methyl-4-[5-(trifluoromethyl)-1,2,4-oxadiazol-3-yl]benzenecarbothioamide+TX; N-methyl-4-[5-(trifluoromethyl)-1,2,4-oxadiazol-3-yl]benzamide+TX; (Z,2E)-5-[1-(2,4-dichlorophenyl)pyrazol-3-yl]oxy-2-methoxyimino-N,3-dimethyl-pent-3-enamide+TX (this compound may be prepared from the methods described in WO 2018/153707); N'-(2-chloro-5-methyl-4-phenoxy-phenyl)-N-ethyl-N-methyl-formamidine+TX; N'-[2-chloro-4-(2-fluorophenoxy)-5-methyl-phenyl]-N-ethyl-N-methyl-formamidine+TX (this compound may be prepared from the methods described in WO 2016/202742); 2-(difluoromethyl)-N-[(3S)-3-ethyl-1,1-dimethyl-indan-4-yl]pyridine-3-carboxamide+TX (this compound may be prepared from the methods described in WO 2014/095675); (5-methyl-2-pyridyl)-[4-[5-(trifluoromethyl)-1,2,4-oxadiazol-3-yl]phenyl]methanone+TX, (3-methylisoxazol-5-yl)-[4-[5-(trifluoromethyl)-1,2,4-oxadiazol-3-yl]phenyl]methanone+TX (these compounds may be prepared from the methods described in WO 2017/220485); 2-oxo-N-propyl-2-[4-[5-(trifluoromethyl)-1,2,4-oxadiazol-3-yl]phenyl]acetamide+TX (this compound may be prepared from the methods described in WO 2018/065414); ethyl 1-[[5-[5-(trifluoromethyl)-1,2,4-oxadiazol-3-yl]-2-thienyl]methyl]pyrazole-4-carboxylate+TX (this compound may be prepared from the methods described in WO 2018/158365); 2,2-difluoro-N-methyl-2-[4-[5-(trifluoromethyl)-1,2,4-oxadiazol-3-yl]phenyl]acetamide+TX, N-[(E)-methoxyiminomethyl]-4-[5-(trifluoromethyl)-1,2,4-oxadiazol-3-yl]benzamide+TX, N-[(Z)-methoxyiminomethyl]-4-[5-(trifluoromethyl)-1,2,4-oxadiazol-3-yl]benzamide+TX, N-[N-methoxy-C-methyl-carbonimidoyl]-4-[5-(trifluoromethyl)-1,2,4-oxadiazol-3-yl]benzamide+TX (these compounds may be prepared from the methods described in WO 2018/202428); microbials including: *Acinetobacter Iwoffii*+TX, *Acremonium alternatum*+TX+TX, *Acremonium cephalosporium*+TX+TX, *Acremonium diospyri*+TX, *Acremonium obclavatum*+TX, *Adoxophyes orana* granulovirus (AdoxGV) (Capex®)+TX, *Agrobacterium radiobacter* strain K84 (Galltrol-A®)+TX, *Alternaria alternate*+TX, *Alternaria cassia*+TX, *Alternaria destruens* (Smolder®)+TX, *Ampelomyces quisqualis* (AQ10e)+TX, *Aspergillus flavus* AF36 (AF36®)+TX, *Aspergillus flavus* NRRL 21882 (Aflaguard®)+TX, *Aspergillus* spp.+TX, *Aureobasidium pullulans*+TX, *Azospirillum*+TX, (MicroAZ®+TX, TAZO B®)+TX, *Azotobacter*+TX, *Azotobacter chroocuccum* (Azotomeal®)+TX, *Azotobacter* cysts (Bionatural Blooming Blossoms®)+TX, *Bacillus amyloliquefaciens*+TX, *Bacillus cereus*+TX, *Bacillus chitinosporus* strain CM-1+TX, *Bacillus chitinosporus* strain AQ746+TX, *Bacillus licheniformis* strain HB-2 (Biostart™ Rhizoboost®)+TX, *Bacillus licheniformis* strain 3086 (Eco-Guard®+TX, Green Releaf®)+TX, *Bacillus circulans*+TX, *Bacillus firmus* (BioSafe®+TX, BioNem-WP®+TX, VOTiVO®)+TX, *Bacillus firmus* strain 1-1582+TX, *Bacillus macerans*+TX, *Bacillus marismortui*+TX, *Bacillus megaterium*+TX, *Bacillus mycoides* strain AQ726+TX, *Bacillus papillae* (Milky Spore Powder®)+TX, *Bacillus pumilus* spp.+TX, *Bacillus pumilus* strain GB34 (Yield Shield®)+TX, *Bacillus pumilus* strain AQ717+TX, *Bacillus pumilus* strain QST 2808 (Sonata®+TX, Ballad Plus®)+TX, *Bacillus spahericus* (VectoLex®)+TX, *Bacillus* spp.+TX, *Bacillus* spp. strain AQ175+TX, *Bacillus* spp. strain AQ177+TX, *Bacillus* spp. strain AQ178+TX, *Bacillus subtilis* strain QST 713 (CEASE®+TX, Serenade®+TX, Rhapsody®)+TX, *Bacillus subtilis* strain QST 714 (JAZZ®)+TX, *Bacillus subtilis* strain AQ153+TX, *Bacillus subtilis* strain AQ743+TX, *Bacillus subtilis* strain QST3002+TX, *Bacillus subtilis* strain QST3004+TX, *Bacillus subtilis* var. *amyloliquefaciens* strain FZB24 (Taegro®+TX, Rhizopro®)+TX, *Bacillus thuringiensis* Cry 2Ae+TX, *Bacillus thuringiensis* Cry1Ab+TX, *Bacillus thuringiensis aizawai* GC 91 (Agree®)+TX, *Bacillus thuringiensis israelensis* (BMP123®+TX, Aquabac®+TX, VectoBac®)+TX, *Bacillus thuringiensis* kurstaki (Javelin®+TX, Deliver®+TX, CryMax®+TX, Bonide®+TX, Scutella WP®+TX, Turilav WP®+TX, Astuto®+TX, Dipel WP®+TX, Biobit®+TX, Foray®)+TX, *Bacillus thuringiensis* kurstaki BMP 123 (Baritone®)+TX, *Bacillus thuringiensis* kurstaki HD-1 (Bioprotec-CAF/3P®)+TX, *Bacillus thuringiensis* strain BD #32+TX, *Bacillus thuringiensis* strain AQ52+TX, *Bacillus thuringiensis* var. *aizawai* (XenTari®+TX, DiPel®)+TX, bacteria spp. (GROWMEND®+TX, GROWSWEET®+TX, Shootup®)+TX, bacteriophage of *Clavipacter michiganensis* (AgriPhage®)+TX, Bakflor®+TX, *Beauveria bassiana* (Beaugenic®+TX, Brocaril WP®)+TX, *Beauveria bassiana* GHA (Mycotrol ES®+TX, Mycotrol O®+TX, BotaniGuard®)+TX, *Beauveria brongniartii* (Engerlingspilz®+TX, Schweizer *Beauveria*®+TX, Melocont®)+TX, *Beauveria* spp.+TX, *Botrytis cineria*+TX, *Bradyrhizobium japonicum* (TerraMax®)+TX, *Brevibacillus brevis*+TX, *Bacillus thuringiensis tenebrionis* (Novodor®)+TX, BtBooster+TX, *Burkholderia cepacia* (Deny®+TX, Intercept®+TX, Blue Circle®)+TX, *Burkholderia gladii*+TX, *Burkholderia gladioli*+TX, *Burkholderia* spp.+TX, Canadian thistle fungus (CBH Canadian Bioherbicide®)+TX, *Candida* butyri+TX, *Candida famata*+TX, *Candida* (ructus+TX, *Candida glabrata*+TX, *Candida guiffiermondii*+TX, *Candida melibiosica*+TX, *Candida oleophila* strain 0+TX, *Candida parapsilosis*+TX, *Candida pelliculosa*+TX, *Candida pulcherrima*+TX, *Candida reukaufii*+TX, *Candida saitoana* (Bio-Coat®+TX, Biocure®)+TX, *Candida sake*+TX, *Candida* spp.+TX, *Candida tenius*+TX, *Cedecea dravisae*+TX, *Cellulomonas flavigena*+TX, *Chaetomium cochliodes* (Nova-Cide®)+TX, *Chaetomium globosum* (Nova-Cide®)+TX, *Chromobacterium subtsugae* strain PRAA4-1T (Grandevo®)+TX, *Cladosporium cladosporioides*+TX, *Cladosporium oxysporum*+TX, *Cladosporium chlorocephalum*+TX, *Cladosporium* spp.+TX, *Cladosporium tenuissimum*+TX, *Clonostachys rosea* (EndoFine®)+TX, *Colletotrichum acutatum*+TX, *Coniothyrium minitans* (Cotans WGO)+TX, *Coniothyrium* spp.+TX, *Cryptococcus albidus* (YIELDPLUS®)+TX, *Cryptococcus humicola*+TX, *Cryptococcus* infirmo-miniatus+TX, *Cryptococcus laurentii*+TX, *Cryptophlebia leucotreta* granulovirus (Cryptex®)+TX, *Cupriavidus campinensis*+TX, *Cydia pomonella* granulovirus (CYD-X®)+TX, *Cydia pomonella* granulovirus (Madex®+TX, Madex Plus®+TX, Madex Max/Carpovirusine®)+TX, *Cylindrobasidium laeve* (Stumpout®)+TX, *Cylindrocladium*+TX, *Debaryomyces hansenii*+TX, *Drechslera hawaiinensis*+TX, *Enterobacter cloacae*+TX, Enterobacteriaceae+TX, *Entomophtora virulenta* (Vektor®)+TX, *Epicoccum nigrum*+TX, *Epicoccum purpurascens*+TX, *Epicoccum* spp.+TX, *Filobasidium floriforme*+TX, *Fusarium acuminatum*+TX, *Fusarium chlamydosporum*+TX, *Fusarium oxysporum* (Fusaclean®/Biofox C®)+TX, *Fusarium proliferatum*+TX, *Fusarium* spp.+TX, *Galactomyces geotrichum*+TX, *Gliocladium catenulatum* (Primastop®+TX, Prestop®)+TX, *Gliocladium roseum*+TX, *Gliocladium* spp. (SoilGarde)+TX, *Gliocladium virens* (Soilgard®)+TX, Granulovirus (Granuporn®)+TX, *Halobacillus halophilus*+TX, *Halobacillus litoralis*+TX, *Halobacillus trueperi*+TX, *Halomonas* spp.+TX, *Halomonas subglaciescola*+TX, *Halovibrio variabilis*+TX, *Hanseniaspora uvarum*+TX, *Helicoverpa armigera* nucleopolyhedrovirus (Helicovex®)+TX, *Helicoverpa zea* nuclear polyhedrosis virus (Gemstar®)+TX, Isoflavone—formononetin (Myconate®)+TX, *Kloeckera apiculata*+TX, *Kloeckera* spp.+TX,

*Lagenidium giganteum* (Laginex®)+TX, *Lecanicillium longisporum* (Vertiblast®)+TX, *Lecanicillium muscarium* (Vertikil®)+TX, *Lymantria Dispar* nucleopolyhedrosis virus (Disparvirus®)+TX, *Marinococcus halophilus*+TX, *Meira geulakonigii*+TX, *Metarhizium anisopliae* (Met52®)+TX, *Metarhizium anisopliae* (Destruxin WP®)+TX, *Metschnikowia fruticola* (Shemer®)+TX, *Metschnikowia pulcherrima*+TX, *Microdochium dimerum* (Antibot®)+TX, *Micromonospora coerulea*+TX, *Microsphaeropsis ochracea*+TX, *Muscodor albus* 620 (Muscudor®)+TX, *Muscodor roseus* strain A3-5+TX, *Mycorrhizae* spp. (AMykor®+TX, Root Maximizer®)+TX, *Myrothecium verrucaria* strain AARC-0255 (DiTera®)+TX, BROS PLUS®+TX, *Ophiostoma piliferum* strain D97 (Sylvanex®)+TX, *Paecilomyces farinosus*+TX, *Paecilomyces fumosoroseus* (PFR-97®+TX, PreFeRal®)+TX, *Paecilomyces linacinus* (Biostat WP®)+TX, *Paecilomyces lilacinus* strain 251 (MeloCon WG®)+TX, *Paenibacillus polymyxa*+TX, *Pantoea agglomerans* (BlightBan C9-1®)+TX, *Pantoea* spp.+TX, *Pasteuria* spp. (Econem®)+TX, *Pasteuria nishizawae*+TX, *Penicilliuml aurantiogriseum*+TX, *Penicillium billai* (Jumpstart®+TX, TagTeam®)+TX, *Penicillium brevicompactum*+TX, *Penicillium frequentans*+*TX, Penicillium griseofulvum*+TX, *Penicillium purpurogenum*+TX, *Penicillium* spp.+TX, *Penicillium viridicatum*+TX, *Phlebiopsis gigantean* (Rotstop®)+TX, phosphate solubilizing bacteria (Phosphomeal®)+TX, *Phytophthora cryptogea*+TX, *Phytophthora palmivora* (Devine®)+TX, *Pichia anomala*+TX, *Pichia guilermondii*+TX, *Pichia membranaefaciens*+TX, *Pichia onychis*+TX, *Pichia stipites*+TX, *Pseudomonas aeruginosa*+TX, *Pseudomonas aureofasciens* (Spot-Less Biofungicide®)+TX, *Pseudomonas cepacia*+TX, *Pseudomonas chlororaphis* (AtEze®)+TX, *Pseudomonas* corrugate+TX, *Pseudomonas fluorescens* strain A506 (BlightBan A506®)+TX, *Pseudomonas putida*+TX, *Pseudomonas* reactans+TX, *Pseudomonas* spp.+TX, *Pseudomonas syringae* (Bio-Save®)+TX, *Pseudomonas viridiflava*+TX, *Pseudomons fluorescens* (Zequanox®)+TX, *Pseudozyma flocculosa* strain PF-A22 UL (Sporodex L®)+TX, *Puccinia canaliculata*+TX, *Puccinia thlaspeos* (Wood Warrior®)+TX, *Pythium paroecandrum*+TX, *Pythium oligandrum* (Polygandron®+TX, Polyversum®)+TX, *Pythium periplocum*+TX, *Rhanella aquatilis*+TX, *Rhanella* spp.+TX, *Rhizobia* (Dormal®+TX, Vault®)+TX, *Rhizoctonia*+TX, *Rhodococcus globerulus* strain AQ719+TX, *Rhodosporidium diobovatum*+TX, *Rhodosporidium toruloides*+TX, *Rhodotorula* spp.+TX, *Rhodotorula glutinis*+TX, *Rhodotorula graminis*+TX, *Rhodotorula mucilagnosa*+TX, *Rhodotorula rubra*+TX, *Saccharomyces cerevisiae*+TX, *Salinococcus roseus*+TX, *Sclerotinia minor*+TX, *Sclerotinia minor* (SARRITOR®)+TX, *Scytalidium* spp.+TX, *Scytalidium uredinicola*+TX, *Spodoptera exigua* nuclear polyhedrosis virus (Spod-X®+TX, Spexit®)+TX, *Serratia marcescens*+TX, *Serratia plymuthica*+TX, *Serratia* spp.+TX, *Sordaria fimicola*+TX, *Spodoptera littoralis* nucleopolyhedrovirus (Littovir®)+TX, *Sporobolomyces roseus*+TX, *Stenotrophomonas maltophilia*+TX, *Streptomyces ahygroscopicus*+TX, *Streptomyces albaduncus*+TX, *Streptomyces exfoliates*+TX, *Streptomyces galbus*+TX, *Streptomyces griseoplanus*+TX, *Streptomyces griseoviridis* (Mycostop®)+TX, *Streptomyces lydicus* (Actinovate®)+TX, *Streptomyces lydicus* WYEC-108 (ActinoGrow®)+TX, *Streptomyces violaceus*+*TX, Tilletiopsis minor*+TX, *Tilletiopsis* spp.+TX, *Trichoderma asperellum* (T34 Biocontrol®)+TX, *Trichoderma gamsfi* (Tenet®)+TX, *Trichoderma atroviride* (Plantmate®)+TX, *Trichoderma hamatum* TH 382+TX, *Trichoderma harzianum* rifai (Mycostar®)+TX, *Trichoderma harzianum* T-22 (Trianum-P®+TX, PlantShield HC®+TX, RootShield®+TX, Trianum-G®)+TX, *Trichoderma harzianum* T-39 (Trichodex®)+TX, *Trichoderma inhamatum*+TX, *Trichoderma koningii*+TX, *Trichoderma* spp. LC 52 (Sentinel®)+TX, *Trichoderma lignorum*+TX, *Trichoderma longibrachiatum*+TX, *Trichoderma polysporum* (Binab T®)+TX, *Trichoderma taxi*+TX, *Trichoderma virens*+TX, *Trichoderma virens* (formerly *Gliocladium virens* GL-21) (SoilGuard®)+TX, *Trichoderma viride*+TX, *Trichoderma viride* strain ICC 080 (Remedier®)+TX, *Trichosporon pullulans*+TX, *Trichosporon* spp.+TX, *Trichothecium* spp.+TX, *Trichothecium roseum*+TX, *Typhula phacorrhiza* strain 94670+TX, *Typhula phacorrhiza* strain 94671+TX, *Ulocladium atrum*+TX, *Ulocladium oudemansfi* (Botry-Zen®)+TX, *Ustilago maydis*+TX, various bacteria and supplementary micronutrients (Natural II®)+TX, various fungi (Millennium Microbes®)+TX, *Verticillium chlamydosporium*+TX, *Verticillium lecanfi* (Mycotal®+TX, Vertalec®)+TX, Vip3Aa20 (VlPtera®)+TX, *Virgibaclillus marismortui*+TX, *Xanthomonas campestris* pv. *Poae* (Camperico®)+TX, *Xenorhabdus bovienfi*+TX, *Xenorhabdus nematophilus*;

Plant extracts including: pine oil (Retenol®)+TX, azadirachtin (Plasma Neem Oil®+TX, AzaGuard®+TX, MeemAzal®+TX, Molt-X®+TX, Botanical IGR (Neemazad®+TX, Neemix®)+TX, canola oil (Lilly Miller Vegol®)+TX, *Chenopodium ambrosioides* near *ambrosioides* (Requiem®)+TX, *Chrysanthemum* extract (Crisant®)+TX, extract of neem oil (Trilogy®)+TX, essentials oils of Labiatae (Botania®)+TX, extracts of clove rosemary peppermint and thyme oil (Garden Insect Killer®)+TX, Glycinebetaine (Greenstim®)+TX, garlic+TX, lemongrass oil (GreenMatch®)+TX, neem oil+TX, *Nepeta cataria* (Catnip oil)+TX, *Nepeta* catarina+TX, nicotine+TX, oregano oil (MossBuster®)+TX, Pedaliaceae oil (Nematon®)+TX, pyrethrum+TX, *Quillaja saponaria* (NemaQ®)+TX, *Reynoutria sachalinensis* (Regalia®+TX, Sakalia®)+TX, rotenone (Eco Roten®)+TX, Rutaceae plant extract (Soleo®)+TX, soybean oil (Ortho Ecosense®)+TX, tea tree oil (Timorex Gold®)+TX, thymus oil+TX, AGNIQUE® MMF+TX, BugOil®+TX, mixture of rosemary sesame pepermint thyme and cinnamon extracts (EF 300®)+TX, mixture of clove rosemary and peppermint extract (EF 400®)+TX, mixture of clove pepermint garlic oil and mint (Soil Shot®)+TX, kaolin (Screen®)+TX, storage glucam of brown algae (Laminarin®);

pheromones including: blackheaded fireworm pheromone (3M Sprayable Blackheaded Fireworm Pheromone®)+TX, Codling Moth Pheromone (Paramount dispenser-(CM)/Isomate C-Plus®)+TX, Grape Berry Moth Pheromone (3M MEC-GBM Sprayable Pheromone®)+TX, Leafroller pheromone (3M MEC—LR Sprayable Pheromone®)+TX, Muscamone (Snip7 Fly Bait®+TX, Starbar Premium Fly Bait®)+TX, Oriental Fruit Moth Pheromone (3M oriental fruit moth sprayable Pheromone®)+TX, Peachtree Borer Pheromone (Isomate-P®)+TX, Tomato Pinworm Pheromone (3M Sprayable Pheromone®)+TX, Entostat powder (extract from palm tree) (Exosex CM®)+TX, (E+TX,Z+TX,Z)-3+TX,8+TX,11 Tetradecatrienyl acetate+TX, (Z+TX,Z+TX,E)-7+TX,11+TX,13-Hexadecatrienal+TX, (E+TX,Z)-7+TX,9-Dodecadien-1-yl acetate+TX, 2-Methyl-1-butanol+TX, Calcium acetate+TX, Scenturion®+TX, Biolure®+TX, Check-Mate®+TX, Lavandulyl senecioate; Macrobials including: *Aphelinus abdominalis*+TX, *Aphidius ervi* (*Aphelinus*-System®)+TX, *Acerophagus papaya*+TX, *Adalia bipunctata* (*Adalia*-System®)+TX, *Adalia bipunctata* (Adaline®)+TX, *Adalia bipunctata* (Aphidalia®)+TX, *Ageniaspis citricola*+TX, *Ageniaspis fuscicoffis*+TX, *Amblyseius andersoni* (Anderline®+TX, Andersoni-System®)+TX, *Amblyseius cafifornicus* (Amblyline®+TX, Spicale)+TX, *Amblyseius cucumeris* (Thripex®+TX, Bugline cucumeris®)+TX, *Amblyseius fallacis* (Fallacis®)+TX, *Amblyseius swirskii* (Bugline Swirskii®+TX, Swirskii-Mite®)+TX, *Amblyseius womersleyi* (WomerMite®)+TX, *Amitus hesperidum*+TX, *Anagrus atomus*+TX, *Anagyrus fusciventris*+TX, *Anagyrus kamali*+TX, *Anagyrus loecki*+TX, *Anagyrus pseudococci* (Citripar®)+TX, *Anicetus benefices*+TX, *Anisopteromalus calandrae*+TX, *Anthocoris nemoralis* (*Anthocoris*-System®)+TX, *Aphelinus abdominalis* (*Apheline*®+TX, Aphiline®)+TX, *Aphelinus asychis*+TX, *Aphidius colemani* (Aphipar®)+TX, *Aphidius ervi* (Ervipar®)+TX, *Aphidius gifuensis*+TX, *Aphidius matricariae* (Aphipar-M®)+TX, *Aphidoletes aphidimyza* (Aphidend®)+TX, *Aphidoletes aphidimyza* (Aphidoline®)+TX, *Aphytis lingnanensis*+TX, *Aphytis melinus*+TX, *Aprostocetus hagenowii*+TX, *Atheta coriaria* (Staphyline®)+TX, *Bombus* spp.+TX, *Bombus terrestris* (Natupol Beehive®)+TX, *Bombus terrestris* (Beeline®+TX, Tripol®)+TX, *Cephalonomia stephanoderis*+TX, *Chilocorus nigritus*+TX, *Chrysoperla carnea* (Chrysoline®)+TX, *Chrysoperla carnea* (Chrysopa®)+TX, *Chrysoperla rufilabris*+TX, *Cirrospilus ingenuus*+TX, *Cirrospilus quadristriatus*+TX, *Citrostichus phyllocnistoides*+TX, *Closterocerus chamaeleon*+TX, *Closterocerus* spp.+TX, *Coccidoxenoides perminutus* (Planopar®)+TX, *Coccophagus cowperi*+TX, *Coccophagus lycimnia*+TX, *Cotesia flavipes*+TX, *Cotesia plutellae*+TX, *Cryptolaemus montrouzieri* (Cryptobug®+TX, Cryptoline®)+TX, *Cybocephalus nipponicus*+TX, *Dacnusa sibirica*+TX, *Dacnusa sibirica* (Minusa®)+TX, *Diglyphus isaea* (Diminex®)+TX, *Delphastus catalinae* (Delphastus®)+TX, *Delphastus pusillus*+TX, *Diachasmimorpha krausfi*+TX, *Diachasmimorpha longicaudata*+TX, *Diaparsis jucunda*+TX, *Diaphorencyrtus aligarhensis*+TX, *Diglyphus isaea*+TX, *Diglyphus isaea* (Miglyphus®+TX, Digline®)+TX, *Dacnusa sibirica* (Dac-Digline®+TX, Minex®)+TX, *Diversinervus* spp.+TX, *Encarsia citrina*+TX, *Encarsia formosa* (Encarsiamaze+TX, Encarline®+TX, En-Strip®)+TX, *Eretmocerus eremicus* (Enermix®)+TX, *Encarsia guadeloupae*+TX, *Encarsia haitiensis*+TX, *Episyrphus balteatus* (Syrphidend®)+TX, *Eretmoceris siphonini*+TX, *Eretmocerus califomicus*+TX, *Eretmocerus eremicus* (Ercal®+TX, Eretline E®)+TX, *Eretmocerus eremicus* (Bemimix®)+TX, *Eretmocerus hayati*+TX, *Eretmocerus mundus* (Bemipar®+TX, Eretline M®)+TX, *Eretmocerus siphonini*+TX, *Exochomus quadripustulatus*+TX, *Feltiella acarisuga* (Spidend®)+TX, *Feltiella acarisuga* (Feltiline®)+TX, *Fopius arisanus*+TX, *Fopius ceratitivorus*+TX, Formononetin (Winless Beehome®)+TX, *Franklinothrips vespiformis* (Vespop®)+TX, *Galendromus occidentalis*+TX, *Goniozus legneri*+TX, *Habrobracon hebetor*+TX, *Harmonia axyridis* (HarmoBeetle®)+TX, *Heterorhabditis* spp. (Lawn Patrol®)+TX, *Heterorhabditis bacteriophora* (NemaShield HB®+TX, Nemaseek®+TX, Terranem-Nam®+TX, Terranem®+TX, Larvanem®+TX, B-Green®+TX, NemAttack+TX, Nematop®)+TX, *Heterorhabditis megidis* (Nemasys H®+TX, BioNem H®+TX, Exhibitline Hm®+TX, Larvanem-M®)+TX, *Hippodamia convergens*+TX, *Hypoaspis aculeifer* (*Aculeifer*-System®+TX, Entomite-A®)+TX, *Hypoaspis miles* (Hypoline me+TX, Entomite-M®)+TX, *Lbalia leucospoides*+TX, *Lecanoideus floccissimus*+TX, *Lemophagus errabundus*+TX, *Leptomastidea abnormis*+TX, *Leptomastix dactylopii* (Leptopar®)+TX, *Leptomastix epona*+TX, Lindorus lophanthae+TX, *Lipolexis oregmae*+TX, *Lucilia caesar* (Natufly®)+TX, *Lysiphlebus testaceipes*+TX, *Macrolophus caliginosus* (Mirical-N®+TX, Macroline c®+TX, Mirical®)+TX, *Mesoseiulus longipes*+TX, *Metaphycus flavus*+TX, *Metaphycus lounsburyi*+TX, *Micromus angulatus* (Milacewing®)+TX, *Microterys flavus*+TX, *Muscidifurax raptorellus* and *Spalangia cameroni* (Biopar®)+TX, *Neodryinus typhlocybae*+TX, *Neoseiulus californicus*+TX, *Neoseiulus cucumeris* (THRYPEX®)+TX, *Neoseiulus fallacis*+TX, *Nesideocoris tenuis* (NesidioBug®+TX, Nesibug®)+TX, *Ophyra aenescens* (Biofly®)+TX, *Orius insidiosus* (Thripor-l®+TX, Oriline I®)+TX, *Orius laevigatus* (Thripor-L®+TX, Oriline L®)+TX, *Orius majusculus* (Oriline M®)+TX, *Orius strigicoffis* (Thripor-S®)+TX, *Pauesia juniperorum*+TX, *Pediobius foveolatus*+TX, *Phasmarhabditis hermaphrodita* (Nemaslug®)+TX, *Phymastichus coffea*+TX, *Phytoseiulus Macropilus*+TX, *Phytoseiulus persimilis* (Spidex®+TX, Phytoline P®)+TX, *Podisus maculiventris* (Podisus®)+TX, *Pseudacteon curvatus*+TX, *Pseudacteon obtusus*+TX, *Pseudacteon tricuspis*+TX, *Pseudaphycus maculipennis*+TX, *Pseudleptomastix mexicana*+TX, *Psyllaephagus pilosus*+TX, *Psyttalia concolor* (complex)+TX, *Quadrastichus* spp.+TX, *Rhyzobius lophanthae*+TX, *Rodolia cardinalis*+TX, *Rumina decollate*+TX, *Semielacher petiolatus*+TX, *Sitobion avenae* (Ervibank®)+TX, *Steinemema carpocapsae* (Nematac C®+TX, Millenium®+TX, BioNem C®+TX, NemAttack®+TX, Nemastar®+TX, Capsanem®)+TX, *Steinemema feltiae* (NemaShield®+TX, Nemasys Fe+TX, BioNem Fe+TX, *Steinernema*-System®+TX, NemAttack®+TX, Nemaplus®+TX, Exhibitline Sf®+TX, Scia-Rid®+TX, Entonem®)+TX, *Steinemema kraussei* (Nemasys L®+TX, BioNem Le+TX, Exhibitline Srb®)+TX, *Steinemema riobrave* (BioVector®+TX, BioVektor®)+TX, *Steinemema scapterisci* (Nematac S°)+TX, *Steinemema* spp.+TX, *Steinemema-tid* spp. (Guardian Nematodes®)+TX, *Stethorus punctillum* (Stethorus®)+TX, *Tamarixia radiate*+TX, *Tetrastichus setifer*+TX, *Thripobius semiluteus*+TX, *Torymus sinensis*+TX, *Trichogramma brassicae* (Tricholine B®)+TX, *Trichogramma brassicae* (Tricho-Strip®)+TX, *Trichogramma evanescens*+TX, *Trichogramma minutum*+TX, *Trichogramma ostriniae*+TX, *Trichogramma platneri*+TX, *Trichogramma pretiosum*+TX, *Xanthopimpla stemmator*; and other biologicals including: abscisic acid+TX, bioSea®+TX, *Chondrostereum purpureum* (Chontrol Paste®)+TX, *Colletotrichum gloeosporioides* (Collego®)+TX, Copper Octanoate (Cueva®)+TX, Delta traps (Trapline D®)+TX, *Erwinia amylovora* (Harpin) (ProAct®+TX, Ni-HIBIT Gold CST®)+TX, Ferri-phosphate (Ferramol®)+TX, Funnel traps (Trapline Y®)+TX, Gallex®+TX, Grower's Secret®+TX, Homo-brassonolide+TX, Iron Phosphate (Lilly Miller Worry Free Ferramol Slug & Snail Bait®)+TX, MCP hail trap (Trapline F®)+TX, Microctonus hyperodae+TX, *Mycoleptodiscus terrestris* (Des-X®)+TX, BioGain®+TX, Aminomite®+TX, Zenox®+TX, Pheromone trap (Thripline Ams®)+TX, potassium bicarbonate (MilStop®)+TX, potassium salts of fatty acids (Sanova®)+TX, potassium silicate solution (Sil-Matrix®)+TX, potassium iodide+potassiumthiocyanate (Enzicur®)+TX, SuffOil-X®+TX, Spider venom+TX, *Nosema locustae* (Semaspore Organic Grasshopper Control®)+TX, Sticky traps (Trapline YF®+TX, Rebell Amarillo®)+TX and Traps (Takitrapline y+B®)+TX.

The references in brackets behind the active ingredients, e.g. [3878-19-1] refer to the Chemical Abstracts Registry number. The above described mixing partners are known. Where the active ingredients are included in "The Pesticide Manual" [The Pesticide Manual—A World Compendium; Thirteenth Edition; Editor: C. D. S. TomLin; The British Crop Protection Council], they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet [A. Wood; *Compendium of Pesticide Common Names*, Copyright® 1995-2004]; for example, the compound "acetoprole" is described under the internet address http://www.alanwood.net/pesticides/acetoprole.html.

Most of the active ingredients described above are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "develoment code" is used or, if neither one of those designations nor a "common name" is used, an "alternative name" is employed. "CAS Reg. No" means the Chemical Abstracts Registry Number.

The active ingredient mixture of the compounds of formula I selected selected from the compounds defined in the Tables A-1 to A297, and Table P, and with active ingredients described above comprises a compound selected from one compound defined in the Tables A-1 to A-297, and Table P, and an active ingredient as described above preferably in a mixing ratio of from 100:1 to 1:6000, especially from 50:1 to 1:50, more especially in a ratio of from 20:1 to 1:20, even more especially from 10:1 to 1:10, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

The mixtures as described above can be used in a method for controlling pests, which comprises applying a composition comprising a mixture as described above to the pests or their environment, with the exception of a method for treatment of the human or animal body by surgery or therapy and diagnostic methods practised on the human or animal body.

The mixtures comprising a compound of formula I selected from the compounds defined in the Tables A-1 to A-297, and Table P, and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula I and the active ingredients as described above is not essential for working the present invention.

The compositions according to the invention can also comprise further solid or liquid auxiliaries, such as stabilizers, for example unepoxidized or epoxidized vegetable oils (for example epoxidized coconut oil, rapeseed oil or soya oil), antifoams, for example silicone oil, preservatives, viscosity regulators, binders and/or tackifiers, fertilizers or other active ingredients for achieving specific effects, for example bactericides, fungicides, nematocides, plant activators, molluscicides or herbicides.

The compositions according to the invention are prepared in a manner known per se, in the absence of auxiliaries for example by grinding, screening and/or compressing a solid active ingredient and in the presence of at least one auxiliary for example by intimately mixing and/or grinding the active ingredient with the auxiliary (auxiliaries). These processes for the preparation of the compositions and the use of the compounds I for the preparation of these compositions are also a subject of the invention.

The application methods for the compositions, that is the methods of controlling pests of the abovementioned type, such as spraying, atomizing, dusting, brushing on, dressing, scattering or pouring—which are to be selected to suit the intended aims of the prevailing circumstances—and the use of the compositions for controlling pests of the abovementioned type are other subjects of the invention. Typical rates of concentration are between 0.1 and 1000 ppm, preferably between 0.1 and 500 ppm, of active ingredient. The rate of application per hectare is generally 1 to 2000 g of active ingredient per hectare, in particular 10 to 1000 g/ha, preferably 10 to 600 g/ha.

A preferred method of application in the field of crop protection is application to the foliage of the plants (foliar application), it being possible to select frequency and rate of application to match the danger of infestation with the pest in question. Alternatively, the active ingredient can reach the plants via the root system (systemic action), by drenching the locus of the plants with a liquid composition or by incorporating the active ingredient in solid form into the locus of the plants, for example into the soil, for example in the form of granules (soil application). In the case of paddy rice crops, such granules can be metered into the flooded paddy-field.

The compounds of formula I of the invention and compositions thereof are also be suitable for the protection of plant propagation material, for example seeds, such as fruit, tubers or kernels, or nursery plants, against pests of the abovementioned type. The propagation material can be treated with the compound prior to planting, for example seed can be treated prior to sowing. Alternatively, the compound can be applied to seed kernels (coating), either by soaking the kernels in a liquid composition or by applying a layer of a solid composition. It is also possible to apply the compositions when the propagation material is planted to the site of application, for example into the seed furrow during drilling. These treatment methods for plant propagation material and the plant propagation material thus treated are further subjects of the invention. Typical treatment rates would depend on the plant and pest/fungi to be controlled and are generally between 1 to 200 grams per 100 kg of seeds, preferably between 5 to 150 grams per 100 kg of seeds, such as between 10 to 100 grams per 100 kg of seeds.

The term seed embraces seeds and plant propagules of all kinds including but not limited to true seeds, seed pieces, suckers, corns, bulbs, fruit, tubers, grains, rhizomes, cuttings, cut shoots and the like and means in a preferred embodiment true seeds.

The present invention also comprises seeds coated or treated with or containing a compound of formula I. The term "coated or treated with and/or containing" generally signifies that the active ingredient is for the most part on the surface of the seed at the time of application, although a greater or lesser part of the ingredient may penetrate into the seed material, depending on the method of application. When the said seed product is (re)planted, it may absorb the active ingredient. In an embodiment, the present invention makes available a plant propagation material adhered thereto with a compound of formula I. Further, it is hereby made available, a composition comprising a plant propagation material treated with a compound of formula I.

Seed treatment comprises all suitable seed treatment techniques known in the art, such as seed dressing, seed coating, seed dusting, seed soaking and seed pelleting. The seed treatment application of the compound formula I can be carried out by any known methods, such as spraying or by dusting the seeds before sowing or during the sowing/planting of the seeds.

The compounds of the invention can be distinguished from other similar compounds by virtue of greater efficacy at low application rates and/or different pest control, which can be verified by the person skilled in the art using the experimental procedures, using lower concentrations if necessary, for example 10 ppm, 5 ppm, 2 ppm, 1 ppm or 0.2 ppm; or lower application rates, such as 300, 200 or 100, mg of Al per m². The greater efficacy can be observed by an increased safety profile (against non-target organisms above and below ground (such as fish, birds and bees), improved physico-chemical properties, or increased biodegradability).

In each aspect and embodiment of the invention, "consisting essentially" and inflections thereof are a preferred embodiment of "comprising" and its inflections, and "consisting of" and inflections thereof are a preferred embodiment of "consisting essentially of" and its inflections.

The disclosure in the present application makes available each and every combination of embodiments disclosed herein.

It should be noted that the disclosure herein in respect of a compound of formula I applies equally in respect of a compound of each of formulae I*, I'a, I-A, I'-A and Tables A-1 to A-297 and Table P. Further the preferred enantiomer of formula I'a applies also to compounds of Tables A-1 to A-297 and Table P. Also, made available herein is an agrochemically acceptable salt, stereoisomer, enantiomer, tautomer and/or N-oxide of the compound of formula formulae I*, I'a, I-A, I'-A, and Tables A-1 to A-297 and Table P.

BIOLOGICAL EXAMPLES

The Examples which follow serve to illustrate the invention. Certain compounds of the invention can be distinguished from known compounds by virtue of greater efficacy at low application rates, which can be verified by the person skilled in the art using the experimental procedures outlined in the Examples, using lower application rates if necessary, for example 50 ppm, 24 ppm, 12.5 ppm, 6 ppm, 3 ppm, 1.5 ppm, 0.8 ppm or 0.2 ppm.

Example B1: *Diabrotica Balteata* (Corn Root Worm)

Maize sprouts placed onto an agar layer in 24-well microtiter plates were treated with aqueous test solutions prepared from 10'000 ppm DMSO stock solutions by spraying. After drying, the plates were infested with L2 larvae (6 to 10 per well). The samples were assessed for mortality and growth inhibition in comparison to untreated samples 4 days after infestation.

The following compounds gave an effect of at least 80% control in at least one of the two categories (mortality or growth inhibition) at an application rate of 200 ppm:
P1, P2, P3, P4, P5, P6, P7, P8, P9, P10, P11, P12, P13, P14, P15, P16, P17, P18, P19, P21, P22, P23, P24, P25, P26, P27, P28, P29, P30, P31, P32, P34, P35, P38, P40, P41, P42, P43, P44, P45, P46, P48, P49, P51, P52, P54, P57.

Example B2: *Euschistus heros* (Neotropical Brown Stink Bug)

Soybean leaves on agar in 24-well microtiter plates were sprayed with aqueous test solutions prepared from 10'000 ppm DMSO stock solutions. After drying the leaves were infested with N2 nymphs. The samples were assessed for mortality and growth inhibition in comparison to untreated samples 5 days after infestation.

The following compounds gave an effect of at least 80% control in at least one of the two categories (mortality or growth inhibition) at an application rate of 200 ppm:
P12, P26, P40, P52.

Example B3: *Frankliniella occidentalis* (Western Flower *Thrips*):Feeding/Contact Activity Sunflower leaf discs were placed on agar in 24-well microtiter plates and sprayed with aqueous test solutions prepared from 10'000 DMSO stock solutions. After drying the leaf discs were infested with a *Frankliniella* population of mixed ages. The samples were assessed for mortality 7 days after infestation.

Example B4: *Chilo suppressalis* (Striped Rice Stemborer)

24-well microtiter plates with artificial diet were treated with aqueous test solutions prepared from 10'000 ppm DMSO stock solutions by pipetting. After drying, the plates were infested with L2 larvae (6-8 per well). The samples were assessed for mortality, anti-feeding effect, and growth inhibition in comparison to untreated samples 6 days after infestation. Control of *Chilo suppressalis* by a test sample is given when at least one of the categories mortality, anti-feedant effect, and growth inhibition is higher than the untreated sample.

The following compounds resulted in at least 80% control in at least one of the three categories (mortality, anti-feedant effect, or growth inhibition) at an application rate of 200 ppm:

P1, P2, P3, P4, P5, P6, P7, P8, P9, P10, P11, P12, P13, P14, P15, P16, P17, P18, P19, P20, P21, P22, P23, P24, P25, P26, P27, P28, P29, P30, P31, P32, P33, P34, P35, P37, P38, P40, P41, P42, P43, P44, P45, P46, P47, P48, P49, P50, P51, P52, P53, P54, P57.

Example B5: *Plutella xylostella* (Diamond Back Moth)

24-well microtiter plates with artificial diet were treated with aqueous test solutions prepared from 10'000 ppm DMSO stock solutions by pipetting. After drying, *Plutella* eggs were pipetted through a plastic stencil onto a gel blotting paper and the plate was closed with it. The samples were assessed for mortality and growth inhibition in comparison to untreated samples 8 days after infestation.

The following compounds gave an effect of at least 80% control in at least one of the two categories (mortality or growth inhibition) at an application rate of 200 ppm:

P1, P2, P3, P4, P5, P6, P7, P8, P9, P10, P11, P12, P13, P14, P15, P16, P17, P18, P19, P20, P21, P22, P23, P24, P25, P26, P27, P28, P29, P30, P31, P32, P33, P34, P35, P36, P37, P38, P39, P40, P41, P42, P43, P44, P45, P46, P47, P49, P50, P51, P52, P53, P54, P55, P57.

Example B6: *Myzus persicae* (Green Peach Aphid): Feeding/Contact Activity

Sunflower leaf discs were placed onto agar in a 24-well microtiter plate and sprayed with aqueous test solutions prepared from 10'000 ppm DMSO stock solutions. After drying, the leaf discs were infested with an aphid population of mixed ages. The samples were assessed for mortality 6 days after infestation.

The following compounds resulted in at least 80% mortality at an application rate of 200 ppm:
P35, P55.

Example B7: *Myzus persicae* (Green Peach Aphid): Systemic Activity

Roots of pea seedlings infested with an aphid population of mixed ages were placed directly into aqueous test solutions prepared from 10'000 DMSO stock solutions. The samples were assessed for mortality 6 days after placing seedlings into test solutions.

Example B8: *Myzus persicae* (Green Peach Aphid): Intrinsic Activity

Test compounds prepared from 10'000 ppm DMSO stock solutions were applied by pipette into 24-well microtiter plates and mixed with sucrose solution. The plates were closed with a stretched Parafilm. A plastic stencil with 24 holes was placed onto the plate and infested pea seedlings were placed directly on the Parafilm. The infested plate was closed with a gel blotting paper and another plastic stencil and then turned upside down. The samples were assessed for mortality 5 days after infestation.

Example B9: *Spodoptera littoralis* (Egyptian Cotton Leaf Worm)

Cotton leaf discs were placed onto agar in 24-well microtiter plates and sprayed with aqueous test solutions prepared from 10'000 ppm DMSO stock solutions. After drying the leaf discs were infested with five L1 larvae. The samples were assessed for mortality, anti-feeding effect, and growth inhibition in comparison to untreated samples 3 days after infestation. Control of *Spodoptera littoralis* by a test sample is given when at least one of the categories mortality, anti-feedant effect, and growth inhibition is higher than the untreated sample.

The following compounds resulted in at least 80% control in at least one of the three categories (mortality, anti-feedant effect, or growth inhibition) at an application rate of 200 ppm:

P1, P2, P3, P4, P5, P6, P7, P8, P9, P10, P11, P12, P13, P14, P15, P16, P17, P18, P19, P20, P21, P22, P23, P24, P25, P26, P27, P28, P29, P30, P31, P32, P33, P34, P35, P36, P37, P38, P39, P40, P41, P42, P43, P44, P45, P46, P47, P48, P49, P51, P52, P54, P57.

Example B10: *Spodoptera littoralis* (Egyptian Cotton Leaf Worm)

Test compounds were applied by pipette from 10'000 ppm DMSO stock solutions into 24-well plates and mixed with agar. Lettuce seeds were placed onto the agar and the multi well plate was closed by another plate which contained also agar. After 7 days the compound was absorbed by the roots and the lettuce grew into the lid plate. The lettuce leaves were then cut off into the lid plate. *Spodoptera* eggs were pipetted through a plastic stencil onto a humid gel blotting paper and the lid plate was closed with it. The samples were assessed for mortality, anti-feedant effect and growth inhibition in comparison to untreated samples 6 days after infestation.

The following compounds gave an effect of at least 80% control in at least one of the three categories (mortality, anti-feedant, or growth inhibition) at a test rate of 12.5 ppm:
P12.

Example B11: *Thrips tabaci* (Onion *Thrips*): Feeding/Contact Activity

Sunflower leaf discs were placed on agar in 24-well microtiter plates and sprayed with aqueous test solutions prepared from 10'000 ppm DMSO stock solutions. After drying the leaf discs were infested with a *thrips* population of mixed ages. The samples were assessed for mortality 6 days after infestation.

Example B12: *Myzus persicae* (Green Peach Aphid)

Test compounds prepared from 10'000 ppm DMSO stock solutions were applied by a liquid handling robot into 96-well microtiter plates and mixed with a sucrose solution. Parafilm was stretched over the 96-well microtiter plate and a plastic stencil with 96 holes was placed onto the plate. Aphids were sieved into the wells directly onto the Parafilm. The infested plates were closed with a gel blotting card and a second plastic stencil and then turned upside down. The samples were assessed for mortality 5 days after infestation.

The following compounds resulted in at least 80% mortality at an application rate of 50 ppm:
P23, P43, P47.

Example B13: *Plutella xylostella* (Diamondback Moth)

96-well microtiter plates containing artificial diet were treated with aqueous test solutions, prepared from 10'000 ppm DMSO stock solutions, by a liquid handling robot. After drying, eggs (~30 per well) were infested onto a netted lid which was suspended above the diet. The eggs hatch and L1 larvae move down to the diet. The samples were assessed for mortality 9 days after infestation.

The following compounds gave an effect of at least 80% mortality at an application rate of 500 ppm:
P1, P3, P4, P8, P12, P13, P15, P16, P17, P18, P19, P20, P21, P23, P27, P28, P29, P30, P31, P35, P36, P40, P41, P42, P43, P44, P45, P46, P47, P49, P52, P53, P56, P57.

Example B14: *Tetranychus urticae* (Two-Spotted Spider Mite): Feeding/Contact Activity Bean leaf discs on agar in 24-well microtiter plates were sprayed with aqueous test solutions prepared from 10'000 ppm DMSO stock solutions. After drying the leaf discs were infested with a mite population of mixed ages. The samples were assessed for mortality on mixed population (mobile stages) 8 days after infestation.

The following compounds resulted in at least 80% mortality at an application rate of 200 ppm:
P16.

The invention claimed is:
1. A compound of the formula I

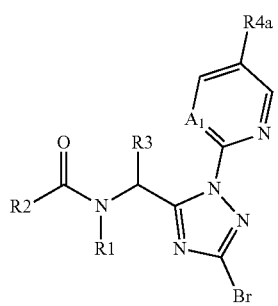

I wherein
$R_1$ is H, $C_1$-$C_6$alkyl, $C_1$-$C_6$cyanoalkyl, aminocarbonyl$C_1$-$C_6$alkyl, hydroxycarbonyl$C_1$-$C_6$alkyl, $C_1$-$C_6$nitroalkyl, trimethylsilane$C_1$-$C_6$alkyl, $C_1$-$C_6$haloalkyl, $C_2$-$C_6$alkenyl, $C_2$-$C_6$haloalkenyl, $C_2$-$C_6$alkynyl, $C_2$-$C_6$haloalkynyl, $C_3$-$C_4$cycloalkyl$C_1$-$C_2$alkyl-, $C_3$-$C_4$cycloalkyl$C_1$-$C_2$alkyl-wherein the $C_3$-$C_4$cycloalkyl group is substituted with 1 or 2 halogen atoms, oxetan-3-yl-$CH_2$—, benzyl or benzyl substituted with halogen or $C_1$-$C_6$haloalkyl;
$R_2$ is selected from phenyl, pyridine, pyrimidine, pyrazine, pyridazine, and phenyl, pyridine, pyrimidine, pyrazine and pyridazine, each of which is substituted with one to three substituents, provided the substituent(s) are not on either carbon adjacent to the carbon C=X is attached, and each substituent is independently selected from: $C_1$-$C_3$alkyl, $C_1$-$C_3$haloalkyl, $C_1$-$C_3$haloalkylthio, $C_1$-$C_3$alkoxy, $C_1$-$C_3$haloalkoxy, halo, $SF_5$, CN, $CONH_2$, and $C(S)NH_2$;
$R_3$ is $C_1$-$C_3$alkyl or $C_1$-$C_3$haloalkyl;
$A_1$ is $CR_{4b}$ or N;
$R_{4b}$ is hydrogen, or halogen;
$R_{4a}$ is cyano, or $C_1$-$C_3$haloalkoxy;
$R_5$ is halogen, amino, ($C_1$-$C_3$alkyl) amino, di($C_1$-$C_3$alkyl) amino, hydroxy, cyano, $C_3$-$C_4$halocycloalkyl, $C_2$-$C_6$haloalkenyl, $C_1$-$C_4$haloalkylsulfanyl, $C_1$-$C_4$haloalkylsulfinyl, $C_1$-$C_4$haloalkylsulfonyl, $C_1$-$C_4$alkylsulfanyl, $C_1$-$C_4$alkylsulfinyl, $C_1$-$C_4$alkylsulfonyl, ($C_1$-$C_3$alkyl) sulfonylamino, ($C_1$-$C_3$alkyl) sulfonyl ($C_1$-$C_3$alkyl) amino, ($C_1$-$C_3$alkyl) NHC(O), ($C_1$-$C_3$alkyl)$_2$NC(O), ($C_3$-$C_6$cycloalkyl) NHC(O), ($C_3$-$C_6$cycloalkyl) ($C_1$-$C_3$alkyl)NC(O), ($C_1$-$C_3$alkyl)C(O)($C_1$-$C_3$alkyl)N, ($C_1$-$C_3$alkyl)C(O)NH, diphenylmethanimine, or $C_1$-$C_3$haloalkoxy; or
agrochemically acceptable salts, stereoisomers, enantiomers, tautomers and N-oxides of the compounds of formula I.

2. The compound according to claim 1, wherein $R_3$ is methyl.

3. The compound according to claim 1, wherein $R_1$ is hydrogen, methyl, ethyl, n-propyl, isobutyl, cyclopropylmethyl or HCH=CCH$_2$—.

4. The compound according to claim 1, wherein $R_2$ is one of M-1 to M-12:

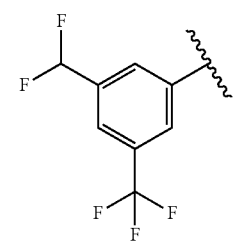

M-1

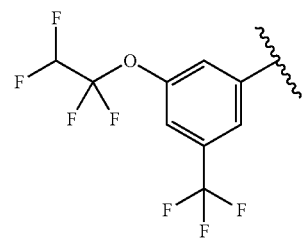

M-2

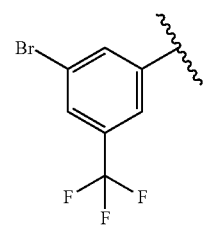

M-3

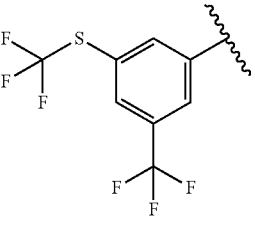

M-4

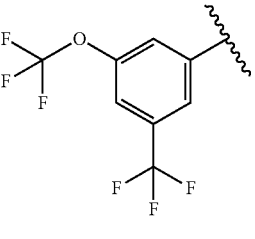

M-5

M-6 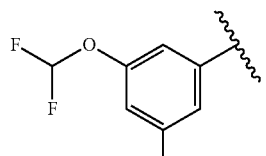
M-7 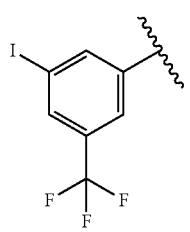
M-8 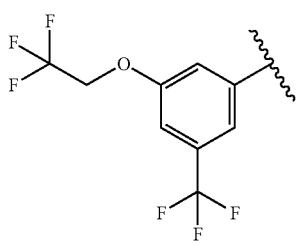
M-9 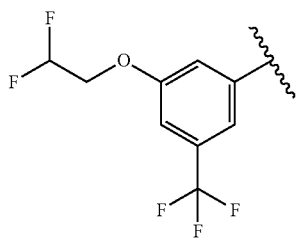
M-10 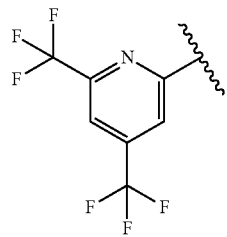
M-11 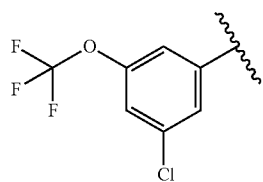
M-12 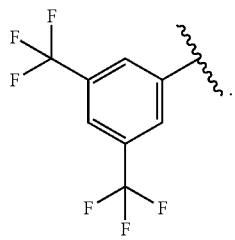
5. The compound according to claim 1, wherein $R_{4a}$ is cyano, or $C_1$-$C_3$ fluoroalkoxy.
6. The compound according claim 1, to wherein $A_1$ is N.
7. The compound according to claim 1, wherein $A_2$ is CH.
8. The compound according to claim 1, wherein $R_5$ is selected from J-1 to J-11:
J-1 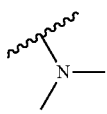
J-2 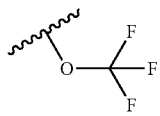
J-3 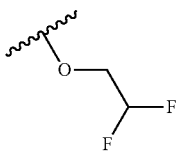
J-4 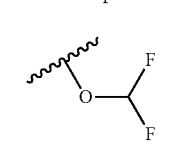
J-5 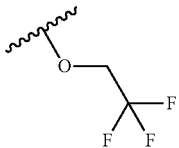
J-6 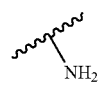
J-7 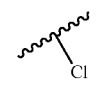
J-8 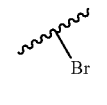
J-9 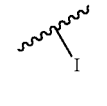

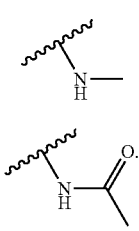

9. A composition comprising the compound according to claim 1, one or more auxiliaries and diluent, and optionally one more other active ingredient.

10. A method
  (i) of combating and controlling insects, acarines, nematodes or molluscs which comprises applying to a pest, to a locus of a pest, or to a plant susceptible to attack by a pest an insecticidally, acaricidally, nematicidally or molluscicidally effective amount of the compound of the formula I; or
  (ii) for the protection of plant propagation material from the attack by insects, acarines, nematodes or molluscs, which comprises treating the propagation material or the site, where the propagation material is planted, with an effective amount of the compound of the formula I; or
  (iii) of controlling parasites in or on an animal in need thereof comprising administering an effective amount of the compound of the formula I; or
  wherein the compound of the formula I is a defined in claim 1.

11. A plant propagation material, comprising the compound according to claim 1.

12. The plant propagation material of claim 11, wherein the plant propagation material is treated with or adhered to the compound according to claim 1.

13. The compound of formula I, wherein the compound is:
3-bromo-N-[1-[5-bromo-2-[5-(difluoromethoxy) pyrimidin-2-yl]-1,2,4-triazol-3-yl]ethyl]-5-(trifluoromethyl) benzamide;
N-[1-[5-bromo-2-[5-(difluoromethoxy) pyrimidin-2-yl]-1,2,4-triazol-3-yl]ethyl]-3,5-bis (trifluoromethyl) benzamide;
N-[1-[5-bromo-2-[5-(difluoromethoxy) pyrimidin-2-yl]-1,2,4-triazol-3-yl]ethyl]-3-(difluoromethoxy)-5-(trifluoromethyl) benzamide;
N-[1-[5-bromo-2-[5-(difluoromethoxy) pyrimidin-2-yl]-1,2,4-triazol-3-yl]ethyl]-3-(2,2,2-trifluoroethoxy)-5-(trifluoromethyl) benzamide;
N-[1-[5-bromo-2-(5-cyano-2-pyridyl)-1,2,4-triazol-3-yl]ethyl]-3-(trifluoromethyl)-5-(trifluoromethylsulfanyl) benzamide;
N-[1-[5-bromo-2-[5-(difluoromethoxy)-2-pyridyl]-1,2,4-triazol-3-yl]ethyl]-3,5-bis (trifluoromethyl) benzamide;
N-[1-[5-bromo-2-[5-(difluoromethoxy)-2-pyridyl]-1,2,4-triazol-3-yl]ethyl]-3-(difluoromethoxy)-5-(trifluoromethyl) benzamide;
N-[1-[5-bromo-2-(5-cyano-2-pyridyl)-1,2,4-triazol-3-yl]ethyl]-3-(difluoromethyl)-5-(trifluoromethyl) benzamide;
N-[1-[5-bromo-2-(5-cyano-2-pyridyl)-1,2,4-triazol-3-yl]ethyl]-3-(trifluoromethoxy)-5-(trifluoromethyl) benzamide;
N-[1-[5-bromo-2-(5-cyano-2-pyridyl)-1,2,4-triazol-3-yl]ethyl]-3-(difluoromethoxy)-5-(trifluoromethyl) benzamide;
N-[1-[5-bromo-2-(5-cyano-2-pyridyl)-1,2,4-triazol-3-yl]ethyl]-3,5-bis (trifluoromethyl) benzamide;
N-[1-[5-bromo-2-(5-cyano-2-pyridyl)-1,2,4-triazol-3-yl]ethyl]-N-methyl-3,5-bis (trifluoromethyl) benzamide;
3-bromo-N-[1-[5-bromo-2-[5-(difluoromethoxy)-2-pyridyl]-1,2,4-triazol-3-yl]ethyl]-5-(trifluoromethyl) benzamide;
N-[1-[5-bromo-2-[5-(difluoromethoxy)-2-pyridyl]-1,2,4-triazol-3-yl]ethyl]-3-(2,2,2-trifluoroethoxy)-5-(trifluoromethyl) benzamide;
N-[1-[5-bromo-2-[5-(2,2-difluoroethoxy)-2-pyridyl]-1,2,4-triazol-3-yl]ethyl]-3,5-bis (trifluoromethyl) benzamide;
N-[1-[5-bromo-2-[5-(2,2-difluoroethoxy)-2-pyridyl]-1,2,4-triazol-3-yl]ethyl]-3-(difluoromethoxy)-5-(trifluoromethyl) benzamide;
N-[1-[5-bromo-2-[5-(2,2,2-trifluoroethoxy)-2-pyridyl]-1,2,4-triazol-3-yl]ethyl]-3,5-bis (trifluoromethyl) benzamide;
3-bromo-N-[1-[5-bromo-2-[5-(2,2-difluoroethoxy) pyrimidin-2-yl]-1,2,4-triazol-3-yl]ethyl]-5-(trifluoromethyl) benzamide;
N-[1-[5-bromo-2-[5-(2,2-difluoroethoxy) pyrimidin-2-yl]-1,2,4-triazol-3-yl]ethyl]-3-(2,2,2-trifluoroethoxy)-5-(trifluoromethyl) benzamide;
N-[1-[5-bromo-2-[5-(2,2,2-trifluoroethoxy) pyrimidin-2-yl]-1,2,4-triazol-3-yl]ethyl]-3-(2,2-difluoroethoxy)-5-(trifluoromethyl) benzamide;
N-[1-[5-bromo-2-(5-cyano-2-pyridyl)-1,2,4-triazol-3-yl]ethyl]-3-(2,2,2-trifluoroethoxy)-5-(trifluoromethyl) benzamide;
N-[1-[5-bromo-2-[5-(2,2-difluoroethoxy) pyrimidin-2-yl]-1,2,4-triazol-3-yl]ethyl]-3-(trifluoromethoxy)-5-(trifluoromethyl) benzamide;
N-[1-[5-bromo-2-[5-(2,2-difluoroethoxy) pyrimidin-2-yl]-1,2,4-triazol-3-yl]ethyl]-3-(difluoromethoxy)-5-(trifluoromethyl) benzamide N-[1-[5-bromo-2-[5-(2,2-difluoroethoxy) pyrimidin-2-yl]-1,2,4-triazol-3-yl]ethyl]-3-(trifluoromethyl)-5-(trifluoromethylsulfanyl) benzamide;
N-[1-[5-bromo-2-[5-(2,2-difluoroethoxy) pyrimidin-2-yl]-1,2,4-triazol-3-yl]ethyl]-3,5-bis (trifluoromethyl) benzamide;
N-[1-[5-bromo-2-[5-(difluoromethoxy)-2-pyridyl]-1,2,4-triazol-3-yl]ethyl]-3-chloro-5-(trifluoromethyl) benzamide;
N-[1-[5-bromo-2-[5-(2,2-difluoroethoxy) pyrimidin-2-yl]-1,2,4-triazol-3-yl]ethyl]-3-chloro-5-(trifluoromethyl) benzamide;
N-[1-[5-bromo-2-[5-(difluoromethoxy) pyrimidin-2-yl]-1,2,4-triazol-3-yl]ethyl]-3-(difluoromethyl)-5-(trifluoromethyl) benzamide;
N-[1-[5-bromo-2-[5-(difluoromethoxy) pyrimidin-2-yl]-1,2,4-triazol-3-yl]ethyl]-3-chloro-5-(trifluoromethyl) benzamide;
3-bromo-N-[1-[5-bromo-2-(5-cyano-2-pyridyl)-1,2,4-triazol-3-yl]ethyl]-5-(trifluoromethyl) benzamide;
N-[1-[5-bromo-2-(5-cyano-2-pyridyl)-1,2,4-triazol-3-yl]ethyl]-3-chloro-5-(trifluoromethyl) benzamide;
N-[1-[2-(5-cyano2-pyridyl)-5-pyrimidin-2-yl1,2,4-triazol-3-yl]ethyl]-3,5-bis (trifluoromethyl) benzamide;
N-[1-[5-bromo-2-(5-cyano-2-pyridyl)-1,2,4-triazol-3-yl]ethyl]-3-(2,2-difluoroethoxy)-5-(trifluoromethyl) benzamide;

N-[1-[5-bromo-2-[5-(difluoromethoxy)-2-pyridyl]-1,2,4-triazol-3-yl]ethyl]-3-(2,2-difluoroethoxy)-5-(trifluoromethyl) benzamide;

3-bromo-N-[1-[5-bromo-2-[5-(2,2-difluoroethoxy)-2-pyridyl]-1,2,4-triazol-3-yl]ethyl]-5-(trifluoromethyl) benzamide;

N-[1-[5-bromo-2-[5-(2,2-difluoroethoxy)-2-pyridyl]-1,2,4-triazol-3-yl]ethyl]-3-(2,2-difluoroethoxy)-5-(trifluoromethyl) benzamide;

N-[1-[5-bromo-2-[5-(2,2,2-trifluoroethoxy)-2-pyridyl]-1,2,4-triazol-3-yl]ethyl]-3-chloro-5-(trifluoromethyl) benzamide;

N-[1-[5-bromo-2-[5-(2,2,2-trifluoroethoxy)-2-pyridyl]-1,2,4-triazol-3-yl]ethyl]-3-(difluoromethoxy)-5-(trifluoromethyl) benzamide;

N-[1-[5-bromo-2-[5-(2,2,2-trifluoroethoxy)-2-pyridyl]-1,2,4-triazol-3-yl]ethyl]-3-(2,2,2-trifluoroethoxy)-5-(trifluoromethyl) benzamide;

N-[1-[5-bromo-2-[5-(2,2-difluoroethoxy) pyrimidin-2-yl]-1,2,4-triazol-3-yl]ethyl]-3-(difluoromethyl)-5-(trifluoromethyl) benzamide;

3-bromo-N-[1-[5-bromo-2-[5-(2,2,2-trifluoroethoxy) pyrimidin-2-yl]-1, 2,4-triazol-3-yl] ethyl]-5-(trifluoromethyl) benzamide;

N-[1-[5-bromo-2-[5-(2,2,2-trifluoroethoxy) pyrimidin-2-yl]-1,2,4-triazol-3-yl]ethy]-3-(difluoromethyl)-5-(trifluoromethyl) benzamide;

N-[1-[5-bromo-2-[5-(2,2,2-trifluoroethoxy) pyrimidin-2-yl]-1,2,4-triazol-3-yl]ethyl]-3-chloro-5-(trifluoromethyl) benzamide;

N-[1-[5-bromo-2-[5-(2,2,2-trifluoroethoxy) pyrimidin-2-yl]-1,2,4-triazol-3-yl]ethyl]-3,5-bis (trifluoromethyl) benzamide;

N-[1-[5-bromo-2-[5-(2,2,2-trifluoroethoxy) pyrimidin-2-yl]-1,2,4-triazol-3-yl]ethyl]-3-(difluoromethoxy)-5-(trifluoromethyl) benzamide;

N-[1-[5-bromo-2-[5-(2,2,2-trifluoroethoxy) pyrimidin-2-yl]-1,2,4-triazol-3-yl]ethyl]-3-(2,2,2-trifluoroethoxy)-5-(trifluoromethyl) benzamide;

N-[1-[5-bromo-2-[5-(2,2-difluoroethoxy) pyrimidin-2-yl]-1,2,4-triazol-3-yl]ethyl]-3-(2,2-difluoroethoxy)-5-(trifluoromethyl) benzamide;

N-[1-[5-cyano-2-(5-cyano-2-pyridyl)-1,2,4-triazol-3-yl] ethyl]-3,5-bis (trifluoromethyl) benzamide;

N-[1-[5-bromo-2-[5-(2,2-difluoroethoxy)-2-pyridyl]-1,2,4-triazol-3-yl]ethyl]-3-chloro-5-(trifluoromethyl) benzamide;

3-bromo-N-[1-[5-bromo-2-[5-(2,2,2-trifluoroethoxy)-2-pyridyl]-1,2,4-triazol-3-yl]ethyl]-5-(trifluoromethyl) benzamide;

N-[1-[5-bromo-2-[5-(difluoromethoxy)-2-pyridyl]-1,2,4-triazol-3-yl]ethyl]-3-(difluoromethyl)-5-(trifluoromethyl) benzamide;

N-[1-[5-bromo-2-[5-(2,2-difluoroethoxy)-2-pyridyl]-1,2,4-triazol-3-yl]ethyl]-3-(difluoromethyl)-5-(trifluoromethyl) benzamide;

N-[1-[5-bromo-2-[5-(2,2-difluoroethoxy)-2-pyridyl]-1,2,4-triazol-3-yl]ethyl]-3-(2,2,2-trifluoroethoxy)-5-(trifluoromethyl) benzamide;

N-[1-[5-bromo-2-[5-(2,2,2-trifluoroethoxy)-2-pyridyl]-1,2,4-triazol-3-yl]ethyl]-3-(difluoromethyl)-5-(trifluoromethyl) benzamide;

N-[1-[5-bromo-2-[5-(2,2,2-trifluoroethoxy)-2-pyridyl]-1,2,4-triazol-3-yl]ethyl]-3-(2,2-difluoroethoxy)-5-(trifluoromethyl) benzamide;

N-[1-[2-(5-cyano2-pyridyl)-5-[(E)-N-methoxy-Cmethyl-carbonimidoyl]-1,2,4-triazol-3-yl]ethyl]-3,5-bis (trifluoromethyl) benzamide; or N-[1-[5-acetyl-2-(5-cyano-2-pyridyl)-1,2,4-triazol-3-yl] ethyl]-3,5-bis (trifluoromethyl) benzamide.

14. The compound of formula I, which is synthesizable from one or more of intermediate selected from:
(i) 6-(3-bromo-5-ethyl-1,2,4-triazol-1-yl) pyridine-3-carbonitrile;
(ii) 6-[3-bromo-5-(1-bromoethyl)-1,2,4-triazol-1-yl]pyridine-3-carbonitrile; and
(iii) 6-[5-(1-aminoethyl)-3-bromo-1,2,4-triazol-1-yl]pyridine-3-carbonitrile hydrobromide.

15. A method of preparing the compound of formula I, comprising
(a) preparing an intermediate selected from
(i) 6-(3-bromo-5-ethyl-1,2,4-triazol-1-yl) pyridine-3-carbonitrile;
(ii) 6-[3-bromo-5-(1-bromoethyl)-1,2,4-triazol-1-yl] pyridine-3-carbonitrile; and
(iii) 6-[5-(1-aminoethyl)-3-bromo-1,2,4-triazol-1-yl] pyridine-3-carbonitrile hydrobromide;
(b) reacting the intermediate with an oxidizing reagent; and
thereby producing the compound of formula I.

16. A compound of:
(i) 6-(3-bromo-5-ethyl-1,2,4-triazol-1-yl) pyridine-3-carbonitrile;
(ii) 6-[3-bromo-5-(1-bromoethyl)-1,2,4-triazol-1-yl]pyridine-3-carbonitrile; or
(iii) 6-[5-(1-aminoethyl)-3-bromo-1,2,4-triazol-1-yl]pyridine-3-carbonitrile hydrobromide.

17. A method
(i) of combating and controlling insects, acarines, nematodes or molluscs which comprises applying to a pest, to a locus of a pest, or to a plant susceptible to attack by a pest an insecticidally, acaricidally, nematicidally or molluscicidally effective amount of the composition according to claim 9; or
(ii) for the protection of plant propagation material from the attack by insects, acarines, nematodes or molluscs, which comprises treating the propagation material or the site, where the propagation material is planted, with an effective amount of the composition according to claim 9; or
(iii) of controlling parasites in or on an animal in need thereof comprising administering an effective amount of the composition according to claim 9.

* * * * *